United States Patent
Kitago et al.

(10) Patent No.: US 10,414,906 B2
(45) Date of Patent: *Sep. 17, 2019

(54) RUBBER COMPOSITION AND PNEUMATIC TIRE

(71) Applicant: SUMITOMO RUBBER INDUSTRIES, LTD., Kobe-shi, Hyogo (JP)

(72) Inventors: Ryota Kitago, Kobe (JP); Takayuki Nagase, Kobe (JP); Yuuki Kawana, Tokyo (JP); Takayuki Hattori, Kobe (JP); Takao Wada, Kobe (JP); Soh Ishino, Kobe (JP); Yuhei Yamashiro, Kobe (JP); Masaki Oshimo, Kobe (JP); Masanobu Nakamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 15/513,514

(22) PCT Filed: Sep. 30, 2015

(86) PCT No.: PCT/JP2015/077737
§ 371 (c)(1),
(2) Date: Mar. 22, 2017

(87) PCT Pub. No.: WO2016/056443
PCT Pub. Date: Apr. 14, 2016

(65) Prior Publication Data
US 2018/0186973 A1    Jul. 5, 2018

(30) Foreign Application Priority Data

| Oct. 6, 2014 | (JP) | 2014-205708 |
|---|---|---|
| Oct. 6, 2014 | (JP) | 2014-205709 |
| Oct. 6, 2014 | (JP) | 2014-205710 |
| Oct. 6, 2014 | (JP) | 2014-205711 |
| Oct. 6, 2014 | (JP) | 2014-205712 |
| Nov. 13, 2014 | (JP) | 2014-230799 |
| Nov. 13, 2014 | (JP) | 2014-230800 |
| Nov. 14, 2014 | (JP) | 2014-231686 |
| Dec. 2, 2014 | (JP) | 2014-244151 |
| Dec. 9, 2014 | (JP) | 2014-249066 |
| Dec. 10, 2014 | (JP) | 2014-250048 |
| Dec. 10, 2014 | (JP) | 2014-250049 |
| Dec. 12, 2014 | (JP) | 2014-252366 |

(51) Int. Cl.
| C08L 9/00 | (2006.01) |
| C08L 9/06 | (2006.01) |
| C08L 15/02 | (2006.01) |
| C08K 3/04 | (2006.01) |
| B60C 1/00 | (2006.01) |
| C08L 7/00 | (2006.01) |
| B60C 15/06 | (2006.01) |

(Continued)

(52) U.S. Cl.
CPC .............. C08L 7/00 (2013.01); B60C 1/00 (2013.01); B60C 1/0016 (2013.01); B60C 15/06 (2013.01); C08K 3/04 (2013.01); C08L 9/00 (2013.01); C08L 9/06 (2013.01); C08L 15/02 (2013.01); C08L 21/00 (2013.01); C08L 91/00 (2013.01); C08K 2201/003 (2013.01); C08K 2201/006 (2013.01); C08L 2205/025 (2013.01); C08L 2207/20 (2013.01)

(58) Field of Classification Search
CPC ..... C08K 3/04; C08L 7/00; C08L 9/00; C08L 9/06; C08L 15/02; B60C 1/00
USPC ....................................................... 524/496
See application file for complete search history.

(56) References Cited

U.S. PATENT DOCUMENTS

| 4,973,463 A | 11/1990 | Nakai |
| 5,124,396 A | 6/1992 | Branan, Jr. et al. |
| 5,229,452 A | 7/1993 | Green et al. |

(Continued)

FOREIGN PATENT DOCUMENTS

| CN | 1206032 A | 1/1999 |
| EP | 2 778 202 A1 | 9/2014 |

(Continued)

OTHER PUBLICATIONS

Machine Translation of JP-10-193911-A, published Jul. 28, 1998 (Japanese and English language versions provided).
Machine Translation of JP-2000-313820-A, published Nov. 14, 2000 (Japanese and English language versions provided).
Machine Translation of JP-2011-99012-A, published May 19, 2011 (Japanese and English language versions provided).
Machine Translation of JP-2011-99018-A, published May 19, 2011 (Japanese and English language versions provided).

(Continued)

*Primary Examiner* — Deve E Valdez
(74) *Attorney, Agent, or Firm* — Birch, Stewart, Kolasch & Birch LLP

(57) ABSTRACT

The present invention aims to provide pneumatic tires that can achieve both abrasion resistance and low heat build-up properties. The present invention relates to a pneumatic tire including a tread formed from a rubber composition, the rubber composition containing: a rubber component including an isoprene-based rubber and a high-cis polybutadiene rubber having a cis content of 90% by mass or more; one or more types of carbon black; and sulfur, at least one of the one or more types of carbon black being produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI = 48,640/(T+273) + 473.7D - 456.8.$$

8 Claims, 1 Drawing Sheet

(51) Int. Cl.
*C08L 21/00* (2006.01)
*C08L 91/00* (2006.01)

(56) References Cited

U.S. PATENT DOCUMENTS

| | | |
|---|---|---|
| 5,430,088 A | 7/1995 | Ohashi et al. |
| 5,985,977 A | 11/1999 | Aoki et al. |
| 6,358,487 B1 | 3/2002 | Omae et al. |
| 6,787,595 B1 | 9/2004 | Yamada et al. |
| 2003/0134960 A1* | 7/2003 | Hochi .............. C08K 3/34 524/492 |
| 2008/0110552 A1 | 5/2008 | Arnold |
| 2013/0092300 A1 | 4/2013 | Kunisawa et al. |
| 2016/0083553 A1* | 3/2016 | Kitago .............. B60C 1/00 523/155 |

FOREIGN PATENT DOCUMENTS

| | | |
|---|---|---|
| JP | 7-500371 A | 1/1995 |
| JP | 8-230407 A | 9/1996 |
| JP | 10-193911 A | 7/1998 |
| JP | 2912845 B2 | 6/1999 |
| JP | 2000-313820 A | 11/2000 |
| JP | 2001-81239 A | 3/2001 |
| JP | 2009-23503 A | 2/2009 |
| JP | 2009-24071 A | 2/2009 |
| JP | 2011-99012 A | 5/2011 |
| JP | 2011-99018 A | 5/2011 |
| JP | 2012-126852 A | 7/2012 |
| JP | 2012-207233 A | 10/2012 |
| JP | 2013-185102 A | 9/2013 |
| JP | 2013-221052 A | 10/2013 |
| JP | 2013-241482 A | 12/2013 |
| JP | 2015-919 A | 1/2015 |
| WO | WO 91/13944 A1 | 9/1991 |
| WO | WO 94/19412 A1 | 9/1994 |
| WO | 2014/200009 A1 | 12/2014 |
| WO | WO 2014/200009 * | 12/2014 |

OTHER PUBLICATIONS

Machine Translation of JP-2012-126852-A, published Jul. 5, 2012 (Japanese and English language versions provided).
Machine Translation of JP-2013-185102-A, published Sep. 19, 2013 (Japanese and English language versions provided).
Machine Translation of JP-2013-221052-A, published Oct. 28, 2013 (Japanese and English language versions provided).
Machine Translation of JP-2013-241482-A, published Dec. 5, 2013 (Japanese and English language versions provided).
International Search Report, issued in PCT JP2015/077737 (PCT/ISA/210), dated Dec. 1, 2015.
Written Opinion of the International Searching Authority, issued in PCT/JP2015/077737 (PCT/ISA/237), dated Dec. 1, 2015.
Chinese Office Action and Search Report, dated Apr. 24, 2018 for Chinese Application No. 201580051628.7, with an English translation of the Chinese Office Action.
Technical Intelligence Unit, Carbon Black Industrial Research and Design Institute, "Carbon Black Raw Material Oil," Petrochemical Industry Press, Jul. 31, 1978, pp. 93-64, 82-84, 23-24 (8 pages total).
Zhaohong, "Rubber Reinforcing Fillers," Chemical Industry Press, Jun. 30, 2013, 3 pages.

* cited by examiner

RUBBER COMPOSITION AND PNEUMATIC TIRE

TECHNICAL FIELD

The present invention relates to rubber compositions or pneumatic tires.

BACKGROUND ART

<1>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent resistance to abrasion (abrasion resistance) during running and also to exhibit low hysteresis loss upon deformation of the rubbers during running and thus have low heat build-up properties. Several techniques have been investigated to simultaneously achieve such abrasion resistance and low heat build-up properties, such as high filling with carbon black or use of carbon black having a high specific surface area (a small particle size) or a high structure. Such use of carbon black enhances abrasion resistance but unfortunately may lead to insufficient low heat build-up properties.

In order to improve abrasion resistance of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire including a tread formed from the rubber composition may show insufficient low heat build-up properties. On the other hand, reducing the sharpness (increasing the broadness) of the aggregate diameter distribution can improve the low heat build-up properties of tires but at the same time tends to reduce the abrasion resistance. Thus, controlling only the aggregate diameter distribution of carbon black is also not an effective way to simultaneously achieve abrasion resistance and low heat build-up properties of tires.

As described above, abrasion resistance and low heat build-up properties have a trade-off relationship. Although developments have been made to achieve both properties to a high extent, it is still difficult to achieve the goal.

<2>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Rubber compositions for clinches or chafers, which are tire components to be in contact with the rims of tires for ensuring antistatic properties for the tires, conventionally include carbon black derived from fossil resources or highly conductive carbon black (for example, carbon black having a nitrogen adsorption specific surface area of 1,000 m²/g or more). The uses of carbon black derived from fossil resources and of highly conductive carbon black can reduce the cost and the amount of carbon black added, respectively, but may cause problems such as so-called rim chafing (abrasion caused by contact with the rim) in the portion of the clinch or chafer in contact with the rim or deterioration of the antistatic properties of tires during service.

In order to improve abrasion resistance of tires by controlling the properties of carbon black other than specific surface area and structure, a technique of increasing the sharpness of the aggregate diameter distribution of carbon black has been proposed. However, controlling only the aggregate diameter distribution of carbon black is not an effective way to simultaneously achieve abrasion resistance and low heat build-up properties of tires, which have a trade-off relationship, and therefore there is room for improvement.

<3>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Rubber compositions for conductive rubbers (base pens), which are tire components to be in contact with the ground for ensuring antistatic properties for tires, conventionally include carbon black derived from fossil resources or highly conductive carbon black (for example, carbon black having a nitrogen adsorption specific surface area of 1,000 m²/g or more). The uses of carbon black derived from fossil resources and of highly conductive carbon black can reduce the cost and the amount of carbon black added, respectively, but may cause problems such as higher abrasion of the portion of the conductive rubber in contact with the ground than the surrounding component (tread rubber) leading to poor ground contact properties, or deterioration of the antistatic properties of tires during service.

In order to improve abrasion resistance of tires by controlling the properties of carbon black other than specific surface area and structure, a technique of increasing the sharpness of the aggregate diameter distribution of carbon black has been proposed. However, controlling only the aggregate diameter distribution of carbon black is not an effective way to simultaneously achieve abrasion resistance and low heat build-up properties of tires, which have a trade-off relationship, and therefore there is room for improvement.

<4>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent resistance to abrasion (abrasion resistance) during running and also to exhibit low hysteresis loss upon deformation of the rubbers during running and thus have low heat build-up properties. Several techniques have been investigated to simultaneously achieve such abrasion resistance and low heat build-up properties, such as high filling with carbon black or use of carbon black having a high specific surface area (a small particle size) or a high structure. The use of such carbon black enhances the abrasion resistance but unfortunately may lead to insufficient low heat build-up properties.

In order to improve abrasion resistance of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire with a tread formed from the rubber composition may have insufficient low heat build-up properties. Reducing the sharpness (increasing the broadness) of the aggregate diameter distribution can improve the low heat build-up properties of tires but at the same time tends to reduce the abrasion resistance. Thus, controlling only the aggregate diameter distribution of carbon black is also not an effective way to simultaneously achieve abrasion resistance and low heat build-up properties of tires.

As described above, abrasion resistance and low heat build-up properties have a trade-off relationship. Although developments have been made to achieve both properties to a high extent, no carbon black providing sufficient properties has yet been found.

<5>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Rubber compositions for tire innerliners are required to maintain the air pressure of tires for a long time, in other words, to have air permeation resistance, and also to exhibit low hysteresis loss upon deformation of the rubbers during running and thus have low heat build-up properties. Several techniques have been investigated to simultaneously achieve such air permeation resistance and low heat build-up properties, such as high filling with carbon black or use of carbon black having a high structure. Such use of carbon black enhances air permeation resistance but unfortunately may lead to insufficient low heat build-up properties.

As described above, air permeation resistance and low heat build-up properties have a trade-off relationship. Although developments have been made to achieve both properties to a high extent, no carbon black providing sufficient properties has yet been found.

<6>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent resistance to abrasion (abrasion resistance) during running and also to exhibit low hysteresis loss upon deformation of the rubbers during running and thus have low heat build-up properties. Several techniques have been investigated to simultaneously achieve such abrasion resistance and low heat build-up properties, such as high filling with carbon black or use of carbon black having a high specific surface area (a small particle size) or a high structure. Such use of carbon black enhances abrasion resistance but unfortunately may lead to insufficient low heat build-up properties.

In order to improve abrasion resistance of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire including a tread formed from the rubber composition may show insufficient low heat build-up properties. On the other hand, reducing the sharpness (increasing the broadness) of the aggregate diameter distribution can improve the low heat build-up properties of tires but at the same time tends to reduce the abrasion resistance. Thus, controlling only the aggregate diameter distribution of carbon black is also not an effective way to simultaneously achieve abrasion resistance and low heat build-up properties of tires.

As described above, abrasion resistance and low heat build-up properties have a trade-off relationship. Although developments have been made to achieve both properties to a high extent, there is still room for improvement.

<7>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent resistance to abrasion (abrasion resistance) during running and also to exhibit low hysteresis loss upon deformation of the rubbers during running and thus have low heat build-up properties. Several techniques have been investigated to simultaneously achieve such abrasion resistance and low heat build-up properties, such as high filling with carbon black or use of carbon black having a high specific surface area (a small particle size) or a high structure. Such use of carbon black enhances abrasion resistance but unfortunately may lead to insufficient low heat build-up properties.

In order to improve abrasion resistance of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire including a tread formed from the rubber composition may show insufficient low heat build-up properties. On the other hand, reducing the sharpness (increasing the broadness) of the aggregate diameter distribution can improve the low heat build-up properties of tires but at the same time tends to reduce the abrasion resistance. Thus, controlling only the aggregate diameter distribution of carbon black is also not an effective way to simultaneously achieve abrasion resistance and low heat build-up properties of tires.

As described above, abrasion resistance and low heat build-up properties have a trade-off relationship. Although developments have been made to achieve both properties to a high extent, there is still room for improvement.

<8>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent rubber strength and also to exhibit low hysteresis loss upon deformation of the rubbers during running and thus have low heat build-up properties. Several techniques have been investigated to simultaneously achieve such rubber strength and low heat build-up properties, such as high filling with carbon black or use of carbon black having a high specific surface area (a small particle size) or a high structure. Such use of carbon black enhances rubber strength but unfortunately may lead to insufficient low heat build-up properties.

In order to improve rubber strength of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire including a tread formed from the rubber composition may show insufficient low heat build-up properties. On the other hand, reducing the sharpness (increasing the broadness) of the aggregate diameter distribution can improve the low heat build-up properties of tires but at the same time tends to reduce the rubber strength. Thus, controlling only the aggregate diameter distribution of carbon black is also not an effective way to simultaneously achieve rubber strength and low heat build-up properties of tires.

As described above, rubber strength and low heat build-up properties have a trade-off relationship. Although developments have been made to achieve both properties to a high extent, there is still room for improvement.

<9>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Rubber compositions for tire insulations are components provided between a carcass and a component, such as a tie gum provided between an innerliner and a carcass, or an inner sidewall layer provided between a carcass and an outer sidewall layer, for the purpose of enhancing durability of tires mainly by reinforcing the carcass. Thus, the rubber compositions for insulations are required to have moderate rubber strength and, further, moderate E' (storage modulus) for improving handling stability of tires. Furthermore, the recent demand for higher fuel economy has created a need for tire components showing lower heat build-up, and therefore it is desirable for the rubber compositions for insulations to have low heat build-up properties as other components do.

Reducing the amount of reinforcing agents such as carbon black has been known to lead to lower heat build-up; however, it is known that this technique deteriorates rubber strength and storage modulus as opposing properties.

As described above, rubber strength or storage modulus has a trade-off relationship with low heat build-up properties. Although developments have been made to achieve all these properties to a high extent, no carbon black providing sufficient properties has yet been found. As a result, no tire that is excellent in the balance of low heat build-up properties, durability, and handling stability has yet been developed.

<10>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

The fuel economy of vehicles has conventionally been improved by reducing the rolling resistance of tires (i.e. improving the rolling resistance properties). The recent growing demand for higher fuel economy has created a need to use a rubber composition having excellent low heat build-up properties in a sidewall portion which occupies a large portion of the tire, among other tire components.

The low heat build-up properties of rubber compositions for tire sidewalls can be effectively improved by reducing the amount of reinforcing agents such as carbon black in sidewall compounds or by using carbon black having a large particle size. However, at the same time, these techniques often deteriorate the properties indicative of hardness of the rubber compounds, such as storage modulus or hardness. Due to this, during use on vehicles, the tires unfortunately show reduced resistance to external damage (cut resistance).

As described above, low heat build-up properties and storage modulus have a trade-off relationship. Although developments have been made to achieve both properties to a high extent, no carbon black providing sufficient properties has yet been found. As a result, no tire that can simultaneously achieve cut resistance and low heat build-up properties has been developed.

<11>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent resistance to abrasion (abrasion resistance) during running and also to exhibit low hysteresis loss upon deformation of the rubbers during running and thus have low heat build-up properties. Several techniques have been investigated to simultaneously achieve such abrasion resistance and low heat build-up properties, such as high filling with carbon black or use of carbon black having a high specific surface area (a small particle size) or a high structure. Such use of carbon black enhances abrasion resistance but unfortunately may lead to insufficient low heat build-up properties.

In order to improve abrasion resistance of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire including a tread formed from the rubber composition may show insufficient low heat build-up properties. On the other hand, reducing the sharpness (increasing the broadness) of the aggregate diameter distribution can improve the low heat build-up properties of tires but at the same time tends to reduce the abrasion resistance. Thus, controlling only the aggregate diameter distribution of carbon black is also not an effective way to simultaneously achieve abrasion resistance and low heat build-up properties of tires.

As described above, abrasion resistance and low heat build-up properties have a trade-off relationship. Although developments have been made to achieve both properties to a high extent, there is still room for improvement.

<12>

Fuel-efficient tires of these days have increased electrical resistance, which has created safety problems such as ignition of fuel due to sparks caused by static electricity during refueling of vehicles.

In order to solve these problems, Patent Literature 2 proposes a tire including a conductive thin film to ensure conductivity. However, due to the recent demand for much higher fuel economy, such conductive thin films have become a hindrance to improving fuel economy. It is also effective to ensure conductivity by increasing the gauge; however, unfortunately this technique also deteriorates low heat build-up properties and increases the cost.

Furthermore, in the automobile society these days, the tires in the market have a longer service life because of their improved abrasion resistance, and there is a concern about the reduction of durability due to internal damages of the tires. For this reason, rubberized tire cord components, which are inner components, are also required to have better breaking properties.

It has been known that the breaking properties of rubber compositions can be improved by increasing the amount of filler such as carbon black. This technique, however, deteriorates the heat build-up properties of rubbers. As described above, breaking properties and low heat build-up properties have a trade-off relationship, and thus it has been difficult to simultaneously achieve these properties.

<13>

Carbon black, when incorporated into rubber compositions, greatly affects the properties of the rubber compositions due to its physical properties such as specific surface area, structure, and surface properties. For this reason, various types of carbon black with different properties are selected and used depending on the properties required of the rubber compositions, the environmental conditions under which the rubber compositions are used, or other factors (see, for example, Patent Literature 1).

Tread rubbers, which contact the ground, are required to have excellent resistance to abrasion (abrasion resistance) during running and also to exhibit low hysteresis loss upon deformation of the rubbers during running and thus have low heat build-up properties. Several techniques have been investigated to simultaneously achieve such abrasion resistance and low heat build-up properties, such as high filling with carbon black or use of carbon black having a high specific surface area (a small particle size) or a high structure. Such use of carbon black enhances abrasion resistance but unfortunately may lead to insufficient low heat build-up properties.

In order to improve abrasion resistance of tires by controlling the properties of carbon black other than specific surface area and structure, a technique of increasing the sharpness of the aggregate diameter distribution of carbon black has been proposed. However, a rubber composition containing such a carbon black may have poor low heat build-up properties, and a tire including a tread formed from the rubber composition may show insufficient low heat build-up properties. On the other hand, reducing the sharpness (increasing the broadness) of the aggregate diameter distribution can improve the low heat build-up properties of tires but at the same time tends to reduce the abrasion resistance. Thus, controlling only the aggregate diameter distribution of carbon black is also not an effective way to simultaneously achieve abrasion resistance and low heat build-up properties of tires.

Patent Literature 3 proposes a technique for improving low heat build-up properties by adding a diamine compound for better dispersion of carbon black. However, there is still room for improvement to improve low heat build-up properties while maintaining good abrasion resistance. Further, there is also room for improvement in processability.

As described above, abrasion resistance and low heat build-up properties have a trade-off relationship. Although developments have been made to achieve both properties to a high extent, there is still room for improvement.

CITATION LIST

Patent Literature

Patent Literature 1: JP 2001-081239 A
Patent Literature 2: JP H8-230407 A
Patent Literature 3: JP 2912845 B

SUMMARY OF INVENTION

Technical Problem

The aspects 1-1 and 1-2 of the invention aim to solve the above problem <1> and provide pneumatic tires that can achieve both abrasion resistance and low heat build-up properties.

The aspects 2-1 and 2-2 of the invention aim to solve the above problem <2> and provide pneumatic tires that can exhibit rim chafing resistance and antistatic properties for a long time while maintaining or improving good low heat build-up properties.

The aspects 3-1 and 3-2 of the invention aim to solve the above problem <3> and provide pneumatic tires that can exhibit ground contact properties and antistatic properties for a long time while maintaining or improving good low heat build-up properties.

The aspects 4-1 and 4-2 of the invention aim to solve the above problem <4> and provide rubber compositions that can achieve both abrasion resistance and low heat build-up properties, and pneumatic tires formed from the rubber compositions.

The aspects 5-1 and 5-2 of the invention aim to solve the above problem <5> and provide pneumatic tires that can achieve both air permeation resistance and low heat build-up properties.

The aspects 6-1 and 6-2 of the invention aim to solve the above problem <6> and provide rubber compositions that can achieve both abrasion resistance and low heat build-up properties, and pneumatic tires formed from the rubber compositions.

The aspects 7-1 and 7-2 of the invention aim to solve the above problem <7> and provide rubber compositions that can achieve both abrasion resistance and low heat build-up properties, and pneumatic tires formed from the rubber compositions.

The aspects 8-1 and 8-2 of the invention aim to solve the above problem <8> and provide rubber compositions that can achieve both rubber strength and low heat build-up properties, and pneumatic tires formed from the rubber compositions.

The aspects 9-1 and 9-2 of the invention aim to solve the above problem <9> and provide pneumatic tires that have high productivity and are excellent in the balance of durability, handling stability, and low heat build-up properties.

The aspects 10-1 and 10-2 of the invention aim to solve the above problem <10> and provide pneumatic tires that have high productivity and can achieve both cut resistance and low heat build-up properties.

The aspects 11-1 and 11-2 of the invention aim to solve the above problem <11> and provide rubber compositions that can achieve both abrasion resistance and low heat build-up properties, and pneumatic tires formed from the rubber compositions.

The aspects 12-1 and 12-2 of the invention aim to solve the above problem <12> and provide pneumatic tires that show a balanced improvement in breaking properties and low heat build-up properties while having excellent conductivity.

The aspects 13-1 and 13-2 of the invention aim to solve the above problem <13> and provide rubber compositions that can achieve both abrasion resistance and low heat build-up properties while maintaining good processability, and pneumatic tires formed from the rubber compositions.

Solution to Problem

<The Aspects 1-1 and 1-2 of the Invention>

The present inventors have made extensive studies and found that the balance of abrasion resistance and low heat build-up properties can be significantly and synergistically improved by incorporating as filler carbon black having specific aggregate properties such as carbon black produced from a specific feedstock oil, into a tread containing a specific rubber component and sulfur, thereby completing the aspects 1-1 and 1-2 of the invention.

The aspect 1-1 of the invention relates to a pneumatic tire, including a tread formed from a rubber composition, the rubber composition containing: a rubber component including an isoprene-based rubber and a high-cis polybutadiene rubber having a cis content of 90% by mass or more; one or more types of carbon black; and sulfur, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 1-2 of the invention relates to a pneumatic tire, including a tread formed from a rubber composition, the rubber composition containing: a rubber component including an isoprene-based rubber and a high-cis polybutadiene rubber having a cis content of 90% by mass or more; one or more types of carbon black; and sulfur, at least one of the one or more types of carbon black having, as aggregate properties, a mode diameter (Dmod) of a Stokes' diameter distribution curve of 79 nm or less and a ratio ($\Delta$D50/Dmod) of a half width ($\Delta$D50) of the distribution curve to the Dmod of 0.78 or more.

<The Aspects 2-1 and 2-2 of the Invention>

The present inventors have made extensive studies and found that, the incorporation of carbon black having specific aggregate properties, such as carbon black produced from a specific feedstock oil, into a rubber composition for clinches and/or chafers produces the following significant effects: the resulting clinch and/or chafer can exhibit improved abrasion resistance and good conductivity while maintaining or improving good low heat build-up properties, and also can reduce deterioration in conductive properties during service, as a result of which the resulting pneumatic tire can exhibit rim chafing resistance and antistatic properties for a long time. Accordingly, the present inventors completed the aspects 2-1 and 2-2 of the invention.

The aspect 2-1 of the invention relates to a pneumatic tire, including at least one of a clinch or chafer formed from a rubber composition containing one or more types of carbon black, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 2-2 of the invention relates to a pneumatic tire, including at least one of a clinch or chafer formed from a rubber composition containing one or more types of carbon black, at least one of the one or more types of carbon black having, as aggregate properties, a mode diameter (Dmod) of a Stokes' diameter distribution curve of 79 nm or less and a ratio ($\Delta$D50/Dmod) of a half width ($\Delta$D50) of the distribution curve to the Dmod of 0.78 or more.

<The Aspects 3-1 and 3-2 of the Invention>

The present inventors have made extensive studies and found that the incorporation of carbon black having specific aggregate properties, such as carbon black produced from a specific feedstock oil, into a rubber composition to form a conductive rubber that is to be embedded in a tread so as to be exposed on the surface of the tread produces the following significant effects: the conductive rubber can exhibit improved abrasion resistance and good conductivity while maintaining or improving good low heat build-up properties, and also can reduce deterioration in conductive properties during service, as a result of which the resulting pneumatic tire can exhibit ground contact properties and antistatic properties for a long time. Accordingly, the present inventors completed the aspects 3-1 and 3-2 of the invention.

The aspect 3-1 of the invention relates to a pneumatic tire, including a tread, the tread including a conductive rubber embedded therein so that the conductive rubber is partially exposed, the conductive rubber being formed from a rubber composition containing one or more types of carbon black, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 3-2 of the invention relates to a pneumatic tire, including a tread, the tread including a conductive rubber embedded therein so that the conductive rubber is partially exposed, the conductive rubber being formed from a rubber composition containing one or more types of carbon black, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 4-1 and 4-2 of the Invention>

The present inventors have made extensive studies and found that rubber compositions containing a rubber component, carbon black having specific aggregate properties such as carbon black produced from a specific feedstock oil, and a specific amount of a specific silica can achieve both abrasion resistance and low heat build-up properties, thereby completing the aspects 4-1 and 4-2 of the invention.

The aspect 4-1 of the invention relates to a rubber composition, containing: a rubber component; one or more types of carbon black; and silica, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, the silica having a nitrogen adsorption specific surface area of 40 to 400 m²/g, the rubber composition containing the silica in an amount of 1 to 120 parts by mass relative to 100 parts by mass of the rubber component, $$BMCI=48,640/(T+273)+473.7D-456.8.$$

The aspect 4-2 of the invention relates to a rubber composition, containing: a rubber component; one or more types of carbon black; and silica, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more, the silica having a nitrogen adsorption specific surface area of 40 to 400 m²/g, the rubber composition containing the silica in an amount of 1 to 120 parts by mass relative to 100 parts by mass of the rubber component.

<The Aspects 5-1 and 5-2 of the Invention>

The present inventors have made extensive studies and found that rubber compositions containing specific amounts of a halogenated butyl rubber and carbon black having specific aggregate properties, such as carbon black produced from a specific feedstock oil, can achieve both air permeation resistance and low heat build-up properties, thereby completing the aspects 5-1 and 5-2 of the invention.

The aspect 5-1 of the invention relates to a pneumatic tire, including an innerliner formed from a rubber composition, the rubber composition containing a rubber component, and one or more types of carbon black, the rubber component including 60% to 100% by mass of a halogenated butyl rubber based on 100% by mass of the rubber component, the rubber composition containing the one or more types of carbon black in a total amount of 5 to 80 parts by mass relative to 100 parts by mass of the rubber component, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 5-2 of the invention relates to a pneumatic tire, including an innerliner formed from a rubber composition, the rubber composition containing a rubber component, and one or more types of carbon black, the rubber component including 60% to 100% by mass of a halogenated butyl rubber based on 100% by mass of the rubber component, the rubber composition containing the one or more types of carbon black in a total amount of 5 to 80 parts by mass relative to 100 parts by mass of the rubber component, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 6-1 and 6-2 of the Invention>

The present inventors have made extensive studies and found that rubber compositions containing carbon black having specific aggregate properties, such as carbon black produced from a specific feedstock oil, can achieve both abrasion resistance and low heat build-up properties. They have also found that the abrasion resistance and low heat build-up properties can be synergistically improved when a resin having a specific softening point is used in combination with the carbon black, thereby completing the aspects 6-1 and 6-2 of the invention.

Specifically, the aspect 6-1 of the invention relates to a rubber composition, containing: a rubber component; one or more resins; and one or more types of carbon black, at least one of the one or more resins having a softening point within a range from −20° C. to 45° C., at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 6-2 of the invention relates to a rubber composition, containing: a rubber component; one or more resins; and one or more types of carbon black, at least one of the one or more resins having a softening point within a range from −20° C. to 45° C., at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 7-1 and 7-2 of the Invention>

The present inventors have made extensive studies and found that rubber compositions containing carbon black having specific aggregate properties, such as carbon black produced from a specific feedstock oil, can achieve both abrasion resistance and low heat build-up properties. They have also found that the abrasion resistance and low heat build-up properties can be synergistically improved when a specific modified natural rubber is used in combination with the carbon black, thereby completing the aspects 7-1 and 7-2 of the invention.

Specifically, the aspect 7-1 of the invention relates to a rubber composition, containing a rubber component, and one or more types of carbon black, the rubber component including a modified natural rubber that is highly purified and adjusted to have a pH of 2 to 7, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 7-2 of the invention relates to a rubber composition, containing a rubber component, and one or more types of carbon black, the rubber component including a modified natural rubber that is highly purified and adjusted to have a pH of 2 to 7, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 8-1 and 8-2 of the Invention>

The present inventors have made extensive studies and found that rubber compositions containing carbon black having specific aggregate properties, such as carbon black produced from a specific feedstock oil, can achieve both rubber strength and low heat build-up properties. They have also found that the rubber strength and low heat build-up properties can be synergistically improved when a tin-modified polybutadiene rubber is used in combination with the carbon black, thereby completing the aspects 8-1 and 8-2 of the invention.

Specifically, the aspect 8-1 of the invention relates to a rubber composition, containing a rubber component, and one or more types of carbon black, the rubber component including a tin-modified polybutadiene rubber that is produced by polymerization using a lithium initiator and has a tin atom content of 50 to 3,000 ppm, a vinyl content of 5% to 50% by mass, and a molecular weight distribution (Mw/Mn) of 2.0 or less, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 8-2 of the invention relates to a rubber composition, containing a rubber component, and one or more types of carbon black, the rubber component including a tin-modified polybutadiene rubber that is produced by polymerization using a lithium initiator and has a tin atom content of 50 to 3,000 ppm, a vinyl content of 5% to 50% by mass, and a molecular weight distribution (Mw/Mn) of 2.0 or less, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 9-1 and 9-2 of the Invention>

The present inventors have made extensive studies and found that rubber compositions containing a rubber component including an isoprene-based rubber and a styrene butadiene rubber, and carbon black having specific aggregate properties, such as carbon black produced from a specific feedstock oil can achieve rubber strength and storage modulus together with low heat build-up properties. They have also found that the use of the rubber compositions in insulations allows for the production of tires that are excellent in the balance of durability, handling stability, and low heat build-up properties, thereby completing the aspects 9-1 and 9-2 of the invention.

The aspect 9-1 of the invention relates to a pneumatic tire, including an insulation, the insulation being formed from a rubber composition that contains: a rubber component including an isoprene-based rubber and a styrene butadiene rubber; and one or more types of carbon black, the rubber composition containing the one or more types of carbon black in a total amount of 15 to 80 parts by mass relative to 100 parts by mass of the rubber component, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 9-2 of the invention relates to a pneumatic tire, including an insulation, the insulation being formed from a rubber composition that contains: a rubber component including an isoprene-based rubber and a styrene butadiene rubber; and one or more types of carbon black, the rubber composition containing the one or more types of carbon black in a total amount of 15 to 80 parts by mass relative to 100 parts by mass of the rubber component, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 10-1 and 10-2 of the Invention>

The present inventors have made extensive studies and found that rubber compositions containing a rubber component including an isoprene-based rubber and a polybutadiene rubber, and carbon black having specific aggregate properties, such as carbon black produced from a specific feedstock oil can achieve both storage modulus and low heat build-up properties. They have also found that the use of the rubber compositions in sidewalls allows for the production of tires that can achieve both cut resistance and low heat build-up properties, thereby completing the aspects 10-1 and 10-2 of the invention.

The aspect 10-1 of the invention relates to a pneumatic tire, including a sidewall, the sidewall being formed from a rubber composition that contains: a rubber component including an isoprene-based rubber and a polybutadiene rubber; and one or more types of carbon black, the rubber composition containing the one or more types of carbon black in a total amount of 15 to 80 parts by mass relative to 100 parts by mass of the rubber component, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 10-2 of the invention relates to a pneumatic tire, including a sidewall, the sidewall being formed from a rubber composition that contains: a rubber component including an isoprene-based rubber and a polybutadiene rubber; and one or more types of carbon black, the rubber composition containing the one or more types of carbon black in a total amount of 15 to 80 parts by mass relative to 100 parts by mass of the rubber component, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 11-1 and 11-2 of the Invention>

The present inventors have made extensive studies and found that rubber compositions containing carbon black having specific aggregate properties, such as carbon black produced from a specific feedstock oil, can achieve both abrasion resistance and low heat build-up properties. They have also found that the abrasion resistance and low heat build-up properties can be synergistically improved when the carbon black is incorporated in the form of a wet masterbatch, thereby completing the aspects 11-1 and 11-2 of the invention.

Specifically, the aspect 11-1 of the invention relates to a rubber composition, containing a wet masterbatch, the wet masterbatch being obtained by mixing a rubber latex and a dispersion of one or more types of carbon black, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 11-2 of the invention relates to a rubber composition, containing a wet masterbatch, the wet masterbatch being obtained by mixing a rubber latex and a dispersion of one or more types of carbon black, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 12-1 and 12-2 of the Invention>

The present inventors have made extensive studies and found that rubber compositions containing carbon black having specific aggregate properties, such as carbon black produced from a specific feedstock oil, can achieve both breaking properties and low heat build-up properties. They have also found that the conductivity and low heat build-up properties can be synergistically improved when the carbon black is incorporated in the form of a wet masterbatch, thereby completing the aspects 12-1 and 12-2 of the invention.

Specifically, the aspect 12-1 of the invention relates to a pneumatic tire, including a rubberized tire cord component, the rubberized tire cord component being formed from a rubber composition that contains a wet masterbatch, the wet masterbatch being obtained by mixing a rubber latex and a dispersion of one or more types of carbon black, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 12-2 of the invention relates to a pneumatic tire, including a rubberized tire cord component, the rubberized tire cord component being formed from a rubber composition that contains a wet masterbatch, the wet masterbatch being obtained by mixing a rubber latex and a dispersion of one or more types of carbon black, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

<The Aspects 13-1 and 13-2 of the Invention>

The present inventors have made extensive studies and found that rubber compositions containing carbon black having specific aggregate properties, such as carbon black produced from a specific feedstock oil, can achieve both abrasion resistance and low heat build-up properties. They have also found that the abrasion resistance and low heat build-up properties can be synergistically improved while maintaining good processability, when a specific amphoteric compound is used in combination with the carbon black, thereby completing the aspects 13-1 and 13-2 of the invention.

Specifically, the aspect 13-1 of the invention relates to a rubber composition, containing: a rubber component; at least one amphoteric compound; and one or more types of carbon black, the at least one amphoteric compound containing at least one acidic functional group selected from the group consisting of a carboxylic acid group, a sulfonic acid group, a phosphoric acid group, a thiosulfonic acid group, a dithiocarboxylic acid group, a thioalkylcarboxylic acid group having a C1-C20 alkyl group, and a phenolic hydroxy group, and also containing a basic functional group that is an amino group or a substituted amino group, at least one of the one or more types of carbon black being produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

The aspect 13-2 of the invention relates to a rubber composition, containing: a rubber component; at least one amphoteric compound; and one or more types of carbon black, the at least one amphoteric compound containing at least one acidic functional group selected from the group consisting of a carboxylic acid group, a sulfonic acid group, a phosphoric acid group, a thiosulfonic acid group, a dithiocarboxylic acid group, a thioalkylcarboxylic acid group having a C1-C20 alkyl group, and a phenolic hydroxy group, and also containing a basic functional group that is an amino group or a substituted amino group, at least one of the one or more types of carbon black having, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

Advantageous Effects of Invention

The aspect 1-1 or 1-2 of the invention is a pneumatic tire including a tread formed from a rubber composition, wherein the rubber composition contains a rubber component including an isoprene-based rubber and a high-cis polybutadiene rubber having a cis content of 90% by mass or more, one or more types of carbon black, and sulfur, and the one or more types of carbon black include a specific carbon black. The balance of abrasion resistance and low heat build-up properties can be significantly improved in such pneumatic tires.

The aspect 2-1 or 2-2 of the invention is a pneumatic tire including a clinch and/or chafer formed from a rubber composition containing a specific carbon black. Such pneumatic tires can exhibit rim chafing resistance and antistatic properties for a long time while maintaining or improving good low heat build-up properties.

The aspect 3-1 or 3-2 of the invention is a pneumatic tire including a tread in which a conductive rubber is embedded, wherein the conductive rubber is formed from a rubber composition containing a specific carbon black. Such pneumatic tires can exhibit ground contact properties and antistatic properties for a long time while maintaining or improving good low heat build-up properties.

The aspect 4-1 or 4-2 of the invention is a rubber composition containing a rubber component, a specific carbon black, and a specific amount of a specific silica. The use of such rubber compositions allows for the production of pneumatic tires that achieve both abrasion resistance and low heat build-up properties and are excellent in both properties.

The aspect 5-1 or 5-2 of the invention is a pneumatic tire including an innerliner formed from a rubber composition, wherein the rubber composition contains specific amounts of a halogenated butyl rubber and a specific carbon black. Such pneumatic tires can achieve both air permeation resistance and low heat build-up properties.

The aspect 6-1 or 6-2 of the invention is a rubber composition containing a resin having a softening point of −20° C. to 45° C. and a specific carbon black. The use of such rubber compositions allows for the production of pneumatic tires that achieve both abrasion resistance and low heat build-up properties and are excellent in both properties.

The aspect 7-1 or 7-2 of the invention is a rubber composition containing a modified natural rubber that is highly purified and adjusted to have a pH of 2 to 7, and a specific carbon black. The use of such rubber compositions allows for the production of pneumatic tires that achieve both abrasion resistance and low heat build-up properties and are excellent in both properties.

The aspect 8-1 or 8-2 of the invention is a rubber composition containing a tin-modified polybutadiene rubber and a specific carbon black. The use of such rubber compositions allows for the production of pneumatic tires that achieve both rubber strength and low heat build-up properties and are excellent in both properties.

The aspect 9-1 or 9-2 of the invention is a pneumatic tire including an insulation formed from a rubber composition, wherein the rubber composition contains an isoprene-based rubber, a styrene butadiene rubber, and a specific carbon black. Such pneumatic tires are excellent in the balance of durability, handling stability, and low heat build-up properties. Furthermore, since the rubber compositions have good processability, the pneumatic tires can be produced with high productivity.

The aspect 10-1 or 10-2 of the invention is a pneumatic tire including a sidewall formed from a rubber composition, wherein the rubber composition contains an isoprene-based rubber, a polybutadiene rubber, and a specific carbon black. Such pneumatic tires can achieve both cut resistance and low heat build-up properties. Furthermore, since the rubber compositions have good processability, the pneumatic tires can be produced with high productivity.

The aspect 11-1 or 11-2 of the invention is a rubber composition containing a wet masterbatch, wherein the wet masterbatch is obtained by mixing a rubber latex and a dispersion of one or more types of carbon black, and at least one of the one or more types of carbon black is a specific carbon black. The use of such rubber compositions allows for the production of pneumatic tires that achieve both abrasion resistance and low heat build-up properties and are excellent in both properties.

The aspect 12-1 or 12-2 of the invention is a pneumatic tire including a rubberized tire cord component, wherein the rubberized tire cord component is formed from a rubber composition containing a wet masterbatch, the wet masterbatch is obtained by mixing a rubber latex and a dispersion of one or more types of carbon black, and at least one of the one or more types of carbon black is a specific carbon black. Such pneumatic tires can achieve a balanced improvement in breaking properties and low heat build-up properties while having excellent conductivity.

The aspect 13-1 or 13-2 of the invention is a rubber composition containing a rubber component, an amphoteric compound containing a specific acidic functional group and a specific basic functional group, and a specific carbon black. The use of such rubber compositions allows for the production of pneumatic tires that achieve, while maintaining good processability, both abrasion resistance and low heat build-up properties and in which both properties are synergistically improved.

DESCRIPTION OF EMBODIMENTS

Figure 1:
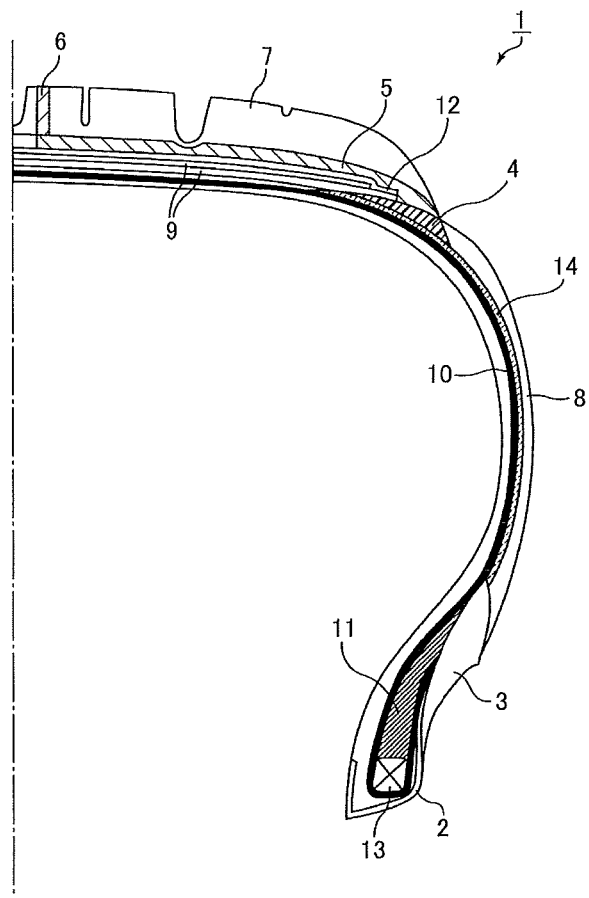
FIG. 1 illustrates the upper right half of a cross sectional view of a pneumatic tire according to the aspect 2-1, 2-2, 3-1 or 3-2 of the invention.

<The Aspects 1-1 and 1-2 of the Invention>

The aspect 1-1 of the invention relates to a pneumatic tire including a tread formed from a rubber composition, the rubber composition containing: a rubber component including an isoprene-based rubber and a high-cis polybutadiene rubber having a cis content of 90% by mass or more; one or more types of carbon black; and sulfur, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 1-2 of the invention relates to a pneumatic tire including a tread formed from a rubber composition, the rubber composition containing: a rubber component including an isoprene-based rubber and a high-cis polybutadiene rubber having a cis content of 90% by mass or more; one or more types of carbon black; and sulfur, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 1-1 or 1-2 of the invention, a specific carbon black, i.e. carbon black (1) produced from a feedstock oil having a specific BMCI value or less and a specific aliphatic hydrocarbon content or more, or carbon black (1) having specific aggregate properties including a specific Dmod value or less and a specific ΔD50/Dmod ratio or higher, is incorporated into a tread that contains an isoprene-based rubber, a high-cis polybutadiene rubber, and sulfur. This allows the tread to have improved abrasion resistance while maintaining or improving good low heat build-up properties, thereby achieving a balance of both abrasion resistance and low heat build-up properties. The balance of the above properties can be significantly and synergistically improved, particularly as compared to cases where any other rubber component (for example, an isoprene-based rubber alone or a styrene butadiene rubber alone) is used instead of the blend of an isoprene-based rubber and a high-cis polybutadiene rubber.

The rubber compositions 1-1 and 1-2 used in the aspects 1-1 and 1-2 of the invention will first be described below.

The rubber component of the rubber composition 1-1 or 1-2 includes an isoprene-based rubber. Examples of the isoprene-based rubber include natural rubber (NR), polyisoprene rubber (IR), and epoxidized natural rubber (ENR). Among these, NR is suitable as it is excellent in abrasion resistance, low heat build-up properties, and other properties. Examples of the NR include those commonly used in the tire industry such as SIR20, RSS#3, and TSR20. The IR is not particularly limited, and those commonly used in the tire industry can be used.

In the rubber composition 1-1 or 1-2, the amount of the isoprene-based rubber is usually 35% by mass or more, preferably 55% by mass or more, more preferably 75% by mass or more based on 100% by mass of the rubber component. If the amount is less than 35% by mass, fuel economy may not be sufficiently improved. The amount of the isoprene-based rubber is usually 95% by mass or less, preferably 85% by mass or less. If the amount is more than 95% by mass, sufficient abrasion resistance cannot be ensured, and a good balance of fuel economy and abrasion resistance may not be obtained.

The rubber component of the rubber composition 1-1 or 1-2 also includes a high-cis polybutadiene rubber (high-cis BR) having a cis content of 90% by mass or more. Any high-cis BR may be used, including those commonly used in the tire industry. Suitable is high-cis BR synthesized using a rare earth catalyst and having a vinyl content of 1.0% by mass or less, preferably 0.8% by mass or less, and a cis content of 95% by mass or more, preferably rare earth-catalyzed polybutadiene rubber (rare earth-catalyzed BR).

In the aspect 1-1 or 1-2 of the invention, the vinyl content (1,2-butadiene unit content) and the cis content (cis-1,4-butadiene unit content) are determined by infrared absorption spectrometry.

In the rubber composition 1-1 or 1-2, the amount of the high-cis BR is usually 5% by mass or more, preferably 15% by mass or more based on 100% by mass of the rubber component. If the amount is less than 5% by mass, sufficient abrasion resistance may not be ensured. The amount of the high-cis BR is usually 65% by mass or less, preferably 45% by mass or less, more preferably 25% by mass or less. If the amount is more than 65% by mass, fuel economy and abrasion resistance may not be sufficiently improved.

The rubber composition 1-1 contains carbon black (1) produced from a feedstock oil having a specific BMCI value or less and a specific aliphatic hydrocarbon content or more. The rubber composition 1-2 contains carbon black (1) having specific aggregate properties including a specific Dmod value or less and a specific ΔD50/Dmod ratio or higher. The incorporation of such carbon black (1) enables simultaneous achievement of abrasion resistance and low heat build-up properties.

In the rubber composition 1-2, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 1-1 or 1-2 of the invention (particularly the effect of improving abrasion resistance) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or abrasion resistance.

In the rubber composition 1-2, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 1-1 or 1-2 of the invention (particularly the effect of improving low heat build-up properties) are insufficient. The upper limit of the ΔD50/Dmod ratio is not particularly limited but is preferably 2.5 or less, more preferably 2.0 or less. If it is more than 2.5, abrasion resistance may deteriorate, with the result that the desired effects may not be obtained.

In the aspect 1-1 or 1-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range indicated above, the effects of the aspect 1-1 or 1-2 of the invention can be more suitably achieved.

In the aspect 1-1 or 1-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving abrasion resistance can be more suitably achieved and the effects of the aspect 1-1 or 1-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 $m^2$/mg, more preferably 0.85 to 1.15 $m^2$/mg, still more preferably 0.9 to 1.1 $m^2$/mg. When the CTAB/IA ratio falls within the range indicated above, the effects of the aspect 1-1 or 1-2 of the invention can be more suitably achieved.

In the aspect 1-1 or 1-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 1-1 or 1-2 of the invention can be more suitably achieved.

Carbon black (1) preferably has a 24M4 dibutyl phthalate oil absorption (24M4 DBP) of 50 to 120 $cm^3$/100 g, more preferably 70 to 120 $cm^3$/100 g, still more preferably 90 to 115 $cm^3$/100 g, particularly preferably 95 to 110 $cm^3$/100 g. When the 24M4 DBP falls within the range indicated above, the effects of the aspect 1-1 or 1-2 of the invention can be more suitably achieved.

In the aspect 1-1 or 1-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and abrasion resistance of the rubber composition can be more suitably improved, and the effects of the aspect 1-1 or 1-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 1-1 or 1-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the rubber composition 1-1, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above, with the result that abrasion resistance and low heat build-up properties cannot be simultaneously achieved. The lower limit of the BMCI value of the feedstock oil is not particularly limited but is preferably 95 or more. If it is less than 95, a poor yield (insufficient amount of carbon black) may be obtained.

In the rubber composition 1-1, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, and therefore abrasion resistance and low heat build-up properties cannot be simultaneously achieved. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 1-1 or 1-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

In the rubber composition 1-1 or 1-2, the amount of carbon black (1) relative to 100 parts by mass of the rubber component is preferably 20 parts by mass or more, more preferably 40 parts by mass or more. If the amount is less than 20 parts by mass, the effects of the aspect 1-1 or 1-2 of the invention tend not to be sufficiently obtained. The amount of carbon black (1) is preferably 70 parts by mass or less, more preferably 60 parts by mass or less. If the amount is more than 70 parts by mass, low heat build-up properties or abrasion resistance may deteriorate.

In the aspect 1-1 or 1-2 of the invention, carbon black other than carbon black (1) may be incorporated together with carbon black (1).

The rubber composition 1-1 or 1-2 contains sulfur. Any sulfur may be used, including those commonly used in the tire industry. Examples include powdered sulfur, precipitated sulfur, colloidal sulfur, insoluble sulfur, and highly dispersible sulfur. The sulfur in the aspect 1-1 or 1-2 of the invention includes sulfur contained in crosslinkable sulfur-containing compounds such as sulfur-containing coupling agents.

The amount of sulfur relative to 100 parts by mass of the rubber component is preferably 0.5 parts by mass or more, more preferably 0.6 parts by mass or more. An amount of less than 0.5 parts by mass may provide insufficient curing, failing to achieve a desired strength. The amount of sulfur is preferably 1.6 parts by mass or less, more preferably 1.1 parts by mass or less. An amount of more than 1.6 parts by mass may reduce abrasion resistance.

In the aspect 1-1 or 1-2 of the invention, the amount of sulfur means the total net sulfur content of the vulcanizing agents contained in the rubber composition. For example, when the vulcanizing agent used is an oil-containing sulfur and/or a sulfur-containing coupling agent such as Vulcuren KA9188 available from Lanxess or DURALINK HTS available from Flexsys, the amount of sulfur means the total amount of sulfur contained in the oil-containing sulfur and/or the sulfur-containing coupling agent.

The rubber composition 1-1 or 1-2 may include a compound represented by the formula (3) below as a crosslinking agent (sulfur-containing coupling agent). This allows the rubber composition to bear C—C bonds with high binding energy and high thermal stability.

$$R^1-S-S-A-S-S-R^2 \qquad (3)$$

In formula (3), A represents a C2-C10 alkylene group, and $R^1$ and $R^2$ are the same as or different from one another and each represent a monovalent organic group containing a nitrogen atom.

Examples of the (C2-C10) alkylene group for A in formula (3) include, but not limited to, linear, branched, and cyclic alkylene groups. Linear alkylene groups are preferred, with a hexamethylene group being more preferred. $R^1$ and $R^2$ in formula (3) are not particularly limited as long as they are monovalent organic groups containing a nitrogen atom. $R^1$ and $R^2$ each preferably contain at least one aromatic ring, and more preferably contain a linking group represented by N—C(=S)— whose carbon atom is bonded to the dithio group.

In the case where the rubber composition 1-1 or 1-2 contains a compound represented by formula (3), the amount of the compound relative to 100 parts by mass of the rubber component is preferably 0.5 to 5 parts by mass, more preferably 1 to 3 parts by mass.

The rubber composition 1-1 or 1-2 preferably contains at least one selected from the group consisting of stearic acid, calcium stearate, and fatty acid zinc salts. The fatty acid zinc salt used may suitably be a saturated fatty acid zinc salt having multiple carbon atoms, specifically 14 to 20 carbon atoms.

The combined amount of stearic acid, calcium stearate, and fatty acid zinc salts in the rubber composition 1-1 or 1-2 relative to 100 parts by mass of the rubber component is preferably 2 parts by mass or more, more preferably 3 parts by mass or more, still more preferably 3.5 parts by mass or more. If the combined amount is less than 2 parts by mass, sufficient processability (Mooney viscosity, extrusion processability) may not be ensured. The combined amount is preferably 6 parts by mass or less, more preferably 4 parts by mass or less. If the combined amount is more than 6 parts by mass, abrasion resistance and elongation at break may be reduced.

The rubber composition 1-1 or 1-2 preferably contains zinc oxide. Any zinc oxide may be used, including those commonly used in the tire industry.

The amount of zinc oxide relative to 100 parts by mass of the rubber component is preferably 1.5 parts by mass or more, more preferably 2 parts by mass or more. If the amount is less than 1.5 parts by mass, fuel economy and other properties may decrease. The amount of zinc oxide is preferably 3.99 parts by mass or less, preferably 3 parts by mass or less. If the amount is more than 3.99 parts by mass, abrasion resistance may decrease.

The rubber composition 1-1 or 1-2 may appropriately contain, in addition to the above-described components, compounding agents commonly used in preparation of rubber compositions, for example, reinforcing fillers such as silica, silane coupling agents, antioxidants, oil, wax, or vulcanization accelerators.

The amount of oil relative to 100 parts by mass of the rubber component is preferably 7.0 parts by mass or less, more preferably 3.0 parts by mass or less, still more preferably 1.0 part by mass or less, and may be 0 parts by mass.

The rubber composition 1-1 or 1-2 may be prepared by known methods, such as by kneading the components with a known mixer such as a roll mill or Banbury mixer.

The rubber composition 1-1 or 1-2 preferably contains a masterbatch prepared by kneading an isoprene-based rubber and carbon black (1). Specifically, the rubber composition 1-1 or 1-2 is preferably prepared by kneading an isoprene-based rubber and carbon black (1) to prepare a masterbatch, and kneading the masterbatch with other compounding agents. The dispersibility of carbon black (1) can be improved by previously kneading an isoprene-based rubber and carbon black (1) as described above.

In the case where finely divided carbon black is also used in addition to carbon black (1), carbon black (1) having a large nitrogen adsorption specific surface area ($N_2SA$) is preferably kneaded in the step of preparing a masterbatch. In this case, the carbon black can be efficiently dispersed by kneading the masterbatch and finely divided carbon black having low dispersibility with other compounding agents in the subsequent step.

If the rubber component other than the isoprene-based rubber, oil, processing aids, stearic acid, or antioxidants is kneaded in the step of preparing a masterbatch, the rubber viscosity may decrease so that the dispersibility of carbon black (1) can be reduced. For this reason, the rubber component other than the isoprene-based rubber, oil, processing aids, stearic acid, and antioxidants are preferably kneaded in the subsequent step. In other words, only the isoprene-based rubber and carbon black (1) are preferably kneaded in the step of preparing a masterbatch.

In the step of preparing a masterbatch, the discharge temperature is preferably adjusted to 130° C. to 1700° C., and the kneading time is usually set to about 2 to 5 minutes, depending on the size of the kneading machine used.

In the masterbatch, the amount of carbon black (1) relative to 100 parts by mass of the isoprene-based rubber is preferably 30 to 80 parts by mass, more preferably 45 to 65 parts by mass.

The rubber compositions 1-1 and 1-2 can be used in tire treads.

The pneumatic tires according to the aspects 1-1 and 1-2 of the invention can be produced from the respective rubber compositions by usual methods. Specifically, a rubber composition containing additives as needed, before vulcanization, is extruded and processed into the shape of a tire tread and then formed and assembled with other tire components on a tire building machine by a usual method to build an unvulcanized tire. The unvulcanized tire is heated and pressurized in a vulcanizer, whereby a pneumatic tire according to the aspect 1-1 or 1-2 of the invention can be produced.

The pneumatic tires according to the aspects 1-1 and 1-2 of the invention can be used for passenger vehicles, heavy duty vehicles, and other vehicles. They can be suitably used especially as heavy duty tires with a high isoprene-based rubber content.

<The Aspects 2-1 and 2-2 of the Invention>

The aspect 2-1 of the invention relates to a pneumatic tire including a clinch and/or chafer formed from a rubber composition containing one or more types of carbon black, at least one of the one or more types of carbon black being produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 2-2 of the invention relates to a pneumatic tire including a clinch and/or chafer formed from a rubber composition containing one or more types of carbon black, at least one of the one or more types of carbon black having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 2-1 or 2-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition for clinches and/or chafers. This allows the rubber composition to have improved abrasion resistance and good conductive properties while maintaining or improving good low heat build-up properties, and also to reduce the deterioration in conductive properties during service. As a result, the pneumatic tire according to the aspect 2-1 or 2-2 of the invention can exhibit rim chafing resistance and antistatic properties for a long time.

The rubber composition for forming a clinch and/or chafer (hereinafter, also referred to as the rubber composition in the aspect 2-1 or 2-2 of the invention) will first be described below.

Examples of materials which can be included in the rubber component of the rubber composition in the aspect 2-1 or 2-2 of the invention include diene rubbers such as isoprene-based rubbers, polybutadiene rubber (BR), styrene butadiene rubber (SBR), and styrene isoprene butadiene rubber (SIBR). The rubber component may be a single material or a combination of two or more materials. In order to more suitably achieve the effects of the aspect 2-1 or 2-2 of the invention, isoprene-based rubbers and BR are preferred among these materials, with isoprene-based rubbers being more preferred.

Examples of the isoprene-based rubber include polyisoprene rubber (IR), natural rubber (NR), and epoxidized natural rubber (ENR). NR is preferred among these because it is excellent in rim chafing resistance, low heat build-up properties, and other properties. Examples of the NR include those commonly used in the tire industry such as SIR20, RSS#3, and TSR20. The IR is not particularly limited, and those commonly used in the tire industry can be used. According to the aspect 2-1 or 2-2 of the invention, the incorporation of carbon black (1) together with the rubber component including an isoprene-based rubber, particularly NR, allows the effects of the aspect 2-1 or 2-2 of the invention to be more suitably achieved.

In the rubber composition in the aspect 2-1 or 2-2 of the invention, the amount of the isoprene-based rubber based on 100% by mass of the rubber component is preferably 20% by mass or more, more preferably 30% by mass or more, still more preferably 60% by mass or more, further preferably 80% by mass or more, particularly preferably 90% by mass or more, most preferably 100% by mass. If the amount of the isoprene-based rubber is less than 20% by mass, abrasion resistance, low heat build-up properties, or rim chafing resistance may not be sufficiently achieved.

The carbon black (1) described earlier is used in the aspect 2-1 or 2-2 of the invention.

In the aspect 2-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 2-1 or 2-2 of the invention (particularly the effects of improving abrasion resistance or rim chafing resistance) are insufficient. The lower limit of the Dmod is not particularly limited but is preferably 50 nm, more preferably 56 nm. If it is less than 50 nm, the carbon black (1) tends to have poor dispersibility, resulting in reduced breaking properties, abrasion resistance, or rim chafing resistance.

In the aspect 2-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 2-1 or 2-2 of the invention (particularly the effects of improving abrasion resistance or rim chafing resistance) are insufficient. The upper limit of the ΔD50/Dmod ratio is not particularly limited but is preferably 2.5, more preferably 2.0. If it is more than 2.5, abrasion resistance or rim chafing resistance may deteriorate, with the result that the desired effects may not be obtained.

In the aspect 2-1 or 2-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by mass. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range indicated above, the effects of the aspect 2-1 or 2-2 of the invention can be more suitably achieved. In the aspect 2-1 or 2-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effects of improving abrasion resistance or rim chafing resistance can be more suitably achieved and the effects of the aspect 2-1 or 2-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 $m^2/mg$, more preferably 0.85 to 1.15 $m^2/mg$, still more preferably 0.9 to 1.1 $m^2/mg$. When the CTAB/IA ratio falls within the range indicated above, the effects of the aspect 2-1 or 2-2 of the invention can be more suitably achieved.

In the aspect 2-1 or 2-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 2-1 or 2-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 2-1 or 2-2 of the invention can be more suitably achieved.

In the aspect 2-1 or 2-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the abrasion resistance and rim chafing resistance of the rubber composition can be more suitably improved, and the effects of the aspect 2-1 or 2-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 2-1 or 2-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 2-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. Additionally, rim chafing resistance and antistatic properties cannot be simultaneously achieved. The lower limit of the BMCI value of the feedstock oil is not particularly limited but is preferably 95. If it is less than 95, a poor yield (insufficient amount of carbon black) may be obtained.

In the aspect 2-1 of the invention, the aliphatic hydrocarbon content of the feedstock oil (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. Additionally, rim chafing resistance and antistatic properties cannot be simultaneously achieved. The upper limit of the aliphatic hydrocarbon content is not particularly limited but is preferably 60% by mass. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 2-1 or 2-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above and the effects of the aspect 2-1 or 2-2 of the invention.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a fuel hydrocarbon is introduced into the high-temperature combustion gas stream formed in the combustion zone by spraying from parallel or laterally disposed burners, so that the fuel hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

In the rubber composition in the aspect 2-1 or 2-2 of the invention, the amount of carbon black (1) relative to 100 parts by mass of the rubber component is preferably 5 parts by mass or more, more preferably 10 parts by mass or more, still more preferably 25 parts by mass or more, further preferably 35 parts by mass or more, particularly preferably 50 parts by mass or more. If the amount is less than 5 parts by mass, the effects of the aspect 2-1 or 2-2 of the invention tend not to be sufficiently obtained. The amount of carbon black (1) is also preferably 150 parts by mass or less, more preferably 120 parts by mass or less, still more preferably 100 parts by mass or less, further preferably 90 parts by mass or less, particularly preferably 80 parts by mass or less. If the amount is more than 150 parts by mass, the resulting rubber composition tends to be too hard, adversely leading to reduced abrasion resistance or rim chafing resistance. Furthermore, low heat build-up properties tend to deteriorate.

The rubber composition in the aspect 2-1 or 2-2 of the invention may contain carbon black other than carbon black (1) together with carbon black (1).

The amount of carbon black (1) based on 100% by mass of the total carbon black is preferably 30% by mass or more, more preferably 50% by mass or more, still more preferably 80% by mass or more, further preferably 90% by mass or more, particularly preferably 100% by mass. If the amount is less than 30% by mass, the effects of the aspect 2-1 or 2-2 of the invention may not be sufficiently obtained.

The total amount of carbon black when carbon black other than carbon black (1) is incorporated is as described for the amount of carbon black (1) when carbon black (1) alone is used.

The rubber composition in the aspect 2-1 or 2-2 of the invention may appropriately contain, in addition to carbon black, reinforcing fillers commonly used in preparation of rubber compositions, such as silica, clay, and talc. The amount of carbon black based on 100% by mass of reinforcing fillers is preferably 50% by mass or more, more preferably 80% by mass or more, still more preferably 90% by mass or more, particularly preferably 100% by mass. If the amount of carbon black is less than 50% by mass, the effects of the aspect 2-1 or 2-2 of the invention may not be sufficiently obtained. In the case where the rubber composition in the aspect 2-1 or 2-2 of the invention contains two or more types of carbon black, the amount of carbon black means the total amount of carbon black.

The rubber composition in the aspect 2-1 or 2-2 of the invention preferably contains oil. The incorporation of oil can improve the dispersibility of carbon black and processability in the preparation of the rubber composition.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ (loss tangent) as a parameter of dynamic viscoelasticity, or, in other words, maintain good low heat build-up properties.

When the rubber composition in the aspect 2-1 or 2-2 of the invention contains oil, the amount of oil relative to 100 parts by mass of the rubber component is preferably 1 part by mass or more, more preferably 3 parts by mass or more. If the amount is less than 1 part by mass, the effects produced by the incorporation of oil may not be obtained. The amount of oil is also preferably 15 parts by mass or less, more preferably 8 parts by mass or less. If the amount is more than 15 parts by mass, although the softening effect is sufficient, reinforcing properties may greatly decrease, resulting in reduced abrasion resistance or rim chafing resistance.

The rubber composition in the aspect 2-1 or 2-2 of the invention preferably contains a non-reactive alkylphenol resin to achieve good processability, low heat build-up properties, and rim chafing resistance.

The term "non-reactive alkylphenol resin" refers to an alkylphenol resin which has no reactivity at positions ortho and para (especially para) to the hydroxyl groups of the benzene rings in the chain. Suitable examples of the non-reactive alkylphenol resin include those represented by the following formula (1) or (2), and more suitably those represented by formula (1).

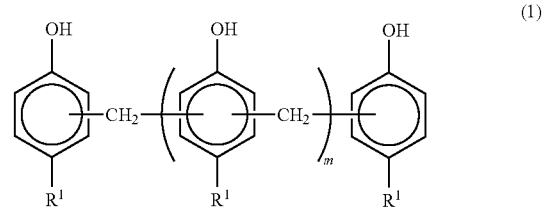

In formula (1), m represents an integer. For moderate blooming properties, m is preferably an integer of 1 to 10. R¹s in formula (1) may be the same as or different from each other and each represent an alkyl group. In view of affinity with rubber, they are each preferably a C4-C15, more preferably C6-C10, alkyl group.

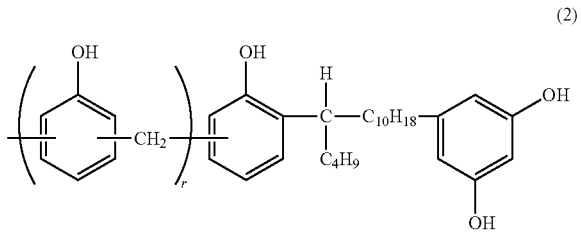

(2)

In formula (2), r represents an integer. For moderate blooming properties, r in formula (2) is preferably an integer of 1 to 10, more preferably an integer of 2 to 9.

In the rubber composition in the aspect 2-1 or 2-2 of the invention, the amount of the non-reactive alkylphenol resin is preferably 0.2 parts by mass or more, more preferably 1 part by mass or more, still more preferably 2 parts by mass or more relative to 100 parts by mass of the rubber component. If the amount is less than 0.2 parts by mass, low heat build-up properties or rim chafing resistance may not be sufficiently improved. The amount is also preferably 8 parts by mass or less, more preferably 4 parts by mass or less. If the amount is more than 8 parts by mass, sufficient low heat build-up properties tend not to be obtained.

The rubber composition in the aspect 2-1 or 2-2 of the invention may appropriately contain, in addition to the above-described components, compounding agents commonly used in preparation of rubber compositions. Examples of the compounding agents include silane coupling agents; zinc oxide; stearic acid; processing aids; various types of antioxidants; wax; vulcanizing agents such as sulfur and sulfur-containing compounds; and vulcanization accelerators.

Examples of the sulfur include powdered sulfur, precipitated sulfur, colloidal sulfur, insoluble sulfur, and highly dispersible sulfur. Preferred among these is powdered sulfur. The amount of sulfur relative to 100 parts by mass of the rubber component is preferably 0.1 to 10 parts by mass, more preferably 0.5 to 5 parts by mass, still more preferably 1 to 2 parts by mass.

Examples of the vulcanization accelerator include thiazole vulcanization accelerators such as 2-mercaptobenzothiazole, di-2-benzothiazolyl disulfide, and N-cyclohexyl-2-benzothiazolylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolesulfenamide, N-t-butyl-2-benzothiazolylsulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the aspect 2-1 or 2-2 of the invention, sulfenamide vulcanization accelerators are preferred among these, with N-t-butyl-2-benzothiazolylsulfenamide being more preferred. The amount of the vulcanization accelerator relative to 100 parts by mass of the rubber component is preferably 0.1 parts by mass or more, more preferably 0.3 parts by mass or more, and is also preferably 10 parts by mass or less, more preferably 5 parts by mass or less, still more preferably 2 parts by mass or less, particularly preferably 1 part by mass or less.

The rubber composition in the aspect 2-1 or 2-2 of the invention can be prepared by usual methods. Specifically, it may be prepared by kneading the components using a Banbury mixer, a kneader, an open roll mill, or other kneading machines and vulcanizing the kneadate.

The rubber composition in the aspect 2-1 or 2-2 of the invention can exhibit the effects of the aspect 2-1 or 2-2 of the invention when it is used as a rubber composition for clinches and/or chafers. The rubber composition in the aspect 2-1 or 2-2 of the invention may also be used in tire components other than clinches and chafers.

In the aspect 2-1 or 2-2 of the invention, a clinch refers to a rubber portion disposed at an inner end of a sidewall, and a chafer is a component disposed at a portion of a bead in contact at least with a rim. Specific examples of clinches or chafers are shown in, for example, FIG. 1 of this application and FIG. 1 of JP 2010-163560 A.

The pneumatic tire according to the aspect 2-1 or 2-2 of the invention can be produced from the rubber composition by usual methods.

Specifically, a rubber composition containing the above components before vulcanization is extruded and processed into the shape of a clinch and/or chafer and then assembled with other tire components on a tire building machine by a usual method to build an unvulcanized tire. The unvulcanized tire is heated and pressurized in a vulcanizer to produce a tire.

The pneumatic tire according to the aspect 2-1 or 2-2 of the invention can be suitably used for passenger vehicles, trucks and buses, or two-wheeled vehicles, or as high performance tires or other tires. The pneumatic tire obtained according to the aspect 2-1 or 2-2 of the invention can exhibit good rim chafing resistance and good antistatic properties for a long time.

High performance tires in the aspect 2-1 or 2-2 of the invention conceptually encompass racing tires used for racing vehicles.

An example of the pneumatic tire according to the aspect 2-1 or 2-2 of the invention will be described below with reference to drawings.

(Basic Structure)

The pneumatic tire according to the aspect 2-1 or 2-2 of the invention has a structure as illustrated in, for example, the upper right half of the cross section of a tire shown in FIG. 1. A pneumatic tire 1 includes a tread rubber 7 forming a tread, a sidewall rubber 8 forming each of a pair of sidewalls extending inwardly from each end of the tread rubber 7 in the radial direction of the pneumatic tire 1, a clinch rubber 3 forming a clinch located at an inner end of each sidewall, and a chafer rubber 2 forming a chafer located on the top of a rim. A carcass 10 is provided to extend between the clinches or chafers. A breaker rubber 9 forming a breaker is disposed outward of the carcass 10 in the radial direction of the pneumatic tire 1. The carcass 10 is composed of at least one carcass ply including carcass cords arranged therein. The carcass ply extends from the tread via the sidewall and then is turned up around a bead core 13 and a bead apex 11 extending from the upper end of the bead core 13 toward the sidewall, from the inside to the outside in the axial direction of the pneumatic tire 1, and finally anchored by the turn-up. The breaker is composed of two or more breaker plies including breaker cords arranged therein. The breaker cords are stacked in different orientations to cross the breaker cords in one breaker ply with another breaker ply. The pneumatic tire 1 according to the aspect 2-1 or 2-2 of the invention has, for example, but not limited to, the following structure: a covering rubber (undertread) 5 for covering the upper side of the breaker is provided between the tread (tread rubber 7, base tread) and the breaker; a cushion rubber 4 is disposed between the carcass ply and the sidewall or each end of the breaker while having an area in contact with the covering rubber 5; a conductive rubber 6 is disposed in the tread rubber 7 to be in contact with the covering rubber 5 and also to be partially exposed on the ground contact surface; an inner sidewall layer rubber 14 is disposed between the carcass 10 and the sidewall rubber 8 while having an area in contact with the cushion rubber 4, and extending at least from the cushion rubber 4 to the position in contact with the clinch rubber 3 or chafer rubber 2; and the conductive rubber 6, the covering rubber 5, the cushion rubber 4, the inner sidewall layer rubber 14, and the clinch rubber 3 or chafer rubber 2 are electrically connected in the pneumatic tire 1.

Although in FIG. 1, the inner sidewall layer rubber 14 and the chafer rubber 2 are not directly in contact with each other, a structure may be used in which an inner sidewall layer rubber is directly in contact with a chafer rubber.

With the above-described structure, the static electricity generated in the bead rubbers (clinch rubber, chafer rubber) located in the area in contact with the rim, or at the ground contact area during running of the pneumatic tire can be released outside the pneumatic tire through the electrically connected conductive rubber components in the pneumatic tire. Therefore, even when the tread rubber, breaker rubber, or sidewall rubber contains silica, the pneumatic tire can have low electrical resistance.

(Tread Rubber, Breaker Rubber, Sidewall Rubber)

The tread rubber, breaker rubber, and sidewall rubber forming a pneumatic tire are each preferably adjusted to have a volume resistivity of $1\times10^8$ Ω·cm or more. The upper limit of the volume resistivity of each rubber is not particularly limited but is preferably set to $1\times10^{15}$ Ω·cm. Conventionally, carbon black has been used as a rubber-reinforcing agent (filler) in these components. Replacing such carbon black with silica can reduce rolling resistance. Furthermore, silica, which is not derived from fossil fuel such as petroleum, is environmentally suitable as compared to carbon black which is generally derived from petroleum or coal. However, the use of silica tends to increase the volume resistivity. The pneumatic tire according to the aspect 2-1 or 2-2 of the invention basically contains silica to maintain the basic properties including rubber processability and reduced rolling resistance, and, at the same time, can ameliorate the problem of high electrical resistance, i.e. the volume resistivity of the rubber composition of $1\times10^8$ Ω·cm or more, by the use of the above-mentioned electrically connected structure.

The volume resistivity in the aspect 2-1 or 2-2 of the invention can be measured by the method described in Examples. The term "volume resistivity" as used alone in the aspect 2-1 or 2-2 of the invention means a volume resistivity measured at 10 V.

Any silica may be used, including those produced by a wet process or dry process. The incorporation of silica can further reduce rolling resistance while ensuring reinforcing properties, and can ensure flex crack growth resistance, mechanical strength, and other properties. Moreover, the incorporation of silica can improve the scorch resistance of the rubber composition.

In the pneumatic tire according to the aspect 2-1 or 2-2 of the invention, the silica preferably constitutes 50% by mass or more of the total filler in the tread rubber, breaker rubber, or sidewall rubber. When the silica accounts for 50% by mass or more of the total filler, it has a good effect in reducing the rolling resistance of the pneumatic tire. The proportion of silica relative to the total filler is more preferably 70% by mass or more, still more preferably 90% by mass or more. The upper limit of the proportion is not particularly limited and may be 100% by mass. Although the silica may constitute the total amount of filler, other fillers may be used in combination to control the properties of the tread rubber, breaker rubber, or sidewall rubber, such as conductivity, mechanical strength, and resistance to ultraviolet degradation.

The silica may be incorporated in an amount of, for example, 5 to 100 parts by mass relative to 100 parts by mass of the rubber component in the tread rubber, breaker rubber, or sidewall rubber. The incorporation of 5 parts by mass or more of silica can reduce the rolling resistance of the pneumatic tire. The incorporation of 100 parts by mass or less can well prevent an excessive cost increase, or a decrease in processability caused by an increase in the viscosity of the unvulcanized rubber composition in the preparation of the tread rubber, breaker rubber, or sidewall rubber.

The silica preferably has a nitrogen adsorption specific surface area (BET method) within the range of 50 to 300 $m^2/g$, more preferably 100 to 250 $m^2/g$. The silica having a nitrogen adsorption specific surface area of 50 $m^2/g$ or more can produce a sufficient reinforcing effect, thereby allowing the pneumatic tire to have well-improved abrasion resistance. The silica having a nitrogen adsorption specific surface area of 300 $m^2/g$ or less can provide good processability in the preparation of each rubber and also ensure good handling stability for the pneumatic tire. The nitrogen adsorption specific surface area in the aspect 2-1 or 2-2 of the invention is determined by the BET method set forth in ASTM D3037-81.

In the case where the tread rubber, breaker rubber, or sidewall rubber contains silica, a silane coupling agent is preferably incorporated together with the silica. Any silane coupling agent conventionally used in combination with silica in the rubber industry may be used. Examples include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred. The amount of the silane coupling agent relative to 100 parts by mass of silica is preferably 5 to 15 parts by mass.

(Covering Rubber)

The covering rubber 5 in the aspect 2-1 or 2-2 of the invention is preferably formed of a rubber that is adjusted to have a volume resistivity of less than $1\times10^8$ Ω·cm and provided to be in contact with the cushion rubber 4 and the conductive rubber 6 and also to cover the upper side of the breaker. The covering rubber 5 having a volume resistivity of less than 1×10⁸ Ω·cm can provide the effect of improving the conductivity of the pneumatic tire to the desired extent. The volume resistivity is also more preferably set to $1 \times 10^7$ Ω·cm or less, still more preferably $1 \times 10^6$ Ω·cm or less, particularly preferably $1 \times 10^{5.5}$ Ω·cm or less, but preferably $1 \times 10^3$ Ω·cm or more, more preferably $1 \times 10^4$ Ω·cm or more.

The covering rubber having a thickness of 0.2 mm or more can provide the effect of improving the conductivity of the pneumatic tire to the desired extent and, with a thickness of 3.0 mm or less, it does not greatly deteriorate the rolling resistance of the pneumatic tire. The cushion rubber preferably has a thickness within the range of 0.5 to 2.0 mm, more preferably 0.7 to 1.3 mm. It is sufficient that the covering rubber has an area in contact with the cushion rubber and the conductive rubber. It may be provided between the tread and the breaker while extending over the entire surface thereof or partially to the position where the conductive rubber is located or within a range exceeding the position.

With regard to the areas of contact of the covering rubber with the cushion rubber or conductive rubber, the covering rubber preferably has an area in contact with the cushion rubber, extending as a strip with a width of at least 2 mm, more preferably at least 4 mm, in the circumferential direction of the pneumatic tire. The upper limit of the width is not particularly limited but is preferably 10 mm. When the cushion rubber is in contact with the covering rubber under the above conditions, the effect of improving the conductivity of the pneumatic tire can be sufficiently obtained. The covering rubber is preferably in contact with the conductive rubber over the entire surface of the conductive rubber in the width and/or circumferential direction of the pneumatic tire.

The carbon black used in the covering rubber preferably has a nitrogen adsorption specific surface area of 50 to 2,000 m²/g. Such a carbon black is preferred because it allows the covering rubber to have good mechanical strength and ensures processability during production. The nitrogen adsorption specific surface area is more preferably 60 to 1,500 m²/g. The carbon black may suitably be carbon black of non-petroleum origin such as wood tar carbon black.

The covering rubber may contain two or more types of carbon black as filler.

In the case of the covering rubber containing two types of carbon black, one of the two types of carbon black preferably has a nitrogen adsorption specific surface area of 30 to 90 m²/g, more preferably 60 to 85 m²/g. The other carbon black preferably has a nitrogen adsorption specific surface area of 95 to 200 m²/g, more preferably 105 to 125 m²/g.

According to the aspect 2-1 or 2-2 of the invention, the covering rubber preferably contains carbon black in an amount of 5 to 80 parts by mass, more preferably 10 to 70 parts by mass, still more preferably 20 to 60 parts by mass, relative to 100 parts by mass of the rubber component. The covering rubber containing 5 parts by mass or more of carbon black can have high conductivity. In the case of the covering rubber containing two or more types of carbon black, the above amount means the total amount of carbon black.

(Cushion Rubber)

According to the aspect 2-1 or 2-2 of the invention, the cushion rubber 4 is preferably formed of a rubber that is adjusted to have a volume resistivity of less than 1×10⁸ Ω·cm and provided below each end of the breaker, between the sidewall or the breaker edge and the carcass ply forming the later-described carcass 10, while having an area in contact with the inner sidewall layer rubber 14. The cushion rubber 4 having a volume resistivity of less than 1×10⁸ Ω·cm can provide the effect of improving the conductivity of the pneumatic tire. The cushion rubber is more preferably adjusted to have a volume resistivity of 1×10⁷ Ω·cm or less, still more preferably 1×10⁶·⁵ Ω·cm or less, particularly preferably 1×10⁶ Ω·cm or less, but preferably 1×10³ Ω·cm or more, more preferably 1×10⁴ Ω·cm or more.

The cushion rubber may be provided continuously or discontinuously in the circumferential direction of the pneumatic tire between the sidewall or the breaker edge and the carcass ply forming the carcass as described above, with no limitation on the thickness, shape, and other characteristics of the cushion rubber.

The carbon black used in the cushion rubber preferably has a nitrogen adsorption specific surface area of 50 to 2,000 m²/g. Such a carbon black is preferred because it allows the cushion rubber to have good mechanical strength and ensures processability during production. The nitrogen adsorption specific surface area is more preferably 60 to 1,500 m²/g. The carbon black may suitably carbon black of non-petroleum origin such as wood tar carbon black.

According to the aspect 2-1 or 2-2 of the invention, the cushion rubber preferably contains carbon black in an amount of 1 to 50 parts by mass, more preferably 3 to 30 parts by mass, still more preferably 5 to 20 parts by mass, relative to 100 parts by mass of the rubber component. In the case of the cushion rubber containing two or more types of carbon black, the above amount means the total amount of carbon black.

(Conductive Rubber)

According to the aspect 2-1 or 2-2 of the invention, the conductive rubber is embedded in the tread. A part of the conductive rubber is exposed on the ground contact surface of the pneumatic tire while another part is connected to (in contact with) the covering rubber, to thereby effectively release the static electricity generated during running of the pneumatic tire to the ground contact surface. Although FIG. 1 shows a structure in which one conductive rubber 6 is embedded in the center of the tread, multiple conductive rubbers may be embedded. The width of the conductive rubber in the width direction of the pneumatic tire is, for example, 0.2 to 10 mm, preferably 2 to 4 mm. The conductive rubber having a width of less than 0.2 mm may exhibit a small conductive effect, while the conductive rubber with a width of more than 10 mm has a relatively increased ground contact area in the tread, which may impair ground contact properties, rolling resistance properties, or abrasion resistance. The conductive rubber is preferably provided as a continuous layer in the circumferential direction of the pneumatic tire but may be provided intermittently in the circumferential direction of the pneumatic tire.

The conductive rubber is adjusted to have a volume resistivity lower than the tread rubber, breaker rubber, and sidewall rubber, preferably of less than 1×10⁸ Ω·cm. The conductive rubber having a volume resistivity of less than 1×10⁸ Ω·cm can improve the conductivity of the pneumatic tire and provide a static electricity-releasing effect. The conductive rubber more preferably has a volume resistivity of 1×10⁷ Ω·cm or less, still more preferably 1×10⁶ Ω·cm or less, particularly preferably 1×10⁵·⁵ Ω·cm or less. The lower limit of the volume resistivity of the conductive rubber is not particularly limited but is preferably 1×10³ Ω·cm, more preferably 1×10⁴ Ω·cm.

The conductive rubber may have substantially the same formulation as the covering rubber or the cushion rubber and may contain the same carbon black or silica as described above. To improve ground contact properties, the conductive rubber may be designed to have a formulation capable of providing conductivity based on the formulation of the tread rubber.

(Inner Sidewall Layer Rubber)

The inner sidewall layer rubber 14 has a structure in which it is disposed between the carcass 10 and the sidewall rubber 8 while having an area in contact with the cushion rubber 4, and extending at least from the cushion rubber 4 to the position in contact with the clinch rubber 3 or chafer rubber 2, and, for example, the upper end of the inner sidewall layer rubber is electrically connected with the cushion rubber while the lower end thereof is electrically connected with the clinch rubber or chafer rubber. The inner sidewall layer rubber is adjusted to have a volume resistivity of less than $1 \times 10^8$ Ω·cm. The inner sidewall layer rubber having a volume resistivity of less than $1 \times 10^8$ Ω·cm can provide the effect of improving the conductivity of the pneumatic tire. The inner sidewall layer rubber is preferably adjusted to have a volume resistivity of $1 \times 10^7$ Ω·cm or less, more preferably $1 \times 10^{6.5}$ Ω·cm or less, still more preferably $1 \times 10^6$ Ω·cm or less, particularly preferably $1 \times 10^{5.5}$ Ω·cm or less. The use of a rubber composition containing a large amount of a conductive component reduces the electrical resistance but promotes the electrochemical reaction in the area of contact of the pneumatic tire with the rim to accelerate rusting of the rim. In order to avoid this problem, the cushion rubber is preferably adjusted to have a volume resistivity of $1 \times 10^3$ Ω·cm or more, more preferably $1 \times 10^4$ Ω·cm or more.

The inner sidewall layer rubber having a thickness of 0.2 mm or more can provide the effect of improving the conductivity of the pneumatic tire to the desired extent and, with a thickness of 1.0 mm or less, it does not greatly deteriorate the rolling resistance of the pneumatic tire. The cushion rubber preferably has a thickness particularly within the range of 0.5 to 1.5 mm. It is sufficient that the inner sidewall layer rubber is disposed between the carcass and the sidewall rubber (for example, disposed adjacent to the outer side of the carcass and the inner side of the sidewall rubber) and has an area in contact with the cushion rubber and the bead rubber. The inner sidewall layer rubber may be partially located between the carcass and the breaker, and provided continuously or discontinuously in the circumferential direction of the pneumatic tire.

With regard to the areas of contact of the inner sidewall layer rubber with the cushion rubber or the bead rubber, the inner sidewall layer rubber preferably has an area in contact with the cushion rubber, extending as a strip with a width of at least 2 mm, more preferably at least 4 mm, in the circumferential direction of the pneumatic tire. The upper limit of the width is not particularly limited but is preferably 10 mm. When the inner sidewall layer rubber is in contact with the cushion rubber under the above conditions, the effect of improving the conductivity of the pneumatic tire can be sufficiently obtained. The inner sidewall layer rubber preferably has an area in contact with the bead rubber, preferably the clinch rubber and/or chafer rubber, with a width of at least 2 mm, more preferably at least 4 mm, along the shape of the carcass. The upper limit of the width is not particularly limited but is preferably 10 mm.

According to the aspect 2-1 or 2-2 of the invention, static electricity can be effectively released through an electrically connected path as shown in FIG. 1. Furthermore, the use of the rubber composition for inner sidewall layer rubbers having the above-described formulation can also improve crack resistance. Thus, the formation of cracks from the ply turn-ups and the formation of cracks on the sidewall surface and the innerliner surface can be prevented.

The inner sidewall layer rubber may have substantially the same formulation as the cushion rubber and may contain the same carbon black or silica as described above.

(Bead Rubber)

According to the aspect 2-1 or 2-2 of the invention, a bead rubber disposed in the area of contact of a bead with a rim flange conceptually encompasses a clinch rubber and a chafer rubber. During running of pneumatic tires, driving force is transmitted from the rim through the bead rubber. At that time, static electricity can easily be generated due to the friction between the rim and the bead rubber. Since the bead rubber has an area in contact with the inner sidewall layer rubber, static electricity can be effectively released to the ground contact surface through the inner sidewall layer rubber. In FIG. 1, the clinch rubber 3 and the chafer rubber 2 are electrically connected to the inner sidewall layer rubber 14.

The bead rubber (clinch rubber, chafer rubber) preferably has a volume resistivity of less than $1 \times 10^8$ Ω·cm. The bead rubber having a volume resistivity of less than $1 \times 10^8$ Ω·cm allows the pneumatic tire to have good conductivity. The bead rubber preferably has a volume resistivity of $1 \times 10^7$ Ω·cm or less, more preferably $1 \times 10^{6.5}$ Ω·cm or less, still more preferably $1 \times 10^6$ Ω·cm or less, particularly preferably $1 \times 10^{5.5}$ Ω·cm or less. The lower limit of the volume resistivity of the bead rubber is not particularly limited but is preferably $1 \times 10^3$ Ω·cm, more preferably $1 \times 10^4$ Ω·cm. Since the clinch rubber 3 and the chafer rubber 2 are required to have abrasion resistance, rim chafing resistance, rigidity, and hardness, the electrical resistance of these rubbers can be controlled by the use of the formulation designs for these properties as well as the formulation techniques for the cushion rubber and the conductive rubber. The bead rubber is preferably formed from a rubber composition having a carbon black dispersion of 90% or more as determined by counting the number of aggregates in accordance with JIS K 6812 "Method for the assessment of the degree of pigment or carbon black dispersion in polyolefin pipes, fittings and compounds".

The clinch and/or chafer of the bead rubber are formed from the rubber composition in the aspect 2-1 or 2-2 of the invention.

(Carcass)

According to the aspect 2-1 or 2-2 of the invention, a carcass extending from the tread via the sidewall to the bead is composed of at least one carcass ply including carcass cords arranged therein. The carcass ply has a structure in which parallel carcass cords are embedded in rubber. Examples of fiber materials that can form the carcass cords include rayon, nylon, polyester, and aramid. These may be used alone, or two or more of these may be used in admixture. In view of the environment, rayon which is a material of natural origin may be used. In this case, the rayon content is preferably 90% by mass or more of fiber materials forming the carcass cords.

The volume resistivity of the ply rubber is not particularly limited but may be adjusted as described for the tread rubber, breaker rubber, and sidewall rubber. The ply rubber may also be adjusted to have a volume resistivity of less than $1 \times 10^8$ Ω·cm. Such a ply rubber together with the adjacent inner sidewall layer rubber can improve the conductivity of the pneumatic tire and provide a static electricity-releasing effect. In this case, the ply rubber is preferably adjusted to have a volume resistivity of $1 \times 10^7$ Ω·cm or less, more preferably $1 \times 10^6$ Ω·cm or less, still more preferably $1 \times 10^{5.5}$ Ω·cm or less. The lower limit of the volume resistivity of the ply rubber is not particularly limited but is preferably $1\times10^3$ Ω·cm, more preferably $1\times10^4$ Ω·cm.

According to the aspect 2-1 or 2-2 of the invention, the ply rubber may have substantially the same formulation as the covering rubber and may contain the same carbon black or silica as described above. To improve the adhesion to the carcass cords, the ply rubber may be provided with conductivity by incorporating carbon black or the like into a basic formulation for conventional ply rubbers.

According to the aspect 2-1 or 2-2 of the invention, the tread rubber, breaker rubber, and sidewall rubber are adjusted to have a volume resistivity of $1\times10^8$ Ω·cm or more to maintain the properties of tires such as rolling resistance and durability, and at the same time, the bead rubber and its electrically connected inner sidewall layer rubber, cushion rubber, covering rubber, and conductive rubber are adjusted to have a lower volume resistivity. Thus, the static electricity generated in the pneumatic tire can be effectively released through the electrically connected path formed by these components.

Moreover, since the clinch and/or chafer are formed from the rubber composition in the aspect 2-1 or 2-2 of the invention, rolling resistance can be reduced to a low level, and also the accumulation of static electricity during running of the tire can be prevented. Furthermore, an increase over time in the electrical resistance of the tire can be suppressed so that the accumulation of static electricity during running of the tire can be effectively prevented throughout the life of the tire. In addition, rim chafing resistance can be improved. The inner sidewall layer rubber and/or cushion rubber may also be formed from the rubber composition in the aspect 2-1 or 2-2 of the invention.

(Rubber Formulations for Covering Rubber, Cushion Rubber, Conductive Rubber, Inner Sidewall Layer Rubber, Tread Rubber, Breaker Rubber, and Sidewall Rubber)

The covering rubber, cushion rubber, conductive rubber, inner sidewall layer rubber, tread rubber, breaker rubber, and sidewall rubber in the pneumatic tire according to the aspect 2-1 or 2-2 of the invention may be formed from the following rubber compositions, for example.

Examples of the rubber component to be used in the rubber composition for each of them include those listed for the rubber composition in the aspect 2-1 or 2-2 of the invention. The rubber component to be used in the covering rubber, cushion rubber, conductive rubber, inner sidewall layer rubber, tread rubber, breaker rubber, or sidewall rubber is preferably a diene rubber, more preferably, for example, natural rubber, styrene-butadiene rubber, polybutadiene rubber, polyisoprene rubber, or epoxidized natural rubber.

The rubber compositions may appropriately contain the below-mentioned compounding agents commonly used in tire rubber formulations.

The rubber compositions may appropriately contain, in addition to the above-described components, compounding agents commonly used in preparation of rubber compositions. Examples of the compounding agents include reinforcing fillers such as clay and talc; zinc oxide; stearic acid; processing aids; various types of antioxidants; wax; oil; vulcanizing agents such as sulfur and sulfur-containing compounds; and vulcanization accelerators.

<The Aspects 3-1 and 3-2 of the Invention>

The aspect 3-1 of the invention relates to a pneumatic tire including a tread, the tread including a conductive rubber embedded therein so that the conductive rubber is partially exposed, the conductive rubber being formed from a rubber composition containing one or more types of carbon black, at least one of the one or more types of carbon black being produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 3-2 of the invention relates to a pneumatic tire including a tread, the tread including a conductive rubber embedded therein so that the conductive rubber is partially exposed, the conductive rubber being formed from a rubber composition containing one or more types of carbon black, at least one of the one or more types of carbon black having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 3-1 or 3-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition for forming the conductive rubber. Accordingly, improved abrasion resistance and good conductivity can be exhibited while maintaining or improving good low heat build-up properties, and further the deterioration in conductive properties can be reduced during service. As a result, the pneumatic tire according to the aspect 3-1 or 3-2 of the invention can exhibit ground contact properties and antistatic properties for a long time.

The rubber composition for forming the conductive rubber (hereinafter, also referred to as the rubber composition in the aspect 3-1 or 3-2 of the invention) will first be described below.

Examples of materials which can be included in the rubber component of the rubber composition in the aspect 3-1 or 3-2 of the invention include diene rubbers such as isoprene-based rubbers, polybutadiene rubber (BR), styrene butadiene rubber (SBR), and styrene isoprene butadiene rubber (SIBR). The rubber component may be a single material or a combination of two or more materials. In order to more suitably achieve the effects of the aspect 3-1 or 3-2 of the invention, isoprene-based rubbers, SBR, and BR are preferred among these, and combinations of isoprene-based rubbers and SBR and/or BR are more preferred. According to the aspect 3-1 or 3-2 of the invention, the incorporation of carbon black (1) with a rubber component including a combination of an isoprene-based rubber (particularly NR) and SBR (particularly S-SBR) and/or BR (particularly high-cis BR) allows the effects of the aspect 3-1 or 3-2 of the invention to be more suitably achieved.

Examples of the isoprene-based rubber include polyisoprene rubber (IR), natural rubber (NR), and epoxidized natural rubber (ENR). NR is preferred among these because it is excellent in processability, low heat build-up properties, and other properties. Examples of the NR include those commonly used in the tire industry such as SIR20, RSS#3, and TSR20. The IR is not particularly limited, and those commonly used in the tire industry can be used.

In the rubber composition in the aspect 3-1 or 3-2 of the invention, the amount of the isoprene-based rubber based on 100% by mass of the rubber component is preferably 1% by mass or more, more preferably 5% by mass or more, still more preferably 10% by mass or more, particularly preferably 20% by mass or more. If the amount of the isoprene-based rubber is less than 1% by mass, abrasion resistance, low heat build-up properties, and processability may not be sufficiently obtained. The amount of the isoprene-based rubber is also preferably 50% by mass or less, more preferably 40% by mass or less. If the amount of the isoprene-based rubber is more than 50% by mass, sufficient wet grip performance may not be obtained.

Any SBR may be used, and examples include emulsion-polymerized styrene butadiene rubber (E-SBR) and solution-polymerized styrene butadiene rubber (S-SBR). Among these, S-SBR is preferred in order to suitably achieve the effects of the aspect 3-1 or 3-2 of the invention and also to provide good wet grip performance.

The SBR preferably has a vinyl content of 20% by mass or more, more preferably 40% by mass or more, still more preferably 60% by mass or more. With SBR having a vinyl content of less than 20% by mass, the effects of the aspect 3-1 or 3-2 of the invention may not be suitably achieved. The vinyl content is preferably 90% by mass or less, more preferably 80% by mass or less, still more preferably 70% by mass or less. With SBR having a vinyl content of more than 90% by mass, abrasion resistance tends to deteriorate. The vinyl content of SBR can be measured by infrared absorption spectrometry.

The SBR preferably has a styrene content of 5% by mass or more, more preferably 10% by mass or more, still more preferably 15% by mass or more. With SBR having a styrene content of less than 5% by mass, the effects of the aspect 3-1 or 3-2 of the invention tend not to be suitably achieved. The styrene content is also preferably 60% by mass or less, more preferably 30% by mass or less, still more preferably 25% by mass or less. With SBR having a styrene content of more than 60% by mass, abrasion resistance tends to decrease. In the aspect 3-1 or 3-2 of the invention, the styrene content of SBR is determined by $^1$H-NMR analysis.

In the case where the rubber composition in the aspect 3-1 or 3-2 of the invention contains SBR, the amount of SBR based on 100% by mass of the rubber component is preferably 50% by mass or more, more preferably 60% by mass or more. If the amount is less than 50% by mass, abrasion resistance, ground contact properties, or wet grip performance tend not to be sufficiently obtained. The amount of SBR is also preferably 99% by mass or less, more preferably 95% by mass or less, still more preferably 90% by mass or less, particularly preferably 80% by mass or less. If the amount is more than 99% by mass, low heat build-up properties may not be sufficiently obtained. The amounts of the rubber component and SBR mean solid contents.

The carbon black (1) described above is used in the aspect 3-1 or 3-2 of the invention.

In the aspect 3-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 3-1 or 3-2 of the invention (particularly the effects of improving abrasion resistance or ground contact properties) are insufficient. The lower limit of the Dmod is not particularly limited but is preferably 50 nm, more preferably 56 nm. If it is less than 50 nm, the carbon black (1) tends to have poor dispersibility, resulting in reduced breaking properties, abrasion resistance, or ground contact properties.

In the aspect 3-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 3-1 or 3-2 of the invention (particularly the effects of improving abrasion resistance or ground contact properties) are insufficient. The upper limit of the ΔD50/Dmod ratio is not particularly limited but is preferably 2.5, more preferably 2.0. If it is more than 2.5, abrasion resistance or ground contact properties may deteriorate, with the result that the desired effects may not be obtained.

In the aspect 3-1 or 3-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by mass. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 m$^2$/g, more preferably 80 to 145 m$^2$/g, still more preferably 100 to 140 m$^2$/g, particularly preferably 105 to 135 m$^2$/g. When the CTAB falls within the range indicated above, the effects of the aspect 3-1 or 3-2 of the invention can be more suitably achieved.

In the aspect 3-1 or 3-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effects of improving abrasion resistance or ground contact properties can be more suitably achieved and the effects of the aspect 3-1 or 3-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 3-1 or 3-2 of the invention can be more suitably achieved.

In the aspect 3-1 or 3-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 3-1 or 3-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 3-1 of the invention can be more suitably achieved.

In the aspect 3-1 or 3-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the abrasion resistance and ground contact properties of the rubber composition can be more suitably improved, and the effects of the aspect 3-1 or 3-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 3-1 or 3-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 3-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. Additionally, ground contact properties and antistatic properties cannot be simultaneously achieved. The lower limit of the BMCI value of the feedstock oil is not particularly limited but is preferably 95. If it is less than 95, a poor yield (insufficient amount of carbon black) may be obtained.

In the aspect 3-1 of the invention, the aliphatic hydrocarbon content of the feedstock oil (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. Additionally, ground contact properties and antistatic properties cannot be simultaneously achieved. The upper limit of the aliphatic hydrocarbon content is not particularly limited but is preferably 60% by mass. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 3-1 or 3-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above and the effects of the aspect 3-1 or 3-2 of the invention.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a fuel hydrocarbon is introduced into the high-temperature combustion gas stream formed in the combustion zone by spraying from parallel or laterally disposed burners, so that the fuel hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

In the rubber composition in the aspect 3-1 or 3-2 of the invention, the amount of carbon black (1) relative to 100 parts by mass of the rubber component is preferably 5 parts by mass or more, more preferably 10 parts by mass or more, still more preferably 25 parts by mass or more, further preferably 35 parts by mass or more, particularly preferably 45 parts by mass or more. If the amount is less than 5 parts by mass, the effects of the aspect 3-1 or 3-2 of the invention tend not to be sufficiently obtained. The amount of carbon black (1) is also preferably 150 parts by mass or less, more preferably 120 parts by mass or less, still more preferably 100 parts by mass or less, further preferably 90 parts by mass or less, particularly preferably 60 parts by mass or less. If the amount is more than 150 parts by mass, the resulting rubber composition tends to be too hard, adversely leading to reduced abrasion resistance or ground contact properties. Furthermore, low heat build-up properties tend to deteriorate.

The rubber composition in the aspect 3-1 or 3-2 of the invention may contain carbon black other than carbon black (1) together with carbon black (1).

The amount of carbon black (1) based on 100% by mass of the total carbon black is preferably 30% by mass or more, more preferably 50% by mass or more, still more preferably 80% by mass or more, further preferably 90% by mass or more, particularly preferably 100% by mass. If the amount is less than 30% by mass, the effects of the aspect 3-1 or 3-2 of the invention may not be sufficiently obtained.

The total amount of carbon black when carbon black other than carbon black (1) is incorporated is as described for the amount of carbon black (1) when carbon black (1) alone is used.

The rubber composition in the aspect 3-1 or 3-2 of the invention may appropriately contain, in addition to carbon black, reinforcing fillers commonly used in preparation of rubber compositions, such as silica, clay, and talc. The amount of carbon black based on 100% by mass of reinforcing fillers is preferably 50% by mass or more, more preferably 80% by mass or more, still more preferably 90% by mass or more, particularly preferably 100% by mass. If the amount of carbon black is less than 50% by mass, the effects of the aspect 3-1 or 3-2 of the invention may not be sufficiently obtained. In the case where the rubber composition in the aspect 3-1 or 3-2 of the invention contains two or more types of carbon black, the amount of carbon black means the total amount of carbon black.

The rubber composition in the aspect 3-1 or 3-2 of the invention may appropriately contain, in addition to the above-described components, compounding agents commonly used in preparation of rubber compositions. Examples of the compounding agents include silane coupling agents; zinc oxide; stearic acid; processing aids; various types of antioxidants; wax; oil; vulcanizing agents such as sulfur and sulfur-containing compounds; and vulcanization accelerators.

Examples of the sulfur include powdered sulfur, precipitated sulfur, colloidal sulfur, insoluble sulfur, and highly dispersible sulfur. Preferred among these is powdered sulfur. The amount of sulfur relative to 100 parts by mass of the rubber component is preferably 0.1 to 10 parts by mass, more preferably 0.5 to 5 parts by mass, still more preferably 1 to 3 parts by mass.

Examples of the vulcanization accelerator include thiazole vulcanization accelerators such as 2-mercaptobenzothiazole, di-2-benzothiazolyl disulfide, and N-cyclohexyl-2-benzothiazolylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolesulfenamide, N-t-butyl-2-benzothiazolylsulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the aspect 3-1 or 3-2 of the invention, sulfenamide vulcanization accelerators are preferred among these, with N-t-butyl-2-benzothiazolylsulfenamide being more preferred. The amount of the vulcanization accelerator relative to 100 parts by mass of the rubber component is preferably 0.1 parts by mass or more, more preferably 0.3 parts by mass or more, still more preferably 0.5 parts by mass or more, and is also preferably 10 parts by mass or less, more preferably 2 parts by mass or less, still more preferably 1.5 parts by mass or less.

The rubber composition in the aspect 3-1 or 3-2 of the invention can be prepared by usual methods. Specifically, it may be prepared by kneading the components using a Banbury mixer, a kneader, an open roll mill, or other kneading machines and vulcanizing the kneadate.

The rubber composition in the aspect 3-1 or 3-2 of the invention exhibits the effects of the aspect 3-1 or 3-2 of the invention when it is used as a conductive rubber composition. The rubber composition in the aspect 3-1 or 3-2 of the invention may also be used in components other than the above-described conductive rubber for tires.

In the aspect 3-1 or 3-2 of the invention, the conductive rubber is embedded in the tread. Apart of the conductive rubber is exposed on the ground contact surface of the tire while another part is connected to a rubber having conductivity, to thereby effectively release the static electricity generated during running of the pneumatic tire to the ground contact surface. Specific examples of conductive rubbers are shown in, for example, FIG. 1 of this application and FIG. 1 of JP 2944908 B.

The pneumatic tire according to the aspect 3-1 or 3-2 of the invention can be produced from the rubber composition by usual methods.

Specifically, a rubber composition containing the above components, before vulcanization, is extruded and processed into the shape of a conductive rubber and then assembled with other tire components on a tire building machine by a usual method to build an unvulcanized tire. The unvulcanized tire is heated and pressurized in a vulcanizer to produce a tire.

The pneumatic tire according to the aspect 3-1 or 3-2 of the invention can be suitably used for passenger vehicles, trucks and buses, or two-wheeled vehicles, or as high performance tires or other tires. The pneumatic tire obtained according to the aspect 3-1 or 3-2 of the invention can exhibit good ground contact properties and good antistatic properties for a long time.

High performance tires in the aspect 3-1 or 3-2 of the invention conceptually encompass racing tires used for racing vehicles.

An example of the pneumatic tire according to the aspect 3-1 or 3-2 of the invention will be described below with reference to drawings.
(Basic Structure)

The pneumatic tire according to the aspect 3-1 or 3-2 of the invention has a structure as illustrated in, for example, the upper right half of the cross section of a tire shown in FIG. 1. A pneumatic tire 1 includes a tread rubber 7 forming a tread, a sidewall rubber 8 forming each of a pair of sidewalls extending inwardly from each end of the tread rubber 7 in the radial direction of the pneumatic tire 1, a clinch rubber 3 forming a clinch located at an inner end of each sidewall, and a chafer rubber 2 forming a chafer located on the top of a rim. A carcass 10 is provided to extend between the clinches or chafers. A breaker rubber 9 forming a breaker is disposed outward of the carcass 10 in the radial direction of the pneumatic tire 1. The carcass 10 is composed of at least one carcass ply including carcass cords arranged therein. The carcass ply extends from the tread via the sidewall and then is turned up around a bead core 13 and a bead apex 11 extending from the upper end of the bead core 13 toward the sidewall, from the inside to the outside in the axial direction of the pneumatic tire 1, and finally anchored by the turn-up. The breaker is composed of two or more breaker plies including breaker cords arranged therein. The breaker cords are stacked in different orientations to cross the breaker cords in one breaker ply with another breaker ply. The pneumatic tire 1 according to the aspect 3-1 or 3-2 of the invention has, for example, but not limited to, the following structure: a covering rubber (undertread) 5 for covering the upper side of the breaker is provided between the tread (tread rubber 7, base tread) and the breaker; a cushion rubber 4 is disposed between the carcass ply and the sidewall or each end of the breaker while having an area in contact with the covering rubber 5; a conductive rubber 6 is disposed in the tread rubber 7 to be in contact with the covering rubber 5 and also to be partially exposed on the ground contact surface (tread); an inner sidewall layer rubber 14 is disposed between the carcass 10 and the sidewall rubber 8 while having an area in contact with the cushion rubber 4, and extending at least from the cushion rubber 4 to the position in contact with the clinch rubber 3 or chafer rubber 2; and the conductive rubber 6, the covering rubber 5, the cushion rubber 4, the inner sidewall layer rubber 14, and the clinch rubber 3 or chafer rubber 2 are electrically connected in the pneumatic tire 1.

With the above-described structure, the static electricity generated in the bead rubbers (clinch rubber, chafer rubber) located in the area in contact with the rim, or at the ground contact area during running of the pneumatic tire can be released outside the pneumatic tire through the electrically connected conductive rubber components in the pneumatic tire. Therefore, even when the tread rubber, breaker rubber, or sidewall rubber contains silica, the pneumatic tire can have low electrical resistance.
(Tread Rubber, Breaker Rubber, Sidewall Rubber)

The tread rubber, breaker rubber, and sidewall rubber forming a pneumatic tire are each preferably adjusted to have a volume resistivity of $1 \times 10^8$ Ω·cm or more. The upper limit of the volume resistivity of each rubber is not particularly limited but is preferably set to $1 \times 10^{15}$ Ω·cm. Conventionally, carbon black has been used as a rubber-reinforcing agent (filler) in these components. Replacing such carbon black with silica can reduce rolling resistance. Furthermore, silica, which is not derived from fossil fuel such as petroleum, is environmentally suitable as compared to carbon black which is generally derived from petroleum or coal. However, the use of silica tends to increase the volume resistivity. The pneumatic tire according to the aspect 3-1 or 3-2 of the invention basically contains silica to maintain the basic properties including rubber processability and reduced rolling resistance, and, at the same time, can ameliorate the problem of high electrical resistance, i.e. the volume resistivity of the rubber composition of $1 \times 10^8$ Ω·cm or more, by the use of the above-mentioned electrically connected structure.

The volume resistivity in the aspect 3-1 or 3-2 of the invention can be measured by the method described in Examples. The term "volume resistivity" as used alone in the aspect 3-1 or 3-2 of the invention means a volume resistivity measured at 10 V.

Any silica may be used, including those produced by a wet process or dry process. The incorporation of silica can further reduce rolling resistance while ensuring reinforcing properties, and can also ensure flex crack growth resistance, mechanical strength, and other properties. Moreover, the incorporation of silica can improve the scorch resistance of the rubber composition.

In the pneumatic tire according to the aspect 3-1 or 3-2 of the invention, the silica preferably constitutes 50% by mass or more of the total filler in the tread rubber, breaker rubber, or sidewall rubber. When the silica accounts for 50% by mass or more of the total filler, it has a good effect in reducing the rolling resistance of the pneumatic tire. The proportion of silica relative to the total filler is more preferably 70% by mass or more, still more preferably 90% by mass or more. The upper limit of the proportion is not particularly limited and may be 100% by mass. Although the silica may constitute the total amount of filler, other fillers may be used in combination to control the properties of the tread rubber, breaker rubber, or sidewall rubber, such as conductivity, mechanical strength, and resistance to ultraviolet degradation.

The silica may be incorporated in an amount of, for example, 5 to 100 parts by mass relative to 100 parts by mass of the rubber component in the tread rubber, breaker rubber, or sidewall rubber. The incorporation of 5 parts by mass or more of silica can reduce the rolling resistance of the pneumatic tire. The incorporation of 100 parts by mass or less can well prevent an excessive cost increase, or a decrease in processability caused by an increase in the viscosity of the unvulcanized rubber composition in the preparation of the tread rubber, breaker rubber, or sidewall rubber.

The silica preferably has a nitrogen adsorption specific surface area (BET method) within the range of 50 to 300 $m^2/g$, more preferably 100 to 250 $m^2/g$. The silica having a nitrogen adsorption specific surface area of 50 $m^2/g$ or more can produce a sufficient reinforcing effect, thereby allowing the pneumatic tire to have well-improved abrasion resistance. The silica having a nitrogen adsorption specific surface area of 300 $m^2/g$ or less can provide good processability in the preparation of each rubber and also ensure good handling stability for the pneumatic tire. The nitrogen adsorption specific surface area in the aspect 3-1 or 3-2 of the invention is determined by the BET method set forth in ASTM D3037-81.

In the case where the tread rubber, breaker rubber, or sidewall rubber contains silica, a silane coupling agent is preferably incorporated together with the silica. Any silane coupling agent conventionally used in combination with silica in the rubber industry may be used. Examples include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred. The amount of the silane coupling agent relative to 100 parts by mass of silica is preferably 5 to 15 parts by mass.

(Covering Rubber)

The covering rubber 5 in the aspect 3-1 or 3-2 of the invention is preferably formed of a rubber that is adjusted to have a volume resistivity of less than $1 \times 10^8$ Ω·cm and provided to be in contact with the cushion rubber 4 and the conductive rubber 6 and also to cover the upper side of the breaker. The covering rubber 5 having a volume resistivity of less than $1 \times 10^8$ Ω·cm can provide the effect of improving the conductivity of the pneumatic tire to the desired extent. The volume resistivity is also more preferably set to $1 \times 10^7$ Ω·cm or less, still more preferably $1 \times 10^6$ Ω·cm or less, particularly preferably $1 \times 10^{5.5}$ Ω·cm or less, but preferably $1 \times 10^3$ Ω·cm or more, more preferably $1 \times 10^4$ Ω·cm or more.

The covering rubber having a thickness of 0.2 mm or more can provide the effect of improving the conductivity of the pneumatic tire to the desired extent and, with a thickness of 3.0 mm or less, it does not greatly deteriorate the rolling resistance of the pneumatic tire. The cushion rubber preferably has a thickness within the range of 0.5 to 2.0 mm, more preferably 0.7 to 1.3 mm. It is sufficient that the covering rubber has an area in contact with the cushion rubber and the conductive rubber. It may be provided between the tread and the breaker while extending over the entire surface thereof or partially to the position where the conductive rubber is located or within a range exceeding the position.

With regard to the areas of contact of the covering rubber with the cushion rubber or conductive rubber, the covering rubber preferably has an area in contact with the cushion rubber, extending as a strip with a width of at least 2 mm, more preferably at least 4 mm, in the circumferential direction of the pneumatic tire. The upper limit of the width is not particularly limited but is preferably 10 mm. When the cushion rubber is in contact with the covering rubber under the above conditions, the effect of improving the conductivity of the pneumatic tire can be sufficiently obtained. The covering rubber is preferably in contact with the conductive rubber over the entire surface of the conductive rubber in the width and/or circumferential direction of the pneumatic tire.

The carbon black used in the covering rubber preferably has a nitrogen adsorption specific surface area of 50 to 2,000 $m^2/g$. Such a carbon black is preferred because it allows the covering rubber to have good mechanical strength and ensures processability during production. The nitrogen adsorption specific surface area is more preferably 60 to 1,500 $m^2/g$. The carbon black may suitably carbon black of non-petroleum origin such as wood tar carbon black.

The covering rubber may contain two or more types of carbon black as filler.

In the case of the covering rubber containing two types of carbon black, one of the two types of carbon black preferably has a nitrogen adsorption specific surface area of 30 to 90 $m^2/g$, more preferably 60 to 85 $m^2/g$. The other carbon black preferably has a nitrogen adsorption specific surface area of 95 to 200 $m^2/g$, more preferably 105 to 125 $m^2/g$.

According to the aspect 3-1 or 3-2 of the invention, the covering rubber preferably contains carbon black in an amount of 5 to 80 parts by mass, more preferably 10 to 70 parts by mass, still more preferably 20 to 60 parts by mass, relative to 100 parts by mass of the rubber component. The covering rubber containing 5 parts by mass or more of carbon black can have high conductivity. In the case of the covering rubber containing two or more types of carbon black, the above amount means the total amount of carbon black.

(Cushion Rubber)

According to the aspect 3-1 or 3-2 of the invention, the cushion rubber 4 is preferably formed of a rubber that is adjusted to have a volume resistivity of less than $1 \times 10^8$ Ω·cm and provided below each end of the breaker, between the sidewall or the breaker edge and the carcass ply forming the later-described carcass 10, while having an area in contact with the inner sidewall layer rubber 14. The cushion rubber 4 having a volume resistivity of less than $1 \times 10^8$ Ω·cm can provide the effect of improving the conductivity of the pneumatic tire. The cushion rubber is more preferably adjusted to have a volume resistivity of $1 \times 10^7$ Ω·cm or less, still more preferably $1 \times 10^{6.5}$ Ω·cm or less, particularly preferably $1\times10^6$ Ω·cm or less, but preferably $1\times10^3$ Ω·cm or more, more preferably $1\times10^4$ Ω·cm or more.

The cushion rubber may be provided continuously or discontinuously in the circumferential direction of the pneumatic tire between the sidewall or the breaker edge and the carcass ply forming the carcass as described above, with no limitation on the thickness, shape, and other characteristics of the cushion rubber.

The carbon black used in the cushion rubber preferably has a nitrogen adsorption specific surface area of 50 to 2,000 m²/g. Such a carbon black is preferred because it allows the cushion rubber to have good mechanical strength and ensures processability during production. The nitrogen adsorption specific surface area is more preferably 60 to 1,500 m²/g. The carbon black may suitably carbon black of non-petroleum origin such as wood tar carbon black.

According to the aspect 3-1 or 3-2 of the invention, the cushion rubber preferably contains carbon black in an amount of 1 to 50 parts by mass, more preferably 3 to 30 parts by mass, still more preferably 5 to 20 parts by mass, relative to 100 parts by mass of the rubber component. In the case of the cushion rubber containing two or more types of carbon black, the above amount means the total amount of carbon black.

(Conductive Rubber)

According to the aspect 3-1 or 3-2 of the invention, the conductive rubber is preferably embedded in the tread so that a part of the conductive rubber is exposed while another part is connected to (in contact with) the covering rubber. Also, the conductive rubber is preferably located in the center of the tread. Although FIG. 1 shows a structure in which one conductive rubber 6 is embedded in the center of the tread, multiple conductive rubbers may be embedded. The width of the conductive rubber in the width direction of the pneumatic tire is, for example, 0.2 to 10 mm, preferably 2 to 4 mm. The conductive rubber having a width of less than 0.2 mm may exhibit a small conductive effect, while the conductive rubber with a width of more than 10 mm has a relatively increased ground contact area in the tread, which may impair ground contact properties, rolling resistance properties, or abrasion resistance. Furthermore, the conductive rubber is preferably provided as a continuous layer in the circumferential direction of the pneumatic tire but may be provided intermittently in the circumferential direction of the pneumatic tire.

The conductive rubber is adjusted to have a volume resistivity lower than the tread rubber, breaker rubber, and sidewall rubber, preferably of less than $1\times10^8$ Ω·cm. The conductive rubber having a volume resistivity of less than $1\times10^8$ Ω·cm can improve the conductivity of the pneumatic tire and provide a static electricity-releasing effect. The conductive rubber more preferably has a volume resistivity of $1\times10^7$ Ω·cm or less, still more preferably $1\times10^6$ Ω·cm or less, particularly preferably $1\times10^{5.5}$ Ω·cm or less. The lower limit of the volume resistivity of the conductive rubber is not particularly limited but is preferably $1\times10^3$ Ω·cm, more preferably $1\times10^4$ Ω·cm.

The conductive rubber is formed from the rubber composition in the aspect 3-1 or 3-2 of the invention.

(Inner Sidewall Layer Rubber)

The inner sidewall layer rubber 14 has a structure in which it is disposed between the carcass 10 and the sidewall rubber 8 while having an area in contact with the cushion rubber 4, and extending at least from the cushion rubber 4 to the position in contact with the clinch rubber 3 or chafer rubber 2, and, for example, the upper end of the inner sidewall layer rubber is electrically connected with the cushion rubber while the lower end thereof is electrically connected with the clinch rubber or chafer rubber. The inner sidewall layer rubber is adjusted to have a volume resistivity of less than $1\times10^8$ Ω·cm. The inner sidewall layer rubber having a volume resistivity of less than $1\times10^8$ Ω·cm can provide the effect of improving the conductivity of the pneumatic tire. The inner sidewall layer rubber is preferably adjusted to have a volume resistivity of $1\times10^7$ Ω·cm or less, more preferably $1\times10^{6.5}$ Ω·cm or less, still more preferably $1\times10^6$ Ω·cm or less, particularly preferably $1\times10^{5.5}$ Ω·cm or less. The use of a rubber composition containing a large amount of a conductive component reduces the electrical resistance but promotes the electrochemical reaction in the area of contact of the pneumatic tire with the rim to accelerate rusting of the rim. In order to avoid this problem, the cushion rubber is preferably adjusted to have a volume resistivity of $1\times10^3$ Ω·cm or more, more preferably $1\times10^4$ Ω·cm or more.

The inner sidewall layer rubber having a thickness of 0.2 mm or more can provide the effect of improving the conductivity of the pneumatic tire to the desired extent and, with a thickness of 1.0 mm or less, it does not greatly deteriorate the rolling resistance of the pneumatic tire. The cushion rubber preferably has a thickness particularly within the range of 0.5 to 1.5 mm. It is sufficient that the inner sidewall layer rubber is disposed between the carcass and the sidewall rubber (for example, disposed adjacent to the outer side of the carcass and the inner side of the sidewall rubber) and has an area in contact with the cushion rubber and the bead rubber. The inner sidewall layer rubber may be partially located between the carcass and the breaker, and provided continuously or discontinuously in the circumferential direction of the pneumatic tire.

With regard to the areas of contact of the inner sidewall layer rubber with the cushion rubber or the bead rubber, the inner sidewall layer rubber preferably has an area in contact with the cushion rubber, extending as a strip with a width of at least 2 mm, more preferably at least 4 mm, in the circumferential direction of the pneumatic tire. The upper limit of the width is not particularly limited but is preferably 10 mm. When the inner sidewall layer rubber is in contact with the cushion rubber under the above conditions, the effect of improving the conductivity of the pneumatic tire can be sufficiently obtained. The inner sidewall layer rubber preferably has an area in contact with the bead rubber, preferably the clinch rubber and/or chafer rubber, with a width of at least 2 mm, more preferably at least 4 mm, along the shape of the carcass. The upper limit of the width is not particularly limited but is preferably 10 mm.

According to the aspect 3-1 or 3-2 of the invention, static electricity can be effectively released through an electrically connected path as shown in FIG. 1. Furthermore, the use of the rubber composition for inner sidewall layer rubbers having the above-described formulation can also improve crack resistance. Thus, the formation of cracks from the ply turn-ups and the formation of cracks on the sidewall surface and the innerliner surface can be prevented.

The inner sidewall layer rubber may have substantially the same formulation as the cushion rubber and may contain the same carbon black or silica as described above.

(Bead Rubber)

According to the aspect 3-1 or 3-2 of the invention, a bead rubber disposed in the area of contact of a bead with a rim flange conceptually encompasses a clinch rubber and a chafer rubber. During running of pneumatic tires, driving force is transmitted from the rim through the bead rubber. At that time, static electricity can easily be generated due to the friction between the rim and the bead rubber. Since the bead rubber has an area in contact with the inner sidewall layer rubber, static electricity can be effectively released outside the pneumatic tire through the inner sidewall layer rubber. In FIG. 1, the clinch rubber 3 and the chafer rubber 2 are electrically connected to the inner sidewall layer rubber 14.

The bead rubber (clinch rubber, chafer rubber) preferably has a volume resistivity of less than $1 \times 10^8$ Ω·cm. The bead rubber having a volume resistivity of less than $1 \times 10^8$ Ω·cm allows the pneumatic tire to have good conductivity. The bead rubber preferably has a volume resistivity of $1 \times 10^7$ Ω·cm or less, more preferably $1 \times 10^{6.5}$ Ω·cm or less, still more preferably $1 \times 10^6$ Ω·cm or less, particularly preferably $1 \times 10^{5.5}$ Ω·cm or less. The lower limit of the volume resistivity of the bead rubber is not particularly limited but is preferably $1 \times 10^3$ Ω·cm, more preferably $1 \times 10^4$ Ω·cm. Since the clinch rubber 3 and the chafer rubber 2 are required to have abrasion resistance, rim chafing resistance, rigidity, and hardness, the electrical resistance of these rubbers can be controlled by the use of the formulation designs for these properties as well as the formulation techniques for the cushion rubber and the conductive rubber. The bead rubber may contain the same carbon black or silica as described above. The bead rubber is preferably formed from a rubber composition having a carbon black dispersion of 90% or more as determined by counting the number of aggregates in accordance with JIS K 6812 "Method for the assessment of the degree of pigment or carbon black dispersion in polyolefin pipes, fittings and compounds".

(Carcass)

According to the aspect 3-1 or 3-2 of the invention, a carcass extending from the tread via the sidewall to the bead is composed of at least one carcass ply including carcass cords arranged therein. The carcass ply has a structure in which parallel carcass cords are embedded in rubber. Examples of fiber materials that can form the carcass cords include rayon, nylon, polyester, and aramid. These may be used alone, or two or more of these may be used in admixture. In view of the environment, rayon which is a material of natural origin may be used. In this case, the rayon content is preferably 90% by mass or more of fiber materials forming the carcass cords.

The volume resistivity of the ply rubber is not particularly limited but may be adjusted as described for the tread rubber, breaker rubber, and sidewall rubber. The ply rubber may also be adjusted to have a volume resistivity of less than $1 \times 10^8$ Ω·cm. Such a ply rubber together with the adjacent inner sidewall layer rubber can improve the conductivity of the pneumatic tire and provide a static electricity-releasing effect. In this case, the ply rubber is preferably adjusted to have a volume resistivity of $1 \times 10^7$ Ω·cm or less, more preferably $1 \times 10^6$ Ω·cm or less, still more preferably $1 \times 10^{5.5}$ Ω·cm or less. The lower limit of the volume resistivity of the ply rubber is not particularly limited but is preferably $1 \times 10^3$ Ω·cm, more preferably $1 \times 10^4$ Ω·cm.

According to the aspect 3-1 or 3-2 of the invention, the ply rubber may have substantially the same formulation as the covering rubber and may contain the same carbon black or silica as described above. To improve the adhesion to the carcass cords, the ply rubber may be provided with conductivity by incorporating carbon black or the like into a basic formulation for conventional ply rubbers.

According to the aspect 3-1 or 3-2 of the invention, the tread rubber, breaker rubber, and sidewall rubber are adjusted to have a volume resistivity of $1 \times 10^8$ Ω·cm or more to maintain the properties of tires such as rolling resistance and durability, and at the same time, the bead rubber and its electrically connected inner sidewall layer rubber, cushion rubber, covering rubber, and conductive rubber are adjusted to have a lower volume resistivity. Thus, the static electricity generated in the pneumatic tire can be effectively released through the electrically connected path formed by these components.

Moreover, since the conductive rubber is formed from the rubber composition in the aspect 3-1 or 3-2 of the invention, rolling resistance can be reduced to a low level, and also the accumulation of static electricity during running of the tire can be prevented. Furthermore, an increase over time in the electrical resistance of the tire can be suppressed so that the accumulation of static electricity during running of the tire can be effectively prevented throughout the life of the tire. In addition, ground contact properties can be improved. The inner sidewall layer rubber and/or cushion rubber may also be formed from the rubber composition in the aspect 3-1 or 3-2 of the invention.

(Rubber Formulations for Covering Rubber, Cushion Rubber, Inner Sidewall Layer Rubber, Bead Rubber, Tread Rubber, Breaker Rubber, and Sidewall Rubber)

The covering rubber, cushion rubber, inner sidewall layer rubber, bead rubber, tread rubber, breaker rubber, and sidewall rubber in the pneumatic tire according to the aspect 3-1 or 3-2 of the invention may be formed from the following rubber compositions, for example.

Examples of the rubber component to be used in the rubber composition for each of them include those listed for the rubber composition in the aspect 3-1 or 3-2 of the invention. The rubber component to be used in the covering rubber, cushion rubber, inner sidewall layer rubber, bead rubber, tread rubber, breaker rubber, or sidewall rubber is preferably a diene rubber, more preferably, for example, natural rubber, styrene-butadiene rubber, polybutadiene rubber, polyisoprene rubber, or epoxidized natural rubber.

The rubber compositions may appropriately contain the below-mentioned compounding agents commonly used in tire rubber formulations.

The rubber compositions may appropriately contain, in addition to the above-described components, compounding agents commonly used in preparation of rubber compositions. Examples of the compounding agents include reinforcing fillers such as clay and talc; zinc oxide; stearic acid; processing aids; various types of antioxidants; wax; oil; vulcanizing agents such as sulfur and sulfur-containing compounds; and vulcanization accelerators.

<The Aspects 4-1 and 4-2 of the Invention>

The aspect 4-1 of the invention relates to a rubber composition containing: a rubber component; one or more types of carbon black; and silica, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, the silica having a nitrogen adsorption specific surface area of 40 to 400 m²/g, the rubber composition containing the silica in an amount of 1 to 120 parts by mass relative to 100 parts by mass of the rubber component, $$BMCI=48,640/(T+273)+473.7D-456.8.$$

The aspect 4-2 of the invention relates to a rubber composition containing: a rubber component; one or more types of carbon black; and silica, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more, the silica having a nitrogen adsorption specific surface area of 40 to 400 m²/g, the rubber composition containing the silica in an amount of 1 to 120 parts by mass relative to 100 parts by mass of the rubber component.

According to the aspect 4-1 or 4-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated together with a rubber component and silica into a rubber composition. This allows the rubber composition to have improved abrasion resistance while maintaining or improving good low heat build-up properties. Thus, abrasion resistance and low heat build-up properties can be simultaneously achieved to a high extent.

Examples of the rubber component in the aspect 4-1 or 4-2 of the invention include diene rubbers such as isoprene-based rubbers, polybutadiene rubber (BR), styrene butadiene rubber (SBR), and styrene isoprene butadiene rubber (SIBR), and modified rubbers thereof, and ethylene-propylene copolymers, and ethylene-octene copolymers.

Examples of the modified rubbers include modified polyisoprene rubber, modified BR, and modified SBR, each having at least one chain-end modified with a modifier containing a functional group that interacts with silica, preferably a functional group containing at least one atom selected from nitrogen, oxygen, and silicon. Modified rubbers containing such a functional group at both chain-ends or within the main chain may also be used.

Examples of the functional group include amino, amide, alkoxysilyl, isocyanate, imino, imidazole, urea, ether, carbonyl, carboxyl, hydroxyl, nitrile, and pyridyl groups.

The rubber component may be a single material or a combination of two or more materials. In order to better achieve the effects of the aspect 4-1 or 4-2 of the invention, preferably BR or SBR, more preferably a combination of BR and SBR, as the rubber component is used together with carbon black (1) and a specific amount of a specific silica.

Examples of the isoprene-based rubber include polyisoprene rubber (IR), natural rubber (NR), and epoxidized natural rubber (ENR). Examples of the NR include those commonly used in the tire industry such as SIR20, RSS#3, and TSR20. The IR is not particularly limited, and those commonly used in the tire industry can be used.

The BR is not particularly limited. Examples include high-cis BR such as BR1220 available from Zeon Corporation and BR130B and BR150B both available from Ube Industries, Ltd. and syndiotactic polybutadiene crystal-containing BR such as VCR412 and VCR617 both available from Ube Industries, Ltd. In particular, for good abrasion resistance, BR preferably has a cis content of 90% by mass or more, more preferably 95% by mass or more. In the aspect 4-1 or 4-2 of the invention, the cis content is determined by infrared absorption spectrometry.

In the case where the rubber composition according to the aspect 4-1 or 4-2 of the invention contains BR, the amount of BR based on 100% by mass of the rubber component is preferably 5% by mass or more, more preferably 10% by mass or more, still more preferably 15% by mass or more. If the amount is less than 5% by mass, sufficient abrasion resistance may not be ensured. The amount is preferably 50% by mass or less, more preferably 40% by mass or less, still more preferably 30% by mass or less. If the amount is more than 50% by mass, sufficient processability may not be obtained.

Any SBR may be used, including, for example, emulsion-polymerized styrene butadiene rubber (E-SBR) and solution-polymerized styrene butadiene rubber (S-SBR). S-SBR is preferred in order to more suitably achieve the effects of the aspect 4-1 or 4-2 of the invention and also to provide good wet grip performance.

The SBR preferably has a vinyl content of 20% by mass or more, more preferably 25% by mass or more, still more preferably 30% by mass or more. With SBR having a vinyl content of less than 20% by mass, the effects of the aspect 4-1 or 4-2 of the invention may not be suitably achieved. The vinyl content is preferably 90% by mass or less, more preferably 80% by mass or less, still more preferably 70% by mass or less. With SBR having a vinyl content of more than 90% by mass, abrasion resistance tends to deteriorate. The vinyl content of SBR can be measured by infrared absorption spectrometry.

The SBR preferably has a styrene content of 5% by mass or more, more preferably 10% by mass or more, still more preferably 15% by mass or more. With SBR having a styrene content of less than 5% by mass, the effects of the aspect 4-1 or 4-2 of the invention tend not to be suitably achieved. The styrene content is also preferably 60% by mass or less, more preferably 50% by mass or less, still more preferably 45% by mass or less. With SBR having a styrene content of more than 60% by mass, low heat build-up properties tend to decrease. In the aspect 4-1 or 4-2 of the invention, the styrene content of SBR is determined by $^1$H-NMR analysis.

In the case where the rubber composition according to the aspect 4-1 or 4-2 of the invention contains SBR, the amount of SBR based on 100% by mass of the rubber component is preferably 50% by mass or more, more preferably 60% by mass or more, still more preferably 70% by mass or more. If the amount is less than 50% by mass, sufficient wet grip performance may not be ensured. The amount is also preferably 95% by mass or less, more preferably 90% by mass or less, still more preferably 85% by mass or less. If the amount is more than 95% by mass, abrasion resistance may not be sufficiently obtained.

The carbon black (1) described above is used in the aspect 4-1 or 4-2 of the invention. The rubber composition can simultaneously achieve abrasion resistance and low heat build-up properties when it contains carbon black (1) together with a specific amount of a specific silica.

In the aspect 4-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 4-1 or 4-2 of the invention (particularly the effect of improving abrasion resistance) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or abrasion resistance.

In the aspect 4-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 4-1 or 4-2 of the invention (particularly the effect of improving low heat build-up properties) are insufficient. The upper limit of the ΔD50/

Dmod ratio is not particularly limited but is preferably 2.5 or less, more preferably 2.0 or less. If it is more than 2.5, abrasion resistance may deteriorate, with the result that the desired effects may not be obtained.

In the aspect 4-1 or 4-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 m$^2$/g, more preferably 80 to 145 m$^2$/g, still more preferably 100 to 140 m$^2$/g, particularly preferably 105 to 135 m$^2$/g. When the CTAB falls within the range indicated above, the effects of the aspect 4-1 or 4-2 of the invention can be more suitably achieved.

In the aspect 4-1 or 4-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving abrasion resistance can be more suitably achieved and the effects of the aspect 4-1 or 4-2 of the invention can be more suitably achieved.

In the aspect 4-1 or 4-2 of the invention, the iodine adsorption (IA) of carbon black is determined in accordance with JIS K 6217-1:2008.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 4-1 or 4-2 of the invention can be more suitably achieved.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 4-1 or 4-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 4-1 or 4-2 of the invention can be more suitably achieved.

In the aspect 4-1 or 4-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and abrasion resistance of the rubber composition can be more suitably improved, and the effects of the aspect 4-1 or 4-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 4-1 or 4-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 4-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 4-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 4-1 or 4-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) is preferably 1 part by mass or more, more preferably 5 parts by mass or more, still more preferably 10 parts by mass or more, particularly preferably 20 parts by mass or more. If the amount is less than 1 part by mass, the effects of the aspect 4-1 or 4-2 of the invention tend not to be sufficiently obtained. The amount of the carbon black is also preferably 250 parts by mass or less, more preferably 150 parts by mass or less, still more preferably 100 parts by mass or less, particularly preferably 70 parts by mass or less, most preferably 40 parts by mass or less. If the amount is more than 250 parts by mass, the resulting rubber composition tends to be too hard, adversely leading to reduced abrasion resistance. Moreover, the processability of the rubber composition tends to drastically decrease. Furthermore, the low heat build-up properties tend to deteriorate.

According to the aspect 4-1 or 4-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

In the case of the rubber composition according to the aspect 4-1 or 4-2 of the invention being used as a rubber composition for treads, carbon black (2) preferably has a nitrogen adsorption specific surface area ($N_2SA$) of 80 $m^2/g$ or more, more preferably 90 $m^2/g$ or more, still more preferably 100 $m^2/g$ or more. Carbon black (2) having a $N_2SA$ of less than 80 $m^2/g$ tends to provide reduced reinforcing properties, resulting in insufficient abrasion resistance. Carbon black (2) also preferably has a $N_2SA$ of 200 $m^2/g$ or less, more preferably 190 $m^2/g$ or less, still more preferably 180 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties or abrasion resistance.

The $N_2SA$ of carbon black in the aspect 4-1 or 4-2 of the invention is determined in accordance with JIS K 6217-2: 2001.

In the case of the rubber composition according to the aspect 4-1 or 4-2 of the invention being used as a rubber composition for treads, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient abrasion resistance. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 4-1 or 4-2 of the invention is determined in accordance with JIS K 6217-4: 2001.

The total amount of carbon black relative to 100 parts by mass of the rubber component is preferably 1 part by mass or more, more preferably 5 parts by mass or more, still more preferably 10 parts by mass or more, particularly preferably 20 parts by mass or more. If the total amount of carbon black is less than 1 part by mass, sufficient reinforcing properties may not be obtained. The total amount of carbon black is also preferably 250 parts by mass or less, more preferably 200 parts by mass or less, still more preferably 150 parts by mass or less, particularly preferably 100 parts by mass or less, most preferably 50 parts by mass or less. If the total amount is more than 250 parts by mass, processability may decrease and low heat build-up properties, abrasion resistance, or durability may also decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 4-1 or 4-2 of the invention may not be sufficiently obtained, and it may be difficult to simultaneously achieve abrasion resistance and low heat build-up properties. Although the amount of carbon black (1) may be 100% by mass, it is preferably 80% by mass or less when any other carbon black is used in combination.

Silica is used in the aspect 4-1 or 4-2 of the invention. The incorporation of silica together with carbon black (1) can synergistically improve abrasion resistance and the balance of abrasion resistance and low heat build-up properties. Any silica may be used, including, for example, dry silica (anhydrous silica) and wet silica (hydrous silica). Wet silica is preferred because it contains a large number of silanol groups.

The silica has a nitrogen adsorption specific surface area ($N_2SA$) of 40 $m^2/g$ or more, preferably 55 $m^2/g$ or more, more preferably 60 $m^2/g$ or more, still more preferably 100 $m^2/g$ or more. With silica having a $N_2SA$ of less than 40 $m^2/g$, abrasion resistance may deteriorate. The silica also has a $N_2SA$ of 400 $m^2/g$ or less, preferably 300 $m^2/g$ or less, more preferably 270 $m^2/g$ or less, still more preferably 200 $m^2/g$ or less. Silica having a $N_2SA$ of more than 400 $m^2/g$ is less likely to disperse, and may also deteriorate rolling resistance.

The nitrogen adsorption specific surface area of silica is determined by the BET method set forth in ASTM D3037-81.

The amount of silica relative to 100 parts by mass of the rubber component is 1 part by mass or more, preferably 10 parts by mass or more, more preferably 30 parts by mass or more, still more preferably 40 parts by mass or more. If the amount is less than 1 part by mass, the effects produced by the incorporation of silica tend not to be sufficiently obtained, and abrasion resistance tends to decrease. The amount of silica is 120 parts by mass or less, preferably 100 parts by mass or less, more preferably 90 parts by mass or less. If the amount is more than 120 parts by mass, the silica is less likely to disperse, with the result that low heat build-up properties, processability, and abrasion resistance tend to deteriorate.

According to the aspect 4-1 or 4-2 of the invention, a filler other than silica and carbon black may be used. Examples of the filler other than silica and carbon black include white fillers such as calcium carbonate, mica, e.g. sericite, aluminum hydroxide, magnesium oxide, magnesium hydroxide, clay, talc, alumina, and titanium oxide. Each of these may be used alone, or two or more of these may be used in combination.

The combined amount of all fillers including silica and carbon black (preferably the combined amount of silica and carbon black) relative to 100 parts by mass of the rubber component is preferably 5 parts by mass or more, more preferably 15 parts by mass or more, still more preferably 20 parts by mass or more. The combined amount is also preferably 300 parts by mass or less, more preferably 200 parts by mass or less, still more preferably 120 parts by mass or less, particularly preferably 100 parts by mass or less, most preferably 80 parts by mass or less. When the combined amount falls within the range indicated above, the effects of the aspect 4-1 or 4-2 of the invention can be better achieved.

The total amount of carbon black based on 100% by mass of all fillers including silica and carbon black is preferably 10% by mass or more, more preferably 20% by mass or more, still more preferably 25% by mass or more. The total amount is also preferably 60% by mass or less, more preferably 50% by mass or less, still more preferably 40% by mass or less. When the total amount of carbon black falls within the range indicated above, the effects of the aspect 4-1 or 4-2 of the invention can be better achieved.

The amount of silica based on 100% by mass of all fillers including silica and carbon black is preferably 40% by mass or more, more preferably 50% by mass or more, still more preferably 60% by mass or more. If the amount of silica is less than 40% by mass and the other filler used is carbon black, wet grip performance tends to deteriorate. Moreover, with filler other than carbon black, abrasion resistance may deteriorate. The amount of silica is also preferably 90% by mass or less, more preferably 80% by mass or less, still more preferably 75% by mass or less.

According to the aspect 4-1 or 4-2 of the invention, a silane coupling agent is preferably used together with silica. The silane coupling agent may be a conventionally known one. Examples include: sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. Each of these silane coupling agents may be used alone, or two or more of these may be used in combination. In view of the reinforcing effect of silane coupling agents, processability, and cost, sulfide silane coupling agents are preferred, with bis(3-triethoxysilylpropyl)tetrasulfide being more preferred.

The amount of the silane coupling agent relative to 100 parts by mass of silica is preferably 3 parts by mass or more, more preferably 5 parts by mass or more. An amount of less than 3 parts by mass tends not to provide a sufficient coupling effect and also tends not to allow for high dispersion of silica. As a result, fuel economy or tensile strength may decrease. The amount of the silane coupling agent is also preferably 15 parts by mass or less, more preferably 10 parts by mass or less. If the amount is more than 15 parts by mass, excess silane coupling agents may be left in the resulting rubber composition, leading to reduction in the processability and breaking properties of the rubber composition.

The rubber composition according to the aspect 4-1 or 4-2 of the invention preferably contains oil. The incorporation of oil together with carbon black (1) and a specific amount of a specific silica allows the effects of the aspect 4-1 or 4-2 of the invention to be better achieved.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ.

When the rubber composition contains oil, the amount of oil relative to 100 parts by mass of the rubber component is preferably 5 parts by mass or more, more preferably 10 parts by mass or more, still more preferably 15 parts by mass or more. If the amount is less than 5 parts by mass, the effect of softening rubber (softening effect) may be so small that the effect of lowering the E* may be reduced. The amount of oil is also preferably 50 parts by mass or less, more preferably 40 parts by mass or less. If the amount is more than 50 parts by mass, although the softening effect is sufficient, reinforcing properties may greatly decrease, resulting in reduced abrasion resistance or durability (breaking properties). The amount of oil includes the amount of oil contained in rubber (oil extended rubber).

The rubber composition according to the aspect 4-1 or 4-2 of the invention may appropriately contain, in addition to the above-described components, compounding agents commonly used in preparation of rubber compositions. Examples of the compounding agents include vulcanizing agents such as sulfur; vulcanization accelerators; vulcanization activators such as zinc oxide or stearic acid; organic peroxides; processing aids such as extender oil or lubricants; and antioxidants.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to better achieve the effects of the aspect 4-1 or 4-2 of the invention, sulfenamide vulcanization accelerators and/or guanidine vulcanization accelerators are preferred among these, with N-t-butyl-2-benzothiazolesulfenamide and/or diphenylguanidine being more preferred. The amount of the vulcanization accelerator is preferably 0.1 to 5 parts by mass, more preferably 0.2 to 4 parts by mass, relative to 100 parts by mass of the rubber component.

The rubber composition according to the aspect 4-1 or 4-2 of the invention can be prepared by usual methods. Specifically, it may be prepared by kneading the components using a Banbury mixer, a kneader, an open roll mill, or other kneading machines and vulcanizing the kneadate.

With regard to the kneading conditions when additives other than the vulcanizing agent and the vulcanization accelerator are added, the kneading temperature is usually 50° C. to 200° C., preferably 80° C. to 190° C., and the kneading time is usually 30 seconds to 30 minutes, preferably 1 minute to 30 minutes.

When the vulcanizing agent and the vulcanization accelerator are added, the kneading temperature is usually not higher than 100° C., and preferably ranges from room temperature to 80° C. The composition with the vulcanizing agent and the vulcanization accelerator added therein is usually subjected to press vulcanization or other vulcanization treatments before use. The vulcanization temperature is usually 120° C. to 200° C., preferably 140° C. to 180° C.

The rubber composition according to the aspect 4-1 or 4-2 of the invention (after vulcanization) preferably has a tan δ peak temperature (Tg) of −160° C. or higher, more preferably −15° C. or higher. With a Tg of lower than −16° C., grip performance may deteriorate. The upper limit of the tan δ peak temperature (Tg) of the rubber composition according to the aspect 4-1 or 4-2 of the invention (after vulcanization) is not particularly limited but is preferably lower than −8°

C., more preferably lower than −10° C. With a Tg of −8° C. or higher, fuel economy and abrasion resistance may deteriorate.

The tan δ peak temperature (Tg) is measured by the method described in Examples below.

The tan δ peak temperature (Tg) of the rubber composition can be adjusted to −16° C. or higher by controlling the compounding ratio of the rubber composition. The tan δ peak temperature (Tg) of the rubber composition can be increased, for example, by (1) increasing the amount of SBR with a high styrene content or (2) reducing the amount of BR.

The rubber composition according to the aspect 4-1 or 4-2 of the invention can be used in various tire components as a rubber composition for tires, and suitable especially as a rubber composition for treads.

The pneumatic tire in the aspect 4-1 or 4-2 of the invention can be produced from the rubber composition by usual methods.

Specifically, a rubber composition containing the above components, before vulcanization, is extruded and processed into the shape of a tire component such as a tread and then assembled with other tire components on a tire building machine by a usual method to build an unvulcanized tire. The unvulcanized tire is heated and pressurized in a vulcanizer to produce a tire.

The pneumatic tire in the aspect 4-1 or 4-2 of the invention can be suitably used for passenger vehicles, trucks and buses, or two-wheeled vehicles, or as high performance tires or other tires, especially suitably as high performance tires. The pneumatic tire obtained according to the aspect 4-1 or 4-2 of the invention has excellent grip performance on dry roads.

High performance tires in the aspect 4-1 or 4-2 of the invention are excellent especially in grip performance on dry roads and conceptually encompass racing tires used for racing vehicles.

<The Aspects 5-1 and 5-2 of the Invention>

The aspect 5-1 of the invention relates to a pneumatic tire including an innerliner formed from a rubber composition, the rubber composition containing a rubber component, and one or more types of carbon black, the rubber component including 60% to 100% by mass of a halogenated butyl rubber based on 100% by mass of the rubber component, the rubber composition containing the one or more types of carbon black in a total amount of 5 to 80 parts by mass relative to 100 parts by mass of the rubber component, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 5-2 of the invention relates to a pneumatic tire including an innerliner formed from a rubber composition, the rubber composition containing a rubber component, and one or more types of carbon black, the rubber component including 60% to 100% by mass of a halogenated butyl rubber based on 100% by mass of the rubber component, the rubber composition containing the one or more types of carbon black in a total amount of 5 to 80 parts by mass relative to 100 parts by mass of the rubber component, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 5-1 or 5-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated together with a halogenated butyl rubber into a rubber composition. This allows the rubber composition to maintain or improve good air permeation resistance and good low heat build-up properties. Thus, air-permeation resistance and low heat build-up properties can be simultaneously achieved to a high extent.

The rubber component of the rubber composition in the aspect 5-1 or 5-2 of the invention includes a halogenated butyl rubber (X-IIR). The incorporation of carbon black (1) into a rubber formulation including a halogenated butyl rubber allows the effects of the aspect 5-1 or 5-2 of the invention to be well achieved.

It should be noted that the halogenated butyl rubber in the aspect 5-1 or 5-2 of the invention refers to a halogenated butyl rubber, excluding those contained in reclaimed butyl-based rubbers.

Examples of the halogenated butyl rubber include brominated butyl rubber (Br-IIR) and chlorinated butyl rubber (Cl-IIR). Each of these halogenated butyl rubbers may be used alone, or two or more of these may be used in combination. Preferred among these is chlorinated butyl rubber because, when it is used in combination with natural rubber (NR), such a system is excellent in cure rate and scorch resistance, and thus the effects of the aspect 5-1 or 5-2 of the invention can be better achieved.

The amount of the halogenated butyl rubber based on 100% by mass of the rubber component is 60% by mass or more. If the amount is less than 60% by mass, sufficient air permeation resistance or cure rate may not be ensured. The amount may be 100% by mass but is preferably 96% by mass or less, more preferably 90% by mass or less, still more preferably 80% by mass or less. When the amount is 96% by mass or less, building tack and low heat build-up properties tend to be further improved.

The rubber component of the rubber composition in the aspect 5-1 or 5-2 of the invention preferably includes butyl rubber other than the halogenated butyl rubber (hereinafter, also referred to as a second butyl rubber). The incorporation of carbon black (1) into a rubber formulation including a second butyl rubber in addition to the halogenated butyl rubber allows the effects of the aspect 5-1 or 5-2 of the invention to be better achieved.

Examples of the second butyl rubber include non-halogenated butyl rubber (hereinafter, also referred to as regular butyl rubber) and reclaimed butyl-based rubbers. In order to better achieve the effects of the aspect 5-1 or 5-2 of the invention, reclaimed butyl-based rubbers are preferred among these.

Any regular butyl rubber may be used, including those commonly used in the rubber industry.

Reclaimed butyl-based rubbers refer to crushed rubber products with a high butyl rubber content, such as tire tubes or bladders used in the production of tires, or those obtained by devulcanization of the crushed rubber products, in which the crosslinking bonds in the rubber component are cleaved to allow for revulcanization. In general, a reclaimed butyl-based rubber contains about 50% by mass of butyl rubber.

The reclaimed butyl-based rubber contains a sulfur component which has been deactivated to an extent not affecting the crosslinking. The reclaimed butyl-based rubber may partially contain a halogenated butyl rubber. In this case, the halogen has been deactivated to an extent having no influence in the aspect 5-1 or 5-2 of the invention.

Examples of commercial reclaimed butyl-based rubbers include tube reclaimed rubbers available from Muraoka Rubber Reclaiming Co., Ltd. and bladder reclaimed rubbers available from Car Quest. Tube reclaimed rubbers available from Muraoka Rubber Reclaiming Co., Ltd. are produced by heating butyl tubes under pressure. Bladder reclaimed rubbers available from Car Quest are produced by crushing bladders in an extruder. Each of these reclaimed butyl-based rubbers may be used alone, or two or more of these may be used in combination.

In the case where the rubber composition in the aspect 5-1 or 5-2 of the invention contains a second butyl rubber, the amount of the second butyl rubber based on 100% by mass of the rubber component is preferably 5% by mass or more, more preferably 8% by mass or more. The amount is also preferably 30% by mass or less, more preferably 25% by mass or less. If the amount is more than 30% by mass, sufficient air permeation resistance or elongation at break tends not to be ensured. When a reclaimed butyl-based rubber is contained as a second butyl-based rubber, the above amount includes only the butyl rubber component.

The combined amount of the halogenated butyl rubber and second butyl rubber, based on 100% by mass of the rubber component, is preferably 70% by mass or more, more preferably 75% by mass or more, still more preferably 80% by mass or more. If the combined amount is less than 70% by mass, sufficient air permeation resistance tends not to be obtained. The upper limit of the combined amount is not limited and may be 100% by mass, but is preferably 96% by mass or less, more preferably 95% by mass or less, still more preferably 90% by mass or less. When the combined amount is 96% by mass or less, building tack and low heat build-up properties tend to be further improved.

The rubber component of the rubber composition in the aspect 5-1 or 5-2 of the invention preferably includes rubber other than the halogenated butyl rubber and butyl rubber (hereinafter, also referred to as a second rubber).

Examples of the second rubber include natural rubber (NR), polyisoprene rubber (IR), styrene butadiene rubber (SBR), polybutadiene rubber (BR), chloroprene rubber (CR), styrene-isoprene-butadiene copolymer rubber (SIBR), and styrene-isobutylene-styrene block copolymers (SIBS). Each of these may be used alone, or two or more of these may be used in combination. In view of adhesion, NR or IR is preferred, with NR being more preferred. Also in view of air permeation resistance, ENR or SIBS is preferred.

Any NR may be used, including those commonly used in the tire industry, such as SIR20, RSS#3, or TSR20. Any IR may be used, including those commonly used in the tire industry.

In the case where the rubber composition in the aspect 5-1 or 5-2 of the invention contains a second rubber, the amount of the second rubber (particularly NR) based on 100% by mass of the rubber component is preferably 4% by mass or more, more preferably 5% by mass or more, still more preferably 10% by mass or more, particularly preferably 15% by mass or more. If the amount is less than 4% by mass, adhesion, sheet processability, air permeation resistance, or low heat build-up properties tend to be poor. The amount is also preferably 30% by mass or less, more preferably 25% by mass or less, still more preferably 20% by mass or less.

If the amount is more than 30% by mass, the amount of the halogenated butyl rubber or second butyl rubber is reduced so that air permeation resistance may not be sufficiently ensured.

The carbon black (1) described above is used in the aspect 5-1 or 5-2 of the invention. Air permeation resistance and low heat build-up properties can be simultaneously achieved by incorporating carbon black (1) with the halogenated butyl rubber.

In the aspect 5-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 5-1 or 5-2 of the invention (particularly the effect of improving air permeation resistance) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or air permeation resistance.

In the aspect 5-2 of the invention, the aggregate properties of carbon black (1) include a ratio ($\Delta D50/Dmod$) of the half width ($\Delta D50$) of the distribution curve to the Dmod of 0.78 or more, preferably 0.90 or more, more preferably 1.0 or more, still more preferably 1.1 or more. If the ratio is less than 0.78, the effects of the aspect 5-1 or 5-2 of the invention (particularly the effect of improving low heat build-up properties) are insufficient. The upper limit of the $\Delta D50/Dmod$ ratio is not particularly limited but is preferably 2.5 or less, more preferably 2.0 or less. If it is more than 2.5, air permeation resistance may deteriorate, with the result that the desired effects may not be obtained.

In the aspect 5-1 or 5-2 of the invention, the Dmod and the $\Delta D50$ of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width ($\Delta D50$)) of the distribution curve).

Carbon black (1) preferably has a cetyltrimethylammonium bromide adsorption specific surface area (CTAB) of 60 to 150 m$^2$/g, more preferably 80 to 145 m$^2$/g, still more preferably 100 to 140 m$^2$/g, particularly preferably 105 to 135 m$^2$/g. When the CTAB falls within the range indicated above, the effects of the aspect 5-1 or 5-2 of the invention can be more suitably achieved.

In the aspect 5-1 or 5-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving air permeation resistance can be more suitably achieved and the effects of the aspect 5-1 or 5-2 of the invention can be more suitably achieved.

In the aspect 5-1 or 5-2 of the invention, the iodine adsorption (IA) of carbon black is determined in accordance with JIS K 6217-1:2008.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 5-1 or 5-2 of the invention can be more suitably achieved.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 5-1 or 5-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 5-1 or 5-2 of the invention can be more suitably achieved.

In the aspect 5-1 or 5-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and air permeation resistance of the rubber composition can be more suitably improved, and the effects of the aspect 5-1 or 5-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 5-1 or 5-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 5-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 5-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 5-1 or 5-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) relative to 100 parts by mass of the rubber component is preferably 1 part by mass or more, more preferably 5 parts by mass or more, still more preferably 10 parts by mass or more, particularly preferably 15 parts by mass or more. If the amount is less than 1 part by mass, the effects of the aspect 5-1 or 5-2 of the invention tend not to be sufficiently obtained. The amount of the carbon black is also preferably 80 parts by mass or less, more preferably 60 parts by mass or less, still more preferably 40 parts by mass or less. If the amount is more than 80 parts by mass, low heat build-up properties tend not to be ensured. Moreover, the processability of the rubber composition tends to drastically decrease.

According to the aspect 5-1 or 5-2 of the invention, carbon black other than carbon black (1) (hereinafter, also referred to as carbon black (2)) may be incorporated together with carbon black (1). In this case, the effects of the aspect 5-1 or 5-2 of the invention can be better achieved.

Non-limiting examples of carbon black (2) include GPF, FEF, HAF, ISAF, and SAF.

Carbon black (2) preferably has a nitrogen adsorption specific surface area ($N_2SA$) of 10 $m^2/g$ or more, more preferably 20 $m^2/g$ or more, still more preferably 23 $m^2/g$ or more. Carbon black (2) having a $N_2SA$ of less than 10 $m^2/g$ tends to provide reduced reinforcing properties, resulting in insufficient abrasion resistance. Carbon black (2) also preferably has a $N_2SA$ of 200 $m^2/g$ or less, more preferably 100 $m^2/g$ or less, still more preferably 50 $m^2/g$ or less, particularly preferably 35 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties or air permeation resistance.

The $N_2SA$ of carbon black in the aspect 5-1 or 5-2 of the invention is determined in accordance with JIS K 6217-2: 2001.

Carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient abrasion resistance. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 5-1 or 5-2 of the invention is determined in accordance with JIS K 6217-4: 2001.

In the case where the rubber composition in the aspect 5-1 or 5-2 of the invention contains carbon black (2), the amount of carbon black (2) relative to 100 parts by mass of the rubber component is preferably 1 part by mass or more, more preferably 5 parts by mass or more, still more preferably 10 parts by mass or more, particularly preferably 15 parts by mass or more. The amount is also preferably 80 parts by mass or less, more preferably 60 parts by mass or less, still more preferably 40 parts by mass or less.

The total amount of carbon black relative to 100 parts by mass of the rubber component is 5 parts by mass or more, preferably 10 parts by mass or more, more preferably 20 parts by mass or more, still more preferably 30 parts by mass or more. If the total amount is less than 5 parts by mass, sufficient reinforcing properties may not be obtained. Also, the total amount of carbon black is 80 parts by mass or less, preferably 60 parts by mass or less, more preferably 50 parts by mass or less. If the total amount is more than 80 parts by mass, processability may decrease, and low heat build-up properties or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 5-1 or 5-2 of the invention may not be sufficiently obtained, and it may be difficult to simultaneously achieve air permeation resistance and low heat build-up properties. Although the amount of carbon black (1) may be 100% by mass, it is preferably 80% by mass or less, more preferably 60% by mass or less, when any other carbon black is used in combination.

The rubber composition in the aspect 5-1 or 5-2 of the invention preferably contains an organic resin. The incorporation of an organic resin together with carbon black (1) into a rubber formulation including a halogenated butyl rubber allows the effects of the aspect 5-1 or 5-2 of the invention to be better achieved.

Examples of the organic resin include coumarone resin, indene resin, coumarone-indene resin, phenolic resin, terpene resin, petroleum hydrocarbon resin, and rosin derivatives. For good air permeation resistance, suitable are resin mixtures combining at least two resins, including, for example, aromatic hydrocarbon resins such as alkyl phenolic resins and aliphatic hydrocarbon resins such as C5 resins; the aromatic hydrocarbon resins, and the aliphatic hydrocarbon resins. Each of these may be used alone, or two or more of these may be used in combination.

Preferred of these are resin mixtures, aromatic hydrocarbon resins, and aliphatic hydrocarbon resins. More preferred are combinations of resin mixtures of aromatic hydrocarbon resins (particularly polyaromatic hydrocarbon resins) and aliphatic hydrocarbon resins, aromatic hydrocarbon resins (particularly alkylphenol resins), and aliphatic hydrocarbon resins (particularly C5 resins).

Specific examples of resin mixtures include STRUKTOL 40MS available from Struktol, RHENOSIN 145A available from Rhein Chemie Corp., and PROMIX 400 available from Flow Polymers Inc.

In the case where the rubber composition in the aspect 5-1 or 5-2 of the invention contains an organic resin, the total amount of organic resins relative to 100 parts by mass of the rubber component is preferably 5 parts by mass or more, more preferably 7 parts by mass or more, still more preferably 10 parts by mass or more. The total amount is also preferably 30 parts by mass or less, more preferably 25 parts by mass or less, still more preferably 20 parts by mass or less. If the total amount falls within the range indicated above, the effects of the aspect 5-1 or 5-2 of the invention can be better achieved.

The rubber composition in the aspect 5-1 or 5-2 of the invention preferably contains a process oil. In this case, the effects of the aspect 5-1 or 5-2 of the invention can be better achieved.

Process oils usually used in this field may be suitably used. In general, a process oil consists of a paraffinic component, a naphthenic component, and an aromatic component. Specific examples of process oils include Diana Process PA32 (paraffinic component: 67% by mass, naphthenic component: 28% by mass, aromatic component: 5% by mass), AC-12, AC-460, AH-24, and AH-58 all available from Idemitsu Kosan Co., Ltd., and Vivatec40 (treated distillate aromatic extracts (TDAE) oil, paraffinic component: 49% by mass, naphthenic component: 27% by mass, aromatic component: 23% by mass) available from H&R. Each of these may be used alone, or two or more of these may be used in combination.

The process oil preferably contains an aromatic component in an amount of 15% by mass or less, more preferably 12% by mass or less, still more preferably 10% by mass or less. The process oil containing more than 15% by mass of an aromatic component tends to be poorly compatible with the halogenated butyl rubber and bleed to the rubber sheet surface, resulting in reduced building tack, low heat build-up properties, or air permeation resistance.

In the case where the rubber composition in the aspect 5-1 or 5-2 of the invention contains a process oil, the amount of the process oil relative to 100 parts by mass of the rubber component is preferably 1 part by mass or more. The amount is also preferably 7 parts by mass or less, more preferably 5 parts by mass or less, still more preferably 3 parts by mass or less. If the amount is more than 7 parts by mass, air permeation resistance tends to deteriorate.

The rubber composition in the aspect 5-1 or 5-2 of the invention may appropriately contain, in addition to the above-described components, compounding agents commonly used in preparation of rubber compositions. Examples of the compounding agents include reinforcing fillers such as silica, clay, and talc; silane coupling agents; zinc oxide; stearic acid; processing aids; various types of antioxidants; wax; vulcanizing agents such as sulfur and sulfur-containing compounds; and vulcanization accelerators.

The rubber composition in the aspect 5-1 or 5-2 of the invention can be prepared by usual methods. Specifically, it may be prepared by kneading the components using a Banbury mixer, a kneader, an open roll mill, or other kneading machines and vulcanizing the kneadate.

The rubber composition in the aspect 5-1 or 5-2 of the invention is used in tire innerliners.

The pneumatic tire according to the aspect 5-1 or 5-2 of the invention can be produced from the rubber composition by usual methods.

Specifically, a rubber composition containing the above components, before vulcanization, is extruded and processed into the shape of an innerliner and then assembled with other tire components on a tire building machine by a usual method to build an unvulcanized tire. The unvulcanized tire is heated and pressurized in a vulcanizer to produce a tire.

The pneumatic tire according to the aspect 5-1 or 5-2 of the invention can be suitably used for passenger vehicles, trucks and buses, or two-wheeled vehicles, or as high performance tires or other tires, and especially for passenger vehicles.

High performance tires in the aspect 5-1 or 5-2 of the invention are excellent especially in grip performance on dry roads and conceptually encompass racing tires used for racing vehicles.

<The Aspects 6-1 and 6-2 of the Invention>

The aspect 6-1 of the invention relates to a rubber composition containing: a rubber component; one or more resins; and one or more types of carbon black, at least one of the one or more resins having a softening point within a range from −20° C. to 45° C., at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8'.$$

The aspect 6-2 of the invention relates to a rubber composition containing: a rubber component; one or more resins; and one or more types of carbon black, at least one of the one or more resins having a softening point within a range from −20° C. to 45° C., at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 6-1 or 6-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition. This allows the rubber composition to have improved abrasion resistance while maintaining or improving good low heat build-up properties. Thus, abrasion resistance and low heat build-up properties can be simultaneously achieved to a high extent. Furthermore, in the aspect 6-1 or 6-2 of the invention, a resin having a softening point of −20° C. to 45° C. is incorporated in addition to the specific carbon black to synergistically improve abrasion resistance and low heat build-up properties. Thus, abrasion resistance and low heat build-up properties can be significantly improved.

Examples of materials which can be included in the rubber component in the aspect 6-1 or 6-2 of the invention include diene rubbers such as natural rubber (NR), polyisoprene rubber (IR), polybutadiene rubber (BR), styrene butadiene rubber (SBR), and styrene isoprene butadiene rubber (SIBR). The rubber component may be a single material or a combination of two or more materials. For a balanced improvement in abrasion resistance and low heat build-up properties in the use for tires, SBR and BR are preferred among these, with a combination of SBR and BR being more preferred.

Any SBR may be used, including those commonly used in the tire industry, such as emulsion-polymerized styrene butadiene rubber (E-SBR) and solution-polymerized styrene butadiene rubber (S-SBR).

The amount of SBR based on 100% by mass of the rubber component is preferably 60% by mass or more, more preferably 70% by mass or more. With less than 60% by mass of SBR, sufficient heat build-up properties may not be obtained. The amount of SBR is preferably 90% by mass or less, more preferably 85% by mass or less. With more than 90% by mass of SBR, the amount of BR may be reduced so that sufficient abrasion resistance may not be obtained.

The BR is not particularly limited. Examples include high-cis BR such as BR1220 available from Zeon Corporation and BR130B and BR150B both available from Ube Industries, Ltd. and syndiotactic polybutadiene crystal-containing BR such as VCR412 and VCR617 both available from Ube Industries, Ltd. In particular, for good abrasion resistance, the BR preferably has a cis content of 90% by mass or more.

The amount of BR based on 100% by mass of the rubber component is preferably 10% by mass or more, more preferably 15% by mass or more. If the amount is less than 10% by mass, sufficient abrasion resistance may not be obtained. The amount of BR is preferably 40% by mass or less, more preferably 30% by mass or less. If the amount is more than 40% by mass, the amount of SBR may be reduced so that sufficient low heat build-up properties may not be obtained.

The combined amount of SBR and BR based on 100% by mass of the rubber component is preferably 60% by mass or more, more preferably 80% by mass or more, and may be 100% by mass. When the combined amount of SBR and BR falls within the range indicated above, the effects of the aspect 6-1 or 6-2 of the invention can be more suitably achieved.

The carbon black (1) described above is used in the aspect 6-1 or 6-2 of the invention. Abrasion resistance and low heat build-up properties can be simultaneously achieved by incorporation of carbon black (1).

In the aspect 6-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 6-1 or 6-2 of the invention (particularly the effect of improving abrasion resistance) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or abrasion resistance.

In the aspect 6-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 6-1 or 6-2 of the invention (particularly the effect of improving low heat build-up properties) are insufficient. The upper limit of the ΔD50/Dmod ratio is not particularly limited but is preferably 2.5 or less, more preferably 2.0 or less. If it is more than 2.5, abrasion resistance may deteriorate, with the result that the desired effects may not be obtained.

In the aspect 6-1 or 6-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 m$^2$/g, more preferably 80 to 145 m$^2$/g, still more preferably 100 to 140 m$^2$/g, particularly preferably 105 to 135 m$^2$/g. When the CTAB falls within the range indicated above, the effects of the aspect 6-1 or 6-2 of the invention can be more suitably achieved.

In the aspect 6-1 or 6-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving abrasion resistance can be more suitably achieved and the effects of the aspect 6-1 or 6-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 6-1 or 6-2 of the invention can be more suitably achieved.

In the aspect 6-1 or 6-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 6-1 or 6-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 6-1 or 6-2 of the invention can be more suitably achieved.

In the aspect 6-1 or 6-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and abrasion resistance of the rubber composition can be more suitably improved, and the effects of the aspect 6-1 or 6-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 6-1 or 6-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 6-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 6-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 6-1 or 6-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) is preferably 1 part by mass or more, more preferably 5 parts by mass or more, still more preferably 10 parts by mass or more, particularly preferably 20 parts by mass or more. If the amount is less than 1 part by mass, the effects of the aspect 6-1 or 6-2 of the invention tend not to be sufficiently obtained. The amount of the carbon black is also preferably 250 parts by mass or less, more preferably 200 parts by mass or less, still more preferably 150 parts by mass or less, particularly preferably 100 parts by mass or less, most preferably 60 parts by mass or less, further most preferably 40 parts by mass or less. If the amount is more than 250 parts by mass, the resulting rubber composition tends to be too hard, adversely leading to reduced abrasion resistance. Moreover, the processability of the rubber composition tends to drastically decrease. Furthermore, low heat build-up properties tend to deteriorate.

According to the aspect 6-1 or 6-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

In the case of the rubber composition according to the aspect 6-1 or 6-2 of the invention being used as a rubber composition for treads, carbon black (2) preferably has a nitrogen adsorption specific surface area ($N_2SA$) of 80 $m^2/g$ or more, more preferably 90 $m^2/g$ or more, still more preferably 100 $m^2/g$ or more. Carbon black (2) having a $N_2SA$ of less than 80 $m^2/g$ tends to provide reduced reinforcing properties, resulting in insufficient abrasion resistance. Carbon black (2) also preferably has a $N_2SA$ of 200 $m^2/g$ or less, more preferably 190 $m^2/g$ or less, still more preferably 180 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties or abrasion resistance.

The $N_2SA$ of carbon black in the aspect 6-1 or 6-2 of the invention is determined in accordance with JIS K 6217-2: 2001.

In the case of the rubber composition according to the aspect 6-1 or 6-2 of the invention being used as a rubber composition for treads, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient abrasion resistance. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 6-1 or 6-2 of the invention is determined in accordance with JIS K 6217-4: 2001.

In the case of the rubber composition according to the aspect 6-1 or 6-2 of the invention being used as a rubber composition for sidewalls, carcasses, or clinches, carbon black (2) preferably has a nitrogen adsorption specific surface area ($N_2SA$) of 20 $m^2/g$ or more, more preferably 30 $m^2/g$ or more. Carbon black (2) having a $N_2SA$ of less than 20 $m^2/g$ tends to provide reduced reinforcing properties, resulting in insufficient durability. Carbon black (2) also preferably has a $N_2SA$ of 110 $m^2/g$ or less, more preferably 100 $m^2/g$ or less. The use of carbon black (2) having a $N_2SA$ of more than 110 $m^2/g$ tends to deteriorate low heat build-up properties.

In the case of the rubber composition according to the aspect 6-1 or 6-2 of the invention being used as a rubber composition for sidewalls, carcasses, or clinches, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient durability. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or fatigue resistance.

The total amount of carbon black relative to 100 parts by mass of the rubber component is preferably 1 part by mass or more, more preferably 5 parts by mass or more, still more preferably 10 parts by mass or more, particularly preferably 20 parts by mass or more. If the total amount is less than 1 part by mass, sufficient reinforcing properties may not be obtained. The total amount of carbon black is also preferably 250 parts by mass or less, more preferably 200 parts by mass or less, still more preferably 150 parts by mass or less, particularly preferably 100 parts by mass or less, most preferably 60 parts by mass or less, further most preferably 40 parts by mass or less. If the total amount is more than 250 parts by mass, processability may decrease, and low heat build-up properties, abrasion resistance, or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 6-1 or 6-2 of the invention may not be sufficiently obtained, and it may be difficult to simultaneously achieve abrasion resistance and low heat build-up properties. Although the amount of carbon black (1) may be 100% by mass, it is preferably 80% by mass or less when any other carbon black is used in combination.

In the aspect 6-1 or 6-2 of the invention, silica is preferably incorporated in addition to carbon black (1) and a resin having a softening point of −20° C. to 45° C. This can more significantly improve abrasion resistance and low heat build-up properties.

Any silica may be used, including, for example, dry silica (anhydrous silica) and wet silica (hydrous silica). Wet silica is preferred because it contains a large number of silanol groups.

The silica preferably has a nitrogen adsorption specific surface area ($N_2SA$) of 45 $m^2/g$ or more, more preferably 55 $m^2/g$ or more, still more preferably 60 $m^2/g$ or more, particularly preferably 100 $m^2/g$ or more, most preferably 150 $m^2/g$ or more. If the $N_2SA$ is less than 45 $m^2/g$, abrasion resistance or rubber tensile strength may deteriorate. The silica also preferably has a $N_2SA$ of 350 $m^2/g$ or less, more preferably 300 $m^2/g$ or less, still more preferably 270 $m^2/g$ or less, particularly preferably 220 $m^2/g$ or less. Silica having a $N_2SA$ of more than 350 $m^2/g$ is less likely to disperse, and may also deteriorate low heat build-up properties.

The nitrogen adsorption specific surface area of silica is determined by the BET method set forth in ASTM D3037-81.

In the case where the rubber composition according to the aspect 6-1 or 6-2 of the invention contains silica, the amount of silica relative to 100 parts by mass of the rubber component is preferably 1 part by mass or more, more preferably 10 parts by mass or more, still more preferably 30 parts by mass or more, particularly preferably 45 parts by mass or more. If the amount is less than 1 part by mass, the effects produced by the incorporation of silica tend not to be sufficiently obtained, and low heat build-up properties or abrasion resistance tends to deteriorate. The amount of silica is preferably 200 parts by mass or less, more preferably 150 parts by mass or less, still more preferably 120 parts by mass or less, particularly preferably 100 parts by mass or less, most preferably 70 parts by mass or less. If the amount is more than 200 parts by mass, the silica is less likely to disperse, with the result that processability, low heat build-up properties, and abrasion resistance tend to deteriorate.

The rubber composition according to the aspect 6-1 or 6-2 of the invention preferably contains a silane coupling agent together with silica.

Any silane coupling agent conventionally used in combination with silica in the rubber industry can be used. Examples include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Preferred among these are sulfide silane coupling agents, with bis(3-triethoxysilylpropyl)tetrasulfide being more preferred.

In the case where the rubber composition according to the aspect 6-1 or 6-2 of the invention contains a silane coupling agent, the amount of the silane coupling agent relative to 100 parts by mass of silica is preferably 0.1 parts by mass or more, more preferably 0.5 parts by mass or more. If the amount is less than 0.1 parts by mass, abrasion resistance or low heat build-up properties tend to greatly decrease. The amount of the silane coupling agent is also preferably 15 parts by mass or less, more preferably 10 parts by mass or less. If the amount is more than 15 parts by mass, excess silane coupling agents may be left in the resulting rubber composition, leading to reduction in the processability and abrasion resistance of the rubber composition.

The rubber composition according to the aspect 6-1 or 6-2 of the invention contains a resin having a softening point of −20° C. to 45° C. Examples of the resin include petroleum-based or coal-based resins such as coumarone-indene resin, indene resin, α-methylstyrene resin, vinyltoluene resin, and polyisopentane resin. The resin is preferably at least one selected from the group consisting of coumarone-indene resin, indene resin, and α-methylstyrene resin, more preferably coumarone-indene resin, among others.

A coumarone-indene resin refers to a resin containing coumarone and indene as monomer units forming the backbone (main chain) of the resin. Examples of monomer units other than coumarone and indene that may be contained in the backbone include styrene, α-methylstyrene, methylindene, and vinyltoluene. Indene resin and α-methylstyrene resin contain indene and α-methylstyrene, respectively, as main monomer units forming the back bone (main chain) of the respective resins.

The resin has a softening point of −20° C. or higher, preferably −10° C. or higher, more preferably 0° C. or higher. If the softening point is lower than −20° C., the effect of improving low heat build-up properties may not be sufficiently obtained. The softening point is 45° C. or lower, preferably 40° C. or lower, more preferably 35° C. or lower. If the resin has a softening point of higher than 45° C., the heat build-up of the resin itself tends to increase so that the resulting tire tends to show increased heat build-up (deteriorated low heat build-up properties).

The softening point of the resin such as coumarone-indene resin is measured in conformity with JIS K 6220-1: 2001 with a ring and ball softening point measuring apparatus and defined as the temperature at which the ball drops down.

The amount of the resin having the specific softening point relative to 100 parts by mass of the rubber component is preferably 3 parts by mass or more, more preferably 5 parts by mass or more, still more preferably 8 parts by mass or more. Less than 3 parts by mass of the resin may not sufficiently provide the effect of improving low heat build-up properties. The amount of the resin is preferably 40 parts by mass or less, more preferably 35 parts by mass or less, still more preferably 30 parts by mass or less, particularly preferably 20 parts by mass or less. With more than 40 parts by mass of the resin, the effects of improving low heat build-up properties, rubber tensile strength, or abrasion resistance may not be sufficiently obtained.

In addition to the resin having the specific softening point, the rubber composition according to the aspect 6-1 or 6-2 of the invention may contain a resin other than the resin having the specific softening point. Examples of the other resin include those having softening point that is different from the specific softening point.

The rubber composition according to the aspect 6-1 or 6-2 of the invention may contain oil together with resin having the specific softening point.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ.

Since the resin having a softening point of −20° C. to 45° C. contained in the rubber composition according to the aspect 6-1 or 6-2 of the invention acts to soften the rubber composition, the use of the resin can reduce the amount of oil in the rubber composition. The amount of oil relative to 100 parts by mass of the rubber component is preferably 30 parts by mass or less, more preferably 20 parts by mass or less. In this case, better abrasion resistance can be obtained, and the effects of the aspect 6-1 or 6-2 of the invention can be more suitably achieved.

In order to suitably achieve the effects of the aspect 6-1 or 6-2 of the invention, the combined amount of oil and the resin having a softening point of −20° C. to 45° C., relative to 100 parts by mass of the rubber component, is preferably 5 parts by mass or more, more preferably 10 parts by mass or more, but preferably 70 parts by mass or less, more preferably 60 parts by mass or less, still more preferably 40 parts by mass or less.

The rubber composition according to the aspect 6-1 or 6-2 of the invention may appropriately contain, in addition to the above-described components, compounding agents commonly used in preparation of rubber compositions. Examples of the compounding agents include reinforcing fillers such as clay and talc; zinc oxide; stearic acid; processing aids; various types of antioxidants; wax; vulcanizing agents such as sulfur and sulfur-containing compounds; and vulcanization accelerators.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazole-sulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the aspect 6-1 or 6-2 of the invention, sulfenamide vulcanization accelerators are preferred among these, with N-t-butyl-2-benzothiazolesulfenamide being more preferred. Guanidine vulcanization accelerators may further be used in combination therewith. The amount of the vulcanization accelerator is preferably 0.1 to 7 parts by mass, more preferably 0.5 to 5 parts by mass, relative to 100 parts by mass of the rubber component.

The vulcanizing agent is not particularly limited but may suitably be sulfur. The amount of sulfur relative to 100 parts by mass of the rubber component is preferably 0.5 to 5 parts by mass, more preferably 1 to 3 parts by mass. With such an amount of sulfur, the effects of the aspect 6-1 or 6-2 of the invention can be more suitably achieved.

The rubber composition according to the aspect 6-1 or 6-2 of the invention can be prepared by usual methods. Specifically, it may be prepared by kneading the components using a Banbury mixer, a kneader, an open roll mill, or other kneading machines and vulcanizing the kneadate.

The rubber composition according to the aspect 6-1 or 6-2 of the invention can be used as a rubber composition for tires, and suitable especially as a rubber composition for tires. The rubber composition according to the aspect 6-1 or 6-2 of the invention may be used in various tire components, and suitable especially for, for example, treads, sidewalls, carcasses, or clinches.

The pneumatic tire in the aspect 6-1 or 6-2 of the invention can be produced from the rubber composition by usual methods.

Specifically, a rubber composition containing the above components, before vulcanization, is extruded and processed into the shape of a tire component such as a tread and then assembled with other tire components on a tire building machine by a usual method to build an unvulcanized tire. The unvulcanized tire is heated and pressurized in a vulcanizer to produce a tire.

The pneumatic tire in the aspect 6-1 or 6-2 of the invention can be suitably used for passenger vehicles, trucks and buses, or two-wheeled vehicles, or as high performance tires or other tires, and especially as high performance tires. The pneumatic tire obtained according to the aspect 6-1 or 6-2 of the invention has excellent grip performance on dry roads.

High performance tires in the aspect 6-1 or 6-2 of the invention are excellent especially in grip performance on dry roads and conceptually encompass racing tires used for racing vehicles.

<The Aspects 7-1 and 7-2 of the Invention>

The aspect 7-1 of the invention relates to a rubber composition containing a rubber component, and one or more types of carbon black, the rubber component including a modified natural rubber that is highly purified and adjusted to have a pH of 2 to 7, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 7-2 of the invention relates to a rubber composition containing a rubber component, and one or more types of carbon black, the rubber component including a modified natural rubber that is highly purified and adjusted to have a pH of 2 to 7, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 7-1 or 7-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition. This allows the rubber composition to have improved abrasion resistance while maintaining or improving good low heat build-up properties. Thus, abrasion resistance and low heat build-up properties can be simultaneously achieved to a high extent.

The modified natural rubber is highly purified and further adjusted to have a pH of 2 to 7.

Since the modified natural rubber has been highly purified by removing non-rubber components such as proteins and phospholipids, and the pH of the rubber is controlled to an appropriate value, the modified natural rubber provides improved abrasion resistance and improved low heat build-up properties. Although the degradation of the rubber is accelerated by the removal of non-rubber components or due to the basicity or strong acidity of the rubber, the adjustment of the pH of the rubber within the predetermined range reduces the decrease in the molecular weight during storage so that good heat aging resistance can be obtained. As a result, during kneading, the deterioration of the rubber physical properties can be prevented and the dispersibility of filler can be enhanced, and therefore the above properties are improved. Furthermore, according to the aspect 7-1 or 7-2 of the invention, a specific carbon black is incorporated in addition to the modified natural rubber. This can synergistically improve abrasion resistance and low heat build-up properties. Thus, abrasion resistance and low heat build-up properties can be significantly improved.

The term "highly purified" means removing impurities, excluding a natural polyisoprenoid component, such as phospholipids and proteins. Natural rubber has a structure in which an isoprenoid component is covered with such impurity components. If the impurity components are removed, then the structure of the isoprenoid component is altered so that the interaction with compounding agents is changed to reduce energy loss or enhance durability. It is probably for this reason that a better rubber composition can be obtained.

The modified natural rubber that is highly purified and adjusted to have a pH of 2 to 7 may be any modified natural rubber which has been highly purified by reducing the amounts of non-rubber components and has a pH of 2 to 7. Specific examples include: (1) a modified natural rubber having a pH of 2 to 7 which is obtained by removing non-rubber components from natural rubber and treating the resultant rubber with an acidic compound; (2) a modified natural rubber having a pH of 2 to 7 which is obtained by washing a saponified natural rubber latex and treating the washed latex with an acidic compound; and (3) a modified natural rubber having a pH of 2 to 7 which is obtained by washing a deproteinized natural rubber latex and treating the washed latex with an acidic compound.

The modified natural rubber can be prepared, for example, by washing a saponified natural rubber latex or a deproteinized natural rubber latex with water, such as distilled water, and then treating the washed latex with an acidic compound as described above. It is important to reduce the pH relative to the pH of distilled water used in the water washing, by shifting the pH to the acidic side by the treatment with an acidic compound. Distilled water usually does not have a pH of 7.00 but has a pH of approximately 5 to 6. In the case of such distilled water, it is important to reduce the pH to a more acidic range than pH 5-6 by the treatment with an acidic compound. Specifically, it is preferred to reduce the pH by the treatment with an acidic compound to a pH lower by 0.2-2 than the pH of water used in the water washing.

The modified natural rubber has a pH of 2 to 7, preferably 3 to 6, more preferably 4 to 6. Adjusting the pH within the range indicated above can prevent deterioration of heat aging resistance, thereby significantly improving the above-described properties. The pH of the modified natural rubber is determined by cutting the rubber into pieces at most 2 mm square on each side, immersing the pieces in distilled water, irradiating the immersed pieces with microwaves for extraction at 90° C. for 15 minutes, and measuring the resulting immersion water with a pH meter. Specifically, the pH is determined by the method described later in Examples. With regard to the extraction, one-hour extraction using an ultrasonic washing device or the like cannot completely extract water-soluble components from the inside of rubber and thus cannot reveal the pH of the inside accurately. In contrast, the present inventors have found out that extraction by the above-described technique can elucidate the real nature of rubber.

The modified natural rubber has been highly purified by any of various methods, including the methods (1) to (3). For example, the modified natural rubber preferably has a phosphorus content of 200 ppm or less, more preferably 150 ppm or less. If the phosphorus content is more than 200 ppm, the Mooney viscosity may increase during storage so that processability may deteriorate, or tan δ may increase so that low heat build-up properties cannot be improved. The phosphorus content can be measured by conventional methods, such as ICP emission analysis. The phosphorus is presumably derived from phospholipids in natural rubber.

When the modified natural rubber contains an artificial antioxidant, it preferably has a nitrogen content of 0.15% by mass or less, more preferably 0.1% by mass or less, as determined after it is immersed in acetone at a room temperature (25° C.) for 48 hours. If the nitrogen content is more than 0.15% by mass, the Mooney viscosity may increase during storage so that processability may deteriorate, or the effect of improving low heat build-up properties may be insufficiently produced. Highly purified natural rubber is free of natural antioxidant components that natural rubber is thought to contain by nature, and thus it may deteriorate during long-term storage. For this reason, artificial antioxidants may be added to highly purified natural rubber. The nitrogen content is measured after artificial antioxidants in the rubber are removed by extraction with acetone. The nitrogen content can be measured by conventional methods, such as the Kjeldahl method or use of a trace nitrogen analyzer. The nitrogen is derived from proteins and amino acids.

The modified natural rubber preferably has a viscosity ML (1+4) at 130° C. of 75 or less, more preferably 40 to 75, still more preferably 45 to 75, particularly preferably 50 to 70, most preferably 55 to 65, as measured in accordance with JIS K 6300:2001-1. The modified natural rubber having a Mooney viscosity of 75 or less does not need mastication which is usually necessary before kneading of rubber. Thus, the modified natural rubber prepared without a mastication process can be suitably used as a material to be compounded into rubber compositions. In contrast, the modified natural rubber having a Mooney viscosity of more than 75 needs mastication before use and thus tends to cause problems such as the need of dedicated equipment, or a loss of electricity or thermal energy.

With respect to the Mooney viscosity ML (1+4) at 130° C. mentioned above, the modified natural rubber preferably has a heat aging resistance index defined by the following formula of 75 to 120%.

$$\text{Heat-aging resistance index}(\%) = \frac{\text{Mooney viscosity of the modified natural rubber determined after 18-hour heat treatment at 80° C.}}{\text{Mooney viscosity of the modified natural rubber before the treatment}} \times 100$$

The heat aging resistance index defined by the formula is more preferably 80 to 115%, still more preferably 85 to 110%. Although various methods for evaluating the heat aging resistance of rubber are reported, the heat aging resistance, e.g. during the production or service of tires can be accurately evaluated by the method of evaluating a rate of change in the Mooney viscosity ML (1+4) at 130° C. between before and after heat treatment at 80° C. for 18 hours. A heat aging resistance index within the range indicated above results in excellent heat aging resistance and in a significant improvement in the above-described properties.

The modified natural rubber that is highly purified and adjusted to have a pH of 2 to 7, such as the rubbers (1) to (3), can be prepared by, for example, a production method 1 or a production method 2. The production method 1 includes: Step 1-1 of saponifying natural rubber latex; Step 1-2 of washing the saponified natural rubber latex; and Step 1-3 of treating the washed latex with an acidic compound. The production method 2 includes: Step 2-1 of deproteinizing natural rubber latex; Step 2-2 of washing the deproteinized natural rubber latex; and Step 2-3 of treating the washed latex with an acidic compound.

[Production Method 1]
(Step 1-1)

Step 1-1 includes saponifying natural rubber latex. This treatment decomposes phospholipids and proteins in the rubber, thereby providing a saponified natural rubber latex containing a reduced amount of non-rubber components.

Natural rubber latex is collected as sap of natural rubber trees such as hevea trees. It contains components including water, proteins, lipids, inorganic salts as well as a rubber component. The gel fraction in rubber is considered to be derived from a complex of various impurities in the rubber. In the aspect 7-1 or 7-2 of the invention, the natural rubber latex to be used may be a raw latex (field latex) taken from hevea trees by tapping, or a concentrated latex (e.g. purified latex; high-ammonia latex in which ammonia is added by a usual method; and LATZ latex which is stabilized with zinc oxide, TMTD, and ammonia) concentrated by centrifugation or creaming.

The saponification can be suitably carried out by methods disclosed in, for example, JP 2010-138359 A and JP 2010-174169 A, and specifically may be carried out as follows, for example.

The saponification may be carried out by adding an alkali and optionally a surfactant to natural rubber latex, followed by still standing for a certain period of time at a predetermined temperature. Stirring or other operations may be performed as needed.

The alkali to be used in the saponification is preferably, but not limited to, sodium hydroxide, potassium hydroxide, or the like. The surfactant is not particularly limited, and examples include known anionic surfactants such as polyoxyethylene alkyl ether sulfates, nonionic surfactants, and amphoteric surfactants. Suitable are anionic surfactants such as polyoxyethylene alkyl ether sulfates because they allow for good saponification without coagulating rubber. In the saponification, the amounts of the alkali and the surfactant, and the temperature and duration of the saponification may be appropriately selected.

(Step 1-2)

Step 1-2 includes washing the saponified natural rubber latex obtained in Step 1-1. Non-rubber components such as proteins are removed by the washing.

For example, Step 1-2 can be carried out by coagulating the saponified natural rubber latex obtained in Step 1-1 to produce a coagulated rubber, treating the coagulated rubber with a basic compound, and then washing the resultant rubber. Specifically, after a coagulated rubber is produced, it is diluted with water to transfer water-soluble components to the aqueous phase, and then water is removed, whereby the non-rubber components can be removed. Further, the coagulated rubber is treated with a basic compound so that the non-rubber components which have been trapped inside the rubber during the coagulation can be redissolved. Thus, non-rubber components such as proteins firmly attached inside the coagulated rubber can be removed.

For example, an exemplary coagulation method includes adding an acid, such as formic acid, acetic acid, or sulfuric acid, to adjust the pH, and optionally further adding a polymer flocculant. This does not produce a large coagulum but produces a particulate rubber having a diameter in the order of between not more than one to a few millimeters and 20 mm, and then proteins and other impurities in such a rubber are sufficiently removed by the treatment with a basic compound. The pH is preferably adjusted within the range of 3.0 to 5.0, more preferably 3.5 to 4.5.

Examples of the polymer flocculants include cationic polymer flocculants such as poly(dimethylaminoethyl (meth)acrylate methyl chloride quaternary salt); anionic polymer flocculants such as poly(acrylic acid salt); nonionic polymer flocculants such as polyacrylamide; and amphoteric polymer flocculants such as a copolymer of a dimethylaminoethyl (meth)acrylate methyl chloride quaternary salt and an acrylic acid salt. The amount of the polymer flocculant may be appropriately chosen.

Then, the coagulated rubber thus obtained is treated with a basic compound. The basic compound is not particularly limited and is suitably a basic inorganic compound because of its ability to remove proteins and other impurities.

Examples of the basic inorganic compounds include: metal hydroxides such as alkali metal hydroxides and alkaline earth metal hydroxides; metal carbonates such as alkali metal carbonates and alkaline earth metal carbonates; metal hydrogen carbonates such as alkali metal hydrogen carbonates; metal phosphates such as alkali metal phosphates; metal acetates such as alkali metal acetates; metal hydrides such as alkali metal hydrides; and ammonia.

Examples of the alkali metal hydroxides include lithium hydroxide, sodium hydroxide, and potassium hydroxide. Examples of the alkaline earth metal hydroxides include magnesium hydroxide, calcium hydroxide, and barium hydroxide. Examples of the alkali metal carbonates include lithium carbonate, sodium carbonate, and potassium carbonate. Examples of the alkaline earth metal carbonates include magnesium carbonate, calcium carbonate, and barium carbonate. Examples of the alkali metal hydrogen carbonates include lithium hydrogen carbonate, sodium hydrogen carbonate, and potassium hydrogen carbonate. Examples of the alkali metal phosphates include sodium phosphate and sodium hydrogen phosphate. Examples of the alkali metal acetates include sodium acetate and potassium acetate. Examples of the alkali metal hydrides include sodium hydride and potassium hydride.

Preferred among these are metal hydroxides, metal carbonates, metal hydrogen carbonates, metal phosphates, and ammonia; more preferred are alkali metal carbonates, alkali metal hydrogen carbonates, and ammonia; still more preferred is sodium carbonate or sodium hydrogen carbonate. These basic compounds may be used alone, or two or more of these may be used in combination.

The method for treating the coagulated rubber with a basic compound is not particularly limited, as long as the coagulated rubber is brought into contact with the basic compound. Examples include a method in which the coagulated rubber is immersed in an aqueous solution of the basic compound; and a method in which an aqueous solution of the basic compound is sprayed onto the coagulated rubber. The aqueous solution of the basic compound may be prepared by diluting and dissolving the basic compound with water.

The amount of the basic compound based on 100% by mass of the aqueous solution is preferably 0.1% by mass or more, more preferably 0.3% by mass or more. If the amount is less than 0.1% by mass, proteins may not be sufficiently removed. The amount is preferably 10% by mass or less, more preferably 5% by mass or less. If the amount is more than 10% by mass, in spite of a large amount of the basic compound required, the amount of decomposed proteins tends not to be increased, resulting in poor efficiency.

The aqueous solution of the basic compound preferably has a pH of 9 to 13, and in view of treatment efficiency, it more preferably has a pH of 10 to 12.

The treatment temperature may be appropriately chosen and is preferably 10° C. to 50° C., more preferably 15° C. to 35° C. Moreover, the treatment duration is usually 1 minute or longer, preferably 10 minutes or longer, more preferably 30 minutes or longer. If the duration is shorter than 1 minute, the effects according to the aspect 7-1 or 7-2 of the invention may not be well achieved. Although the upper limit is not limited, from a standpoint of productivity, it is preferably 48 hours or shorter, more preferably 24 hours or shorter, still more preferably 16 hours or shorter.

Washing is performed after the treatment with a basic compound. This treatment allows the non-rubber components such as proteins which have been trapped inside the rubber during the coagulation to be sufficiently removed and, at the same time, allows the basic compound present inside the coagulated rubber as well as those on the surface thereof to be sufficiently removed. In particular, the removal of basic compounds remaining in the entire rubber in the washing step permits the entire rubber to sufficiently undergo treatment with an acidic compound as described later. Thus, the pH of not only the surface but also the inside of the rubber can be adjusted to 2 to 7.

The washing can be suitably carried out by methods that can sufficiently remove the non-rubber components and the basic compound contained in the entire rubber. For example, the washing may be carried out by a method in which the rubber component is diluted and washed in water, followed by centrifugation or followed by standing to allow the rubber to float and then draining only the aqueous phase to collect the rubber component. The number of washing cycles may be arbitrarily chosen as long as the amounts of non-rubber components such as proteins and of the basic compound can be reduced to desired levels. In the case of repeating a washing cycle which consists of adding 1,000 mL of water per 300 g of dry rubber, stirring the mixture, and then removing water, the number of washing cycles is preferably 3 (3 cycles) or more, more preferably 5 (5 cycles) or more, still more preferably 7 (7 cycles) or more.

The washing is preferably performed until the rubber has a phosphorus content of 200 ppm or less and/or has a nitrogen content of 0.15% by mass or less. When the washing is carried out so that phospholipids and proteins are sufficiently removed, the above-described properties are improved.

(Step 1-3)

Step 1-3 includes treating the washed rubber obtained in Step 1-2 with an acidic compound. This treatment adjusts the pH of the entire rubber to 2 to 7 as described above, thereby providing a modified natural rubber that is excellent in the above-described properties. Although heat aging resistance tends to be reduced due to the treatment with a basic compound or other factors, an additional treatment with an acidic compound prevents such a problem and provides good heat aging resistance.

Examples of the acidic compound include, but not limited to, inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, α-resorcylic acid, β-resorcylic acid, γ-resorcylic acid, gallic acid, phloroglycine, sulfosalicylic acid, ascorbic acid, erythorbic acid, and bisphenolic acids. Preferred among these are, for example, acetic acid, sulfuric acid, and formic acid. The acidic compounds may be used alone, or two or more of these may be used in combination.

The method for treating the coagulated rubber with an acid is not particularly limited, as long as the coagulated rubber is brought into contact with the acidic compound. Examples include a method in which the coagulated rubber is immersed in an aqueous solution of the acidic compound; and a method in which an aqueous solution of the acidic compound is sprayed onto the coagulated rubber. The aqueous solution of the acidic compound may be prepared by diluting and dissolving the acidic compound with water.

Although the amount of the acidic compound based on 100% by mass of the aqueous solution is not particularly limited, the lower limit is preferably 0.1% by mass or more, more preferably 0.3% by mass or more, while the upper limit is preferably 15% by mass or less, more preferably 10% by mass or less, still more preferably 5% by mass or less. When the amount falls within the range indicated above, good heat aging resistance can be obtained.

The treatment temperature may be appropriately chosen and it is preferably 10° C. to 50° C., more preferably 15° C. to 35° C. Usually, the treatment duration is preferably 3 seconds or longer, more preferably 10 seconds or longer, still more preferably 30 seconds or longer. If the duration is shorter than 3 seconds, the rubber may not be sufficiently neutralized and thus the effects according to the aspect 7-1 or 7-2 of the invention may not be well achieved. Although the upper limit is not limited, from a standpoint of productivity, it is preferably 24 hours or shorter, more preferably 10 hours or shorter, still more preferably 5 hours or shorter.

In the treatment such as immersing the rubber in an aqueous solution of the acidic compound, the pH is preferably adjusted to 6 or lower.

Such neutralization leads to excellent heat aging resistance. The upper limit of the pH is more preferably 5 or lower, still more preferably 4.5 or lower. The lower limit of the pH is not particularly limited, but it is preferably 1 or higher, more preferably 2 or higher, because too strong acidity can cause deterioration of the rubber and some trouble in the wastewater disposal, though depending on the duration of immersion. The immersing treatment can be carried out, for example, by leaving the coagulated rubber in an aqueous solution of the acidic compound.

After the above treatment, the compound used in the treatment with an acidic compound is removed, and then the treated coagulated rubber may appropriately be washed. The washing may be carried out in the same manner as described above. For example, the amount of non-rubber components may be further reduced and adjusted to a desired level by repeating washing. Moreover, the coagulated rubber obtained after the treatment with an acidic compound may be squeezed with, for example, a roll squeezer into a sheet or other shapes. The additional step of squeezing the coagulated rubber allows the surface and inside of the coagulated rubber to have a uniform pH, and the resulting rubber has desired properties. After the washing and/or squeezing steps are performed as needed, the resultant rubber is milled on a creper and dried, whereby the modified natural rubber can be obtained. The drying may be carried out in any manner, such as by using a common drier for drying TSR, e.g. a trolley dryer, a vacuum dryer, an air dryer, or a drum dryer.

[Production Method 2]
(Step 2-1)

Step 2-1 includes deproteinizing natural rubber latex. This treatment produces a deproteinized natural rubber latex free of non-rubber components such as proteins. The natural rubber latex to be used in Step 2-1 may be the same as described above.

The deproteinizing treatment may be carried out by any known method by which proteins can be removed. An exemplary method includes adding a proteolytic enzyme to natural rubber latex to decompose proteins.

The proteolytic enzyme to be used in the deproteinizing treatment may be, but not limited to, any of bacteria-derived enzymes, mold-derived enzymes, and yeast-derived enzymes. Specifically, one or a combination of proteases, peptidases, cellulases, pectinases, lipases, esterases, amylases, and other enzymes may be used.

The amount of the proteolytic enzyme to be added is preferably 0.005 parts by mass or more, more preferably 0.01 parts by mass or more, still more preferably 0.05 parts by mass or more, relative to 100 parts by mass of solids in the natural rubber latex. An amount of less than the lower limit may result in an insufficient proteolytic reaction.

A surfactant may also be added together with the proteolytic enzyme in the deproteinizing treatment. Examples of the surfactants include anionic surfactants, cationic surfactants, nonionic surfactants, and amphoteric surfactants.

(Step 2-2)

Step 2-2 includes washing the deproteinized natural rubber latex obtained in Step 2-1. Non-rubber components such as proteins are removed by the washing.

Step 2-2 may be carried out, for example, by coagulating the deproteinized natural rubber latex obtained in Step 2-1 to produce a coagulated rubber, and washing the coagulated rubber. Thus, non-rubber components such as proteins firmly attached inside the coagulated rubber can be removed.

The coagulation may be carried out in the same manner as in Step 1-2. Further, the treatment with a basic compound as described above may optionally be performed. After a coagulated rubber is produced, washing is performed. This washing may be carried out in the same manner as in Step 1-2, whereby non-rubber components such as proteins and the basic compound can be removed. For the same reason as described above, the washing is preferably performed until the rubber has a phosphorus content of 200 ppm or less and/or has a nitrogen content of 0.15% by mass or less.

(Step 2-3)

Step 2-3 includes treating the washed rubber obtained in Step 2-2 with an acidic compound. Not only the treatment with a basic compound but also the acid coagulation using a small amount of acid tend to reduce heat aging resistance due to the fact that a water extract of the finally obtained rubber shows alkalinity or neutrality. Enzymes having an optimum pH in an alkali region are usually used as the proteolytic enzyme because they suitably allow for deproteinization. Such an enzymatic reaction is often carried out under alkaline conditions depending on the optimum pH. In order to adjust the pH of the final rubber to 2 to 7, natural rubber latex is preferably deproteinized at a pH of 8 to 11, more preferably a pH of 8.5 to 11 in Step 2-1. The deproteinized latex is then coagulated under acidic conditions in the coagulation process. When the coagulated rubber was washed only with water, an extract of the rubber obtained in the extraction described later had a higher pH than the pH of the extracting solvent, and such a rubber showed a great decrease particularly in heat aging resistance. In contrast, when the coagulated rubber is treated with an acidic compound, optionally following treatment with a basic compound, the above problem is prevented and good heat aging resistance is obtained.

The same acidic compounds as mentioned in Step 1-3 can be used. The method for treating the coagulated rubber with acid is not particularly limited, as long as the coagulated rubber is brought into contact with the acidic compound. Examples include a method in which the coagulated rubber is immersed in an aqueous solution of the acidic compound; and a method in which an aqueous solution of the acidic compound is sprayed onto the coagulated rubber. The aqueous solution of the acidic compound may be prepared by diluting and dissolving the acidic compound with water.

Although the amount of the acidic compound based on 100% by mass of the aqueous solution is not particularly limited, the lower limit is preferably 0.01% by mass or more, more preferably 0.03% by mass or more, while the upper limit is preferably 15% by mass or less, more preferably 10% by mass or less, still more preferably 5% by mass or less. When the amount falls within the range indicated above, good heat aging resistance can be obtained.

The temperature and duration for the treatment may be appropriately chosen. The treatment may be carried out at the same temperature as in Step 1-3. Moreover, in the treatment such as immersing the rubber in an aqueous solution of the acidic compound, the pH is preferably adjusted to the same range as in Step 1-3.

After the above treatment, the compound used in the treatment with an acidic compound is removed, and then the treated coagulated rubber may appropriately be washed. The washing may be carried out in the same manner as described above. For example, the amount of non-rubber components may be further reduced and adjusted to a desired level by repeating washing. After the completion of washing, the resultant rubber is dried, whereby the modified natural rubber can be obtained. The drying may be carried out in any manner, for example, by the above-described techniques.

In the rubber composition according to the aspect 7-1 or 7-2 of the invention, the amount of the modified natural rubber based on 100% by mass of the rubber component is preferably 5% by mass or more, more preferably 20% by mass or more, still more preferably 40% by mass or more, particularly preferably 60% by mass or more, most preferably 80% by mass or more. The upper limit of the amount is not particularly limited and may be 100% by mass.

Examples of materials other than the modified natural rubber which may be included in the rubber component include diene rubbers such as natural rubber (non-modified) (NR), epoxidized natural rubber (ENR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), acrylonitrile-butadiene rubber (NBR), and butyl-based rubbers.

The carbon black (1) described above is used in the aspect 7-1 or 7-2 of the invention. Abrasion resistance and low heat build-up properties can be simultaneously achieved by incorporation of carbon black (1).

In the aspect 7-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 7-1 or 7-2 of the invention (particularly the effect of improving abrasion resistance) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or abrasion resistance.

In the aspect 7-2 of the invention, the aggregate properties of carbon black (1) include a ratio ($\Delta D50/Dmod$) of the half width ($\Delta D50$) of the distribution curve to the Dmod of 0.78 or more, preferably 0.90 or more, more preferably 1.0 or more, still more preferably 1.1 or more. If the ratio is less than 0.78, the effects of the aspect 7-1 or 7-2 of the invention (particularly the effect of improving low heat build-up properties) are insufficient. The upper limit of the $\Delta D50/Dmod$ ratio is not particularly limited but is preferably 2.5 or less, more preferably 2.0 or less. If it is more than 2.5, abrasion resistance may deteriorate, with the result that the desired effects may not be obtained.

In the aspect 7-1 or 7-2 of the invention, the Dmod and the $\Delta D50$ of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width ($\Delta D50$) of the distribution curve).

Carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range indicated above, the effects of the aspect 7-1 or 7-2 of the invention can be more suitably achieved.

In the aspect 7-1 or 7-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving abrasion resistance can be more suitably achieved and the effects of the aspect 7-1 or 7-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 7-1 or 7-2 of the invention can be more suitably achieved.

In the aspect 7-1 or 7-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 7-1 or 7-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 7-1 or 7-2 of the invention can be more suitably achieved.

In the aspect 7-1 or 7-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and abrasion resistance of the rubber composition can be more suitably improved, and the effects of the aspect 7-1 or 7-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 7-1 or 7-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 7-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 7-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 7-1 or 7-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) is preferably 1 part by mass or more, more preferably 5 parts by mass or more, still more preferably 10 parts by mass or more, particularly preferably 20 parts by mass or more. If the amount is less than 1 part by mass, the effects of the aspect 7-1 or 7-2 of the invention tend not to be sufficiently obtained. The amount of carbon black is also preferably 250 parts by mass or less, more preferably 200 parts by mass or less, still more preferably 150 parts by mass or less, particularly preferably 100 parts by mass or less, most preferably 70 parts by mass or less. If the amount is more than 250 parts by mass, the resulting rubber composition tends to be too hard, adversely leading to reduced abrasion resistance. Moreover, the processability of the rubber composition tends to drastically decrease. Furthermore, low heat build-up properties tend to deteriorate.

According to the aspect 7-1 or 7-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

In the case of the rubber composition according to the aspect 7-1 or 7-2 of the invention being used as a rubber composition for treads, carbon black (2) preferably has a nitrogen adsorption specific surface area ($N_2SA$) of 80 $m^2/g$ or more, more preferably 90 $m^2/g$ or more, still more preferably 100 $m^2/g$ or more. Carbon black (2) having a $N_2SA$ of less than 80 $m^2/g$ tends to provide reduced reinforcing properties, resulting in insufficient abrasion resistance. Carbon black (2) also preferably has a $N_2SA$ of 200 $m^2/g$ or less, more preferably 190 $m^2/g$ or less, still more preferably 180 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties or abrasion resistance.

The $N_2SA$ of carbon black in the aspect 7-1 or 7-2 of the invention is determined in accordance with JIS K 6217-2: 2001.

In the case of the rubber composition according to the aspect 7-1 or 7-2 of the invention being used as a rubber composition for treads, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient abrasion resistance. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 7-1 or 7-2 of the invention is determined in accordance with JIS K 6217-4: 2001.

In the case of the rubber composition according to the aspect 7-1 or 7-2 of the invention being used as a rubber composition for sidewalls, carcasses, or clinches, carbon black (2) preferably has a nitrogen adsorption specific surface area ($N_2SA$) of 20 $m^2/g$ or more, more preferably 30 $m^2/g$ or more. Carbon black (2) having a $N_2SA$ of less than 20 $m^2/g$ tends to provide reduced reinforcing properties, resulting in insufficient durability. Carbon black (2) also preferably has a $N_2SA$ of 110 $m^2/g$ or less, more preferably 100 $m^2/g$ or less. The use of carbon black (2) having a $N_2SA$ of more than 110 $m^2/g$ tends to deteriorate low heat build-up properties.

In the case of the rubber composition according to the aspect 7-1 or 7-2 of the invention being used as a rubber composition for sidewalls, carcasses, or clinches, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient durability. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or fatigue resistance.

The total amount of carbon black relative to 100 parts by mass of the rubber component is preferably 1 part by mass or more, more preferably 5 parts by mass or more, still more preferably 10 parts by mass or more, particularly preferably 20 parts by mass or more. If the total amount is less than 1 part by mass, sufficient reinforcing properties may not be obtained. The total amount of carbon black is also preferably 250 parts by mass or less, more preferably 200 parts by mass or less, still more preferably 150 parts by mass or less, particularly preferably 100 parts by mass or less. If the total amount is more than 250 parts by mass, processability may decrease, and low heat build-up properties, abrasion resistance, or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 7-1 or 7-2 of the invention may not be sufficiently obtained, and it may be difficult to simultaneously achieve abrasion resistance and low heat build-up properties. Although the amount of carbon black (1) may be 100% by mass, it is preferably 80% by mass or less when any other carbon black is used in combination.

The rubber composition according to the aspect 7-1 or 7-2 of the invention preferably contains oil. The incorporation of oil can reduce the $E^*$ (complex modulus) while maintaining the tan $\delta$ (loss tangent) as a parameter of dynamic viscoelasticity, thus improving grip performance.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan $\delta$.

When the rubber composition contains oil, the amount of oil relative to 100 parts by mass of the rubber component is preferably 1 part by mass or more, more preferably 3 parts by mass or more. If the amount is less than 1 part by mass, the effect of softening rubber (softening effect) may be so small that the effect of lowering the $E^*$ may be reduced. The amount of oil is also preferably 15 parts by mass or less, more preferably 8 parts by mass or less. If the amount is more than 15 parts by mass, although the softening effect is sufficient, reinforcing properties may greatly decrease, resulting in reduced abrasion resistance or durability (breaking properties). The amount of oil includes the amount of oil contained in rubber (oil extended rubber).

The rubber composition in the aspect 7-1 or 7-2 of the invention may appropriately contain, in addition to the above-described components, compounding agents commonly used in preparation of rubber compositions. Examples of the compounding agents include reinforcing fillers such as silica, clay, and talc; silane coupling agents; zinc oxide; stearic acid; processing aids; various types of antioxidants; wax; vulcanizing agents such as sulfur and sulfur-containing compounds; and vulcanization accelerators.

The rubber composition according to the aspect 7-1 or 7-2 of the invention can be prepared by usual methods. Specifically, it may be prepared by kneading the components using a Banbury mixer, a kneader, an open roll mill, or other kneading machines and vulcanizing the kneadate.

The rubber composition according to the aspect 7-1 or 7-2 of the invention can be suitably used as a rubber composition for tires. The rubber composition according to the aspect 7-1 or 7-2 of the invention can be used in various tire components, and suitable especially for, for example, treads, sidewalls, carcasses, or clinches.

The pneumatic tire in the aspect 7-1 or 7-2 of the invention can be produced from the rubber composition by usual methods.

Specifically, a rubber composition containing the above components, before vulcanization, is extruded and processed into the shape of a tire component such as a tread and then assembled with other tire components on a tire building machine by a usual method to build an unvulcanized tire. The unvulcanized tire is heated and pressurized in a vulcanizer to produce a tire.

The pneumatic tire in the aspect 7-1 or 7-2 of the invention can be suitably used for passenger vehicles, trucks and buses, or two-wheeled vehicles, or as high performance tires or other tires, and especially as high performance tires. The pneumatic tire obtained according to the aspect 7-1 or 7-2 of the invention has excellent grip performance on dry roads.

High performance tires in the aspect 7-1 or 7-2 of the invention are excellent especially in grip performance on dry roads and conceptually encompass racing tires used for racing vehicles.

<The Aspects 8-1 and 8-2 of the Invention>

The aspect 8-1 of the invention relates to a rubber composition containing a rubber component, and one or more types of carbon black, the rubber component including a tin-modified polybutadiene rubber that is produced by polymerization using a lithium initiator and has a tin atom content of 50 to 3,000 ppm, a vinyl content of 5% to 50% by mass, and a molecular weight distribution (Mw/Mn) of 2.0 or less, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 8-2 of the invention relates to a rubber composition containing a rubber component, and one or more types of carbon black, the rubber component including a tin-modified polybutadiene rubber that is produced by polymerization using a lithium initiator and has a tin atom content of 50 to 3,000 ppm, a vinyl content of 5% to 50% by mass, and a molecular weight distribution (Mw/Mn) of 2.0 or less, at least one of the one or more types of carbon black being carbon black (1) having, as aggregate properties, a mode diameter (Dmod) of the Stokes' diameter distribution curve of 79 nm or less and a ratio ($\Delta$D50/Dmod) of the half width ($\Delta$D50) of the distribution curve to the Dmod of 0.78 or more.

According to the aspect 8-1 or 8-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition. This allows the rubber composition to have improved rubber strength while maintaining or improving good low heat build-up properties. Thus, rubber strength and low heat build-up properties can be simultaneously achieved to a high extent. Furthermore, in the aspect 8-1 or 8-2 of the invention, a tin-modified polybutadiene rubber is incorporated in addition to the specific carbon black to synergistically improve rubber strength and low heat build-up properties. Thus, rubber strength and low heat build-up properties can be significantly improved.

According to the aspect 8-1 or 8-2 of the invention, the rubber component includes a tin-modified polybutadiene rubber (tin-modified BR) that is produced by polymerization using a lithium initiator and has a tin atom content of 50 to 3,000 ppm, a vinyl content of 5% to 50% by mass, and a molecular weight distribution (Mw/Mn) of 2.0 or less. The tin-modified BR is highly effective in improving the dispersibility of filler and can suitably promote dispersion especially of carbon black (1), thereby significantly improving rubber strength and low heat build-up properties.

It is preferred that the tin-modified BR is produced by polymerizing 1,3-butadiene using a lithium initiator and subsequently adding a tin compound, and further has a tin-carbon bond at a molecular end.

Examples of the lithium initiator include lithium compounds such as alkyllithiums, aryllithiums, allyllithiums, vinyllithiums, organotinlithiums, and organic nitrogen lithium compounds. The use of a lithium compound as an initiator allows for the production of a tin-modified BR having a high vinyl content and a low cis content.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene. Each of these may be used alone, or two or more of these may be used in combination.

The tin-modified BR has a tin atom content of 50 ppm or more, preferably 60 ppm or more. If the tin atom content is less than 50 ppm, the effect of promoting dispersion of carbon black in the tin-modified BR is small, and low heat build-up properties deteriorate. The tin atom content is 3,000 ppm or less, preferably 2,500 ppm or less, still more preferably 250 ppm or less. If the tin atom content is more than 3,000 ppm, the kneadate poorly comes together and does not have a uniform edge profile, and thus has poor extrudability. Also, low heat build-up properties deteriorate.

The tin-modified BR has a molecular weight distribution (Mw/Mn) of 2.0 or less, preferably 1.5 or less. A tin-modified BR having a Mw/Mn of more than 2.0 is not preferred because the use of such a tin-modified BR leads to poor dispersion of carbon black and an increase in tan δ (poor low heat build-up properties). The lower limit of the Mw/Mn is not particularly limited.

In the aspect 8-1 or 8-2 of the invention, the weight average molecular weight (Mw) and number average molecular weight (Mn) can be determined using a gel permeation chromatograph (GPC) (GPC-8000 series available from Tosoh Corporation, detector: differential refractometer, column: TSKGEL SUPERMALTPORE HZ-M available from Tosoh Corporation) calibrated with polystyrene standards.

The tin-modified BR has a vinyl content of 5% by mass or more, preferably 7% by mass or more. A tin-modified BR having a vinyl content of less than 5% by mass is difficult to polymerize (produce). Also, the vinyl content is 50% by mass or less, preferably 20% by mass or less. A tin-modified BR having a vinyl content of more than 50% by mass tends to result in poor dispersion of filler (particularly carbon black) and therefore poor low heat build-up properties, and also in reduced rubber strength.

The amount of the tin-modified BR based on 100% by mass of the rubber component is preferably 5% by mass or more, more preferably 10% by mass or more. The amount of the tin-modified BR is preferably 90% by mass or less, more preferably 70% by mass or less, still more preferably 50% by mass or less, particularly preferably 30% by mass or less. When the amount of the tin-modified BR falls within the range indicated above, a more balanced improvement in low heat build-up properties and rubber strength can be achieved.

Examples of materials other than tin-modified BR which can be included in the rubber component in the aspect 8-1 or 8-2 of the invention include diene rubbers such as isoprene-based rubbers, polybutadiene rubber (BR) excluding tin-modified BR, styrene butadiene rubber (SBR), and styrene isoprene butadiene rubber (SIBR). The rubber component may be a single material or a combination of two or more materials. For a balanced improvement in low heat build-up properties and rubber strength in the use for tires, isoprene-based rubbers are preferred. The incorporation of an isoprene-based rubber with the specific carbon black and the tin-modified polybutadiene rubber can significantly improve rubber strength and low heat build-up properties.

Examples of the isoprene-based rubber include polyisoprene rubber (IR), natural rubber (NR), and epoxidized natural rubber (ENR). NR is preferred because it is excellent in low heat build-up properties, rubber strength, and other properties. Examples of the NR include those commonly used in the tire industry such as SIR20, RSS#3, and TSR20. The IR is not particularly limited, and those commonly used in the tire industry can be used.

The amount of the isoprene-based rubber based on 100% by mass of the rubber component is preferably 10% by mass or more, more preferably 30% by mass or more, still more preferably 60% by mass or more. If the amount is less than 10% by mass, abrasion resistance, low heat build-up properties, or rubber strength may not be sufficiently obtained. The amount is preferably 90% by mass or less, more preferably 85% by mass or less. If it is more than 90% by mass, the amount of the tin-modified BR is reduced so that the effects of the aspect 8-1 or 8-2 of the invention may not be sufficiently obtained.

The combined amount of the tin-modified BR and the isoprene-based rubber, based on 100% by mass of the rubber component, is preferably 60% by mass or more, more preferably 80% by mass or more, and may be 100% by mass. If the combined amount of the tin-modified BR and the isoprene-based rubber falls within the range indicated above, the effects of the aspect 8-1 or 8-2 of the invention can be more suitably achieved.

The carbon black (1) described above is used in the aspect 8-1 or 8-2 of the invention. Rubber strength and low heat build-up properties can be simultaneously achieved by incorporation of carbon black (1).

In the aspect 8-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 8-1 or 8-2 of the invention (particularly the effect of improving rubber strength) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or rubber strength.

In the aspect 8-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 8-1 or 8-2 of the invention (particularly the effect of improving low heat build-up properties) are insufficient. The upper limit of the ΔD50/Dmod ratio is not particularly limited but is preferably 2.5 or less, more preferably 2.0 or less. If it is more than 2.5, rubber strength may deteriorate, with the result that the desired effects may not be obtained.

In the aspect 8-1 or 8-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 m²/g, more preferably 80 to 145 m²/g, still more preferably 100 to 140 m²/g, particularly preferably 105 to 135 m²/g. When the CTAB falls within the range indicated above, the effects of the aspect 8-1 or 8-2 of the invention can be more suitably achieved.

In the aspect 8-1 or 8-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving rubber strength can be more suitably achieved and the effects of the aspect 8-1 or 8-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m²/mg, more preferably 0.85 to 1.15 m²/mg, still more preferably 0.9 to 1.1 m²/mg. When the CTAB/IA ratio falls within the range indicated above, the effects of the aspect 8-1 or 8-2 of the invention can be more suitably achieved.

In the aspect 8-1 or 8-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 8-1 or 8-2 of the invention can be more suitably achieved.

Carbon black (1) preferably has a 24M4 dibutyl phthalate oil absorption (24M4 DBP) of 50 to 120 cm³/100 g, more preferably 70 to 120 cm³/100 g, still more preferably 90 to 115 cm³/100 g, particularly preferably 95 to 110 cm³/100 g. When the 24M4 DBP falls within the range indicated above, the effects of the aspect 8-1 or 8-2 of the invention can be more suitably achieved.

In the aspect 8-1 or 8-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and rubber strength of the rubber composition can be more suitably improved, and the effects of the aspect 8-1 or 8-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 8-1 or 8-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 8-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 8-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 8-1 or 8-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) is preferably 1 part by mass or more, more preferably 5 parts by mass or more, still more preferably 10 parts by mass or more, particularly preferably 20 parts by mass or more, most preferably 30 parts by mass or more. If the amount is less than 1 part by mass, the effects of the aspect 8-1 or 8-2 of the invention tend not to be sufficiently obtained. The amount of the carbon black is also preferably 250 parts by mass or less, more preferably 200 parts by mass or less, still more preferably 150 parts by mass or less, particularly preferably 100 parts by mass or less, most preferably 60 parts by mass or less. If the amount is more than 250 parts by mass, the resulting rubber composition tends to be too hard, adversely leading to reduced rubber strength. Moreover, the processability of the rubber composition tends to drastically decrease. Furthermore, low heat build-up properties tend to deteriorate.

According to the aspect 8-1 or 8-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

In the case of the rubber composition according to the aspect 8-1 or 8-2 of the invention being used as a rubber composition for treads, carbon black (2) preferably has a nitrogen adsorption specific surface area ($N_2SA$) of 80 $m^2/g$ or more, more preferably 90 $m^2/g$ or more, still more preferably 100 $m^2/g$ or more. Carbon black (2) having a $N_2SA$ of less than 80 $m^2/g$ tends to provide reduced reinforcing properties, resulting in insufficient rubber strength. Carbon black (2) also preferably has a $N_2SA$ of 200 $m^2/g$ or less, more preferably 190 $m^2/g$ or less, still more preferably 180 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties or rubber strength.

The $N_2SA$ of carbon black in the aspect 8-1 or 8-2 of the invention is determined in accordance with JIS K 6217-2: 2001.

In the case of the rubber composition according to the aspect 8-1 or 8-2 of the invention being used as a rubber composition for treads, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient rubber strength. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 8-1 or 8-2 of the invention is determined in accordance with JIS K 6217-4: 2001.

In the case of the rubber composition according to the aspect 8-1 or 8-2 of the invention being used as a rubber composition for sidewalls, carcasses, or clinches, carbon black (2) preferably has a nitrogen adsorption specific surface area ($N_2SA$) of 20 $m^2/g$ or more, more preferably 30 $m^2/g$ or more. Carbon black (2) having a $N_2SA$ of less than 20 $m^2/g$ tends to provide reduced reinforcing properties, resulting in insufficient durability. Carbon black (2) also preferably has a $N_2SA$ of 110 $m^2/g$ or less, more preferably 100 $m^2/g$ or less. The use of carbon black (2) having a $N_2SA$ of more than 110 $m^2/g$ tends to deteriorate low heat build-up properties.

In the case of the rubber composition according to the aspect 8-1 or 8-2 of the invention being used as a rubber composition for sidewalls, carcasses, or clinches, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient durability. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or fatigue resistance.

The total amount of carbon black relative to 100 parts by mass of the rubber component is preferably 1 part by mass or more, more preferably 5 parts by mass or more, still more preferably 10 parts by mass or more, particularly preferably 20 parts by mass or more, most preferably 30 parts by mass or more. If the total amount is less than 1 part by mass, sufficient reinforcing properties may not be obtained. The total amount of carbon black is also preferably 250 parts by mass or less, more preferably 200 parts by mass or less, still more preferably 150 parts by mass or less, particularly preferably 100 parts by mass or less, most preferably 60 parts by mass or less. If the total amount is more than 250 parts by mass, processability may decrease, and low heat build-up properties, rubber strength, or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 8-1 or 8-2 of the invention may not be sufficiently obtained, and it may be difficult to simultaneously achieve rubber strength and low heat build-up properties. Although the amount of carbon black (1) may be 100% by mass, it is preferably 80% by mass or less when any other carbon black is used in combination.

The rubber composition according to the aspect 8-1 or 8-2 of the invention preferably contains oil. The incorporation of oil can reduce the E* (complex modulus) while maintaining the tan δ (loss tangent) as a parameter of dynamic viscoelasticity, thus improving grip performance.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ.

When the rubber composition contains oil, the amount of oil relative to 100 parts by mass of the rubber component is preferably 1 part by mass or more, more preferably 3 parts by mass or more. If the amount is less than 1 part by mass, the effect of softening rubber (softening effect) may be so small that the effect of lowering the E* may be reduced. The amount of oil is also preferably 30 parts by mass or less, more preferably 20 parts by mass or less. If the amount is more than 30 parts by mass, although the softening effect is sufficient, reinforcing properties may greatly decrease, resulting in reduced abrasion resistance or rubber strength. The amount of oil includes the amount of oil contained in rubber (oil extended rubber).

The rubber composition in the aspect 8-1 or 8-2 of the invention may appropriately contain, in addition to the above-described components, compounding agents commonly used in preparation of rubber compositions. Examples of the compounding agents include reinforcing fillers such as silica, clay, and talc; silane coupling agents; zinc oxide; stearic acid; processing aids; various types of antioxidants; wax; vulcanizing agents such as sulfur and sulfur-containing compounds; and vulcanization accelerators.

The rubber composition according to the aspect 8-1 or 8-2 of the invention can be prepared by usual methods. Specifically, it may be prepared by kneading the components using a Banbury mixer, a kneader, an open roll mill, or other kneading machines and vulcanizing the kneadate.

The rubber composition according to the aspect 8-1 or 8-2 of the invention can be used as a rubber composition for tires, and suitable especially as a rubber composition for tires. The rubber composition according to the aspect 8-1 or 8-2 of the invention can be used in various tire components, and suitable especially for, for example, treads, sidewalls, carcasses, or clinches.

The pneumatic tire in the aspect 8-1 or 8-2 of the invention can be produced from the rubber composition by usual methods.

Specifically, a rubber composition containing the above components, before vulcanization, is extruded and processed into the shape of a tire component such as a tread and then assembled with other tire components on a tire building machine by a usual method to build an unvulcanized tire. The unvulcanized tire is heated and pressurized in a vulcanizer to produce a tire.

The pneumatic tire in the aspect 8-1 or 8-2 of the invention can be suitably used for passenger vehicles, trucks and buses, or two-wheeled vehicles, or as high performance tires or other tires, and especially as high performance tires. The pneumatic tire obtained according to the aspect 8-1 or 8-2 of the invention has excellent grip performance on dry roads.

High performance tires in the aspect 8-1 or 8-2 of the invention are excellent especially in grip performance on dry roads and conceptually encompass racing tires used for racing vehicles.

<The Aspects 9-1 and 9-2 of the Invention>

The aspect 9-1 of the invention relates to a pneumatic tire including an insulation, the insulation being formed from a rubber composition that contains: a rubber component including an isoprene-based rubber and a styrene butadiene rubber; and one or more types of carbon black, the rubber composition containing the one or more types of carbon black in a total amount of 15 to 80 parts by mass relative to 100 parts by mass of the rubber component, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 9-2 of the invention relates to a pneumatic tire including an insulation, the insulation being formed from a rubber composition that contains: a rubber component including an isoprene-based rubber and a styrene butadiene rubber; and one or more types of carbon black, the rubber composition containing the one or more types of carbon black in a total amount of 15 to 80 parts by mass relative to 100 parts by mass of the rubber component, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 9-1 or 9-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition. This allows the rubber composition to have improved rubber strength and storage modulus while maintaining or improving low heat build-up properties. The use of such a rubber composition in a tire insulation allows for the production of a tire that can achieve a good balance of durability, handling stability, and low heat build-up properties.

The rubber component of the rubber composition in the aspect 9-1 or 9-2 of the invention includes an isoprene-based rubber and a styrene butadiene rubber (SBR). Thus, the effects of the aspect 9-1 or 9-2 of the invention, including excellent processability and durability, can be well achieved.

Examples of the isoprene-based rubber include polyisoprene rubber (IR), natural rubber (NR), and epoxidized natural rubber (ENR). NR is preferred among these because it is excellent in processability. Examples of the NR include those commonly used in the tire industry such as SIR20, RSS#3, and TSR20. The IR is not particularly limited, and those commonly used in the tire industry can be used.

The amount of the isoprene-based rubber (preferably NR) based on 100% by mass of the rubber component is preferably 30% by mass or more, more preferably 40% by mass or more, still more preferably 50% by mass or more. If the amount is less than 30% by mass, low heat build-up properties, storage modulus, or rubber strength tends to decrease. The amount is also preferably 80% by mass or less, more preferably 70% by mass or less. If the amount is more than 80% by mass, low heat build-up properties or storage modulus tends to decrease.

Examples of the SBR include emulsion-polymerized styrene butadiene rubber (E-SBR) and solution-polymerized styrene butadiene rubber (S-SBR).

The SBR preferably has a styrene content of 15% by mass or more, more preferably 20% by mass or more. With SBR having a styrene content of less than 15% by mass, low heat build-up properties tend to deteriorate. The styrene content is also preferably 45% by mass or less, more preferably 40% by mass or less. With SBR having a styrene content of more than 45 by mass, rubber strength tends to decrease.

In the aspect 9-1 or 9-2 of the invention, the styrene content of SBR is determined by $H^1$-NMR analysis.

The amount of SBR based on 100% by mass of the rubber component is preferably 20% by mass or more, more preferably 30% by mass or more. If the amount is less than 20% by mass, low heat build-up properties, storage modulus, or processability tends to decrease. The amount is also preferably 70% by mass or less, more preferably 60% by mass or less, still more preferably 50% by mass or less. If the amount is more than 70% by mass, low heat build-up properties, storage modulus, or rubber strength tends to decrease.

The combined amount of the isoprene-based rubber (preferably NR) and SBR, based on 100% by mass of the rubber component, is preferably 70% by mass or more, more preferably 80% by mass or more, still more preferably 90% by mass or more, particularly preferably 100% by mass.

With a combined amount of 70% by mass or more, excellent rubber strength and a higher reversion resistance effect can be obtained.

The rubber component of the rubber composition in the aspect 9-1 or 9-2 of the invention may include materials other than the isoprene-based rubber and SBR, such as polybutadiene rubber (BR) or styrene isoprene butadiene rubber (SIBR). Each of these may be used alone, or two or more of these may be used in combination.

The carbon black (1) described above is used in the aspect 9-1 or 9-2 of the invention. The incorporation of carbon black (1) into a rubber formulation including an isoprene-based rubber and SBR can improve rubber strength and storage modulus while maintaining or improving low heat build-up properties. Thus, rubber strength or storage modulus and low heat build-up properties can be simultaneously achieved to a high extent. Furthermore, the use of the above combination can produce higher effects (synergistic effects) in improving low heat build-up properties, rubber strength, storage modulus, or the balance of these properties than the mere sum of the effects obtained when only either the above rubber formulation or carbon black (1) is used. As a result, the use of the rubber composition in an insulation allows for the production of a tire that is excellent in the balance of durability, handling stability, and low heat build-up properties.

In the aspect 9-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 9-1 or 9-2 of the invention (particularly the effects of improving rubber strength or storage modulus) are insufficient. The lower limit of the Dmod is not particularly limited but is preferably 50 nm or more, more preferably 56 nm or more. If it is less than 50 nm, the carbon black (1) tends to have poor dispersibility, resulting in reduced rubber strength or storage modulus.

In the aspect 9-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 9-1 or 9-2 of the invention (particularly the effect of improving low heat build-up properties) are insufficient. The upper limit of the ΔD50/Dmod ratio is not particularly limited but is preferably 2.5 or less, more preferably 2.0 or less. If it is more than 2.5, rubber strength or storage modulus may deteriorate, with the result that the desired effects may not be obtained.

In the aspect 9-1 or 9-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range indicated above, the effects of the aspect 9-1 or 9-2 of the invention can be more suitably achieved.

In the aspect 9-1 or 9-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effects of improving rubber strength or storage modulus can be more suitably achieved and the effects of the aspect 9-1 or 9-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 $m^2/mg$, more preferably 0.85 to 1.15 $m^2/mg$, still more preferably 0.9 to 1.1 $m^2/mg$. When the CTAB/IA ratio falls within the range indicated above, the effects of the aspect 9-1 or 9-2 of the invention can be more suitably achieved.

In the aspect 9-1 or 9-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 9-1 or 9-2 of the invention can be more suitably achieved.

Carbon black (1) preferably has a 24M4 dibutyl phthalate oil absorption (24M4 DBP) of 50 to 120 $cm^3/100$ g, more preferably 70 to 120 $cm^3/100$ g, still more preferably 90 to 115 $cm^3/100$ g, particularly preferably 95 to 110 $cm^3/100$ g.

When the 24M4 DBP falls within the range indicated above, the effects of the aspect 9-1 or 9-2 of the invention can be more suitably achieved.

In the aspect 9-1 or 9-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the rubber strength and storage modulus of the rubber composition can be more suitably improved, and the effects of the aspect 9-1 or 9-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 9-1 or 9-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 9-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 9-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 9-1 or 9-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) is preferably 1 part by mass or more, more preferably 5 parts by mass or more, still more preferably 10 parts by mass or more, particularly preferably 15 parts by mass or more. If the amount is less than 1 part by mass, the effects of the aspect 9-1 or 9-2 of the invention tend not to be sufficiently obtained. The amount of the carbon black is also preferably 80 parts by mass or less, more preferably 70 parts by mass or less, still more preferably 40 parts by mass or less. If the amount is more than 80 parts by mass, low heat build-up properties tend not to be ensured. Moreover, the processability of the rubber composition tends to drastically decrease. Furthermore, rubber strength tends to deteriorate.

According to the aspect 9-1 or 9-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

Carbon black (2) preferably has a nitrogen adsorption specific surface area ($N_2SA$) of 80 $m^2/g$ or more, more preferably 90 $m^2/g$ or more, still more preferably 100 $m^2/g$ or more. Carbon black (2) having a $N_2SA$ of less than 80 $m^2/g$ tends to provide reduced reinforcing properties, resulting in insufficient rubber strength or storage modulus. Carbon black (2) also preferably has a $N_2SA$ of 200 $m^2/g$ or less, more preferably 180 $m^2/g$ or less, still more preferably 150 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties, rubber strength, or storage modulus.

The $N_2SA$ of carbon black in the aspect 9-1 or 9-2 of the invention is determined in accordance with JIS K 6217-2: 2001.

Carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient rubber strength or storage modulus. Carbon black (2) also preferably has a DBP of 300 ml/100 g or less, more preferably 200 ml/100 g or less, still more preferably 150 ml/100 g or less. The use of carbon black (2) having a DBP of more than 300 ml/100 g may deteriorate durability or rubber strength.

The DBP of carbon black in the aspect 9-1 or 9-2 of the invention is determined in accordance with JIS K 6217-4: 2001.

The total amount of carbon black relative to 100 parts by mass of the rubber component is 15 parts by mass or more, preferably 20 parts by mass or more. If the total amount of carbon black is less than 15 parts by mass, sufficient reinforcing properties are not obtained, and storage modulus or processability may deteriorate. Also, the total amount of carbon black is 80 parts by mass or less, preferably 60 parts by mass or less, more preferably 40 parts by mass or less. If the total amount is more than 80 parts by mass, processability may decrease, and low heat build-up properties, rubber strength, or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 9-1 or 9-2 of the invention may not be sufficiently obtained, and it may be difficult to simultaneously achieve low heat build-up properties and rubber strength or storage modulus. Although the amount of carbon black (1) may be 100% by mass, it is preferably 80% by mass or less when any other carbon black is used in combination.

The rubber composition in the aspect 9-1 or 9-2 of the invention preferably contains oil. The incorporation of oil can reduce the E* (complex modulus) while maintaining the tan δ (loss tangent) as a parameter of dynamic viscoelasticity, thus improving grip performance.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ.

When the rubber composition contains oil, the amount of oil relative to 100 parts by mass of the rubber component is preferably 1 part by mass or more. If the amount is less than 1 part by mass, the effect of softening rubber (softening effect) may be so small that the effect of lowering the E* may be reduced. The amount of oil is also preferably 15 parts by mass or less, more preferably 8 parts by mass or less, still more preferably 4 parts by mass or less. If the amount is more than 15 parts by mass, although the softening effect is sufficient, reinforcing properties may greatly decrease, resulting in reduced rubber strength, storage modulus, or durability (breaking properties). The amount of oil includes the amount of oil contained in rubber (oil extended rubber).

The rubber composition in the aspect 9-1 or 9-2 of the invention may appropriately contain, in addition to the above-described components, compounding agents commonly used in preparation of rubber compositions. Examples of the compounding agents include reinforcing fillers such as silica, clay, and talc; silane coupling agents; zinc oxide; stearic acid; processing aids; various types of antioxidants; wax; vulcanizing agents such as sulfur and sulfur-containing compounds; and vulcanization accelerators.

The rubber composition in the aspect 9-1 or 9-2 of the invention can be prepared by usual methods. Specifically, it may be prepared by kneading the components using a Banbury mixer, a kneader, an open roll mill, or other kneading machines and vulcanizing the kneadate.

The rubber composition in the aspect 9-1 or 9-2 of the invention can be suitably used in insulations.

Figure 2:
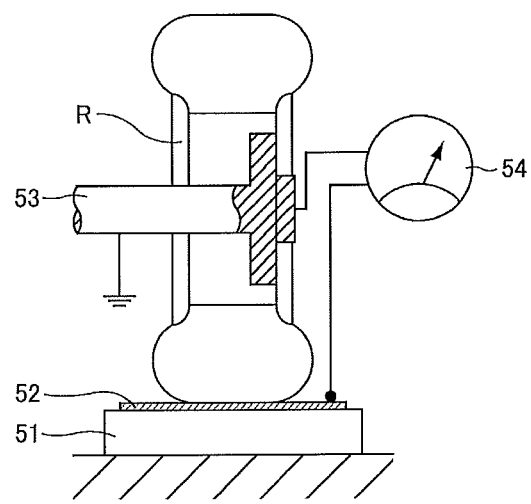
FIG. 2 is an approximate cross-sectional view conceptually showing an apparatus for measuring electrical resistance of tires.

An insulation refers to a component provided between a carcass and a component, such as a tie gum provided between an innerliner and a carcass, or an inner sidewall layer provided between a carcass and an outer sidewall layer. Specifically, the insulation is a component as shown in FIGS. 1 and 2 of JP 2008-150523 A, FIG. 1 of JP 2007-269876 A, FIGS. 1 and 2 of JP 2007-284537 A, or FIG. 1 of JP 2013-028784 A.

The pneumatic tire according to the aspect 9-1 or 9-2 of the invention can be produced from the rubber composition by usual methods.

Specifically, a rubber composition containing the above components, before vulcanization, is extruded and processed into the shape of an insulation and then assembled with other tire components on a tire building machine by a usual method to build an unvulcanized tire. The unvulcanized tire is heated and pressurized in a vulcanizer to produce a tire.

The pneumatic tire according to the aspect 9-1 or 9-2 of the invention can be suitably used for passenger vehicles, trucks and buses, or two-wheeled vehicles, or as high performance tires or other tires, and especially for passenger vehicles.

<The Aspects 10-1 and 10-2 of the Invention>

The aspect 10-1 of the invention relates to a pneumatic tire including a sidewall, the sidewall being formed from a rubber composition that contains: a rubber component including an isoprene-based rubber and a polybutadiene rubber; and one or more types of carbon black, the rubber composition containing the one or more types of carbon black in a total amount of 15 to 80 parts by mass relative to 100 parts by mass of the rubber component, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 10-2 of the invention relates to a pneumatic tire including a sidewall, the sidewall being formed from a rubber composition that contains: a rubber component including an isoprene-based rubber and a polybutadiene rubber; and one or more types of carbon black, the rubber composition containing the one or more types of carbon black in a total amount of 15 to 80 parts by mass relative to 100 parts by mass of the rubber component, at least one of the one or more types of carbon black being carbon black (1) having, as aggregate properties, a mode diameter (Dmod) of the Stokes' diameter distribution curve of 79 nm or less and a ratio ($\Delta D50/Dmod$) of the half width ($\Delta D50$) of the distribution curve to the Dmod of 0.78 or more.

According to the aspect 10-1 or 10-2 of the invention, carbon black having specific aggregate properties including a specific Dmod value or less and a specific $\Delta D50/Dmod$ ratio or higher, such as carbon black (1) produced from a feedstock oil having a specific BMCI value or less and a specific aliphatic hydrocarbon content or more, is incorporated into a rubber composition. This allows the rubber composition to have improved storage modulus while maintaining or improving low heat build-up properties. The use of such a rubber composition in a sidewall of a tire allows the tire to simultaneously achieve cut resistance and low heat build-up properties to a high extent.

The rubber component of the rubber composition in the aspect 10-1 or 10-2 of the invention includes an isoprene-based rubber and a polybutadiene rubber (BR). Thus, the effects of the aspect 10-1 or 10-2 of the invention, including improved low heat build-up properties, can be well achieved.

Examples of the isoprene-based rubber include polyisoprene rubber (IR), natural rubber (NR), and epoxidized natural rubber (ENR). NR is preferred among these because it is excellent in processability. Examples of the NR include those commonly used in the tire industry such as SIR20, RSS#3, and TSR20. The IR is not particularly limited, and those commonly used in the tire industry can be used.

The amount of the isoprene-based rubber (preferably NR) based on 100% by mass of the rubber component is preferably 30% by mass or more, more preferably 50% by mass or more, still more preferably 60% by mass or more. If the amount is less than 30% by mass, low heat build-up properties, storage modulus, or processability tends to deteriorate. The amount is also preferably 80% by mass or less, more preferably 75% by mass or less, still more preferably 70% by mass or less. If the amount is more than 80% by mass, low heat build-up properties or storage modulus tends to deteriorate.

The BR is not particularly limited. Examples include high-cis BR such as BR1220 available from Zeon Corporation and BR130B and BR150B both available from Ube Industries, Ltd. and syndiotactic polybutadiene crystal-containing BR such as VCR412 and VCR617 both available from Ube Industries, Ltd. In particular, for good storage modulus, the BR preferably has a cis content of 90% by mass or more, more preferably 95% by mass or more.

The cis content of BR can be determined by infrared absorption spectrometry.

The amount of BR based on 100% by mass of the rubber component is preferably 20% by mass or more, more preferably 25% by mass or more, still more preferably 30% by mass or more. If the amount is less than 20% by mass, low heat build-up properties or storage modulus tends to deteriorate. The amount of BR is also preferably 70% by mass or less, more preferably 55% by mass or less, still more preferably 50% by mass or less, particularly preferably 40% by mass or less. If the amount is more than 70% by mass, low heat build-up properties, storage modulus, or processability tends to deteriorate.

The combined amount of the isoprene-based rubber (preferably NR) and BR, based on 100% by mass of the rubber component, is preferably 70% by mass or more, more preferably 80% by mass or more, still more preferably 90% by mass or more, particularly preferably 100% by mass. With a combined amount of 70% by mass or more, excellent storage modulus and a higher reversion resistance effect can be obtained.

The rubber component of the rubber composition in the aspect 10-1 or 10-2 of the invention may include materials other than the isoprene-based rubber and BR, such as styrene butadiene rubber (SBR) or styrene isoprene butadiene rubber (SIBR). Each of these may be used alone, or two or more of these may be used in combination.

The carbon black (1) described above is used in the aspect 10-1 or 10-2 of the invention. The incorporation of carbon black (1) into a rubber formulation including an isoprene-based rubber and BR can improve storage modulus while maintaining or improving low heat build-up properties. Thus, storage modulus and low heat build-up properties can be simultaneously achieved to a high extent. Furthermore, the use of the above combination can produce a higher effect (synergistic effect) in improving the balance of storage modulus and low heat build-up properties than the mere sum of the effects obtained when only either the above rubber formulation or carbon black (1) is used. As a result, the use of the rubber composition in a sidewall allows the tire to simultaneously achieve cut resistance and low heat build-up properties to a high extent.

In the aspect 10-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 10-1 or 10-2 of the invention (particularly the effect of improving storage modulus) are insufficient. The lower limit of the Dmod is not particularly limited but is preferably 50 nm or more, more preferably 56 nm or more. If it is less than 50 nm, the carbon black (1) tends to have poor dispersibility, resulting in reduced storage modulus.

In the aspect 10-2 of the invention, the aggregate properties of carbon black (1) include a ratio ($\Delta$D50/Dmod) of the half width ($\Delta$D50) of the distribution curve to the Dmod of 0.78 or more, preferably 0.90 or more, more preferably 1.0 or more, still more preferably 1.1 or more. If the ratio is less than 0.78, the effects of the aspect 10-1 or 10-2 of the invention (particularly the effect of improving low heat build-up properties) are insufficient. The upper limit of the $\Delta$D50/Dmod ratio is not particularly limited but is preferably 2.5 or less, more preferably 2.0 or less. If it is more than 2.5, storage modulus may deteriorate, with the result that the desired effects may not be obtained.

In the aspect 10-1 or 10-2 of the invention, the Dmod and the $\Delta$D50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width ($\Delta$D50) of the distribution curve).

Carbon black (1) preferably has a cetyltrimethylammonium bromide adsorption specific surface area (CTAB) of 60 to 150 m$^2$/g, more preferably 80 to 145 m$^2$/g, still more preferably 100 to 140 m$^2$/g, particularly preferably 105 to 135 m$^2$/g. When the CTAB falls within the range indicated above, the effects of the aspect 10-1 or 10-2 of the invention can be more suitably achieved.

In the aspect 10-1 or 10-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving storage modulus can be more suitably achieved and the effects of the aspect 10-1 or 10-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 10-1 or 10-2 of the invention can be more suitably achieved.

In the aspect 10-1 or 10-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 10-1 or 10-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 10-1 or 10-2 of the invention can be more suitably achieved.

In the aspect 10-1 or 10-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and storage modulus of the rubber composition can be more suitably improved, and the effects of the aspect 10-1 or 10-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 10-1 or 10-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 10-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 10-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 10-1 or 10-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) is preferably 1 part by mass or more, more preferably 5 parts by mass or more, still more preferably 10 parts by mass or more, particularly preferably 15 parts by mass or more. If the amount is less than 1 part by mass, the effects of the aspect 10-1 or 10-2 of the invention tend not to be sufficiently obtained. The amount of the carbon black is also preferably 80 parts by mass or less, more preferably 70 parts by mass or less, still more preferably 40 parts by mass or less. If the amount is more than 80 parts by mass, low heat build-up properties tend not to be ensured. Moreover, the processability of the rubber composition tends to drastically decrease. Furthermore, storage modulus tends to deteriorate.

According to the aspect 10-1 or 10-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

Carbon black (2) preferably has a nitrogen adsorption specific surface area ($N_2SA$) of 5 $m^2/g$ or more, more preferably 30 $m^2/g$ or more. Carbon black (2) having a $N_2SA$ of less than 5 $m^2/g$ tends to have a small reinforcing effect, resulting in reduced storage modulus. Carbon black (2) also preferably has a $N_2SA$ of 200 $m^2/g$ or less, more preferably 180 $m^2/g$ or less, still more preferably 100 $m^2/g$ or less. Carbon black (2) having a $N_2SA$ of more than 200 $m^2/g$ tends to poorly disperse, thereby leading to an increase in hysteresis loss and a decrease in low heat build-up properties.

The $N_2SA$ of carbon black in the aspect 10-1 or 10-2 of the invention is determined in accordance with ASTM D4820-93.

Carbon black (2) preferably has a dibutyl phthalate oil absorption (DBP) of 5 ml/100 g or more, more preferably 80 ml/100 g or more. Carbon black (2) having a DBP of less than 5 ml/100 g tends to have a small reinforcing effect, resulting in reduced storage modulus. Carbon black (2) also preferably has a DBP of 300 ml/100 g or less, more preferably 180 ml/100 g or less, still more preferably 150 ml/100 g or less. Carbon black (2) having a DBP of more than 300 ml/100 g tends to poorly disperse, thereby leading to an increase in hysteresis loss and a decrease in low heat build-up properties.

The DBP of carbon black in the aspect 10-1 or 10-2 of the invention is determined in accordance with ASTM D2414-93.

The total amount of carbon black relative to 100 parts by mass of the rubber component is 15 parts by mass or more, preferably 20 parts by mass or more. If the total amount is less than 15 parts by mass, sufficient reinforcing properties may not be obtained, and storage modulus or processability may deteriorate. Also, the total amount of carbon black is 80 parts by mass or less, preferably 60 parts by mass or less, more preferably 40 parts by mass or less. If the total amount is more than 80 parts by mass, processability may decrease, and low heat build-up properties or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 10-1 or 10-2 of the invention may not be sufficiently obtained, and it may be difficult to simultaneously achieve storage modulus and low heat build-up properties. Although the amount of carbon black (1) may be 100% by mass, it is preferably 80% by mass or less when any other carbon black is used in combination.

Known additives may be used, and examples include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as silica, calcium carbonate, talc, alumina, clay, aluminum hydroxide, and mica; silane coupling agents; processing aids such as extender oils and lubricants; and antioxidants.

Examples of the extender oil include aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The polycyclic aromatic content of the extender oil is preferably less than 3% by mass, more preferably less than 1% by mass. The polycyclic aromatic content is measured in accordance with the Institute of Petroleum (IP, U.K.) 346/92 method. The aromatic hydrocarbon content (CA) of the extender oil is preferably 20% by mass or more. Two or more of these extender oils may be used in combination.

The amount of the extender oil relative to 100 parts by mass of the rubber component is preferably 1 part by mass or more, more preferably 3 parts by mass or more. The amount is also preferably 20 parts by mass or less, more preferably 10 parts by mass or less. When the amount of the extender oil falls within the range indicated above, the effects of the aspect 10-1 or 10-2 of the invention can be better achieved.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount of the vulcanization accelerator is preferably 0.1 to 5 parts by mass, more preferably 0.2 to 3 parts by mass, relative to 100 parts by mass of the rubber component.

The rubber composition in the aspect 10-1 or 10-2 of the invention can be prepared by usual methods. Specifically, it may be prepared by kneading the components using a Banbury mixer, a kneader, an open roll mill, or other kneading machines and vulcanizing the kneadate.

The rubber composition in the aspect 10-1 or 10-2 of the invention can be suitably used in sidewalls.

The pneumatic tire according to the aspect 10-1 or 10-2 of the invention can be produced from the rubber composition by usual methods.

Specifically, a rubber composition containing the above components, before vulcanization, is extruded and processed into the shape of a sidewall and then assembled with other tire components on a tire building machine by a usual method to build an unvulcanized tire. The unvulcanized tire is heated and pressurized in a vulcanizer to produce a tire.

The pneumatic tire according to the aspect 10-1 or 10-2 of the invention can be suitably used for passenger vehicles, trucks and buses (heavy duty vehicles), or two-wheeled vehicles, or as high performance tires or other tires.

<The Aspects 11-1 and 11-2 of the Invention>

The aspect 11-1 of the invention relates to a rubber composition containing a wet masterbatch, the wet masterbatch being obtained by mixing a rubber latex and a dispersion of one or more types of carbon black, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 11-2 of the invention relates to a rubber composition containing a wet masterbatch, the wet masterbatch being obtained by mixing a rubber latex and a dispersion of one or more types of carbon black, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 11-1 or 11-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition. This allows the rubber composition to have improved abrasion resistance while maintaining or improving good low heat build-up properties. Thus, abrasion resistance and low heat build-up properties can be simultaneously achieved to a high extent. Furthermore, in the aspect 11-1 or 11-2 of the invention, the specific carbon black incorporated into a rubber composition is in the form of a wet masterbatch obtained by mixing a rubber latex and a carbon black dispersion. This can synergistically improve abrasion resistance and low heat build-up properties. Thus, abrasion resistance and low heat build-up properties can be significantly improved.

Particularly when the wet masterbatch is prepared using a styrene butadiene rubber (SBR) latex as the rubber latex, the above-described properties can be significantly improved as compared to when it is prepared by dry mixing. This is presumably because SBR, which contains styrene groups and has an electron-withdrawing effect on carbon graphite, easily incorporates carbon black by nature.

[Wet Masterbatch]

The wet masterbatch in the aspect 11-1 or 11-2 of the invention can be prepared by any method. For example, it may be prepared by mixing a rubber latex and a dispersion of carbon black (1) and then coagulating and drying the mixture.

(Rubber Latex)

Any rubber latex may be used, including natural rubber (NR) latex, and synthetic diene rubber latexes such as latexes of polybutadiene rubber (BR), styrene butadiene rubber, styrene isoprene butadiene rubber (SIBR), acrylonitrile butadiene rubber, ethylene vinyl acetate rubber, chloroprene rubber, vinyl pyridine rubber, butyl rubber, or other rubbers. Commercial products may also be used. Each of these may be used alone, or two or more of these may be used in combination. In order to more suitably achieve the effects of the aspect 11-1 or 11-2 of the invention, a SBR latex or latexes of isoprene-based rubbers such as NR, epoxidized natural rubber (ENR), or polyisoprene rubber (IR) are preferred among these, with SBR latex being more preferred.

The SBR in the SBR latex preferably has a vinyl content of 5% by mass or more, more preferably 15% by mass or more. With a vinyl content of less than 5% by mass, low heat build-up properties tend to deteriorate. The vinyl content is preferably 50% by mass or less, more preferably 25% by mass or less. With a vinyl content of more than 50% by mass, abrasion resistance tends to decrease.

The vinyl content of SBR can be determined by infrared absorption spectrometry.

The SBR in the SBR latex preferably has a styrene content of 20% by mass or more, more preferably 30% by mass or more. With a styrene content of less than 20% by mass, abrasion resistance tends to decrease. The styrene content is preferably 60% by mass or less, more preferably 45% by mass or less. With a styrene content of more than 60% by mass, the rubber tends to become hard at low temperatures and easily cause brittle fracture, and also tends to exhibit higher heat build-up leading to deterioration of low heat build-up properties.

The styrene content of SBR is determined by $^1$H-NMR analysis.

The concentration of the rubber component (rubber solids) in the SBR latex is not particularly limited. In view of uniform dispersion in the rubber latex, the concentration in the rubber latex (100% by mass) is preferably 20 to 80% by mass, more preferably 30 to 60% by mass.

(Carbon Black Dispersion)

The carbon black dispersion in the aspect 11-1 or 11-2 of the invention is a dispersion in which carbon black (1) is dispersed. Specifically, it may be, for example, a dispersion in which carbon black (1) is dispersed in an aqueous medium. With the use of the dispersion, the polymer (rubber molecules) and the carbon black can be mixed in the liquid state, thereby providing good dispersion of the carbon black.

First, carbon black (1) will be described.

In the aspect 11-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 11-1 or 11-2 of the invention (particularly the effect of improving abrasion resistance) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or abrasion resistance.

In the aspect 11-2 of the invention, the aggregate properties of carbon black (1) include a ratio (ΔD50/Dmod) of the half width (ΔD50) of the distribution curve to the Dmod of 0.78 or more, preferably 0.90 or more, more preferably 1.0 or more, still more preferably 1.1 or more. If the ratio is less than 0.78, the effects of the aspect 11-1 or 11-2 of the invention (particularly the effect of improving low heat build-up properties) are insufficient. The upper limit of the ΔD50/Dmod ratio is not particularly limited but is preferably 2.5 or less, more preferably 2.0 or less. If it is more than 2.5, abrasion resistance may deteriorate, with the result that the desired effects may not be obtained.

In the aspect 11-1 or 11-2 of the invention, the Dmod and the ΔD50 of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width (ΔD50) of the distribution curve).

Carbon black (1) preferably has a cetyltrimethylammonium bromide adsorption specific surface area (CTAB) of 60 to 150 m$^2$/g, more preferably 80 to 145 m$^2$/g, still more preferably 100 to 140 m$^2$/g, particularly preferably 105 to 135 m$^2$/g. When the CTAB falls within the range indicated above, the effects of the aspect 11-1 or 11-2 of the invention can be more suitably achieved.

In the aspect 11-1 or 11-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving abrasion resistance can be more suitably achieved and the effects of the aspect 11-1 or 11-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 m$^2$/mg, more preferably 0.85 to 1.15 m$^2$/mg, still more preferably 0.9 to 1.1 m$^2$/mg. When the CTAB/IA ratio falls within the range indicated above, the effects of the aspect 11-1 or 11-2 of the invention can be more suitably achieved.

In the aspect 11-1 or 11-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 11-1 or 11-2 of the invention can be more suitably achieved.

Carbon black (1) preferably has a 24M4 dibutyl phthalate oil absorption (24M4 DBP) of 50 to 120 cm$^3$/100 g, more preferably 70 to 120 cm$^3$/100 g, still more preferably 90 to 115 cm$^3$/100 g, particularly preferably 95 to 110 cm$^3$/100 g. When the 24M4 DBP falls within the range indicated above, the effects of the aspect 11-1 or 11-2 of the invention can be more suitably achieved.

In the aspect 11-1 or 11-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and abrasion resistance of the rubber composition can be more suitably improved, and the effects of the aspect 11-1 or 11-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 11-1 or 11-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 11-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 11-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 11-1 or 11-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

We now return to the description of the method for preparing a wet masterbatch.

Examples of the aqueous medium include water and alcohol. Water is preferred among these.

The carbon black dispersion can be prepared by known methods, e.g. using, for example, a high-pressure homogenizer, an ultrasonic homogenizer, or a colloid mill. Specifically, the dispersion may be prepared by adding carbon black to an aqueous medium placed in a colloid mill with stirring, and then circulating the mixture, optionally together with a surfactant, using a homogenizer. The filler concentration in the dispersion (100% by mass) is not particularly limited but is preferably 0.5 to 10% by mass, more preferably 3 to 7% by mass, for uniform dispersion in the dispersion.

As described in the method for preparing the dispersion, a surfactant may appropriately be added to the carbon black dispersion for dispersion. Any surfactant may be used, including known appropriate anionic, nonionic, or amphoteric surfactants. The amount of the surfactant to be added to the dispersion (100% by mass) is not particularly limited but is preferably 0.01% to 3% by mass, more preferably 0.05% to 1% by mass, for uniform filler dispersion in the dispersion.

Carbon black other than carbon black (1) (hereinafter, also referred to as carbon black (2)) may be added together with carbon black (1) to the carbon black dispersion. Alternatively, a dispersion of carbon black (2) may be prepared separately from the dispersion of carbon black (1).

Non-limiting examples of carbon black (2) include GPF, FEF, HAF, ISAF, and SAF.

In the case of the rubber composition according to the aspect 11-1 or 11-2 of the invention being used as a rubber composition for treads, carbon black (2) preferably has a nitrogen adsorption specific surface area ($N_2SA$) of 80 $m^2/g$ or more, more preferably 90 $m^2/g$ or more, still more preferably 100 $m^2/g$ or more. Carbon black (2) having a $N_2SA$ of less than 80 $m^2/g$ tends to provide reduced reinforcing properties, resulting in insufficient abrasion resistance. Carbon black (2) also preferably has a $N_2SA$ of 200 $m^2/g$ or less, more preferably 190 $m^2/g$ or less, still more preferably 180 $m^2/g$ or less. The use of carbon black (2) having a $N_2SA$ of more than 200 $m^2/g$ tends to deteriorate low heat build-up properties. Furthermore, such a carbon black (2) tends to have poor dispersibility, resulting in reduced breaking properties or abrasion resistance.

The $N_2SA$ of carbon black in the aspect 11-1 or 11-2 of the invention is determined in accordance with JIS K 6217-2:2001.

In the case of the rubber composition according to the aspect 11-1 or 11-2 of the invention being used as a rubber composition for treads, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient abrasion resistance. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 11-1 or 11-2 of the invention is determined in accordance with JIS K 6217-4:2001.

In the case of the rubber composition according to the aspect 11-1 or 11-2 of the invention being used as a rubber composition for sidewalls, carcasses, or clinches, carbon black (2) preferably has a nitrogen adsorption specific surface area ($N_2SA$) of 20 $m^2/g$ or more, more preferably 30 $m^2/g$ or more. Carbon black (2) having a $N_2SA$ of less than 20 $m^2/g$ tends to provide reduced reinforcing properties, resulting in insufficient durability. Carbon black (2) also preferably has a $N_2SA$ of 110 $m^2/g$ or less, more preferably 100 $m^2/g$ or less. The use of carbon black (2) having a $N_2SA$ of more than 110 $m^2/g$ tends to deteriorate low heat build-up properties.

In the case of the rubber composition according to the aspect 11-1 or 11-2 of the invention being used as a rubber composition for sidewalls, carcasses, or clinches, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient durability. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or fatigue resistance.

(Softener)

In the preparation of a wet masterbatch, a softener may further be incorporated as needed. The incorporation of a softener allows the effects of the aspect 11-1 or 11-2 of the invention to be better achieved.

Examples of the softener include oils, C5 petroleum resins, and C9 petroleum resins. Oils are preferred among these.

Examples of the oil for improving rubber processability (e.g. a softening effect, a compounding agent-dispersing effect, and a lubrication effect between polymer chains) include petroleum oils. Specific examples include paraffinic process oils, naphthenic process oils, aromatic process oils, as well as aromatic oil alternatives such as treated distillate aromatic extracts (TDAE) and solvent residue aromatic extracts (SRAE), and mild extraction solvates (MES). Among these, aromatic process oils are preferred.

Examples of the C5 petroleum resin include aliphatic petroleum resins made mainly from olefins or diolefins in C5 fraction obtained by naphtha cracking. Examples of the C9 petroleum resin include aromatic petroleum resins made mainly from vinyltoluene, indene, or methylindene in C9 fraction obtained by naphtha cracking.

The C5 or C9 petroleum resin preferably has a softening point of 50° C. or higher, more preferably 80° or higher. The softening point is also preferably 150° or lower, more preferably 130° or lower. When the softening point falls within the range indicated above, the effects of the aspect 11-1 or 11-2 of the invention can be better achieved.

(Mixing)

As described above, the wet masterbatch can be prepared, for example, by mixing the rubber latex and the carbon black dispersion, and optionally a softener, and then coagulating and drying the mixture. The rubber latex, the carbon black dispersion, and the optional softener may be mixed by any method, including known methods. For example, it may be carried out by dropwise adding the carbon black dispersion and the softener to the rubber latex placed in a blender mill with stirring, or by dropwise adding the rubber latex to the carbon black dispersion and the softener with stirring. Alternatively, it may be carried out by mixing a rubber latex stream, a carbon black dispersion stream, and an optional softener at a certain flow rate ratio through vigorous stirring by hydraulic means.

(Coagulation)

After the mixing step, coagulation is usually performed. The coagulation step is usually carried out by addition of a coagulant such as an acidic compound, e.g. formic acid or sulfuric acid, or sodium chloride. Coagulation may be accomplished by the above mixing, and in this case no coagulant is necessary.

(Drying)

After the coagulation, usually the resulting coagulum is recovered, dehydrated by centrifugation or other means, and then washed and dried to obtain the wet masterbatch. The drying may be carried out using, for example, a vacuum dryer, an air dryer, a drum dryer, a band dryer, a hot-air dryer, or a kiln dryer.

(Composition of Wet Masterbatch)

In the wet masterbatch, the amount of SBR based on 100% by mass of the rubber component in the wet masterbatch is preferably 40% by mass or more, more preferably 60% by mass or more, still more preferably 80% by mass or more, particularly preferably 100% by mass. With such a wet masterbatch, the effects of the aspect 11-1 or 11-2 of the invention can be more suitably achieved.

In the wet masterbatch, the amount of carbon black (1) relative to 100 parts by mass of the rubber component in the wet masterbatch is preferably 1 to 200 parts by mass. If the amount of carbon black (1) is less than 1 part by mass, the effects of the aspect 11-1 or 11-2 of the invention tend not to be sufficiently obtained. If the amount of carbon black (1) is more than 200 parts by mass, processability may decrease, and low heat build-up properties, abrasion resistance, or durability may decrease. The lower limit of the amount is more preferably 5 parts by mass or more, still more preferably 10 parts by mass or more, particularly preferably 20 parts by mass or more. The upper limit is more preferably 150 parts by mass or less, still more preferably 100 parts by mass or less, particularly preferably 70 parts by mass or less.

In the wet masterbatch, the total amount of carbon black is preferably 1 to 200 parts by mass relative to 100 parts by mass of the rubber component in the wet masterbatch. If the total amount of carbon black is less than 1 part by mass, sufficient reinforcing properties may not be obtained. If the total amount of carbon black is more than 200 parts by mass, processability may decrease, and low heat build-up properties, abrasion resistance, or durability may decrease. The lower limit of the total amount is more preferably 5 parts by mass or more, still more preferably 10 parts by mass or more, particularly preferably 20 parts by mass or more. The upper limit is more preferably 150 parts by mass or less, still more preferably 100 parts by mass or less, particularly preferably 70 parts by mass or less.

The amount of carbon black (1) based on 100% by mass of the total carbon black in the wet masterbatch is preferably 1% by mass or more, more preferably 5% by mass or more, still more preferably 10% by mass or more, particularly preferably 20% by mass or more. If the amount is less than 1% by mass, the effects of the aspect 11-1 or 11-2 of the invention may not be sufficiently obtained, and it may be difficult to simultaneously achieve abrasion resistance and low heat build-up properties. Although the amount of carbon black (1) may be 100% by mass, it is preferably 80% by mass or less when any other carbon black is used in combination.

The wet masterbatch preferably contains a softener in an amount of 1 to 50 parts by mass, more preferably 3 to 40 parts by mass, relative to 100 parts by mass of the rubber component in the wet masterbatch. When the amount falls within the range indicated above, the effects of the aspect 11-1 or 11-2 of the invention can be better achieved.

[Rubber Composition]

The rubber composition for tires according to the aspect 11-1 or 11-2 of the invention contains the wet masterbatch. The amount of the wet masterbatch based on 100% by mass of the rubber composition for tires is preferably 10% by mass or more, more preferably 20% by mass or more. The upper limit of the amount of the wet masterbatch is preferably 90% by mass or less, more preferably 80% by mass or less. With such an amount of the wet masterbatch, the effects of the aspect 11-1 or 11-2 of the invention can be better achieved.

The rubber composition according to the aspect 11-1 or 11-2 of the invention may optionally contain a further rubber component in addition to the rubber component contained in the wet masterbatch. Examples of materials which can be used as the rubber component include diene rubbers such as NR, IR, BR, SBR, and SIBR. The rubber component may be a single material or a combination of two or more materials. For a balanced improvement in abrasion resistance and low heat build-up properties in the use for tires, BR is preferred among these as the rubber component incorporated in addition to the wet masterbatch. Furthermore, since SBR is preferred as the rubber component used in the wet masterbatch as mentioned above, a combination of SBR and BR is preferably used in the aspect 11-1 or 11-2 of the invention.

The amount of SBR based on 100% by mass of the rubber component contained in the rubber composition according to the aspect 11-1 or 11-2 of the invention is preferably 50% by mass or more, more preferably 60% by mass or more. If the amount is less than 50% by mass, sufficient low heat build-up properties may not be obtained. The amount of SBR is preferably 90% by mass or less, more preferably 80% by mass or less. If the amount is more than 90% by mass, the amount of BR may be reduced so that sufficient abrasion resistance may not be obtained.

The BR is not particularly limited. Examples include high-cis BR such as BR1220 available from Zeon Corporation and BR130B and BR150B both available from Ube Industries, Ltd. and syndiotactic polybutadiene crystal-containing BR such as VCR412 and VCR617 both available from Ube Industries, Ltd. In particular, for good abrasion resistance, the BR preferably has a cis content of 90% by mass or more.

The amount of BR based on 100% by mass of the rubber component contained in the rubber composition according to the aspect 11-1 or 11-2 of the invention is preferably 10% by mass or more, more preferably 20% by mass or more. If the amount is less than 10% by mass, sufficient abrasion resistance may not be obtained. The amount of BR is preferably 50% by mass or less, more preferably 40% by mass or less. If the amount is more than 50% by mass, the amount of SBR may be reduced so that sufficient low heat build-up properties may not be obtained.

The combined amount of SBR and BR based on 100% by mass of the rubber component contained in the rubber composition according to the aspect 11-1 or 11-2 of the invention is preferably 60% by mass or more, more preferably 80% by mass or more, and may be 100% by mass. When the combined amount of SBR and BR falls within the range indicated above, the effects of the aspect 11-1 or 11-2 of the invention can be more suitably achieved.

In order to more suitably achieve the effects of the aspect 11-1 or 11-2 of the invention, the amount of SBR incorporated in the form of a wet masterbatch is preferably 40% by mass or more, more preferably 50% by mass or more, still more preferably 60% by mass or more, furthermore preferably 80% by mass or more, particularly preferably 100% by mass, based on 100% by mass of the total SBR in the rubber composition according to the aspect 11-1 or 11-2 of the invention.

In order to more suitably achieve the effects of the aspect 11-1 or 11-2 of the invention, the amount of the rubber component incorporated in the form of a wet masterbatch is preferably 30% by mass or more, more preferably 50% by mass or more, still more preferably 60% by mass or more, based on 100% by mass of the total rubber component in the rubber composition according to the aspect 11-1 or 11-2 of the invention. The upper limit of the amount is not particularly limited but is preferably 90% by mass or less, more preferably 80% by mass or less, in order to add another rubber component separately from the wet masterbatch to provide smooth kneading of other compounding agents.

In addition to the carbon black contained in the wet masterbatch, the rubber composition according to the aspect 11-1 or 11-2 of the invention may further contain carbon black such as carbon black (1) or carbon black (2) as needed.

The amount of carbon black (1) contained in the rubber composition according to the aspect 11-1 or 11-2 of the invention, relative to 100 parts by mass of the rubber component, is preferably 1 part by mass or more, more preferably 5 parts by mass or more, still more preferably 10 parts by mass or more, particularly preferably 20 parts by mass or more. If the amount is less than 1 part by mass, the effects of the aspect 11-1 or 11-2 of the invention tend not to be sufficiently obtained. The amount of the carbon black relative to 100 parts by mass of the rubber component is also preferably 250 parts by mass or less, more preferably 200 parts by mass or less, still more preferably 150 parts by mass or less, particularly preferably 100 parts by mass or less, most preferably 70 parts by mass or less. If the amount is more than 250 parts by mass, the resulting rubber composition tends to be too hard, adversely leading to reduced abrasion resistance. Moreover, the processability of the rubber composition tends to drastically decrease. Furthermore, low heat build-up properties tend to deteriorate.

The total amount of carbon black contained in the rubber composition according to the aspect 11-1 or 11-2 of the invention, relative to 100 parts by mass of the rubber component, is preferably 1 part by mass or more, more preferably 5 parts by mass or more, still more preferably 10 parts by mass or more, particularly preferably 20 parts by mass or more. If the total amount is less than 1 part by mass, sufficient reinforcing properties may not be obtained. The total amount of carbon black is also preferably 250 parts by mass or less, more preferably 200 parts by mass or less, still more preferably 150 parts by mass or less, particularly preferably 100 parts by mass or less, most preferably 70 parts by mass or less. If the total amount is more than 250 parts by mass, processability may decrease, and low heat build-up properties, abrasion resistance, or durability may decrease.

The amount of carbon black (1) based on 100% by mass of the total carbon black in the rubber composition according to the aspect 11-1 or 11-2 of the invention is preferably 1% by mass or more, more preferably 5% by mass or more, still more preferably 10% by mass or more, particularly preferably 20% by mass or more. If the amount is less than 1% by mass, the effects of the aspect 11-1 or 11-2 of the invention may not be sufficiently obtained, and it may be difficult to simultaneously achieve abrasion resistance and low heat build-up properties. Although the amount of carbon black (1) may be 100% by mass, it is preferably 80% by mass or less when any other carbon black is used in combination.

In order to more suitably achieve the effects of the aspect 11-1 or 11-2 of the invention, the amount of carbon black (1) incorporated in the form of a wet masterbatch is preferably 40% by mass or more, more preferably 50% by mass or more, still more preferably 60% by mass or more, based on 100% by mass of the total carbon black (1) in the rubber composition according to the aspect 11-1 or 11-2 of the invention. The upper limit of the amount is not particularly limited but is preferably 90% by mass or less, more preferably 80% by mass or less, in order to add another carbon black separately from the wet masterbatch to provide smooth kneading of other compounding agents.

Similarly, in order to more suitably achieve the effects of the aspect 11-1 or 11-2 of the invention, the amount of carbon black incorporated in the form of a wet masterbatch is preferably 40% by mass or more, more preferably 50% by mass or more, still more preferably 60% by mass or more, based on 100% by mass of the total carbon black in the rubber composition according to the aspect 11-1 or 11-2 of the invention. The upper limit of the amount is not particularly limited but, for the same reason as mentioned above, it is preferably 90% by mass or less, more preferably 80% by mass or less.

The rubber composition according to the aspect 11-1 or 11-2 of the invention may optionally further contain a softener as described above in addition to the softener contained in the wet masterbatch.

The total amount of softeners contained in the rubber composition according to the aspect 11-1 or 11-2 of the invention, relative to 100 parts by mass of the rubber component, is preferably 1 part by mass or more, more preferably 5 parts by mass or more. The total amount is also preferably 50 parts by mass or less, more preferably 40 parts by mass or less. When the total amount falls within the range indicated above, the effects of the aspect 11-1 or 11-2 of the invention can be better achieved.

In order to more suitably achieve the effects of the aspect 11-1 or 11-2 of the invention, the amount of the softener incorporated in the form of a wet masterbatch is preferably 40% by mass or more, more preferably 50% by mass or more, still more preferably 60% by mass or more, based on 100% by mass of the total softener in the rubber composition according to the aspect 11-1 or 11-2 of the invention. The upper limit of the amount is not particularly limited but is preferably 90% by mass or less, more preferably 80% by mass or less, in order to accelerate incorporation of carbon black into rubber when another carbon black is mixed separately from the wet masterbatch.

The rubber composition according to the aspect 11-1 or 11-2 of the invention may appropriately contain, in addition to the above-described components, compounding agents commonly used in preparation of rubber compositions. Examples of the compounding agents include reinforcing fillers such as silica, clay, and talc; silane coupling agents; zinc oxide; stearic acid; processing aids; various types of antioxidants; wax; vulcanizing agents such as sulfur and sulfur-containing compounds; and vulcanization accelerators.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the aspect 11-1 or 11-2 of the invention, sulfenamide vulcanization accelerators are preferred among these, with N-t-butyl-2-benzothiazolesulfenamide being more preferred. The amount of the vulcanization accelerator is preferably 0.1 to 7 parts by mass, more preferably 0.5 to 5 parts by mass, relative to 100 parts by mass of the rubber component.

The vulcanizing agent is not particularly limited but sulfur can be suitably used. The amount of sulfur relative to 100 parts by mass of the rubber component is preferably 0.5 to 5 parts by mass, more preferably 1 to 3 parts by mass. With such an amount of sulfur, the effects of the aspect 11-1 or 11-2 of the invention can be more suitably achieved.

The rubber composition according to the aspect 11-1 or 11-2 of the invention can be prepared by usual methods. Specifically, it may be prepared by kneading the wet masterbatch and other components using a Banbury mixer, a kneader, an open roll mill, or other kneading machines and vulcanizing the kneadate.

The rubber composition according to the aspect 11-1 or 11-2 of the invention can be suitably used as a rubber composition for tires. The rubber composition according to the aspect 11-1 or 11-2 of the invention can be used in various tire components, and suitable especially for, for example, treads, sidewalls, carcasses, or clinches, and particularly for treads.

The pneumatic tire in the aspect 11-1 or 11-2 of the invention can be produced from the rubber composition by usual methods.

Specifically, a rubber composition containing the above components, before vulcanization, is extruded and processed into the shape of a tire component such as a tread and then assembled with other tire components on a tire building machine by a usual method to build an unvulcanized tire. The unvulcanized tire is heated and pressurized in a vulcanizer to produce a tire.

The pneumatic tire in the aspect 11-1 or 11-2 of the invention can be suitably used for passenger vehicles, trucks and buses, or two-wheeled vehicles, or as high performance tires or other tires, and especially as high performance tires. The pneumatic tire obtained according to the aspect 11-1 or 11-2 of the invention has excellent grip performance on dry roads.

High performance tires in the aspect 11-1 or 11-2 of the invention are excellent especially in grip performance on dry roads and conceptually encompass racing tires used for racing vehicles.

<The Aspects 12-1 and 12-2 of the Invention>

The aspect 12-1 of the invention relates to a pneumatic tire including a rubberized tire cord component, the rubberized tire cord component being formed from a rubber composition that contains a wet masterbatch, the wet masterbatch being obtained by mixing a rubber latex and a dispersion of one or more types of carbon black, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 12-2 of the invention relates to a pneumatic tire including a rubberized tire cord component, the rubberized tire cord component being formed from a rubber composition that contains a wet masterbatch, the wet masterbatch being obtained by mixing a rubber latex and a dispersion of one or more types of carbon black, at least one of the one or more types of carbon black being carbon black (1) having, as aggregate properties, a mode diameter (Dmod) of the Stokes' diameter distribution curve of 79 nm or less and a ratio ($\Delta$D50/Dmod) of the half width ($\Delta$D50) of the distribution curve to the Dmod of 0.78 or more.

According to the aspect 12-1 or 12-2 of the invention, carbon black having specific aggregate properties including a specific Dmod value or less and a specific $\Delta$D50/Dmod ratio or higher, such as carbon black (1) produced from a feedstock oil having a specific BMCI value or less and a specific aliphatic hydrocarbon content or more, is incorporated into a rubber composition. This allows the rubber composition to have improved breaking properties while maintaining or improving good low heat build-up properties. Thus, breaking properties and low heat build-up properties can be simultaneously achieved to a high extent. Furthermore, in the aspect 12-1 or 12-2 of the invention, the specific carbon black incorporated into a rubber composition is in the form of a wet masterbatch obtained by mixing a rubber latex and a carbon black dispersion. This can synergistically improve conductivity and low heat build-up properties. Thus, conductivity and low heat build-up properties can be improved while maintaining or improving good breaking properties. The above allows for the production of a pneumatic tire that shows a balanced improvement in breaking properties and low heat build-up properties while having excellent conductivity.

Particularly when the wet masterbatch is prepared using a styrene butadiene rubber (SBR) latex as the rubber latex, the above-described properties can be significantly improved as compared to when it is prepared by dry mixing. SBR, which contains styrene groups and has an electron-withdrawing effect on carbon graphite, easily incorporates carbon black by nature. For this reason, if a wet masterbatch previously prepared from a SBR latex and carbon black (1) is used in an incompatible rubber formulation including natural rubber (NR) and SBR, the SBR phase selectively incorporating carbon black (1) forms a conductive path, thereby providing high conductivity.

[Wet Masterbatch]

The wet masterbatch in the aspect 12-1 or 12-2 of the invention can be prepared by any method. For example, it may be prepared by mixing a rubber latex and a dispersion of carbon black (1) and then coagulating and drying the mixture.

(Rubber Latex)

Any rubber latex may be used, including natural rubber latex, and synthetic diene rubber latexes such as latexes of polybutadiene rubber (BR), styrene butadiene rubber, styrene isoprene butadiene rubber (SIBR), acrylonitrile butadiene rubber, ethylene vinyl acetate rubber, chloroprene rubber, vinyl pyridine rubber, butyl rubber, or other rubbers. Commercial products may also be used. Each of these may be used alone, or two or more of these may be used in combination. Among these, a SBR latex or latexes of isoprene-based rubbers such as NR, epoxidized natural rubber (ENR), or polyisoprene rubber (IR) are preferred because they are excellent in breaking properties, low heat build-up properties, adhesion to cords, and other properties. The rubber component of the wet masterbatch more preferably includes at least a SBR latex because it is incompatible with isoprene-based rubbers.

The SBR in the SBR latex preferably has a vinyl content of 5% by mass or more, more preferably 15% by mass or more. With a vinyl content of less than 5% by mass, low heat build-up properties tend to deteriorate. The vinyl content is preferably 50% by mass or less, more preferably 25% by mass or less. With a vinyl content of more than 50% by mass, breaking properties tend to decrease.

The vinyl content of SBR can be determined by infrared absorption spectrometry.

The SBR in the SBR latex preferably has a styrene content of 20% by mass or more, more preferably 30% by mass or more. With a styrene content of less than 20% by mass, breaking properties tend to decrease. The styrene content is preferably 60% by mass or less, more preferably 45% by mass or less. With a styrene content of more than 60% by mass, the rubber tends to become hard at low temperatures and easily cause brittle fracture, and also tends to exhibit higher heat build-up leading to deterioration of low heat build-up properties.

The styrene content of SBR is determined by $^1$H-NMR analysis.

The concentration of the rubber component (rubber solids) in the SBR latex is not particularly limited. For uniform dispersion in the rubber latex, the concentration in the rubber latex (100% by mass) is preferably 20 to 80% by mass, more preferably 30 to 60% by mass.

(Carbon Black Dispersion)

The carbon black dispersion in the aspect 12-1 or 12-2 of the invention is a dispersion in which carbon black (1) is dispersed. Specifically, it may be, for example, a dispersion in which carbon black (1) is dispersed in an aqueous medium. With the use of the dispersion, the polymer (rubber molecules) and the carbon black can be mixed in the liquid state, thereby providing good dispersion of the carbon black.

First, carbon black (1) will be described.

In the aspect 12-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 12-1 or 12-2 of the invention (particularly the effect of improving breaking properties) are insufficient. The lower limit of the Dmod is not particularly limited but is preferably 50 nm or more, more preferably 56 nm or more. If it is less than 50 nm, the carbon black (1) tends to have poor dispersibility, resulting in reduced breaking properties or tensile properties at break.

In the aspect 12-2 of the invention, the aggregate properties of carbon black (1) include a ratio ($\Delta D50$/Dmod) of the half width ($\Delta D50$) of the distribution curve to the Dmod of 0.78 or more, preferably 0.90 or more, more preferably 1.0 or more, still more preferably 1.1 or more. If the ratio is less than 0.78, the effects of the aspect 12-1 or 12-2 of the invention (particularly the effect of improving low heat build-up properties) are insufficient. The upper limit of the $\Delta D50$/Dmod ratio is not particularly limited but is preferably 2.5 or less, more preferably 2.0 or less. If it is more than 2.5, breaking properties may deteriorate, with the result that the desired effects may not be obtained.

In the aspect 12-1 or 12-2 of the invention, the Dmod and the $\Delta D50$ of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width ($\Delta D50$) of the distribution curve).

Carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range indicated above, the effects of the aspect 12-1 or 12-2 of the invention can be more suitably achieved.

In the aspect 12-1 or 12-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving breaking properties can be more suitably achieved and the effects of the aspect 12-1 or 12-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 $m^2/mg$, more preferably 0.85 to 1.15 $m^2/mg$, still more preferably 0.9 to 1.1 $m^2/mg$. When the CTAB/IA ratio falls within the range indicated above, the effects of the aspect 12-1 or 12-2 of the invention can be more suitably achieved.

In the aspect 12-1 or 12-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 12-1 or 12-2 of the invention can be more suitably achieved.

Carbon black (1) preferably has a 24M4 dibutyl phthalate oil absorption (24M4 DBP) of 50 to 120 $cm^3/100$ g, more preferably 70 to 120 $cm^3/100$ g, still more preferably 90 to 115 $cm^3/100$ g, particularly preferably 95 to 110 $cm^3/100$ g. When the 24M4 DBP falls within the range indicated above, the effects of the aspect 12-1 or 12-2 of the invention can be more suitably achieved.

In the aspect 12-1 or 12-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and breaking properties of the rubber composition can be more suitably improved, and the effects of the aspect 12-1 or 12-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 12-1 or 12-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 12-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 95 or more. If it is less than 95, a poor yield (insufficient amount of carbon black) may be obtained.

In the aspect 12-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 12-1 or 12-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 8000° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

We now return to the description of the method for preparing a wet masterbatch.

Examples of the aqueous medium include water and alcohol. Water is preferred among these.

The carbon black dispersion can be prepared by known methods, e.g. using, for example, a high-pressure homogenizer, an ultrasonic homogenizer, or a colloid mill. Specifically, the dispersion may be prepared by adding carbon black to an aqueous medium placed in a colloid mill with stirring, and then circulating the mixture, optionally together with a surfactant, using a homogenizer. The filler concentration in the dispersion (100% by mass) is not particularly limited but is preferably 0.5 to 10% by mass, more preferably 3 to 7% by mass, for uniform dispersion in the dispersion.

As described in the method for preparing the dispersion, a surfactant may appropriately be added to the carbon black dispersion for dispersion. Any surfactant may be used, including known appropriate anionic, nonionic, or amphoteric surfactants. The amount of the surfactant to be added to the dispersion (100% by mass) is not particularly limited but is preferably 0.01% to 3% by mass, more preferably 0.05% to 1% by mass, for uniform filler dispersion in the dispersion.

The carbon black dispersion may contain carbon black other than carbon black (1) (hereinafter, also referred to as carbon black (2)) together with carbon black (1). In this case, the effects of the aspect 12-1 or 12-2 of the invention can be more suitably achieved. Alternatively, a dispersion of carbon black (2) may be prepared separately from the dispersion of carbon black (1). When a dispersion of carbon black (2) is prepared separately from the dispersion of carbon black (1), it may be prepared in the same manner as the dispersion of carbon black (1).

Non-limiting examples of carbon black (2) include GPF, FEF, HAF, ISAF, and SAF.

Carbon black (2) preferably has a nitrogen adsorption specific surface area ($N_2SA$) of 20 $m^2/g$ or more, more preferably 50 $m^2/g$ or more. Carbon black (2) having a $N_2SA$ of less than 20 $m^2/g$ tends to provide reduced reinforcing properties, resulting in reduced breaking properties. Also, the $N_2SA$ is 110 $m^2/g$ or less, preferably 100 $m^2/g$ or less, more preferably 90 $m^2/g$ or less. The use of carbon black (2) having a $N_2SA$ of more than 110 $m^2/g$ tends to deteriorate low heat build-up properties. Furthermore, such a carbon black (2) tends to have poor dispersibility, resulting in reduced breaking properties or durability.

Carbon black (2) has a dibutyl phthalate (DBP) oil absorption of 60 ml/100 g or more, preferably 70 ml/100 g or more. Carbon black (2) having a DBP of less than 60 ml/100 g tends to provide reduced reinforcing properties, resulting in reduced breaking properties. Also, the DBP oil absorption is 130 ml/100 g or less, preferably 120 ml/100 g or less. The use of carbon black (2) having a DBP of more than 130 ml/100 g tends to deteriorate tensile elongation at break, resulting in reduced breaking properties or durability.

In the aspect 12-1 or 12-2 of the invention, the $N_2SA$ and DBP oil absorption of carbon black are determined in accordance with JIS K 6217-2:2001 and JIS K 6217-4:2001, respectively.

The aggregate properties of carbon black (2) preferably includes a mode diameter (Dmod) of the Stokes' diameter distribution curve of 80 nm or more, more preferably 90 nm or more, still more preferably 100 nm or more. If the Dmod is less than 80 nm, the effects produced by the use of carbon black (2) in addition to carbon black (1) may be insufficient. The upper limit of the Dmod is not particularly limited but is preferably 120 nm or less.

The aggregate properties of carbon black (2) preferably includes a ratio ($\Delta D50/Dmod$) of the half width ($\Delta D50$) of the distribution curve to the Dmod of 0.77 or less, more preferably 0.75 or less, still more preferably 0.73 or less. If the ratio is more than 0.77, the effects produced by the use of carbon black (2) in addition to carbon black (1) may be insufficient. The lower limit of the $\Delta D50/Dmod$ ratio is not particularly limited but is preferably 0.60 or more, more preferably 0.65 or more.

Carbon black (2) may be produced, for example, as described for the method for producing carbon black (1), but using a feedstock oil (feedstock hydrocarbon) that has a BMCI value of 152 or more and an aliphatic hydrocarbon content of 25% by mass or less. It may be produced as described for the method for producing carbon black (1) except for the feedstock oil. Carbon black (2) having the properties described above can be suitably produced by such a method.

The feedstock oil used for producing carbon black (2) preferably has a BMCI value of 152 or more, more preferably 155 or more. If the BMCI value is less than 152, the effects produced by the use of carbon black (2) in addition to carbon black (1) may be insufficient.

The upper limit of the BMCI value is not particularly limited but is preferably 170 or less.

The feedstock oil used for producing carbon black (2) preferably has an aliphatic hydrocarbon content (amount of aliphatic hydrocarbons based on 100% by mass of the feedstock oil) of 25% by mass or less, more preferably 15% by mass or less, still more preferably 5% by mass or less, and the aliphatic hydrocarbon content may be 0% by mass.

If the aliphatic hydrocarbon content is more than 25% by mass, the effects produced by the use of carbon black (2) in addition to carbon black (1) may be insufficient.

The feedstock oil used for producing carbon black (2) preferably has an aromatic hydrocarbon content (amount of aromatic hydrocarbons based on 100% by mass of the feedstock oil) of 75% by mass or more, more preferably 85% by mass or more, still more preferably 95% by mass or more, and the aromatic hydrocarbon content may be 100% by mass. If the aromatic hydrocarbon content is less than 75% by mass, the effects produced by the use of carbon black (2) in addition to carbon black (1) may be insufficient.

The feedstock oil satisfying the above properties may be a single feedstock oil satisfying the above properties. Alternatively, two or more feedstock oils may be mixed such that the above properties can be satisfied.

Specifically, the feedstock oil may be, for example, at least one selected from the group consisting of (1) aromatic hydrocarbons such as anthracene; coal hydrocarbons such as creosote oil; and petroleum heavy oils such as EHE oil (by-product oil in ethylene production) and FCC oil (fluid catalytic cracking residue). The feedstock oil may be a feedstock oil mixture further containing an aliphatic hydrocarbon. These may be modified. Among these, coal hydrocarbons are preferred, with creosote oil being more preferred. The amount of coal hydrocarbons based on 100% by mass of the feedstock oil is preferably 80% by mass or more, more preferably 90% by mass or more, and may be 100% by mass.

(Softener)

In the preparation of a wet masterbatch, a softener may further be incorporated as needed. The incorporation of a softener allows the effects of the aspect 12-1 or 12-2 of the invention to be better achieved.

Examples of the softener include oils, C5 petroleum resins, and C9 petroleum resins. Oils are preferred among these.

Examples of the oil for improving rubber processability (e.g. a softening effect, a compounding agent-dispersing effect, and a lubrication effect between polymer chains) include petroleum oils. Specific examples include paraffinic process oils, naphthenic process oils, aromatic process oils, as well as aromatic oil alternatives such as treated distillate aromatic extracts (TDAE) and solvent residue aromatic extracts (SRAE), and mild extraction solvates (MES). Among these, aromatic process oils are preferred.

Examples of the C5 petroleum resin include aliphatic petroleum resins made mainly from olefins or diolefins in C5 fraction obtained by naphtha cracking. Examples of the C9 petroleum resin include aromatic petroleum resins made mainly from vinyltoluene, indene, or methylindene in C9 fraction obtained by naphtha cracking.

The C5 or C9 petroleum resin preferably has a softening point of 50° C. or higher, more preferably 80° or higher. The softening point is also preferably 150° or lower, more preferably 130° or lower. When the softening point falls within the range indicated above, the effects of the aspect 12-1 or 12-2 of the invention can be better achieved.

(Mixing)

As described above, the wet masterbatch can be prepared, for example, by mixing the rubber latex and the carbon black dispersion, and optionally a softener, and then coagulating and drying the mixture. The rubber latex, the carbon black dispersion, and the optional softener may be mixed by any method, including known methods. For example, it may be carried out by dropwise adding the carbon black dispersion and the softener to the rubber latex placed in a blender mill with stirring, or by dropwise adding the rubber latex to the carbon black dispersion and the softener with stirring. Alternatively, it may be carried out by mixing a rubber latex stream, a carbon black dispersion stream, and an optional softener at a certain flow rate ratio through vigorous stirring by hydraulic means.

(Coagulation)

After the mixing step, coagulation is usually performed. The coagulation step is usually carried out by addition of a coagulant such as an acidic compound, e.g. formic acid or sulfuric acid, or sodium chloride. Coagulation may be accomplished by the above mixing, and in this case no coagulant is necessary.

(Drying)

After the coagulation, usually the resulting coagulum is recovered, dehydrated by centrifugation or other means, and then washed and dried to obtain the wet masterbatch. The drying may be carried out using, for example, a vacuum dryer, an air dryer, a drum dryer, a band dryer, a hot-air dryer, or a kiln dryer.

(Composition of Wet Masterbatch)

In the wet masterbatch, the amount of SBR based on 100% by mass of the rubber component in the wet masterbatch is preferably 40% by mass or more, more preferably 60% by mass or more, still more preferably 80% by mass or more, particularly preferably 100% by mass. With such a wet masterbatch, the effects of the aspect 12-1 or 12-2 of the invention can be more suitably achieved.

In the wet masterbatch, the amount of carbon black (1) relative to 100 parts by mass of the rubber component in the wet masterbatch is preferably 1 to 200 parts by mass. If the amount of carbon black (1) is less than 1 part by mass, the effects of the aspect 12-1 or 12-2 of the invention tend not to be sufficiently obtained. If the amount of carbon black (1) is more than 200 parts by mass, processability may decrease, and low heat build-up properties, breaking properties, or durability may decrease. The lower limit of the amount is more preferably 5 parts by mass or more, still more preferably 10 parts by mass or more, particularly preferably 20 parts by mass or more. The upper limit is more preferably 150 parts by mass or less, still more preferably 100 parts by mass or less, particularly preferably 60 parts by mass or less.

In the wet masterbatch, the amount of carbon black (2) relative to 100 parts by mass of the rubber component in the wet masterbatch is preferably 1 to 200 parts by mass. If the amount of carbon black (2) is less than 1 part by mass, the effects of the aspect 12-1 or 12-2 of the invention tend not to be sufficiently obtained. If the amount of carbon black (2) is more than 200 parts by mass, processability may decrease, and low heat build-up properties, breaking properties, or durability may decrease. The lower limit of the amount is more preferably 5 parts by mass or more, still more preferably 10 parts by mass or more. The upper limit is more preferably 150 parts by mass or less, still more preferably 100 parts by mass or less, particularly preferably 60 parts by mass or less, most preferably 40 parts by mass or less.

In the wet masterbatch, the total amount of carbon black is preferably 1 to 200 parts by mass relative to 100 parts by mass of the rubber component in the wet masterbatch. If the total amount of carbon black is less than 1 part by mass, sufficient reinforcing properties may not be obtained. If the total amount of carbon black is more than 200 parts by mass, processability may decrease, and low heat build-up properties, breaking properties, or durability may decrease. The lower limit of the total amount is more preferably 5 parts by mass or more, still more preferably 10 parts by mass or more, particularly preferably 20 parts by mass or more, most preferably 30 parts by mass or more. The upper limit is more preferably 150 parts by mass or less, still more preferably 100 parts by mass or less, particularly preferably 80 parts by mass or less.

The amount of carbon black (1) based on 100% by mass of the total carbon black in the wet masterbatch is preferably 1% by mass or more, more preferably 5% by mass or more, still more preferably 10% by mass or more, particularly preferably 20% by mass or more, most preferably 40% by mass or more. If the amount is less than 1% by mass, the effects of the aspect 12-1 or 12-2 of the invention may not be sufficiently obtained, and it may be difficult to simultaneously achieve breaking properties and low heat build-up properties. Although the amount of carbon black (1) may be 100% by mass, it is preferably 80% by mass or less when any other carbon black is used in combination.

The wet masterbatch preferably contains a softener in an amount of 1 to 50 parts by mass, more preferably 3 to 40 parts by mass, relative to 100 parts by mass of the rubber component in the wet masterbatch. When the amount of the softener falls within the range indicated above, the effects of the aspect 12-1 or 12-2 of the invention can be better achieved.

[Rubber Composition]

The rubber composition in the aspect 12-1 or 12-2 of the invention contains the wet masterbatch. The amount of the wet masterbatch based on 100% by mass of the rubber composition is preferably 10% by mass or more, more preferably 20% by mass or more. The upper limit of the amount of the wet masterbatch is preferably 90% by mass or less, more preferably 80% by mass or less, still more preferably 50% by mass or less. With such an amount of the wet masterbatch, the effects of the aspect 12-1 or 12-2 of the invention can be better achieved.

The rubber composition in the aspect 12-1 or 12-2 of the invention may optionally contain a further rubber component in addition to the rubber component contained in the wet masterbatch. Examples of materials which can be used as the rubber component include diene rubbers such as isoprene-based rubbers, BR, SBR, and SIBR. The rubber component may be a single material or a combination of two or more materials. For a balanced improvement in handling stability, low heat build-up properties, elongation at break, adhesion to fiber cords, processability, and reversion resistance, isoprene-based rubbers are preferred among these as the rubber component incorporated in addition to the wet masterbatch. Furthermore, since SBR is preferred as the rubber component used in the wet masterbatch as mentioned above, a combination of SBR and an isoprene-based rubber is preferably used in the aspect 12-1 or 12-2 of the invention.

Examples of the isoprene-based rubber include NR, IR, and ENR. NR is preferred among these because it is excellent in tire durability, adhesion to fiber cords, and other properties.

Examples of the NR include those commonly used in the tire industry such as SIR20, RSS#3, and TSR20. The IR and the ENR are not particularly limited, and those commonly used in the tire industry can be used.

The total amount of isoprene-based rubbers based on 100% by mass of the total rubber component in the rubber composition is preferably 40% by mass or more, more preferably 60% by mass or more. If the total amount is less than 40% by mass, elongation at break, low heat build-up properties, adhesion to fiber cords, processability, or tire durability may not be sufficiently obtained. The total amount is also preferably 90% by mass or less, more preferably 80% by mass or less. If the total amount is more than 90% by mass, handling stability or reversion resistance may not be sufficiently obtained.

The amount of SBR based on 100% by mass of the total rubber component in the rubber composition in the aspect 12-1 or 12-2 of the invention is preferably 10% by mass or more, more preferably 20% by mass or more. If the amount is less than 10% by mass, sufficient handling stability, reversion resistance, or low heat build-up properties may not be obtained. The amount of SBR is preferably 50% by mass or less, more preferably 40% by mass or less. If the amount is more than 50% by mass, the amount of the isoprene-based rubber may be reduced so that elongation at break, low heat build-up properties, processability, or breaking properties may not be sufficiently obtained.

The combined amount of SBR and the isoprene-based rubber based on 100% by mass of the total rubber component in the rubber composition in the aspect 12-1 or 12-2 of the invention is preferably 60% by mass or more, more preferably 80% by mass or more, and may be 100% by mass. If the combined amount of SBR and the isoprene-based rubber falls within the range indicated above, the effects of the aspect 12-1 or 12-2 of the invention can be more suitably achieved.

In order to more suitably achieve the effects of the aspect 12-1 or 12-2 of the invention, the amount of SBR incorporated in the form of a wet masterbatch is preferably 40% by mass or more, more preferably 50% by mass or more, still more preferably 60% by mass or more, particularly preferably 80% by mass or more, most preferably 100% by mass, based on 100% by mass of the total SBR in the rubber composition in the aspect 12-1 or 12-2 of the invention.

In order to more suitably achieve the effects of the aspect 12-1 or 12-2 of the invention, the amount of the rubber component incorporated in the form of a wet masterbatch is preferably 5% by mass or more, more preferably 10% by mass or more, still more preferably 20% by mass or more, based on 100% by mass of the total rubber component in the rubber composition in the aspect 12-1 or 12-2 of the invention. The upper limit of the amount is not particularly limited but is preferably less than 40% by mass, more preferably 35% by mass or less, in order to add another rubber component separately from the wet masterbatch to provide smooth kneading of other compounding agents.

In addition to the carbon black contained in the wet masterbatch, the rubber composition in the aspect 12-1 or 12-2 of the invention may further contain carbon black such as carbon black (1) or carbon black (2) as needed.

The amount of carbon black (1) contained in the rubber composition in the aspect 12-1 or 12-2 of the invention, relative to 100 parts by mass of the rubber component, is preferably 1 part by mass or more, more preferably 5 parts by mass or more, still more preferably 10 parts by mass or more. If the amount is less than 1 part by mass, the effects of the aspect 12-1 or 12-2 of the invention tend not to be sufficiently obtained. The amount of the carbon black relative to 100 parts by mass of the rubber component is also preferably 250 parts by mass or less, more preferably 200 parts by mass or less, still more preferably 150 parts by mass or less, particularly preferably 100 parts by mass or less, most preferably 60 parts by mass or less, further most preferably 30 parts by mass or less. If the amount is more than 250 parts by mass, the resulting rubber composition tends to be too hard, adversely leading to reduced breaking properties. Moreover, the processability of the rubber composition tends to drastically decrease. Furthermore, low heat build-up properties tend to deteriorate.

The amount of carbon black (2) contained in the rubber composition in the aspect 12-1 or 12-2 of the invention, relative to 100 parts by mass of the rubber component, is preferably 1 part by mass or more, more preferably 5 parts by mass or more, still more preferably 10 parts by mass or more, particularly preferably 20 parts by mass or more. If the amount is less than 1 part by mass, the effects of the aspect 12-1 or 12-2 of the invention tend not to be sufficiently obtained. The amount of the carbon black relative to 100 parts by mass of the rubber component is also preferably 250 parts by mass or less, more preferably 200 parts by mass or less, still more preferably 150 parts by mass or less, particularly preferably 100 parts by mass or less, most preferably 60 parts by mass or less. If the amount is more than 250 parts by mass, the resulting rubber composition tends to be too hard, adversely leading to reduced breaking properties. Moreover, the processability of the rubber composition tends to drastically decrease. Furthermore, low heat build-up properties tend to deteriorate.

The total amount of carbon black contained in the rubber composition in the aspect 12-1 or 12-2 of the invention, relative to 100 parts by mass of the rubber component, is preferably 1 part by mass or more, more preferably 5 parts by mass or more, still more preferably 10 parts by mass or more, particularly preferably 20 parts by mass or more, most preferably 30 parts by mass or more. If the total amount is less than 1 part by mass, sufficient reinforcing properties may not be obtained. The total amount of carbon black is also preferably 250 parts by mass or less, more preferably 200 parts by mass or less, still more preferably 150 parts by mass or less, particularly preferably 100 parts by mass or less, most preferably 70 parts by mass or less. If the total amount is more than 250 parts by mass, processability may decrease, and low heat build-up properties, breaking properties, or durability may decrease.

The amount of carbon black (1) based on 100% by mass of the total carbon black in the rubber composition in the aspect 12-1 or 12-2 of the invention is preferably 1% by mass or more, more preferably 5% by mass or more, still more preferably 10% by mass or more, particularly preferably 20% by mass or more. If the amount is less than 1% by mass, the effects of the aspect 12-1 or 12-2 of the invention may not be sufficiently obtained, and it may be difficult to simultaneously achieve breaking properties and low heat build-up properties. Although the amount of carbon black (1) may be 100% by mass, it is preferably 80% by mass or less, more preferably 60% by mass or less, still more preferably 40% by mass or less, when any other carbon black is used in combination.

In order to more suitably achieve the effects of the aspect 12-1 or 12-2 of the invention, the amount of carbon black (1) incorporated in the form of a wet masterbatch is preferably 40% by mass or more, more preferably 50% by mass or more, still more preferably 60% by mass or more, particularly preferably 80% by mass or more, most preferably 100% by mass, based on 100% by mass of the total carbon black (1) in the rubber composition in the aspect 12-1 or 12-2 of the invention.

In order to more suitably achieve the effects of the aspect 12-1 or 12-2 of the invention, the amount of carbon black (2) incorporated in the form of a wet masterbatch is preferably 5% by mass or more, more preferably 10% by mass or more, based on 100% by mass of the total carbon black (2) in the rubber composition in the aspect 12-1 or 12-2 of the invention. The upper limit of the amount is not particularly limited but is preferably 40% by mass or less, more preferably 25% by mass or less, in order to add another carbon black (2) separately from the wet masterbatch to provide smooth kneading of other compounding agents.

Similarly, in order to more suitably achieve the effects of the aspect 12-1 or 12-2 of the invention, the amount of carbon black incorporated in the form of a wet masterbatch is preferably 20% by mass or more, more preferably 30% by mass or more, still more preferably 35% by mass or more, based on 100% by mass of the total carbon black in the rubber composition in the aspect 12-1 or 12-2 of the invention. The upper limit of the amount is not particularly limited but, for the same reason as mentioned above, it is preferably 70% by mass or less, more preferably 60% by mass or less.

The blending ratio of carbon black (1) and carbon black (2) (carbon black (1)/carbon black (2)) by mass in the rubber composition is preferably 0.1 to 0.8, more preferably 0.2 to 0.5. If the blending ratio is less than 0.1, good conductivity may not be obtained, and excellent breaking properties or low heat build-up properties may not be exhibited. If the blending ratio is more than 0.8, breaking properties tend to decrease.

The rubber composition in the aspect 12-1 or 12-2 of the invention may optionally further contain a softener as described above in addition to the softener contained in the wet masterbatch.

The total amount of softeners contained in the rubber composition in the aspect 12-1 or 12-2 of the invention, relative to 100 parts by mass of the rubber component, is preferably 1 part by mass or more, more preferably 5 parts by mass or more. The total amount is also preferably 50 parts by mass or less, more preferably 30 parts by mass or less. When the total amount falls within the range indicated above, the effects of the aspect 12-1 or 12-2 of the invention can be better achieved.

In order to more suitably achieve the effects of the aspect 12-1 or 12-2 of the invention, the amount of the softener incorporated in the form of a wet masterbatch is preferably 30% by mass or more, more preferably 40% by mass or more, still more preferably 50% by mass or more, based on 100% by mass of the total softener in the rubber composition in the aspect 12-1 or 12-2 of the invention. The upper limit of the amount is not particularly limited but is preferably 90% by mass or less, more preferably 80% by mass or less, in order to accelerate incorporation of carbon black into rubber when another carbon black is mixed separately from the wet masterbatch.

The rubber composition in the aspect 12-1 or 12-2 of the invention may appropriately contain, in addition to the above-described components, compounding agents commonly used in preparation of rubber compositions. Examples of the compounding agents include reinforcing fillers such as silica, clay, and talc; silane coupling agents; zinc oxide; stearic acid; processing aids; various types of antioxidants; wax; vulcanizing agents such as sulfur and sulfur-containing compounds; and vulcanization accelerators.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the aspect 12-1 or 12-2 of the invention, sulfenamide vulcanization accelerators are preferred among these, with N-t-butyl-2-benzothiazolesulfenamide being more preferred. The amount of the vulcanization accelerator is preferably 0.1 to 7 parts by mass, more preferably 0.5 to 5 parts by mass, relative to 100 parts by mass of the rubber component.

The vulcanizing agent is not particularly limited but sulfur can be suitably used. The amount of sulfur relative to 100 parts by mass of the rubber component is preferably 0.5 to 5 parts by mass, more preferably 1 to 3 parts by mass. With such an amount of sulfur, the effects of the aspect 12-1 or 12-2 of the invention can be more suitably achieved.

The rubber composition in the aspect 12-1 or 12-2 of the invention can be prepared by usual methods. Specifically, it may be prepared by kneading the wet masterbatch and other components using a Banbury mixer, a kneader, an open roll mill, or other kneading machines and vulcanizing the kneadate.

The rubber composition in the aspect 12-1 or 12-2 of the invention preferably has a volume resistivity measured at 100 V of $1 \times 10^7$ Ω·cm or less, more preferably $0.5 \times 10^7$ Ω·cm or less, still more preferably $0.18 \times 10^7$ Ω·cm or less. In the aspect 12-1 or 12-2 of the invention, the volume resistivity can be measured by the method described in Examples.

The rubber composition in the aspect 12-1 or 12-2 of the invention can be suitably used as a rubber composition for tire cord toppings. It can be used to cover tire cords to form a rubberized tire cord component. It can be suitably used especially as a carcass topping rubber or a jointless band topping rubber, each of which covers tire cords to form a carcass or a jointless band.

A carcass refers to a component including tire cords and a tire cord topping rubber layer. Specifically, it is a component shown in, for example, FIG. 1 of JP 2008-75066A (which is incorporated by reference in its entirety).

A jointless band refers to a component including tire cords and a tire cord topping rubber layer. It is provided radially outside a breaker to inhibit the breaker from being separated from a carcass by the centrifugal force caused by the rotation of the tire during running of the vehicle. Specifically, it is a component shown in, for example, FIG. 3 of JP 2009-007437A (which is incorporated by reference in its entirety).

The carcass in the aspect 12-1 or 12-2 of the invention can be produced by conventionally known methods. For example, it may be produced by arranging multiple extended carcass cords in parallel with each other, and topping the upper and lower sides of the parallel carcass cords with an unvulcanized rubber composition for tire cord toppings. Conventionally known carcass cords may be used, and examples include textile cords (fiber cords) made of organic fibers such as polyester, and steel cords made of steel. The band or the like in the aspect 12-1 or 12-2 of the invention can also be produced by conventionally known methods, and those which are also known as band cords may be used.

[Pneumatic Tire]

The pneumatic tire according to the aspect 12-1 or 12-2 of the invention may suitably be, for example, a pneumatic tire that includes a rubberized tire cord component (e.g. a carcass or band) produced using the rubber composition and optionally a sidewall having a volume resistivity measured at 100 V of $1\times10^9$ Ω·cm or more. The sidewall can be produced from a rubber composition for sidewalls having the above volume resistivity. The formulation of the rubber composition for sidewalls may be, for example, any high silica content rubber compound with the above volume resistivity.

The pneumatic tire according to the aspect 12-1 or 12-2 of the invention can be produced from the rubber composition by usual methods. Specifically, after the compounding agents described above are kneaded, carcass cords, band cords, or the like cords are covered with the kneadate and they are formed into the shape of a rubberized tire cord component such as a carcass or band on a tire building machine, assembled with other tire components and then vulcanized, whereby the tire according to the aspect 12-1 or 12-2 of the invention can be produced.

The pneumatic tire according to the aspect 12-1 or 12-2 of the invention can be suitably used for passenger vehicles, trucks and buses, or two-wheeled vehicles, or as high performance tires or other tires, and especially as high performance tires. The pneumatic tire obtained according to the aspect 12-1 or 12-2 of the invention has excellent grip performance on dry roads.

High performance tires in the aspect 12-1 or 12-2 of the invention are excellent especially in grip performance on dry roads, and conceptually encompass racing tires used for racing vehicles.

<The Aspects 13-1 and 13-2 of the Invention>

The aspect 13-1 of the invention relates to a rubber composition containing: a rubber component; at least one amphoteric compound; and one or more types of carbon black, the at least one amphoteric compound containing at least one acidic functional group selected from the group consisting of a carboxylic acid group, a sulfonic acid group, a phosphoric acid group, a thiosulfonic acid group, a dithiocarboxylic acid group, a thioalkylcarboxylic acid group having a C1-C20 alkyl group, and a phenolic hydroxy group, and also containing a basic functional group that is an amino group or a substituted amino group, at least one of the one or more types of carbon black being carbon black (1) produced from a feedstock oil that has a BMCI value of 150 or less and an aliphatic hydrocarbon content of 30% by mass or more, the BMCI value being calculated from the average boiling point T (° C.) and the specific gravity D (60/60° F.) relative to water at 60° F. according to the equation below, $$BMCI=48,640/(T+273)+473.7D-456.8.$$

The aspect 13-2 of the invention relates to a rubber composition containing: a rubber component; at least one amphoteric compound; and one or more types of carbon black, the at least one amphoteric compound containing at least one acidic functional group selected from the group consisting of a carboxylic acid group, a sulfonic acid group, a phosphoric acid group, a thiosulfonic acid group, a dithiocarboxylic acid group, a thioalkylcarboxylic acid group having a C1-C20 alkyl group, and a phenolic hydroxy group, and also containing a basic functional group that is an amino group or a substituted amino group, at least one of the one or more types of carbon black being carbon black (1) having, as aggregate properties, a mode diameter (Dmod) of the Stokes' diameter distribution curve of 79 nm or less and a ratio (ΔD50/Dmod) of the half width (ΔD50) of the distribution curve to the Dmod of 0.78 or more.

According to the aspect 13-1 or 13-2 of the invention, carbon black having specific aggregate properties including a specific Dmod value or less and a specific ΔD50/Dmod ratio or higher, such as carbon black (1) produced from a feedstock oil having a specific BMCI value or less and a specific aliphatic hydrocarbon content or more, is incorporated into a rubber composition. This allows the rubber composition to have improved abrasion resistance while maintaining or improving good low heat build-up properties. Thus, abrasion resistance and low heat build-up properties can be simultaneously achieved to a high extent. Furthermore, in the aspect 13-1 or 13-2 of the invention, an amphoteric compound containing a specific acidic functional group and a specific basic functional group is incorporated in addition to the specific carbon black. This can synergistically improve abrasion resistance and low heat build-up properties while maintaining good processability.

Examples of materials which can be included in the rubber component in the aspect 13-1 or 13-2 of the invention include diene rubbers such as natural rubber (NR), polyisoprene rubber (IR), polybutadiene rubber (BR), styrene butadiene rubber (SBR), styrene isoprene butadiene rubber (SIBR), chloroprene rubber (CR), acrylonitrile butadiene rubber (NBR), ethylene-propylene-diene rubber (EPDM), butyl rubber (IIR), and halogenated butyl rubbers (X-IIR). The rubber component may be a single material or a combination of two or more materials. Preferred among these is NR in view of low heat build-up properties and mechanical strength, BR in view of abrasion resistance and flex crack resistance, and SBR in view of wet grip performance. Further, for a balanced improvement in abrasion resistance and low heat build-up properties in the use for tires, a combination of NR and BR is more preferred.

Any NR may be used, including those commonly used in the tire industry such as SIR20, RSS#3, and TSR20.

The amount of NR based on 100% by mass of the rubber component is preferably 20% by mass or more, more preferably 30% by mass or more, still more preferably 40% by mass or more. If the amount is less than 20% by mass, sufficient rubber strength or low heat build-up properties tend not to be obtained. The upper limit of the amount of NR is not particularly limited and may be 100% by mass. When the rubber component includes another material in combination with NR, the amount of NR is preferably 70% by mass or less.

The BR is not particularly limited. Examples include high-cis BR such as BR1220 available from Zeon Corporation and BR130B and BR150B both available from Ube Industries, Ltd. and syndiotactic polybutadiene crystal-containing BR such as VCR412 and VCR617 both available from Ube Industries, Ltd. In particular, for good abrasion resistance, the BR preferably has a cis content of 90% by mass or more, more preferably 95% by mass or more.

The cis content of BR can be measured by infrared absorption spectrometry.

The amount of BR based on 100% by mass of the rubber component is preferably 5% by mass or more, more preferably 10% by mass or more, still more preferably 20% by mass or more. If the amount is less than 5% by mass, sufficient abrasion resistance may not be obtained. The amount of BR is preferably 70% by mass or less, more preferably 60% by mass or less.

Any SBR may be used, including those commonly used in the tire industry such as emulsion-polymerized styrene butadiene rubber (E-SBR) and solution-polymerized styrene butadiene rubber (S-SBR).

The amount of SBR based on 100% by mass of the rubber component is preferably 5% by mass or more, more preferably 10% by mass or more. With less than 5% by mass of SBR, sufficient wet grip performance may not be obtained, and low heat build-up properties or abrasion resistance may not be improved. The amount of SBR is preferably 50% by mass or less, more preferably 35% by mass or less.

The combined amount of NR and BR based on 100% by mass of the rubber component is preferably 60% by mass or more, more preferably 80% by mass or more, and may be 100% by mass. If the combined amount of NR and BR falls within the range indicated above, the effects of the aspect 13-1 or 13-2 of the invention can be more suitably achieved.

The carbon black (1) described above is used in the aspect 13-1 or 13-2 of the invention. Abrasion resistance and low heat build-up properties can be simultaneously achieved by incorporation of carbon black (1).

In the aspect 13-2 of the invention, the aggregate properties of carbon black (1) include a mode diameter (Dmod) of the Stokes' diameter distribution curve of 79 nm or less, preferably 69 nm or less, more preferably 63 nm or less. If the Dmod is more than 79 nm, the effects of the aspect 13-1 or 13-2 of the invention (particularly the effect of improving abrasion resistance) are insufficient. The lower limit of the Dmod is not particularly limited but is preferably 40 nm or more, more preferably 50 nm or more, still more preferably 56 nm or more. If it is less than 40 nm, the carbon black (1) tends to have poor dispersibility, resulting in reduced breaking properties or abrasion resistance.

In the aspect 13-2 of the invention, the aggregate properties of carbon black (1) include a ratio ($\Delta D50/Dmod$) of the half width ($\Delta D50$) of the distribution curve to the Dmod of 0.78 or more, preferably 0.90 or more, more preferably 1.0 or more, still more preferably 1.1 or more. If the ratio is less than 0.78, the effects of the aspect 13-1 or 13-2 or the invention (particularly the effect of improving low heat build-up properties) are insufficient. The upper limit of the $\Delta D50/Dmod$ ratio is not particularly limited but is preferably 2.5 or less, more preferably 2.0 or less. If it is more than 2.5, abrasion resistance may deteriorate, with the result that the desired effects may not be obtained.

In the aspect 13-1 or 13-2 of the invention, the Dmod and the $\Delta D50$ of carbon black are determined as follows.

A surfactant ("NONIDET P-40" available from Sigma Chemical) is added to a 20% aqueous solution of ethanol. To the mixture is added an accurately weighed carbon black sample to prepare a sample solution with a carbon black concentration of 0.01% by weight. The sample solution is subjected to a dispersing treatment using an ultrasonic disperser ("ultrasonic generator USV-500V" available from Ultrasonic Engineering Co., Ltd.) at a frequency of 200 kHz and an output power of 100 W for five minutes. Thus, a carbon black slurry is prepared. Separately, 10 ml of a spin liquid (pure water) is poured into a centrifugal particle size distribution analyzer ("BI-DCP PARTICL SIZER" available from Brookhaven Instruments), and then 1 ml of a buffer solution (a 20% by volume aqueous solution of ethanol) is poured thereinto. Subsequently, 1 ml of each carbon black slurry prepared as above is poured, and the mixture is subjected to centrifugal sedimentation at 8,000 rpm to determine a Stokes' diameter. Then, a histogram of the Stokes' diameter versus the relative frequency of occurrence is generated. The intersection of a straight line parallel to the Y-axis and passing through the peak (A) of the histogram with the X-axis of the histogram is designated as C. The Stokes' diameter at the point C is taken as the mode Stokes' diameter (Dmod). The middle point of the segment AC is designated as F, and two intersections (D, E) of a straight line G parallel to the X-axis and passing through the point F with the distribution curve of the histogram are determined. The absolute value of the difference between the Stokes' diameters at the points D and E is taken as the Stokes' diameter half width (half width ($\Delta D50$)) of the distribution curve).

Carbon black (1) preferably has a cetyltrimethylammonium bromide adsorption specific surface area (CTAB) of 60 to 150 $m^2/g$, more preferably 80 to 145 $m^2/g$, still more preferably 100 to 140 $m^2/g$, particularly preferably 105 to 135 $m^2/g$. When the CTAB falls within the range indicated above, the effects of the aspect 13-1 or 13-2 of the invention can be more suitably achieved.

In the aspect 13-1 or 13-2 of the invention, the cetyltrimethylammonium bromide adsorption specific surface area (CTAB) of carbon black is determined in accordance with JIS K 6217-3:2001.

Carbon black (1) preferably has an iodine adsorption (IA) (mg/g) of 100 to 400 mg/g, more preferably 110 to 300 mg/g, still more preferably 120 to 250 mg/g. When the iodine adsorption (IA) falls within the range indicated above, the effect of improving abrasion resistance can be more suitably achieved and the effects of the aspect 13-1 or 13-2 of the invention can be more suitably achieved.

Carbon black (1) preferably has a ratio (CTAB/IA) of the cetyltrimethylammonium bromide adsorption specific surface area (CTAB) to the iodine adsorption (IA) (mg/g) of 0.8 to 1.2 $m^2/mg$, more preferably 0.85 to 1.15 $m^2/mg$, still more preferably 0.9 to 1.1 $m^2/mg$. When the CTAB/IA ratio falls within the range indicated above, the effects of the aspect 13-1 or 13-2 of the invention can be more suitably achieved.

In the aspect 13-1 or 13-2 of the invention, the iodine adsorption (IA) of carbon black is determined in accordance with JIS K 6217-1:2008.

The surface activity index defined by the CTAB/IA ratio can be taken as an index of crystallinity (the rate of graphitization) of carbon black. Specifically, a higher CTAB/IA ratio indicates a lower crystallinity, which tends to lead to greater interaction between the carbon black and the rubber component.

The CTAB/IA ratio can also be used as a parameter to assess the amount of acidic functional groups present on the carbon black surface. Since the acidic functional groups on the carbon black surface contribute to the interaction with the rubber component, a higher CTAB/IA ratio indicates that more acidic functional groups are present on the carbon black surface. Thus, when the CTAB/IA ratio falls within the range indicated above, the carbon black can have a more significant reinforcing effect on the rubber component, and the effects of the aspect 13-1 or 13-2 of the invention can be more suitably achieved.

Carbon black (1) preferably has a 24M4 dibutyl phthalate oil absorption (24M4 DBP) of 50 to 120 cm³/100 g, more preferably 70 to 120 cm³/100 g, still more preferably 90 to 115 cm³/100 g, particularly preferably 95 to 110 cm³/100 g. When the 24M4 DBP falls within the range indicated above, the effects of the aspect 13-1 or 13-2 of the invention can be more suitably achieved.

In the aspect 13-1 or 13-2 of the invention, the 24M4 dibutyl phthalate oil absorption (24M4 DBP) of carbon black is determined in accordance with ASTM D 3493-85a.

Carbon black (1) may be acidic, neutral, or basic, but preferably has a pH measured in accordance with JIS K 6220-1 of 2.0 to 10.0, more preferably 5.5 to 9.5. When the pH of carbon black (1) falls within the range indicated above, the mechanical strength and abrasion resistance of the rubber composition can be more suitably improved, and the effects of the aspect 13-1 or 13-2 of the invention can be more suitably achieved.

Carbon black (1) may be preferably produced by, for example, a method characterized by using a feedstock oil (feedstock hydrocarbon) that has a BMCI value of 150 or less and an aliphatic hydrocarbon content of 30% by mass or more. This method can suitably produce carbon black (1) having the properties described above. Further, this method can facilitate the preparation of carbon black (1) with the above properties by means of one pot preparation, in other words, by only using the above feedstock oil to prepare the carbon black, without preparing and blending multiple types of carbon black or subjecting the prepared carbon black to a post treatment such as a surface treatment.

In the aspect 13-1 or 13-2 of the invention, the BMCI value is calculated from the average boiling point T (° C.) and the specific gravity D (60/60° F.) relative to water at 60° F. according to the equation below.

The average boiling point T refers to the temperature at which, in a distillation test of the feedstock oil, 50% by mass of the feedstock oil is distilled.

$$BMCI=48,640/(T+273)+473.7D-456.8$$

In the aspect 13-1 of the invention, the feedstock oil has a BMCI value of 150 or less, preferably 140 or less, more preferably 130 or less, still more preferably 120 or less, particularly preferably 110 or less. If the BMCI value is more than 150, the carbon black has too sharp a particle size distribution, failing to have the specific aggregate properties mentioned above and deteriorating low heat build-up properties. The lower limit of the BMCI value of the feedstock oil is not particularly limited but is preferably 75 or more, more preferably 95 or more. If it is less than 75, a poor yield (insufficient amount of carbon black) may be obtained.

In the aspect 13-1 of the invention, the aliphatic hydrocarbon content (the amount of aliphatic hydrocarbons based on 100% by mass of the feedstock oil) is 30% by mass or more, preferably 40% by mass or more. If the aliphatic hydrocarbon content is less than 30% by mass, the carbon black fails to have the specific aggregate properties mentioned above, deteriorating low heat build-up properties. The upper limit of the aliphatic hydrocarbon content is not particularly limited but is preferably 60% by mass or less. If it is more than 60% by mass, a poor yield (insufficient amount of carbon black) may be obtained.

The amount of aliphatic hydrocarbons derived from animal or vegetable oils or modified products thereof is preferably 10% by mass or more, more preferably 20% by mass or more, still more preferably 30% by mass or more based on 100% by mass of aliphatic hydrocarbons in the feedstock oil. The upper limit of the amount is not particularly limited, and may be 100% by mass. When the amount falls within the range indicated above, the effects of the aspect 13-1 or 13-2 of the invention can be more suitably achieved. Further, since the effects can be achieved with inexhaustible resources as feedstocks, the depletion of resources and the environmental impact can be addressed.

The feedstock oil satisfying the above properties may be a single feedstock oil satisfying the above properties. Alternatively, two or more feedstock oils may be mixed such that the above properties can be satisfied.

Specifically, the feedstock oil may be, for example, a feedstock oil mixture containing (1) at least one selected from the group consisting of: aromatic hydrocarbons such as anthracene; coal hydrocarbons such as creosote oil; and petroleum heavy oils such as EHE oil (by-product oil in ethylene production) and FCC oil (fluid catalytic cracking residue), and (2) an aliphatic hydrocarbon. These may be modified. Among these, feedstock oil mixtures containing coal hydrocarbons and aliphatic hydrocarbons are preferred.

Examples of the aliphatic hydrocarbon include petroleum aliphatic hydrocarbons as typified by process oils, and animal and vegetable oils as typified by fatty acids such as soybean oil, rapeseed oil, and palm oil.

The animal and vegetable oils include aquatic animal oils such as fatty oils (liver oils) obtained from fish livers and marine animal oils obtained from whales, terrestrial animal oils such as beef tallow and lard, and fats and oils containing fatty acid glycerides extracted from seeds, fruits, nuts, and other portions of plants.

Preferred among the feedstock oils are feedstock oil mixtures containing coal hydrocarbons and petroleum aliphatic hydrocarbons and feedstock oil mixtures containing coal hydrocarbons and animal or vegetable oils. More preferred are feedstock oil mixtures containing creosote oil and petroleum aliphatic hydrocarbons, and feedstock oil mixtures containing creosote oil and soybean oil. Also, tall oil containing aliphatic hydrocarbons can be suitably used as a feedstock oil. The coal hydrocarbon is preferably a coal aromatic hydrocarbon.

Carbon black (1) can be produced by known methods, except for using the feedstock oil described above. The production method is not particularly limited. Specifically, methods of producing carbon black by spraying a feedstock oil into combustion gas are preferred. Examples include conventionally known processes such as a furnace process or a channel process. Among these, the below-described furnace process is preferred because it can suitably provide the specific aggregate properties described above.

The furnace process (oil furnace process), as described in, for example, JP 2004-43598 A and JP 2004-277443 A, uses apparatus having a combustion zone where a high-temperature combustion gas stream is generated in a reaction furnace, a reaction zone where a feedstock hydrocarbon is introduced into the high-temperature combustion gas stream to convert the feedstock hydrocarbon into carbon black by pyrolysis, and a quench zone where the reaction gas is rapidly cooled to terminate the reaction. Various types of carbon black with different properties can be produced by controlling conditions such as combustion conditions, the flow rate of high-temperature combustion gas, the conditions for the introduction of the feedstock oil into the reaction furnace, and the time from the carbon black conversion to the termination of the reaction.

In the combustion zone, air, oxygen, or a mixture thereof as oxygen-containing gas and a gaseous or liquid fuel hydrocarbon are mixed and combusted to form high-temperature combustion gas. Examples of the fuel hydrocarbon include carbon monoxide, natural gas, coal gas, petroleum gas, petroleum liquid fuels such as heavy oil, and coal liquid fuels such as creosote oil. The combustion is preferably controlled so that the combustion temperature is in the range of 1,400° C. to 2,000° C.

In the reaction zone, a feedstock hydrocarbon is introduced into the high-temperature combustion gas stream formed in the combustion zone by spraying from parallel or laterally disposed burners, so that the feedstock hydrocarbon is pyrolyzed and converted to carbon black. Preferably, the feedstock oil is introduced through one or more burners into a high-temperature combustion gas stream having a flow rate in the range of 100 to 1,000 m/s. The feedstock oil is preferably divided and introduced through two or more burners. Moreover, the reaction zone is preferably provided with a narrow portion to improve the reaction efficiency. The narrow portion preferably has a ratio of the diameter of the narrow portion to the diameter of the part upstream of the narrow portion of 0.1 to 0.8.

In the quench zone, water spraying or other cooling methods is performed to cool the high-temperature reaction gas to 1,000° C. to 800° C. or lower. The time from the introduction of the feedstock oil to the termination of the reaction is preferably 2 to 100 milliseconds. After the cooled carbon black is separated and recovered from the gas, it may be subjected to known processes such as pelletization and drying.

The amount of carbon black (1) relative to 100 parts by mass of the rubber component is preferably 1 part by mass or more, more preferably 5 parts by mass or more, still more preferably 10 parts by mass or more, particularly preferably 20 parts by mass or more, most preferably 35 parts by mass or more. If the amount is less than 1 part by mass, the effects of the aspect 13-1 or 13-2 of the invention tend not to be sufficiently obtained. The amount of the carbon black relative to 100 parts by mass of the rubber component is also preferably 250 parts by mass or less, more preferably 200 parts by mass or less, still more preferably 150 parts by mass or less, particularly preferably 100 parts by mass or less, most preferably 60 parts by mass or less, further most preferably 50 parts by mass or less. If the amount is more than 250 parts by mass, the resulting rubber composition tends to be too hard, adversely leading to reduced abrasion resistance. Moreover, the processability of the rubber composition tends to drastically decrease. Furthermore, low heat build-up properties tend to deteriorate.

According to the aspect 13-1 or 13-2 of the invention, carbon black other than carbon black (1) (hereinafter, also referred to as carbon black (2)) may be incorporated together with carbon black (1).

Non-limiting examples of carbon black (2) include GPF, FEF, HAF, ISAF, and SAF.

In the case of the rubber composition according to the aspect 13-1 or 13-2 of the invention being used as a rubber composition for treads, carbon black (2) preferably has a nitrogen adsorption specific surface area ($N_2SA$) of 80 m$^2$/g or more, more preferably 90 m$^2$/g or more, still more preferably 100 m$^2$/g or more. Carbon black (2) having a $N_2SA$ of less than 80 m$^2$/g tends to provide reduced reinforcing properties, resulting in insufficient abrasion resistance. Carbon black (2) also preferably has a $N_2SA$ of 200 m$^2$/g or less, more preferably 190 m$^2$/g or less, still more preferably 180 m$^2$/g or less. The use of carbon black (2) having a $N_2SA$ of more than 200 m$^2$/g tends to deteriorate low heat build-up properties. Furthermore, such a carbon black (2) tends to have poor dispersibility, resulting in reduced breaking properties or abrasion resistance.

The $N_2SA$ of carbon black in the aspect 13-1 or 13-2 of the invention is determined in accordance with JIS K 6217-2:2001.

In the case of the rubber composition according to the aspect 13-1 or 13-2 of the invention being used as a rubber composition for treads, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient abrasion resistance. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or tensile elongation at break.

The DBP of carbon black in the aspect 13-1 or 13-2 of the invention is determined in accordance with JIS K 6217-4:2001.

In the case of the rubber composition according to the aspect 13-1 or 13-2 of the invention being used as a rubber composition for sidewalls, carcasses, or clinches, carbon black (2) preferably has a nitrogen adsorption specific surface area ($N_2SA$) of 20 m$^2$/g or more, more preferably 30 m$^2$/g or more. Carbon black (2) having a $N_2SA$ of less than 20 m$^2$/g tends to provide reduced reinforcing properties, resulting in insufficient durability. Carbon black (2) also preferably has a $N_2SA$ of 110 m$^2$/g or less, more preferably 100 m$^2$/g or less. The use of carbon black (2) having a $N_2SA$ of more than 110 m$^2$/g tends to deteriorate low heat build-up properties.

In the case of the rubber composition according to the aspect 13-1 or 13-2 of the invention being used as a rubber composition for sidewalls, carcasses, or clinches, carbon black (2) preferably has a dibutyl phthalate oil absorption (DBP) of 40 ml/100 g or more, more preferably 60 ml/100 g or more. Carbon black (2) having a DBP of less than 40 ml/100 g tends to provide reduced reinforcing properties, resulting in insufficient durability. Carbon black (2) also preferably has a DBP of 300 ml/100 g or less, more preferably 200 ml/100 g or less, still more preferably 100 ml/100 g or less. The use of carbon black (2) having a DBP of more than 300 ml/100 g may deteriorate durability or fatigue resistance.

The total amount of carbon black relative to 100 parts by mass of the rubber component is preferably 1 part by mass or more, more preferably 5 parts by mass or more, still more preferably 10 parts by mass or more, particularly preferably 20 parts by mass or more, most preferably 35 parts by mass or more. If the total amount is less than 1 part by mass, sufficient reinforcing properties may not be obtained. The total amount of carbon black relative to 100 parts by mass of the rubber component is also preferably 250 parts by mass or less, more preferably 200 parts by mass or less, still more preferably 150 parts by mass or less, particularly preferably 100 parts by mass or less, most preferably 60 parts by mass or less, further most preferably 50 parts by mass or less. If the total amount is more than 250 parts by mass, processability may decrease, and low heat build-up properties, abrasion resistance, or durability may decrease.

The amount of carbon black (1) based on 100% by mass of the total carbon black is preferably 1% by mass or more, more preferably 5% by mass or more, still more preferably 10% by mass or more, particularly preferably 20% by mass or more. If the amount is less than 1% by mass, the effects of the aspect 13-1 or 13-2 of the invention may not be sufficiently obtained, and it may be difficult to simultaneously achieve abrasion resistance and low heat build-up properties. Although the amount of carbon black (1) may be 100% by mass, it is preferably 80% by mass or less when any other carbon black is used in combination.

In the aspect 13-1 or 13-2 of the invention, silica may be incorporated in addition to carbon black (1) and the amphoteric compound having a specific acidic functional group and a specific basic functional group. This allows for a more significant improvement in abrasion resistance and low heat build-up properties.

Any silica may be used, including, for example, dry silica (anhydrous silica) and wet silica (hydrous silica). Wet silica is preferred because it contains a large number of silanol groups.

The silica preferably has a nitrogen adsorption specific surface area ($N_2SA$) of 45 $m^2/g$ or more, more preferably 55 $m^2/g$ or more, still more preferably 60 $m^2/g$ or more, particularly preferably 100 $m^2/g$ or more, most preferably 150 $m^2/g$ or more. If the $N_2SA$ is less than 45 $m^2/g$, abrasion resistance or rubber tensile strength may deteriorate. The silica also preferably has a $N_2SA$ of 350 $m^2/g$ or less, more preferably 300 $m^2/g$ or less, still more preferably 270 $m^2/g$ or less, particularly preferably 220 $m^2/g$ or less. Silica having a $N_2SA$ of more than 350 $m^2/g$ is less likely to disperse, and may also deteriorate low heat build-up properties.

The nitrogen adsorption specific surface area of silica is determined by the BET method set forth in ASTM D3037-81.

In the case where the rubber composition according to the aspect 13-1 or 13-2 of the invention contains silica, the amount of silica relative to 100 parts by mass of the rubber component is preferably 1 part by mass or more, more preferably 10 parts by mass or more, still more preferably 30 parts by mass or more, particularly preferably 45 parts by mass or more. If the amount is less than 1 part by mass, the effects produced by the incorporation of silica tend not to be sufficiently obtained, and low heat build-up properties or abrasion resistance tends to deteriorate. The amount of silica is preferably 200 parts by mass or less, more preferably 150 parts by mass or less, still more preferably 120 parts by mass or less, particularly preferably 100 parts by mass or less, most preferably 70 parts by mass or less. If the amount is more than 200 parts by mass, the silica is less likely to disperse, with the result that processability, low heat build-up properties, and abrasion resistance tend to deteriorate.

In the case where the rubber composition according to the aspect 13-1 or 13-2 of the invention contains silica, it preferably contains a silane coupling agent in combination therewith.

Any silane coupling agent conventionally used in combination with silica in the rubber industry can be used. Examples include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Preferred among these are sulfide silane coupling agents, with bis(3-triethoxysilylpropyl)tetrasulfide being more preferred.

In the case where the rubber composition according to the aspect 13-1 or 13-2 of the invention contains a silane coupling agent, the amount of the silane coupling agent relative to 100 parts by mass of silica is preferably 0.1 parts by mass or more, more preferably 0.5 parts by mass or more. If the amount is less than 0.1 parts by mass, abrasion resistance or low heat build-up properties tend to greatly decrease. The amount of the silane coupling agent is also preferably 15 parts by mass or less, more preferably 10 parts by mass or less. If the amount is more than 15 parts by mass, excess silane coupling agents may be left in the resulting rubber composition, leading to reduction in the processability and abrasion resistance of the rubber composition.

The rubber composition according to the aspect 13-1 or 13-2 of the invention contains at least one amphoteric compound containing at least one acidic functional group selected from the group consisting of a carboxylic acid group, a sulfonic acid group, a phosphoric acid group, a thiosulfonic acid group, a dithiocarboxylic acid group, a thioalkylcarboxylic acid group having a C1-C20 alkyl group, and a phenolic hydroxy group, and also containing a basic functional group that is an amino group or a substituted amino group. Such an amphoteric compound is bound to carbon black through a reaction of the basic functional group portion with a functional group (e.g. carboxyl group) present on the surface of the carbon black, while the acidic functional group portion reacts with a double bond of rubber (polymer). Thus, the carbon black shows improved dispersibility, and such dispersion can be maintained. Moreover; since the carbon black is restrained due to the reaction, heat build-up can also be reduced. Accordingly, a balanced improvement in the above-described properties can be achieved, and also good processability can be obtained. In the aspect 13-1 or 13-2 of the invention, since the specific carbon black and the amphoteric compound are used in combination, the basic functional group of the amphoteric compound highly reacts with the acidic functional group on the surface of the specific carbon black. As a result, abrasion resistance and low heat build-up properties can be synergistically improved while maintaining good processability.

The acidic functional group of the amphoteric compound may be, for example, a carboxylic acid group, a sulfonic acid group, a phosphoric acid group, a thiosulfonic acid group (—$SSO_3H$), a dithiocarboxylic acid group (—CSSH), a thioalkylcarboxylic acid group having a C1-C20 alkyl group (—SRCOOH wherein R represents a linear or branched alkyl group), or a phenolic hydroxy group. Preferred among these is a carboxylic acid group or a thiosulfonic acid group.

The term "carboxylic acid group" includes carboxylic acid ester groups, carboxylic acid salt groups, and amide groups as well as carboxyl groups.

The basic functional group may be, for example, an amino group such as a primary, secondary, or tertiary amino group, or a substituted amino group.

The amphoteric compound may be in the form of a metal salt thereof.

The amount of the amphoteric compound relative to 100 parts by mass of carbo black is preferably 0.01 parts by mass or more, more preferably 0.05 parts by mass or more, still more preferably 0.2 parts by mass or more, particularly preferably 0.5 parts by mass or more. If the amount is less than 0.01 parts by mass, low heat build-up properties and mechanical strength (particularly low heat build-up properties) may not be improved while maintaining a good balance between them. Also, the amount of the amphoteric compound relative to 100 parts by mass of carbon black is 30 parts by mass or less, more preferably 10 parts by mass or less, still more preferably 9 parts by mass or less, particularly preferably 6 parts by mass or less. If the amount is more than 30 parts by mass, mechanical strength, abrasion resistance, or cure stability may deteriorate.

The amphoteric compound is preferably a compound represented by the following formula (I) (also referred to as "compound (I)" in the aspect 13-1 or 13-2 of the invention):

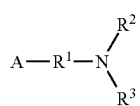
(I)

wherein $R^1$ represents a C2-C30 alkylene group, an alkenylene group, or an alkynylene group; A represents at least one acidic functional group selected from the group consisting of a carboxylic acid group, a sulfonic acid group, a phosphoric acid group, a thiosulfonic acid group, a dithiocarboxylic acid group, a thioalkylcarboxylic acid group having a C1-C20 alkyl group, and a phenolic hydroxy group; and $R^2$ and $R^3$ are the same as or different from each other and each represent a hydrogen atom, a C1-C20 alkyl group, a C2-C20 alkenyl group, a C2-C20 alkynyl group, or a C1-C20 alkoxysilyl group. The compound represented by formula (I) may be in the form of a metal salt thereof.

[Compound (I)]

The compound (I) is represented by formula (I). In formula (I), the alkylene, alkenylene, or alkynylene group for $R^1$ preferably has 2 to 18 carbon atoms, more preferably 2 to 12 carbon atoms. $R^1$ in formula (I) may be either linear or branched. Specific examples of the alkylene group include an ethylene group, a propylene group, and a butylene group. Specific examples of the alkenylene group include a vinylene group, a propenylene group, and a butenylene group. Specific examples of the alkynylene group include an ethynylene group, a propynylene group, and a butynylene group. Examples of the acidic functional group for A in formula (I) include those mentioned above. With regard to $R^2$ or $R^3$ in formula (I), examples of the C1-C20 alkyl group include a methyl group, an ethyl group, a propyl group, and a butyl group; examples of the alkenyl group include a vinyl group, a propenyl group, and a butenyl group; examples of the alkynyl group include an ethynyl group, a propynyl group, and a butynyl group; and examples of the C1-C20 alkoxysilyl group include a triethoxysilyl group and a trimethoxysilyl group.

The compound (I) is preferably a compound represented by the following formula (I-1) and/or formula (I-2).

In formula (I-1), p represents an integer of 2 to 8. In formula (I-2), q represents an integer of 2 to 8; and $M^{r+}$ represents a metal ion, and r represents the valence thereof.

The compound represented by formula (I-2) can be produced by any known method. Specific examples include a method of reacting a haloalkylamine with sodium thiosulfate, and a method of reacting a potassium salt of phthalimide with a dihaloalkane, reacting the resulting compound with sodium thiosulfate, and then hydrolyzing the resulting compound.

Specifically, the compound wherein q is 6 may be produced, for example, by reacting 6-halohexylamine with sodium thiosulfate or by reacting a potassium salt of phthalimide with 1,6-dihalohexane, reacting the resulting compound with sodium thiosulfate, and then hydrolyzing the resulting compound.

The compound wherein q is 3 may be produced, for example, by reacting 3-halopropylamine with sodium thiosulfate or by reacting a potassium salt of phthalimide with 1,3-dihalopropane, reacting the resulting compound with sodium thiosulfate, and then hydrolyzing the resulting compound.

The compound represented by formula (I-1) may be produced, for example, by reacting the compound represented by formula (I-2) with a protonic acid.

In the aspect 13-1 or 13-2 of the invention, a mixture of the compound represented by formula (I-1) and the compound represented by formula (I-2) may also be used. Such a mixture can be prepared by mixing the compound represented by formula (I-1) with the compound represented by formula (I-2), by partially converting the compound represented by formula (I-1) into a metal salt using a metal alkali (e.g. a hydroxide, carbonate, or hydrogen carbonate containing the metal designated by M), or by partially neutralizing the compound represented by formula (I-2) using a protonic acid. The compound of formula (I-1) and/or compound of formula (I-2) produced as above can be removed from the reaction mixture by condensation, crystallization, or other operations. The removed compound of formula (I-1) and/or compound of formula (I-2) usually contains about 0.1 to 5% of moisture. In the aspect 13-1 or 13-2 of the invention, either the compound of formula (I-1) or the compound of formula (I-2) may be used alone. Moreover, multiple types of compounds of formula (I-1) and/or multiple types of compounds of formula (I-2) may be used in combination.

In formula (I-1), p represents an integer of 2 to 8, preferably 2 to 6. In formula (I-2), q represents an integer of 2 to 8, preferably 2 to 6.

The metal ion designated by $M^{r+}$ in formula (I-2) is preferably a lithium ion, a sodium ion, a potassium ion, a cesium ion, a cobalt ion, a copper ion, or a zinc ion, more preferably a lithium ion, a sodium ion, or a potassium ion, still more preferably a sodium ion. In formula (I-2), r represents the valence of the metal ion and may be any possible value for the metal. When the metal ion is an alkali metal ion such as a lithium ion, a sodium ion, a potassium ion, or a cesium ion, r in formula (I-2) is usually 1; r is usually 2 or 3 when the metal ion is a cobalt ion; r is usually an integer of 1 to 3 when the metal ion is a copper ion; and r is usually 2 when the metal ion is a zinc ion. The above method usually produces a sodium salt of the compound represented by formula (I-1). The sodium salt can be converted to a salt of a metal other than sodium by a cation exchange reaction.

The compound represented by formula (I-1) and the compound represented by formula (I-2) each preferably have a median diameter in the range of 0.05 to 100 μm, more preferably 1 to 100 μm. The median diameter can be measured by a laser diffraction method.

The compound represented by formula (I-1) or the compound represented by formula (I-2) may previously be mixed with a supporting agent before use. Examples of the supporting agent include "inorganic fillers and reinforcing agents" described on pp. 510 to 513 of "Rubber Industry Handbook <fourth edition>" edited by The Society of Rubber Science and Technology, Japan, with carbon black, silica, calcined clay, and aluminum hydroxide being preferred among these. The amount of the supporting agent to be used is not particularly limited but is preferably in the range of 10 to 1,000 parts by mass relative to 100 parts by mass of the combined amount of the compound represented by formula (I-1) and/or the compound represented by formula (I-2).

In another suitable embodiment according to the aspect 13-1 or 13-2 of the invention, the amphoteric compound is at least one selected from the group consisting of the following (A1), (B1), (C1) and (D1).
(A1): a compound represented by the formula (II) below (also referred to as "compound (II)" in the aspect 13-1 or 13-2 of the invention)
(B1): a salt of the compound (II)
(C1): a solvate of the compound (II)
(D1): a solvate of a salt of the compound (II)

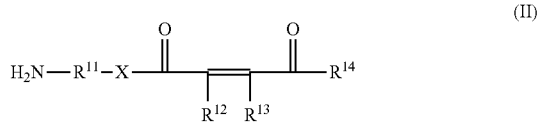

In formula (II), $R^1$ represents an optionally substituted C2-C12 alkanediyl group, an optionally substituted C3-C12 cycloalkanediyl group, or a *—B1-Ar-B2-* group, and * represents a bond; $B^1$ represents a single bond or a C1-C12 alkanediyl group; $B^2$ represents a single bond or a C1-C12 alkanediyl group; Ar represents an optionally substituted C6-C12 divalent aromatic hydrocarbon group; $R^{12}$ and $R^{13}$ are the same as or different from each other and each represent a hydrogen atom, a halogen atom, a C1-C6 alkyl group, a C6-C12 aryl group, a hydroxy group, or a C1-C6 alkoxy group, or they are joined to each other to form a C2-C12 alkanediyl group; $R^{14}$ represents a hydroxy group, a C1-C6 alkoxy group, a C6-C12 aryloxy group, a C7-C15 arylalkoxy group, or —$NR^{15}R^{16}$ in which $R^{15}$ and $R^{16}$ are the same as or different from each other and each represent a hydrogen atom or a C1-C6 alkyl group; and X represents —NH— or —O—.

[Compound (II)]

The term "salt of the compound (II)" includes carboxylate salts of the compound (II) in which $R^{14}$ is a hydroxy group and addition salts formed with acids at the amine portion (—$NH_2$ or —NH—) of the compound (II).

Examples of the carboxylate salts of the compound (II) include salts in which $R_{14}$ in formula (II) is —$O^-(Y^{n+})^{1/n}$ where $Y^{n+}$ represents an n-valent cation, and n represents 1 or 2, specifically salts represented by the following formula (IV):

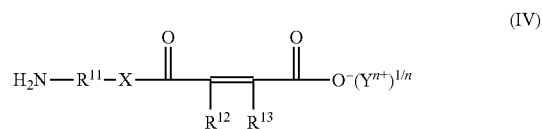

wherein $R^{11}$, $R^{12}$, $R^{13}$, and X are as defined above; $Y^{n+}$ represents an n-valent metal cation, $NH_4^+$, or an n-valent organic cation; and n represents 1 or 2.

Examples of the acids of the addition salt formed with acids at the amine portion of the compound (II) include inorganic acids and organic acids.

The solvate may be, for example, a methanol solvate or a hydrate.

With regard to the bonding of the carbon-carbon double bond with $R^{13}$ or CO—$R^{14}$ in the compound (II), the compound may be a compound in which the carbon-carbon double bond has an E or Z configuration, or a mixture of a compound with an E configuration and a compound with a Z configuration. Among these, it is preferably a compound in which the carbon-carbon double bond has a Z configuration.

The compound (II) is preferably a compound represented by the following formula (III):

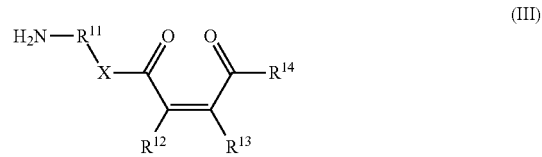

wherein $R^{11}$, $R^{12}$, $R^{13}$, $R^{14}$, and X are as defined above.

Examples of the C2-C12 alkanediyl group for $R^{11}$ include linear alkanediyl groups such as an ethylene group, a trimethylene group, a tetramethylene group, a pentamethylene group, and a hexamethylene group; and branched alkanediyl groups such as an isopropylene group, an isobutylene group, a 2-methyltrimethylene group, an isopentylene group, an isohexylene group, an isooctylene group, a 2-ethylhexylene group, and an isodecylene group. Preferred among these are C3-C12, more preferably C3-C6, alkanediyl groups. Linear alkanediyl groups are also preferred.

Examples of substituents which can be carried by the alkanediyl group include C1-C4 alkoxy groups such as a methoxy group, an ethoxy group, and a butoxy group; halogen atoms such as chlorine, bromine, iodine, and fluorine; C6-C12 aryl groups such as a phenyl group, a naphthyl group, and a biphenyl group; and a hydroxy group. Examples of the substituted alkanediyl group include the following groups in which * represents a bond.

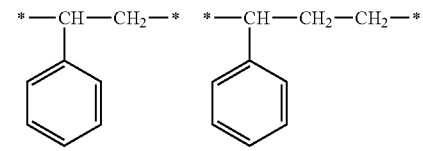

-continued

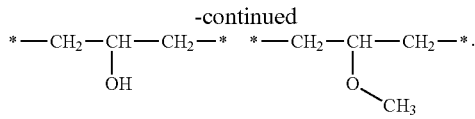

Examples of the C3-C12 cycloalkanediyl group for $R^{11}$ include a cyclopropylene group, a cyclopentylene group, a cyclohexylene group, and a cyclododecylene group.

Examples of substituents which can be carried by the C3-C12 cycloalkanediyl group include C1-C4 alkyl groups such as a methyl group, an ethyl group, an n-propyl group, an n-butyl group, and a t-butyl group; C6-C10 aryl groups such as a phenyl group, a 4-methylphenyl group, and a naphthyl group; C1-C4 alkoxy groups such as a methoxy group, an ethoxy group, and an n-butoxy group; C1-C7 acyl groups such as an acetyl group, a benzoyl group, a formyl group, and a pivaloyl group; C3-C4 alkoxycarbonyl groups such as a methoxycarbonyl group and an ethoxycarbonyl group; C7-C11 aryloxycarbonyl groups such as a phenoxycarbonyl group and a naphthyloxycarbonyl group; and C2-C7 acyloxy groups such as an acetoxy group and a benzoyloxy group.

The C3-C12 cycloalkanediyl group is preferably a cyclopentylene group, a cyclohexylene group, a methylcyclohexylene group, or a t-butylcyclohexylene group.

Examples of the C1-C12 alkanediyl group for $B^1$ or $B^2$ include those mentioned above and a methylene group.

Examples of the C6-C12 divalent aromatic hydrocarbon group for Ar include a phenylene group, a naphthylene group, and a biphenylene group.

Examples of the *—$B^1$—Ar—$B^2$—* group for $R^{11}$ include a phenylene group, a naphthylene group, a biphenylene group, and the following groups in which * represents a bond.

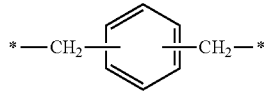

The hydrogen atom contained in Ar may be substituted with at least one group selected from the group consisting of a C1-C4 alkyl group, a C1-C4 alkoxy group, a hydroxy group, a nitro group, a cyano group, a sulfonic group, and a halogen atom.

$R^{11}$ is preferably a C2-C12 alkanediyl group, or a *—$B^1$—Ar—$B^2$—* group, more preferably a C2-C12 alkanediyl group, or an optionally substituted C6-C12 divalent aromatic hydrocarbon group, still more preferably an optionally substituted C6-C12 divalent aromatic hydrocarbon group, particularly preferably a phenylene group.

Examples of the halogen atom for $R^{12}$ or $R^{13}$ include fluorine, chlorine, bromine, and iodine.

Examples of the C1-C6 alkyl group for $R^{12}$ or $R^{13}$ include a methyl group, an ethyl group, an n-propyl group, an isopropyl group, an n-butyl group, an isobutyl group, a sec-butyl group, a tert-butyl group, an n-pentyl group, an isopentyl group, and an n-hexyl group.

The C6-C12 aryl group for $R^{12}$ or $R^{13}$ refers to a C6-C12 monocyclic or a fused polycyclic aromatic hydrocarbon, and examples include a phenyl group, a naphthyl group, and a biphenyl group.

Examples of the C1-C6 alkoxy group for $R^{12}$ or $R^{13}$ include a methoxy group, an ethoxy group, an n-propoxy group, an isopropoxy group, an n-butoxy group, an isobutoxy group, a sec-butoxy group, a tert-butoxy group, an n-pentoxy group, an isopentoxy group, and an n-hexyloxy group.

Examples of the alkanediyl group when $R^{12}$ and $R^{13}$ are joined to each other to form a C2-C12 alkanediyl group include those mentioned above, with C3 or C4 alkanediyl groups being preferred. Examples of the cyclic structure formed by $R^{12}$ and $R^{13}$ together with the carbon atom to which they are attached include a cyclopentene ring and a cyclohexene ring.

Preferably, $R^{12}$ is a hydrogen atom, and $R^{13}$ is a hydrogen atom or a C1-C6 alkyl group. More preferably $R^{12}$ and $R^{13}$ are hydrogen atoms.

Examples of the C1-C6 alkoxy group for $R^{14}$ include those mentioned above.

Examples of the C6-C12 aryloxy group for $R^{14}$ include groups in which an oxy group is bound to the above C6-C12 aryl group, such as a phenyloxy group, a naphthyloxy group, and a biphenyloxy group.

Examples of the C7-C15 arylalkoxy group for $R^{14}$ include a phenylethyloxy group, a benzyloxy group, and a phenylpropyloxy group.

Examples of the —$NR^{15}R^{16}$ for $R^{14}$ include a methylamino group, an ethylamino group, a phenylamino group, an ethylmethylamino group, a dimethylamino group, a diethylamino group, a methylphenylamino group, an ethylphenylamino group, and a diphenylamino group.

$R^{14}$ is preferably a hydroxy group.

X is preferably —NH—.

The $Y^{n+}$ when the carboxylate salt of the compound (II) is a salt represented by formula (IV) may be, for example, a cation of a metal selected from the group consisting of alkali metals, alkaline earth metals, and transition elements of groups IB and IIB of the periodic table, or a cation of an organic base capable of forming a salt with a carboxy group of e.g. an amine. Examples include $Li^+$, $Na^+$, $K^+$, $Mg^{2+}$, $Ca^{2+}$, $Ba^{2+}$, $Zn^{2+}$, $Cu^{2+}$, $Cu^+$, $Ag^+$, $(NH_4)+$, $[NH(C_2H_5)_3]^+$, $[NH(C_2H_5)(i-C_3H_7)_2]^+$, $^+H_3N—(CH_2)_2—NH_3^+$, and $^+H_3N—(CH_2)_6—NH_3^+$. Among these, cations of alkali metals are preferred.

Specific examples of the compound (II) are as follows.

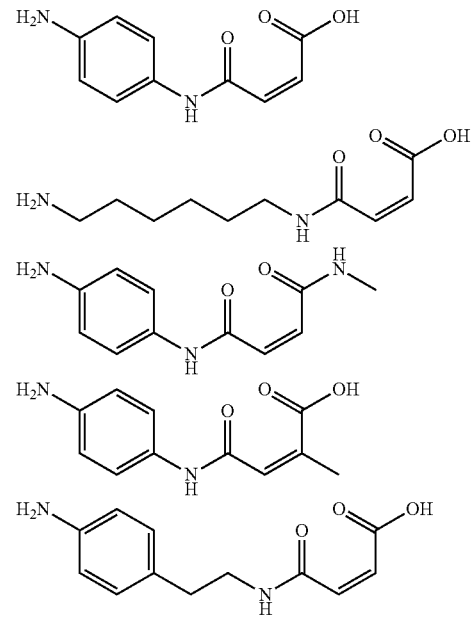

-continued
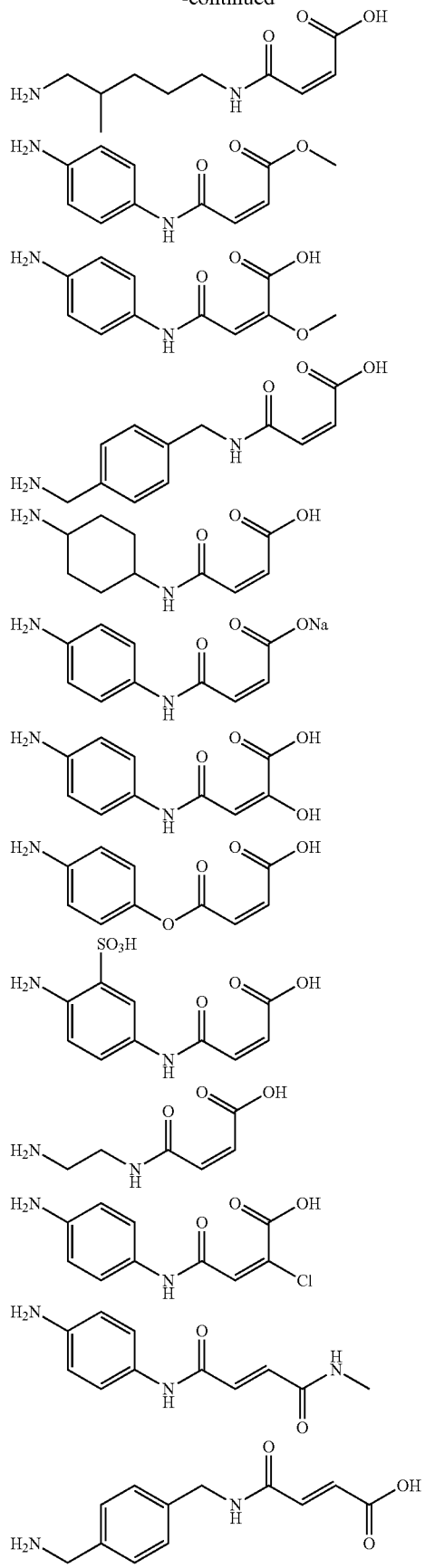
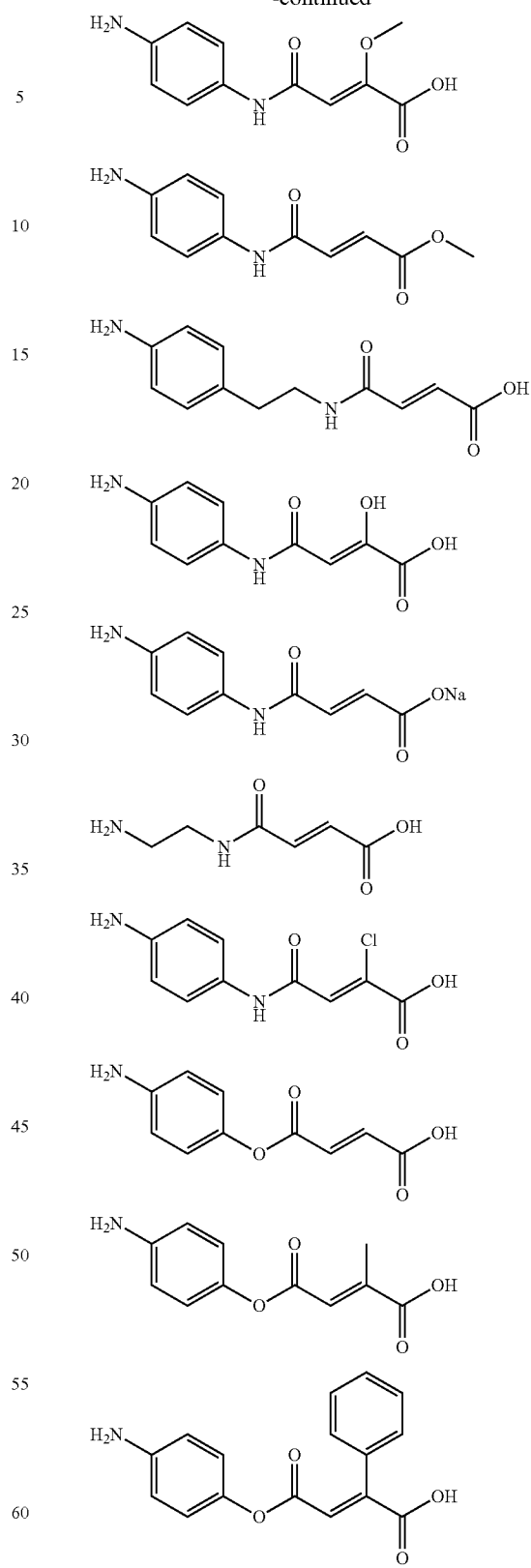
[Method for Producing the Compound (II)]
The compound (II) can be produced, for example, by the reaction shown in the following scheme (a), (b), or (c).

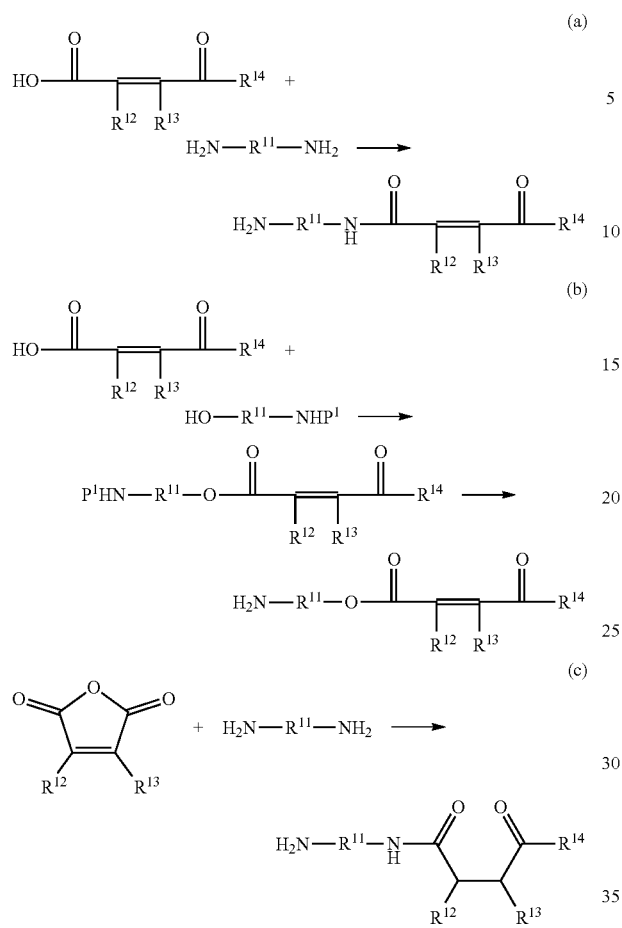

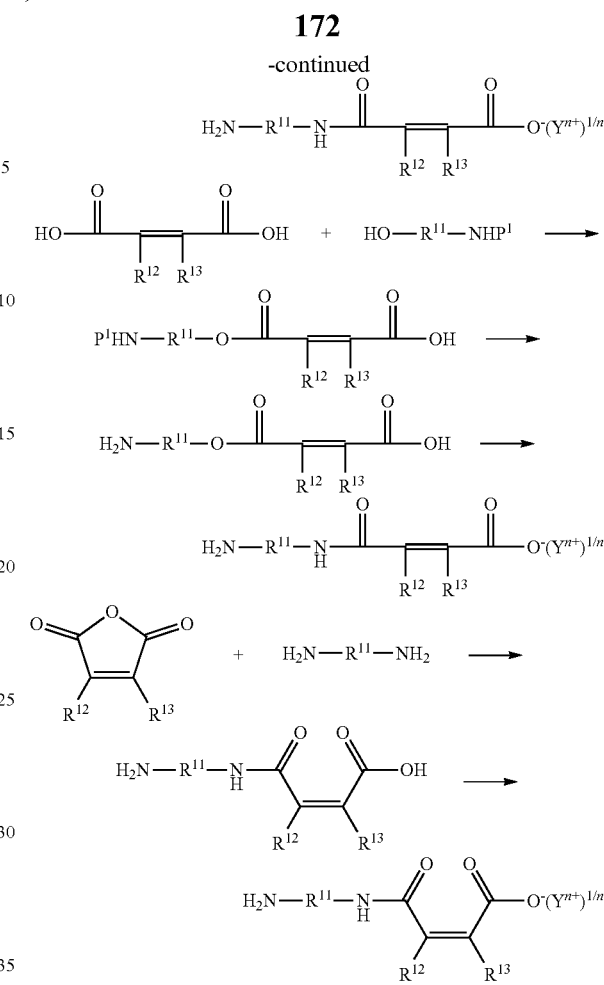

In the schemes (a), (b), and (c), $R^{11}$, $R^{12}$, $R^{13}$ and $R^{14}$ are as defined above; and $P^1$ represents a protecting group.

Examples of the protecting group for $P^1$ include a tert-butoxycarbonyl group. When a protecting group is used, the protecting group can be removed by generally used methods. In particular, the compound represented by formula (III) can be produced by subjecting the corresponding acid anhydride such as maleic anhydride to an esterification reaction, an amidation reaction, or a salt-forming reaction.

[Method for Producing the Salt of the Compound (II)]

The salt of the compound (II) can be produced, for example, by producing a compound (II) in which $R^{14}$ is a hydroxy group through the reaction shown in the scheme (a), (b), or (c), and subjecting the compound (II) to a salt-forming reaction. The salt-forming reaction may be, for example, a reaction in which the compound (II) is converted to a metal salt using a metal.

[Method for Producing the Salt Represented by Formula (IV)]

The salt represented by formula (IV) can be produced, for example, by the method shown in the following scheme:

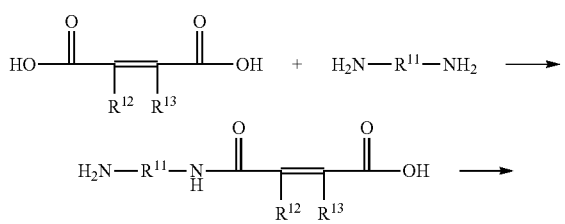

wherein $R^{11}$, $R^{12}$, $R^{13}$ and Y are as defined above; and $P^1$ represents a protecting group.

Examples of the protecting group for $P^1$ include a tert-butoxycarbonyl group. When a protecting group is used, the protecting group can be removed by generally used methods.

The salt represented by formula (IV) may be produced, for example, by producing a compound (II) in which $R^{14}$ is a hydroxy group through the reaction shown in the scheme (a), (b), or (c), and subjecting the compound (II) to a salt-forming reaction. The salt-forming reaction may be a reaction in which the compound (II) is converted to a metal salt using a metal (e.g. a hydroxide, carbonate, or hydrogen carbonate containing the metal designated by Y) or a reaction in which an organic base capable of forming a salt with a carboxy group of e.g. an amine is used to form a salt.

[Method for Producing the Hydrate of the Compound (II)]

The hydrate of the compound (II) can be produced, for example, by conducting the reaction shown in the scheme (a), (b), or (c) in a mixed solvent of water and an organic solvent, or by producing a compound (II) followed by repulping or recrystallization with a water solvent.

[Method for Producing the Methanol Solvate of the Compound (II)]

The methanol solvate of the compound (II) can be produced, for example, by conducting the reaction shown in the scheme (a), (b), or (c) in an organic solvent containing methanol, or by producing a compound (II) followed by repulping or recrystallization with a methanol solvent.

[Method for Producing the Hydrate of a Salt of the Compound (II)]

The hydrate of a salt of the compound (II) can be produced, for example, by producing a compound (II) in which $R^{14}$ is a hydroxy group through the reaction shown in the scheme (a), (b), or (c), and subjecting the compound (II) to a salt-forming reaction in a mixed solvent of water and an organic solvent, or by producing a salt of a compound (II) followed by repulping or recrystallization with a water solvent.

[Method for Producing the Methanol Solvate of a Salt of the Compound (II)]

The methanol solvate of a salt of the compound (II) can be produced, for example, by producing a compound (II) in which $R^{14}$ is a hydroxy group through the reaction shown in the scheme (a), (b), or (c), and subjecting the compound (II) to a salt-forming reaction in an organic solvent containing methanol, or by producing a salt of a compound (II) followed by repulping or recrystallization with a methanol solvent.

The rubber composition according to the aspect 13-1 or 13-2 of the invention may appropriately contain, in addition to the above-described components, compounding agents commonly used in preparation of rubber compositions. Examples of the compounding agents include reinforcing fillers such as clay and talc; zinc oxide; stearic acid; processing aids; various types of antioxidants; softeners such as oil; wax; vulcanizing agents such as sulfur and sulfur-containing compounds; and vulcanization accelerators.

Examples of the oil include process oils, vegetable fats and oils, and mixtures thereof. Examples of process oils include paraffinic process oils, naphthenic process oils, and aromatic process oils. Examples of vegetable fats and oils include castor oil, cottonseed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil, and tung oil. Among these oils, aromatic process oils are preferred because they have compatibility with rubber and can also maintain the tan δ.

The amount of oil relative to 100 parts by mass of the rubber component is preferably 1 part by mass or more, more preferably 3 parts by mass or more. An amount of less than 1 part by mass may result in poor processability and reduced low heat build-up properties or abrasion resistance. The amount of oil is preferably 15 parts by mass or less, more preferably 8 parts by mass or less. An amount of more than 15 parts by mass may deteriorate wet grip performance or abrasion resistance.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. In order to more suitably achieve the effects of the aspect 13-1 or 13-2 of the invention, sulfenamide vulcanization accelerators are preferred among these, with N-t-butyl-2-benzothiazolesulfenamide being more preferred. Guanidine vulcanization accelerators may further be used in combination therewith. The amount of the vulcanization accelerator is preferably 0.1 to 7 parts by mass, more preferably 0.5 to 5 parts by mass, relative to 100 parts by mass of the rubber component.

The vulcanizing agent is not particularly limited but sulfur can be suitably used. The amount of sulfur relative to 100 parts by mass of the rubber component is preferably 0.5 to 5 parts by mass, more preferably 1 to 3 parts by mass. With such an amount of sulfur, the effects of the aspect 13-1 or 13-2 of the invention can be more suitably achieved.

The rubber composition according to the aspect 13-1 or 13-2 of the invention can be prepared by usual methods. Specifically, it may be prepared by kneading the components using a Banbury mixer, a kneader, an open roll mill, an internal mixer, or other kneading machines and vulcanizing the kneadate.

The rubber composition according to the aspect 13-1 or 13-2 of the invention can be used as a rubber composition for tires, and suitable especially as a rubber composition for tires. The rubber composition according to the aspect 13-1 or 13-2 of the invention can be used in various tire components, and suitable especially for, for example, treads (cap treads), base treads, undertreads, sidewalls, carcasses, or clinches.

The pneumatic tire in the aspect 13-1 or 13-2 of the invention can be produced from the rubber composition by usual methods.

Specifically, a rubber composition containing the above components, before vulcanization, is extruded and processed into the shape of a tire component such as a tread and then assembled with other tire components on a tire building machine by a usual method to build an unvulcanized tire. The unvulcanized tire is heated and pressurized in a vulcanizer to produce a tire.

The pneumatic tire in the aspect 13-1 or 13-2 of the invention can be suitably used for passenger vehicles, trucks and buses, or two-wheeled vehicles, or as high performance tires or other tires.

EXAMPLES

The present invention is described in detail with reference to examples. The present invention is not limited to the examples.

[Carbon Black Production Equipment]

Carbon black production equipment was used in which a combustion zone, a feedstock introduction zone, and a rear reaction zone were joined in sequence. The combustion zone had an inner diameter of 500 mm and a length of 1,750 mm and was provided with an air inlet duct and a combustion burner. The feedstock introduction zone was connected to the combustion zone and included a narrow portion with an inner diameter of 55 mm and a length of 700 mm provided with a feedstock nozzle penetrating into the portion from the periphery. The rear reaction zone had an inner diameter of 200 mm and a length of 2,700 mm and was provided with a quenching device.

[Production Conditions] (Furnace Process)

Carbon black was produced in this production equipment using natural gas as a fuel, an oil or petroleum hydrocarbon with properties shown in Table 1 as a feedstock oil, and other conditions shown in Table 2. Table 2 also includes the yields and the properties of each carbon black prepared in the production examples. The properties of each carbon black were determined by the methods described above. The carbon black prepared in any of Production Examples 2 to 5 and 7 to 14 corresponds to carbon black (1) described above. Production Examples 12 to 14 gave poor yields of carbon black, failing to yield evaluable amounts of carbon black. Thus, the amounts of the feedstock oils under their production conditions could not be determined. Additionally, each carbon black prepared in these examples was not subjected to the measurement of properties and a test in which the carbon black was incorporated into a rubber composition, which will be described later.

TABLE 1

| Name of oil | Manufacturer | BMCI | Aliphatic hydrocarbon content (% by mass) |
|---|---|---|---|
| Soybean oil | Nisshin Oilio | 64 | 100 |
| Tall oil 1 | Harima Chemicals | 96 | 40 |
| Tall oil 2 | Harima Chemicals | 86 | 72 |
| Petroleum aliphatic hydrocarbon (PW-32) | Idemitsu Kosan | 21 | 100 |
| Creosote oil | Mitsubishi Chemical | 160 | 0 |

TABLE 2

| | | | Production Example | | | | | | |
|---|---|---|---|---|---|---|---|---|---|
| | | | 1 | 2 | 3 | 4 | 5 | 6 | 7 |
| | Grade | | ISAF | ISAF | ISAF | ISAF | ISAF | SAF | SAF |
| Running condition | Amount of combustion air | Nm³/hr | 500 | 500 | 500 | 500 | 500 | 500 | 500 |
| | Amount of oxygen in combustion air | % | 27 | 27 | 27 | 27 | 27 | 27 | 27 |
| | Amount of natural gas | Nm³/hr | 43 | 43 | 43 | 43 | 43 | 43 | 43 |
| | Temperature of combustion gas | °C. | 1700 | 1700 | 1700 | 1700 | 1700 | 1700 | 1700 |
| | Amount of feedstock oil | kg/hr | 118 | 88 | 80 | 96 | 81 | 118 | 78 |
| Formulation of feedstock oil (parts by mass) | Soybean oil | | — | 40 | 60 | — | — | — | 40 |
| | Tall oil 1 | | — | — | — | — | — | — | — |
| | Tall oil 2 | | — | — | — | — | — | — | — |
| | Petroleum aliphatic hydrocarbon(PW-32) | | — | — | — | 30 | 40 | — | — |
| | Creosote oil | | 100 | 60 | 40 | 70 | 60 | 100 | 60 |
| Composition of feedstock oil (% by mass) | aliphatic hydrocarbon | | — | 40 | 60 | 30 | 40 | — | 40 |
| | (Fatty acid) | | — | 40 | 60 | — | — | — | 40 |
| | Aromatic hydrocarbon | | 100 | 60 | 40 | 70 | 60 | 100 | 60 |
| | Resin acid | | — | — | — | — | — | — | — |
| | BMCI | — | 160 | 122 | 102 | 118 | 104 | 160 | 122 |
| | Yield | % by mass | 50 | 32 | 20 | 35 | 27 | 50 | 17 |
| Properties of carbon black | Dmod | nm | 70 | 63 | 53 | 58 | 58 | 59 | 67 |
| | $\Delta$D50 | nm | 53 | 68 | 68 | 53 | 65 | 43 | 66 |
| | 24M4DBP | cm³/100 g | 107 | 99 | 97 | 100 | 102 | 99 | 115 |
| | CTAB | m²/g | 118 | 117 | 116 | 108 | 114 | 124 | 127 |
| | CTAB/IA | m²/mg | 0.96 | 1.02 | 1.00 | 0.91 | 0.94 | 0.91 | 0.92 |
| | $\Delta$D50/Dmod | — | 0.76 | 1.08 | 1.29 | 0.91 | 1.12 | 0.73 | 0.99 |
| | pH | — | 6.7 | 6.7 | 6.7 | 6.6 | 6.6 | 6.4 | 6.8 |

| | | | Production Example | | | | | | |
|---|---|---|---|---|---|---|---|---|---|
| | | | 8 | 9 | 10 | 11 | 12 | 13 | 14 |
| | Grade | | SAF | SAF | SAF | SAF | ISAF | ISAF | SAF |
| Running condition | Amount of combustion air | Nm³/hr | 500 | 500 | 500 | 500 | 500 | 500 | 500 |
| | Amount of oxygen in combustion air | % | 27 | 27 | 27 | 27 | 27 | 27 | 27 |
| | Amount of natural gas | Nm³/hr | 43 | 50.5 | 43 | 43 | 43 | 43 | 50.5 |
| | Temperature of combustion gas | °C. | 1700 | 1900 | 1700 | 1700 | 1700 | 1700 | 1900 |
| | Amount of feedstock oil | kg/hr | 72 | 79 | 83 | 72 | — | — | — |
| Formulation of feedstock oil (parts by mass) | Soybean oil | | 60 | — | — | — | 80 | 100 | — |
| | Tall oil 1 | | — | 100 | — | — | — | — | — |
| | Tall oil 2 | | — | — | — | — | — | — | 100 |
| | Petroleum aliphatic hydrocarbon(PW-32) | | — | — | 40 | 60 | — | — | — |
| | Creosote oil | | 40 | — | 60 | 40 | 20 | — | — |
| Composition of feedstock oil (% by mass) | aliphatic hydrocarbon | | 60 | 40 | 40 | 60 | 80 | 100 | 72 |
| | (Fatty acid) | | 60 | 40 | — | — | 80 | 100 | 72 |
| | Aromatic hydrocarbon | | 40 | — | 60 | 40 | 20 | — | — |
| | Resin acid | | — | 60 | — | — | — | — | 28 |
| | BMCI | — | 102 | 96 | 104 | 77 | 83 | 64 | 86 |
| | Yield | % by mass | 20 | 13 | 27 | 20 | 10 | 2 | 5 |
| Properties of carbon black | Dmod | nm | 79 | 61 | 51 | 43 | — | — | — |
| | $\Delta$D50 | nm | 113 | 89 | 47 | 47 | — | — | — |
| | 24M4DBP | cm³/100 g | 96 | 104 | 103 | 98 | — | — | — |
| | CTAB | m²/g | 128 | 130 | 132 | 133 | — | — | — |
| | CTAB/IA | m²/mg | 1.03 | 1.06 | 0.88 | 0.84 | — | — | — |
| | $\Delta$D50/Dmod | — | 1.43 | 1.45 | 0.92 | 1.09 | — | — | — |
| | pH | — | 7.7 | 7.3 | 6.7 | 6.1 | — | — | — |

Examples and Comparative Examples in the Aspect 1-1 or 1-2 of the Invention

The chemicals used in examples and comparative examples are listed below.

NR: TSR20 (natural rubber)
High-cis BR: BUNA-CB25 (rare earth-catalyzed BR synthesized using a Nd catalyst, vinyl content: 0.7% by mass, cis content: 97% by mass) available from Lanxess
Carbon black: carbon black prepared in any of Production Examples 1 to 11
Wax: Ozoace 355 available from Nippon Seiro Co., Ltd.
Antioxidant 1: Antigene 6C (N-phenyl-N'-(1,3-dimethylbutyl)-p-phenylenediamine) available from Sumitomo Chemical Co., Ltd.
Antioxidant 2: NOCRAC 224 (poly(2,2,4-trimethyl-1,2-dihydroquinoline)) available from Ouchi Shinko Chemical Industrial Co., Ltd.
Stearic acid: stearic acid "TSUBAKI" available from NOF Corporation
Zinc oxide: Ginrei R available from Toho Zinc Co., Ltd. 5% oil-containing powder sulfur: HK-200-5 (vulcanizing agent, oil content: 5% by mass) available from Hosoi Chemical Industry Co., Ltd
Crosslinking agent: Vulcuren KA9188 (1,6-bis(N,N'-dibenzylthiocarbamoyldithio)hexane, sulfur element content in the compound: 28% by mass) available from Lanxess
Vulcanization accelerator: NOCCELER NS-G available from Ouchi Shinko Chemical Industrial Co., Ltd.

Examples and Comparative Examples

[Production Method A]
(Base Kneading Step 1)
The entire amounts of NR and carbon black were kneaded for four minutes with a 1.7 L Banbury mixer available from Kobe Steel, Ltd., and the mixture was discharged at 150° C. to give a masterbatch.
(Base Kneading Step 2)
To the masterbatch were added the high-cis BR and the materials other than the sulfur, vulcanization accelerator, and KA9188, followed by kneading with the Banbury mixer for four minutes. The mixture was discharged at 150° C. to give a kneadate.

(Final Kneading Step)
To the kneadate were added the sulfur, vulcanization accelerator, and KA9188, followed by kneading for two minutes with an open roll mill. The resulting kneadate was discharged at 105° C. to give an unvulcanized rubber composition.
(Vulcanization Step)
The unvulcanized rubber composition was press-vulcanized at 150° C. for 30 minutes to give a vulcanized rubber composition.
[Production Method B]
A vulcanized rubber composition was prepared in the same manner as in the production method A, except that the entire amounts of the rubber component and carbon black were introduced in the base kneading step 1.

The vulcanized rubber compositions prepared as above were evaluated as follows. Tables 3 and 4 show the test results.
(Abrasion Resistance)
Lambourn abrasion loss was determined using a Lambourn abrasion tester at a temperature of 20° C., a slip ratio of 20%, and a test time of 2 minutes. Then, a volume loss was calculated from the Lambourn abrasion loss. The volume loss of each formulation example is expressed as an index (Lambourn abrasion index) using the equation below, with Comparative Example 1-1 or 1-4 set equal to 100. A higher Lambourn abrasion index indicates better abrasion resistance.

(Abrasion resistance index)=(Volume loss of Comparative Example 1-1 or 1-4)/(Volume loss of each formulation example)×100

(Low Heat Build-Up Properties)
The loss tangent (tan δ) of each formulation example was determined using a viscoelastic spectrometer VES (available from Iwamoto Seisakusho Co., Ltd.) at a temperature of 50° C., an initial strain of 10%, and a dynamic strain of 2%. The tan δ of Comparative Example 1-1 or 1-4 is taken as 100, while the tan δ of the other formulation examples are expressed as an index (rolling resistance index) using the equation below. A higher index indicates better rolling resistance properties (low heat build-up properties). An index of 95 or higher is considered good.

(Rolling resistance index)=(tan δ of Comparative Example 1-1 or 1-4)/(tan δ of each formulation example)×100

TABLE 3

| | Comparative Example 1-1 | Example 1-1 | Example 1-2 | Example 1-3 | Example 1-4 | Comparative Example 1-2 | Comparative Example 1-3 |
|---|---|---|---|---|---|---|---|
| NR | 80 | 80 | 80 | 80 | 80 | 100 | 100 |
| High-cis BR | 20 | 20 | 20 | 20 | 20 | — | — |
| Carbon black | 45 (Production Example 1) | 45 (Production Example 2) | 45 (Production Example 3) | 45 (Production Example 4) | 45 (Production Example 5) | 45 (Production Example 1) | 45 (Production Example 2) |
| Wax | 1.5 | 1.5 | 1.5 | 1.5 | 1.5 | 1.5 | 1.5 |
| Antioxidant 1 | 3 | 3 | 3 | 3 | 3 | 3 | 3 |
| Antioxidant 2 | 1 | 1 | 1 | 1 | 1 | 1 | 1 |
| Stearic acid | 3.5 | 3.5 | 3.5 | 3.5 | 3.5 | 3.5 | 3.5 |
| Zinc oxide | 2.5 | 25 | 2.5 | 2.5 | 2.5 | 2.5 | 2.5 |
| 5% oil-containing powder sulfur (net sulfur content) | 0.7 (0.67) | 0.7 (0.67) | 0.7 (0.67) | 0.7 (0.67) | 0.7 (0.67) | 0.7 (0.67) | 0.7 (0.67) |
| Crosslinking agent (net sulfur content) | — | — | — | — | — | — | — |
| Vulcanization accelerator | 2 | 2 | 2 | 2 | 2 | 2 | 2 |
| Production method | A | A | A | A | A | A | A |
| Abrasion resistance index | 100 | 108 | 107 | 104 | 104 | 83 | 89 |
| Rolling resistance index | 100 | 96 | 98 | 109 | 106 | 89 | 82 |

TABLE 4

|  | Comparative Example 1-4 | Example 1-5 | Example 1-6 | Example 1-7 | Example 1-8 | Example 1-9 | Example 1-10 | Example 1-11 | Comparative Example 1-5 | Comparative Example 1-6 | Comparative Example 1-7 | Comparative Example 1-8 |
|---|---|---|---|---|---|---|---|---|---|---|---|---|
| NR | 80 | 80 | 80 | 80 | 80 | 80 | 80 | 80 | 100 | 100 | 100 | 100 |
| High-cis BR | 20 | 20 | 20 | 20 | 20 | 20 | 20 | 20 | — | — | — | — |
| Carbon black | 45 (Production Example 6) | 45 (Production Example 7) | 45 (Production Example 8) | 45 (Production Example 9) | 45 (Production Example 10) | 45 (Production Example 11) | 45 (Production Example 8) | 45 (Production Example 8) | 45 (Production Example 8) | 45 (Production Example 8) | 45 (Production Example 6) | 45 (Production Example 7) |
| Wax | 1.5 | 1.5 | 1.5 | 1.5 | 1.5 | 1.5 | 1.5 | 1.5 | 1.5 | 1.5 | 1.5 | 1.5 |
| Antioxidant 1 | 3 | 3 | 3 | 3 | 3 | 3 | 3 | 3 | 3 | 3 | 3 | 3 |
| Antioxidant 2 | 1 | 1 | 1 | 1 | 1 | 1 | 1 | 1 | 1 | 1 | 1 | 1 |
| Stearic acid | 3.5 | 3.5 | 3.5 | 3.5 | 3.5 | 3.5 | 3.5 | 3.5 | 3.5 | 3.5 | 3.5 | 3.5 |
| Zinc oxide | 2.5 | 2.5 | 2.5 | 2.5 | 2.5 | 2.5 | 2.5 | 2.5 | 2.5 | 2.5 | 2.5 | 2.5 |
| 5% oil-containing powder sulfur (net sulfur content) | 0.7 (0.67) | 0.7 (0.67) | 0.7 (0.67) | 0.7 (0.67) | 0.7 (0.67) | 0.7 (0.67) | 0.5 (0.48) | 0.7 (0.67) | 0.7 (0.67) | 0.3 (0.29) | 0.7 (0.67) | 0.7 (0.67) |
| Crosslinking agent (net sulfur content) | — | — | — | — | — | — | 2 (0.6) | — | — | — | — | — |
| Vulcanization accelerator | 2 | 2 | 2 | 2 | 2 | 2 | 2 | 2 | 2 | 2 | 2 | 2 |
| Production method | A | A | A | A | A | A | A | B | A | A | A | A |
| Abrasion resistance index | 100 | 108 | 113 | 118 | 102 | 110 | 110 | 111 | 84 | 95 | 85 | 91 |
| Rolling resistance index | 100 | 97 | 117 | 107 | 102 | 104 | 124 | 117 | 100 | 83 | 88 | 82 |

Tables 3 and 4 show that, in the examples in which a specific carbon black in the aspect 1-1 or 1-2 of the invention was incorporated with NR, high-cis BR, and sulfur, abrasion resistance could be improved while maintaining or improving good low heat build-up properties, and thus abrasion resistance and low heat build-up properties could be simultaneously achieved to a high extent. In contrast, these properties were inferior when carbon black other than the specific carbon black was used.

In particular, for example, comparison of Comparative Example 1-1 or Example 1-1 with Comparative Examples 1-2 and 1-3 reveals that the addition of the specific carbon black to a formulation including NR and high-cis BR in the rubber component significantly and synergistically improved the balance of abrasion resistance and rolling resistance (low heat build-up properties) as compared to the addition to a formulation including only NR in the rubber component.

Examples and Comparative Examples in the Aspect 2-1 or 2-2 of the Invention

The chemicals used in examples and comparative examples are listed below.
(Materials)
NR (natural rubber): TSR20
Carbon black: carbon black prepared in any of Production Examples 1 to 11
Aromatic oil: Process X-140 (aromatic process oil) available from Japan Energy Corporation
Petroleum-based resin: SP1068 resin (non-reactive alkylphenol resin represented by the above formula (1) in which m is an integer of 1 to 10, and $R^1$ is an octyl group) available from Nippon Shokubai Co., Ltd.
Stearic acid: stearic acid "Kiri" available from NOF Corporation
Zinc oxide: zinc oxide #2 available from Mitsui Mining & Smelting Co., Ltd.
Antioxidant: NOCRAC 6C (N-phenyl-N'-(1,3-dimethylbutyl)-p-phenylenediamine) available from Ouchi Shinko Chemical Industrial Co., Ltd.
Wax: Ozoace 0355 available from Nippon Seiro Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.
BR (polybutadiene rubber): BR150B (cis content: 95% by mass) available from Ube Industries, Ltd.
SBR: SBR1502 (styrene content: 23.5% by mass) available from Sumitomo Chemical Co., Ltd.
Silica: ULTRASIL VN3 ($N_2SA$: 175 $m^2/g$) available from Degussa
Silane coupling agent: Si69 (bis(3-triethoxysilylpropyl)tetrasulfide) available from Degussa
Carbon black 1: DIABLACK I ($N_2SA$: 114 $m^2/g$) available from Mitsubishi Chemical Corporation
Carbon black 2: SHOBLACK N330 ($N_2SA$: 75 $m^2/g$, DBP: 102 ml/100 g) available from Cabot Japan K.K.
Carbon black 3: PRINTEX XE2B ($N_2SA$: 1,000 $m^2/g$, DBP: 420 ml/100 g) available from Degussa
Cobalt stearate: COST-S available from Nippon Mining & Metals Co., Ltd.
Insoluble sulfur: Sanfel EX available from Sanshin Chemical Industry Co., Ltd.
(Preparation of Clinch Rubber and Chafer Rubber)
Tire conductive components (clinch rubber, chafer rubber) to be contact in the rim of a tire and ensure antistatic properties for the tire were prepared as follows. The compounding components listed in the step 1 column in Table 5 or 6 were kneaded using an internal Banbury mixer for four minutes to give a discharge temperature of 150° C. (base kneading step 1). Next, the kneadate prepared in the base kneading step 1 was kneaded with the components listed in the step 2 column using an internal Banbury mixer for three minutes to give a discharge temperature of 150° C. (base kneading step 2). Further, the kneadate prepared in the base kneading step 2 was kneaded using an internal Banbury mixer for three minutes to give a discharge temperature of 140° C. (rekneading step). Then, the kneadate prepared in the rekneading step was combined with the sulfur and vulcanization accelerator and further kneaded for three minutes to give a discharge temperature of 100° C., followed by conventional extrusion and calendering steps to prepare a clinch rubber composition or a chafer rubber composition.
(Preparation of Covering Rubber and Conductive Rubber)

The compounding components listed in Table 7 or 8, excluding the sulfur and vulcanization accelerator, were kneaded using an internal Banbury mixer for four minutes to give a discharge temperature of 150° C. Thereafter, the kneadate was further kneaded with the sulfur and vulcanization accelerator for three minutes to give a discharge temperature of 100° C., followed by conventional extrusion and calendering steps to prepare a covering rubber composition (undertread rubber composition) or a conductive rubber composition.
(Preparation of Tread Rubber, Sidewall Rubber, and Breaker Rubber)

The compounding components listed in Table 9, 10, or 11, excluding the sulfur and vulcanization accelerator, were kneaded using an internal Banbury mixer for four minutes to give a discharge temperature of 150° C. Thereafter, the kneadate was further kneaded with the sulfur and vulcanization accelerator for three minutes to give a discharge temperature of 100° C., followed by conventional extrusion and calendering steps to prepare a tread rubber composition, a sidewall rubber composition, or a breaker rubber composition. The tread rubber composition was extruded together with the covering rubber composition and the conductive rubber composition into the shape of a tread.
(Preparation of Inner Sidewall Layer Rubber and Cushion Rubber)

The compounding components listed in the step 1 column in Table 12 were kneaded using an internal Banbury mixer for four minutes to give a discharge temperature of 150° C. (base kneading step 1). Next, the kneadate prepared in the base kneading step 1 was kneaded with the components listed in the step 2 column using an internal Banbury mixer for three minutes to give a discharge temperature of 150° C. (base kneading step 2). Further, the kneadate prepared in the base kneading step 2 was kneaded using an internal Banbury mixer for three minutes to give a discharge temperature of 140° C. (rekneading step). Then, the kneadate prepared in the rekneading step was combined with the sulfur and vulcanization accelerator and further kneaded for three minutes to give a discharge temperature of 100° C., followed by conventional extrusion and calendering steps to prepare an inner sidewall layer rubber composition or a cushion rubber composition.
(Preparation of Test Vulcanized Rubber Slab)

The rubber compositions shown in Tables 5 to 12 were vulcanized at 170° C. for 15 minutes to prepare vulcanized rubber slab sheets (2 mm×130 mm×130 mm). The vulcanized rubber slab sheets were evaluated on the following items. Tables 5 to 12 show the results. The reference comparative example in Table 5 is Comparative Example 2-1, and the reference comparative example in Table 6 is Comparative Example 2-2.
(Degree of Carbon Black Dispersion)

Test specimens were cut out of the vulcanized rubber slab sheets (rubber compositions in Tables 5, 6, and 12). The number of carbon black aggregates in each vulcanized rubber composition was counted in accordance with JIS K 6812 "Method for the assessment of the degree of pigment or carbon black dispersion in polyolefin pipes, fittings and compounds" to calculate the degree of carbon black dispersion (%). A higher degree of dispersion indicates better dispersibility of carbon black.
(Volume Resistivity (Ω·Cm) of Rubber Composition)

Using the vulcanized rubber slab sheets (rubber compositions in Tables 5 to 12, 2 mm in thickness×130 mm×130 mm), the volume resistivity (volume resistance) of each rubber composition was measured with an ultra-high resistance/micro current meter R8340A available from Advantest at an applied voltage of 10 V, a temperature of 23° C., and a relative humidity of 55%. Tables 5 to 12 show the common logarithms of the measurements. A higher value indicates that the rubber composition has a higher volume resistivity and a lower conductivity.
(Abrasion Resistance)

Lambourn abrasion loss was determined using a Lambourn abrasion tester at a temperature of 20° C., a slip ratio of 40%, and a test time of 2 minutes. Then, a volume loss was calculated from the Lambourn abrasion loss. The volume loss of each formulation example is expressed as an index (Lambourn abrasion index), with the reference comparative example set equal to 100. A higher Lambourn abrasion index indicates better abrasion resistance.
(Rolling Resistance Properties)

Test specimens were cut out of the vulcanized rubber slab sheets (rubber compositions in Tables 5 and 6). The tan δ of each test rubber composition was determined using a viscoelastic spectrometer VES (available from Iwamoto Seisakusho Co., Ltd.) at a temperature of 50° C., an initial strain of 10%, a dynamic strain of 2%, and a frequency of 10 Hz. The rolling resistance properties of the rubber compositions are expressed as an index (rolling resistance index) using the equation below, with the reference comparative example set equal to 100. A higher index indicates better rolling resistance properties (low heat build-up properties). An index of 95 or higher is considered good.

(Rolling resistance index)=(tan δ of reference comparative example)/(tan δ of each formulation example)×100

(Preparation of Pneumatic Tire)

The rubber compositions prepared according to the formulations shown in Tables 5 and 6 were used for clinch rubbers and chafer rubbers, and the rubber compositions prepared according to the rubber formulations shown in Tables 7 to 12 were used for covering rubbers, conductive rubbers, tread rubbers, sidewall rubbers, breaker rubbers, inner sidewall layer rubbers, and cushion rubbers. These rubbers were assembled and vulcanized at 170° C. for 15 minutes, thereby preparing 195/65R15 pneumatic tires (test tires) having the structure shown in FIG. 1.

The basic structure of each test tire is as follows.
(Carcass Ply)
Cord angle: 90 degrees in tire circumferential direction
Cord material: polyester 1670 dtex/2
(Breaker)
Cord angle: 24 degrees×24 degrees in tire circumferential direction
Cord material: steel cord (2+2×0.25)

The inner sidewall layer rubber had a thickness of 0.5 mm; the covering rubber had a thickness of 1 mm; and the cushion rubber had a thickness of 1 mm. The conductive rubber had a width of 3 mm and was configured to be continuous in the tire circumferential direction.

The contact between the covering rubber and the cushion rubber was formed as a strip with a width of 5 mm in the tire circumferential direction. The contact between the covering rubber and the conductive rubber was formed over the entire surface of the conductive rubber in the tire width direction. The contact between the inner sidewall layer rubber and the cushion rubber was formed as a strip with a width of 5 mm in the tire circumferential direction. The contact between the inner sidewall layer rubber and the clinch rubber was formed with a width of 5 mm or more along the shape of the carcass.

The test tires were evaluated on the following items. Tables 5 and 6 show the results.

(Tire Electrical Resistance)

As shown in FIG. 2, the electrical resistance of each tire-rim R assembly was measured according to the JATMA standards using a measurement instrument including a metal plate 52 (electrical resistance: 10 Ω or less) having a polished surface and placed on an insulating plate 51 (electrical resistance: $10^{12}$ Ω or more), a conductive tire mounting shaft 53 for holding the tire/rim assembly, and an electrical resistance meter 54. The test tires used were previously sufficiently cleaned of the mold releasing agents and dirt on the surface and sufficiently dried. The other conditions were as follows.

Rim: made of aluminum alloy, 15×6JJ
Internal pressure: 200 kPa
Load: 5.3 kN
Temperature of test environment (temperature of test room): 25° C.
Humidity: 50%
Measuring range of electrical resistance meter: $10^3$ to $1.6 \times 10^{16}$ Ω
Test voltage (applied voltage): 1,000 V The test was carried out as follows.
(1) A test tire was mounted on a rim R to prepare a tire-rim assembly. Soap water as a lubricant was applied to the contact area between them.
(2) The tire-rim assembly was allowed to stand for two hours in a test room and then attached to the tire mounting shaft 53.
(3) The above-indicated load was applied to the tire-rim assembly for 0.5 minutes and released, further applied for 0.5 minutes and released, and then further applied for 2 minutes.
(4) The test voltage was applied, and after a lapse of 5 minutes the electrical resistance between the tire mounting shaft 53 and the metal plate 52 was measured using the electrical resistance meter 54. It was measured in four points spaced at 90° intervals in the tire circumferential direction. The highest measured value was taken as the electrical resistance (measured value) of the tire.

The measurement was performed before running (fresh tire) and after 20,000 km running. Tables 5 and 6 list the common logarithms of the electrical resistances. A tire with a common logarithm of 8 or less is considered to have a good conductivity. Tire electrical resistance was compared before running and after 20,000 km running. The tables also show the increases in electrical resistance caused by 20,000 km running. A lower increase indicates that the tire can be better prevented from accumulating static electricity, or can exhibit good antistatic properties, during running throughout the life of the tire.

(Rim Chafing Resistance)

A test tire prepared as above was mounted and subjected to 20,000 km running. Thereafter, the appearance of the clinch was visually observed to evaluate the occurrence of chafing as follows: "Good" indicates good conditions; "Fair" indicates chafing was partly observed; and "Poor" indicates chafing was observed at many parts.

TABLE 5

| | | Clinch rubber, Chafer rubber | | | | | |
|---|---|---|---|---|---|---|---|
| | | | Example 2-1 | Example 2-2 | Example 2-3 | Example 2-4 | Comparative Example 2-1 |
| | | Carbon black used | Production Example 2 | Production Example 3 | Production Example 4 | Production Example 5 | Production Example 1 |
| Amount (parts by mass) | Step 1 | NR | 100 | 100 | 100 | 100 | 100 |
| | | Carbon black (prepared in the above Production Example) | 60 | 60 | 60 | 60 | 60 |
| | | Aromatic oil | 5 | 5 | 5 | 5 | 5 |
| | | Petroleum-based resin | 3 | 3 | 3 | 3 | 3 |
| | Step 2 | Carbon black (prepared in the above Production Example) | 15 | 15 | 15 | 15 | 15 |
| | | Stearic acid | 2.5 | 2.5 | 2.5 | 2.5 | 2.5 |
| | | Zinc oxide | 3 | 3 | 3 | 3 | 3 |
| | | Antioxidant | 3 | 3 | 3 | 3 | 3 |
| | | Wax | 1.2 | 1.2 | 1.2 | 1.2 | 1.2 |
| | Step 3 | Rekneading | performed | performed | performed | performed | performed |
| | Step 4 | Sulfur | 1.5 | 1.5 | 1.5 | 1.5 | 1.5 |
| | | Vulcanization accelerator | 0.7 | 0.7 | 0.7 | 0.7 | 0.7 |
| Evaluation result | | Degree of carbon black dispersion (%) | 98 | 98 | 96 | 96 | 97 |
| | | Volume resistivity | 5.6 | 5.6 | 5.4 | 5.4 | 5.4 |
| | | Abrasion resistance | 113 | 111 | 107 | 107 | 100 |
| | | Rolling resistance properties | 96 | 99 | 111 | 108 | 100 |
| | | Tire electrical resistance (initial) | 6.3 | 6.3 | 6.2 | 6.3 | 6.3 |
| | | Tire electrical resistance (after running 20,000 km) | 6.4 | 6.4 | 6.6 | 6.6 | 11 |
| | | Increase in electrical resistance caused by running (20,000 km) | 0.1 | 0.1 | 0.4 | 0.3 | 4.7 |
| | | Rim chafing resistance | Good | Good | Good | Good | Poor |

TABLE 6

Clinch rubber, Chafer rubber

|   |   |   | Example 2-5 | Example 2-6 | Example 2-7 | Example 2-8 | Example 2-9 | Comparative Example 2-2 |
|---|---|---|---|---|---|---|---|---|
|   |   | Carbon black used | Production Example 7 | Production Example 8 | Production Example 9 | Production Example 10 | Production Example 11 | Production Example 6 |
| Amount (parts by mass) | Step 1 | NR | 100 | 100 | 100 | 100 | 100 | 100 |
|   |   | Carbon black (prepared in the above Production Example) | 60 | 60 | 60 | 60 | 60 | 60 |
|   |   | Aromatic oil | 5 | 5 | 5 | 5 | 5 | 5 |
|   |   | Petroleum-based resin | 3 | 3 | 3 | 3 | 3 | 3 |
|   | Step 2 | Carbon black (prepared in the above Production Example) | 5 | 5 | 5 | 5 | 5 | 5 |
|   |   | Stearic acid | 2.5 | 2.5 | 2.5 | 2.5 | 2.5 | 2.5 |
|   |   | Zinc oxide | 3 | 3 | 3 | 3 | 3 | 3 |
|   |   | Antioxidant | 3 | 3 | 3 | 3 | 3 | 3 |
|   |   | Wax | 1.2 | 1.2 | 1.2 | 1.2 | 1.2 | 1.2 |
|   | Step 3 | Rekneading | performed | performed | performed | performed | performed | performed |
|   | Step 4 | Sulfur | 1.5 | 1.5 | 1.5 | 1.5 | 1.5 | 1.5 |
|   |   | Vulcanization accelerator | 0.7 | 0.7 | 0.7 | 0.7 | 0.7 | 0.7 |
| Evaluation result | Degree of carbon black dispersion (%) |   | 96 | 96 | 97 | 96 | 95 | 96 |
|   | Volume resistivity |   | 5.4 | 5.6 | 5.4 | 5.5 | 5.6 | 5.5 |
|   | Abrasion resistance |   | 111 | 114 | 121 | 106 | 112 | 100 |
|   | Rolling resistance properties |   | 97 | 118 | 107 | 102 | 105 | 100 |
|   | Tire electrical resistance (initial) |   | 6.2 | 6.3 | 6.3 | 6.5 | 6.6 | 6.5 |
|   | Tire electrical resistance (after running 20,000 km) |   | 6.4 | 6.5 | 6.3 | 7 | 6.6 | 10.9 |
|   | Increase in electrical resistance caused by running (20,000 km) |   | 0.2 | 0.2 | 0 | 0.5 | 0 | 4.4 |
|   | Rim chafing resistance |   | Good | Good | Good | Good | Good | Poor |

TABLE 7

Covering rubber (Undertread)

|   |   | Formulation |
|---|---|---|
| Amount (parts by mass) | NR | 75 |
|   | SBR | 25 |
|   | Carbon black 1 | 20 |
|   | Carbon black 2 | 25 |
|   | Stearic acid | 1 |
|   | Zinc oxide | 3 |
|   | Antioxidant | 2 |
|   | Sulfur | 3 |
|   | Vulcanization accelerator | 1 |
| Volume resistivity |   | 5.2 |

TABLE 8

Conductive rubber

|   |   | Formulation |
|---|---|---|
| Amount (parts by mass) | NR | 30 |
|   | SBR | 70 |
|   | Carbon black 1 | 55 |
|   | Wax | 1.5 |
|   | Stearic acid | 1 |
|   | Zinc oxide | 3 |
|   | Antioxidant | 2 |
|   | Sulfur | 1.8 |
|   | Vulcanization accelerator | 1 |
| Volume resistivity |   | 5.4 |

TABLE 9

Tread rubber

|   |   | Formulation |
|---|---|---|
| Amount (parts by mass) | SBR | 100 |
|   | Silica | 50 |
|   | Silane coupling agent | 5 |
|   | Wax | 1 |
|   | Stearic acid | 1 |
|   | Zinc oxide | 3 |
|   | Antioxidant | 2 |
|   | Sulfur | 1.5 |
|   | Vulcanization accelerator | 1 |
| Volume resistivity |   | 13.5 |

TABLE 10

Sidewall rubber

|   |   | Formulation |
|---|---|---|
| Amount (parts by mass) | NR | 60 |
|   | BR | 40 |
|   | Silica | 45 |
|   | Silane coupling agent | 4.5 |
|   | Wax | 1 |
|   | Stearic acid | 1 |
|   | Zinc oxide | 3 |
|   | Antioxidant | 3 |
|   | Sulfur | 2 |
|   | Vulcanization accelerator | 1 |
| Volume resistivity |   | 13.8 |

TABLE 11

Breaker rubber

|   |   | Formulation |
|---|---|---|
| Amount (parts by mass) | NR | 100 |
|   | Silica | 55 |

TABLE 11-continued

Breaker rubber

| | | Formulation |
|---|---|---|
| Silane coupling agent | | 5.5 |
| Cobalt stearate | | 2 |
| Stearic acid | | 1 |
| Zinc oxide | | 10 |
| Antioxidant | | 2 |
| Insoluble sulfur | | 5.5 |
| Vulcanization accelerator | | 0.9 |
| Volume resistivity | | 14.0 |

TABLE 12

Inner sidewall layer rubber, Cushion rubber

| | | | Formulation |
|---|---|---|---|
| Amount (parts by mass) | Step 1 | NR | 60 |
| | | Silica | 25 |
| | | Silane coupling agent | 2.0 |
| | | Carbon black 3 | 12.5 |
| | | Aromatic oil | 5 |
| | | Petroleum-based resin | 3 |
| | Step 2 | BR | 40 |
| | | Stearic acid | 2.5 |
| | | Zinc oxide | 3 |
| | | Antioxidant | 2 |
| | | Wax | 1.2 |
| | Step 3 | Rekneading | performed |
| | Step 4 | Sulfur | 1.5 |
| | | Vulcanization accelerator | 0.7 |
| Degree of carbon black dispersion (%) | | | 99 |
| Volume resistivity | | | 5.2 |

Tables 5 and 6 demonstrate that, in each of the examples using a rubber composition containing a carbon black specified in the aspect 2-1 or 2-2 of the invention, improved abrasion resistance and good conductivity could be exhibited while maintaining or improving good low heat build-up properties, and also the deterioration in conductive properties during service could be reduced. In particular, it is demonstrated that pneumatic tires including a clinch and/or chafer formed from the rubber composition could exhibit rim chafing resistance and antistatic properties for a long time.

In contrast, in each of the comparative examples using a rubber composition containing carbon black other than the carbon black specified in the aspect 2-1 or 2-2 of the invention, the abrasion resistance and the effect of reducing deterioration in conductive properties were lower than the examples. As a result, particularly when such a rubber composition was used in a clinch and/or chafer, unfortunately the tire showed rim chafing and, further, poor antistatic properties after long-term service.

Examples and Comparative Examples in the Aspect 3-1 or 3-2 of the Invention

The chemicals used in examples and comparative examples are listed below.
(Materials)
NR (natural rubber): TSR20
SBR 1 (styrene butadiene rubber): NS116R (S-SBR, vinyl content:
63% by mass, styrene content: 21% by mass) available from Zeon Corporation
Carbon black: carbon black prepared in any of Production Examples 1 to 11
Stearic acid: stearic acid "Kiri" available from NOF Corporation
Zinc oxide: zinc oxide #2 available from Mitsui Mining & Smelting Co., Ltd.
Antioxidant: NOCRAC 6C (N-phenyl-N'-(1,3-dimethylbutyl)-p-phenylenediamine) available from Ouchi Shinko Chemical Industrial Co., Ltd.
Wax: Ozoace 0355 available from Nippon Seiro Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.
BR (polybutadiene rubber): BR150B (cis content: 95% by mass) available from Ube Industries, Ltd.
SBR 2: SBR1502 (styrene content: 23.5% by mass) available from Sumitomo Chemical Co., Ltd.
Silica: ULTRASIL VN3 ($N_2SA$: 175 $m^2/g$) available from Degussa Silane coupling agent: Si69 (bis(3-triethoxysilylpropyl)tetrasulfide) available from Degussa
Carbon black 1: DIABLACK I ($N_2SA$: 114 $m^2/g$) available from Mitsubishi Chemical Corporation
Carbon black 2: SHOBLACK N330 ($N_2SA$: 75 $m^2/g$, DBP: 102 ml/100 g) available from Cabot Japan K.K.
Carbon black 3: PRINTEX XE2B ($N_2SA$: 1,000 $m^2/g$, DBP: 420 ml/100 g) available from Degussa
Aromatic oil: Process X-140 (aromatic process oil) available from Japan Energy Corporation
Petroleum-based resin: SP1068 resin available from Nippon Shokubai Co., Ltd.
Cobalt stearate: COST-S available from Nippon Mining & Metals Co., Ltd.
Insoluble sulfur: Sanfel EX available from Sanshin Chemical Industry Co., Ltd.

(Preparation of Conductive Rubber)

A tire conductive component (a conductive rubber embedded in a tread to be partially exposed on the surface of the tread) to be in contact with the ground and ensure antistatic properties for the tire was prepared as follows. The compounding components listed in the step 1 column in Table 13 or 14 were kneaded using an internal Banbury mixer for four minutes to give a discharge temperature of 150° C. (base kneading step 1). Next, the kneadate prepared in the base kneading step 1 was kneaded with the components listed in the step 2 column using an internal Banbury mixer for three minutes to give a discharge temperature of 100° C. (base kneading step 2). Further, the kneadate prepared in the base kneading step 2 was extruded together with a tread rubber and covering rubber (undertread) prepared as described below to prepare a conductive rubber. The conductive rubber had the shape described in JP 2944908 B.

(Preparation of Covering Rubber)

The compounding components listed in Table 15, excluding the sulfur and vulcanization accelerator, were kneaded using an internal Banbury mixer for four minutes to give a discharge temperature of 150° C. Thereafter, the kneadate was further kneaded with the sulfur and vulcanization accelerator for three minutes to give a discharge temperature of 100° C. The resulting kneadate was extruded with the conductive rubber and tread rubber by a conventional method to prepare a covering rubber composition (undertread rubber composition).

(Preparation of Tread Rubber, Sidewall Rubber, and Breaker Rubber)

The compounding components listed in Table 16, 17, or 18, excluding the sulfur and vulcanization accelerator, were kneaded using an internal Banbury mixer for four minutes to give a discharge temperature of 150° C. Thereafter, the kneadate was further kneaded with the sulfur and vulcanization accelerator for three minutes to give a discharge temperature of 100° C., followed by conventional extrusion and calendering steps to prepare a tread rubber composition, a sidewall rubber composition, or a breaker rubber composition. The tread rubber composition was extruded together with the covering rubber composition and the conductive rubber composition into the shape of a tread.

(Preparation of Inner Sidewall Layer Rubber and Cushion Rubber)

The compounding components listed in the step 1 column in Table 19 were kneaded using an internal Banbury mixer for four minutes to give a discharge temperature of 150° C. (base kneading step 1). Next, the kneadate prepared in the base kneading step 1 was kneaded with the components listed in the step 2 column using an internal Banbury mixer for three minutes to give a discharge temperature of 150° C. (base kneading step 2). Further, the kneadate prepared in the base kneading step 2 was kneaded using an internal Banbury mixer for three minutes to give a discharge temperature of 140° C. (rekneading step). Then, the kneadate prepared in the rekneading step was combined with the sulfur and vulcanization accelerator and further kneaded for three minutes to give a discharge temperature of 1000° C., followed by conventional extrusion and calendering steps to prepare an inner sidewall layer rubber composition or a cushion rubber composition.

(Preparation of Clinch Rubber and Chafer Rubber)

The compounding components listed in the step 1 column in Table 20 were kneaded using an internal Banbury mixer for four minutes to give a discharge temperature of 1500° C. (base kneading step 1). Next, the kneadate prepared in the base kneading step 1 was kneaded with the components listed in the step 2 column using an internal Banbury mixer for three minutes to give a discharge temperature of 150° C. (base kneading step 2). Further, the kneadate prepared in the base kneading step 2 was kneaded using an internal Banbury mixer for three minutes to give a discharge temperature of 140° C. (rekneading step). Then, the kneadate prepared in the rekneading step was combined with the sulfur and vulcanization accelerator and further kneaded for three minutes to give a discharge temperature of 100° C., followed by conventional extrusion and calendering steps to prepare a clinch rubber composition or a chafer rubber composition.

(Preparation of Test Vulcanized Rubber Slab)

The rubber compositions shown in Tables 13 to 20 were vulcanized at 170° C. for 15 minutes to prepare vulcanized rubber slab sheets (2 mm×130 mm×130 mm). The vulcanized rubber slab sheets were evaluated on the following items. Tables 13 to 20 show the results. The reference comparative example in Table 13 is Comparative Example 3-1, and the reference comparative example in Table 14 is Comparative Example 3-2.

(Degree of Carbon Black Dispersion)

Test specimens were cut out of the vulcanized rubber slab sheets (rubber compositions in Tables 13, 14, 19, and 20). The number of carbon black aggregates in each vulcanized rubber composition was counted in accordance with JIS K 6812 "Method for the assessment of the degree of pigment or carbon black dispersion in polyolefin pipes, fittings and compounds" to calculate the degree of carbon black dispersion (%). A higher degree of dispersion indicates better dispersibility of carbon black.

(Volume Resistivity ($\Omega \cdot Cm$) of Rubber Composition)

Using the vulcanized rubber slab sheets (rubber compositions in Tables 13 to 20, 2 mm in thickness×130 mm×130 mm), the volume resistivity (volume resistance) of each rubber composition was measured with an ultra-high resistance/micro current meter R8340A available from Advantest at an applied voltage of 10 V, a temperature of 23° C., and a relative humidity of 55%. Tables 13 to 20 show the common logarithms of the measurements. A higher value indicates that the rubber composition has a higher volume resistivity and a lower conductivity.

(Abrasion Resistance)

The volume loss of each vulcanized rubber composition was determined at a load of 50 N, a speed of 20 km/h, and a slip angle of 5° using a laboratory abrasion and skid tester (LAT tester). The volume loss of each formulation example is expressed as an index, with the reference comparative example set equal to 100. A higher index indicates better abrasion resistance.

(Rolling Resistance Properties)

Test specimens were cut out of the vulcanized rubber slab sheets (rubber compositions in Tables 13 and 14). The tan δ of each test rubber composition was determined using a viscoelastic spectrometer VES (available from Iwamoto Seisakusho Co., Ltd.) at a temperature of 50° C., an initial strain of 10%, a dynamic strain of 2%, and a frequency of 10 Hz. The rolling resistance properties of the rubber compositions are expressed as an index (rolling resistance index) using the equation below, with the reference comparative example set equal to 100. A higher index indicates better rolling resistance properties (low heat build-up properties). An index of 95 or higher is considered good.

(Rolling resistance index)=(tan δ of reference comparative example)/(tan δ of each formulation example)×100

(Preparation of Pneumatic Tire)

The rubber compositions prepared according to the formulations shown in Tables 13 and 14 were used for conductive rubbers, and the rubber compositions prepared according to the rubber formulations shown in Tables 15 to 20 were used for covering rubbers, tread rubbers, sidewall rubbers, breaker rubbers, inner sidewall layer rubbers, and cushion rubbers, as well as clinch rubbers and chafer rubbers. These rubbers were assembled and vulcanized at 170° C. for 15 minutes, thereby preparing 195/65R15 pneumatic tires (test tires) having the structure shown in FIG. 1.

The basic structure of each test tire is as follows.
(Carcass ply)
Cord angle: 90 degrees in tire circumferential direction
Cord material: polyester 1670 dtex/2
(Breaker)
Cord angle: 24 degrees×24 degrees in tire circumferential direction
Cord material: steel cord (2+2×0.25)

The inner sidewall layer rubber had a thickness of 0.5 mm; the covering rubber had a thickness of 1 mm; and the cushion rubber had a thickness of 1 mm. The conductive rubber had a width of 3 mm and was configured to be continuous in the tire circumferential direction.

The contact between the covering rubber and the cushion rubber was formed as a strip with a width of 5 mm in the tire circumferential direction. The contact between the covering rubber and the conductive rubber was formed over the entire surface of the conductive rubber in the tire width direction. The contact between the inner sidewall layer rubber and the cushion rubber was formed as a strip with a width of 5 mm in the tire circumferential direction. The contact between the inner sidewall layer rubber and the clinch rubber was formed with a width of 5 mm or more along the shape of the carcass.

The test tires were evaluated on the following items. Tables 13 and 14 show the results.

(Tire Electrical Resistance)

As shown in FIG. 2, the electrical resistance of each tire-rim R assembly was measured according to the JATMA standards using a measurement instrument including a metal plate 52 (electrical resistance: 10 Ω or less) having a polished surface and placed on an insulating plate 51 (electrical resistance: $10^{12}\Omega$ or more), a conductive tire mounting shaft 53 for holding the tire/rim assembly, and an electrical resistance meter 54. The test tires used were previously sufficiently cleaned of the mold releasing agents and dirt on the surface and sufficiently dried. The other conditions were as follows.
Rim: made of aluminum alloy, 15×6JJ
Internal pressure: 200 kPa
Load: 5.3 kN
Temperature of test environment (temperature of test room): 25° C.
Humidity: 50%
Measuring range of electrical resistance meter: $10^3$ to $1.6 \times 10^{16}\Omega$
Test voltage (applied voltage): 1,000 V
The test was carried out as follows.
(1) A test tire was mounted on a rim R to prepare a tire-rim assembly. Soap water as a lubricant was applied to the contact area between them.
(2) The tire-rim assembly was allowed to stand for two hours in a test room and then attached to the tire mounting shaft 53.
(3) The above-indicated load was applied to the tire-rim assembly for 0.5 minutes and released, further applied for 0.5 minutes and released, and then further applied for 2 minutes.
(4) The test voltage was applied, and after a lapse of 5 minutes the electrical resistance between the tire mounting shaft 53 and the metal plate 52 was measured using the electrical resistance meter 54. It was measured in four points spaced at 90° intervals in the tire circumferential direction. The highest measured value was taken as the electrical resistance (measured value) of the tire.

The measurement was performed before running (fresh tire) and after 20,000 km running. Tables 13 and 14 list the common logarithms of the electrical resistances. A tire with a common logarithm of 8 or less is considered to have a good conductivity. Tire electrical resistance was compared before running and after 20,000 km running. The tables also show the increases in electrical resistance caused by 20,000 km running. A lower increase indicates that the tire can be better prevented from accumulating static electricity, or can exhibit good antistatic properties, during running throughout the life of the tire.

(Ground Contact Properties)

After the tire was mounted and run 20,000 km, the appearance of the surface of the tread containing the conductive rubber was visually observed to evaluate the occurrence of level differences (differences in level between the conductive rubber, which has poor abrasion resistance and may be preferentially worn, and the surrounding component (tread rubber)) as follows: "Good" indicates good conditions with no level differences; "Fair" indicates small level differences; and "Poor" indicates large level differences.

TABLE 13

Conductive rubber

| | | | Example 3-1 | Example 3-2 | Example 3-3 | Example 3-4 | Comparative Example 3-1 |
|---|---|---|---|---|---|---|---|
| | | Carbon black used | Production Example 2 | Production Example 3 | Production Example 4 | Production Example 5 | Production Example 1 |
| Amount (parts by mass) | Step 1 | NR | 30 | 30 | 30 | 30 | 30 |
| | | SBR 1 | 70 | 70 | 70 | 70 | 70 |
| | | Carbon black (prepared in the above Production Example) | 55 | 55 | 55 | 55 | 55 |
| | | Stearic acid | 1 | 1 | 1 | 1 | 1 |
| | | Zinc oxide | 3 | 3 | 3 | 3 | 3 |
| | | Antioxidant | 2 | 2 | 2 | 2 | 2 |
| | | Wax | 1.5 | 1.5 | 1.5 | 1.5 | 1.5 |
| | Step 2 | Sulfur | 1.8 | 1.8 | 1.8 | 1.8 | 1.8 |
| | | Vulcanization accelerator | 1 | 1 | 1 | 1 | 1 |
| Evaluation result | | Degree of carbon black dispersion (%) | 99 | 99 | 97 | 97 | 98 |
| | | Volume resistivity | 5.6 | 5.6 | 5.4 | 5.4 | 5.4 |
| | | Abrasion resistance | 111 | 110 | 106 | 106 | 100 |
| | | Rolling resistance properties | 97 | 99 | 110 | 107 | 100 |
| | | Tire electrical resistance (initial) | 6.4 | 6.4 | 6.2 | 6.2 | 6.2 |
| | | Tire electrical resistance (after running 20,000 km) | 6.4 | 6.4 | 6.5 | 6.5 | 11.1 |
| | | Increase in electrical resistance caused by running (20,000 km) | 0.0 | 0.0 | 0.3 | 0.3 | 4.9 |
| | | Level differences of the tread surface observed after running (20,000 km) | Good | Good | Good | Good | Poor |

TABLE 14

Conductive rubber

| | | | Example 3-5 | Example 3-6 | Example 3-7 | Example 3-8 | Example 3-9 | Comparative Example 3-2 |
|---|---|---|---|---|---|---|---|---|
| | | Carbon black used | Production Example 7 | Production Example 8 | Production Example 9 | Production Example 10 | Production Example 11 | Production Example 6 |
| Amount (parts by mass) | Step 1 | NR | 30 | 30 | 30 | 30 | 30 | 30 |
| | | SBR 1 | 70 | 70 | 70 | 70 | 70 | 70 |
| | | Carbon black (prepared in the above Production Example) | 48 | 48 | 48 | 48 | 48 | 48 |

TABLE 14-continued

Conductive rubber

|  |  | Example 3-5 | Example 3-6 | Example 3-7 | Example 3-8 | Example 3-9 | Comparative Example 3-2 |
|---|---|---|---|---|---|---|---|
|  | Stearic acid | 1 | 1 | 1 | 1 | 1 | 1 |
|  | Zinc oxide | 3 | 3 | 3 | 3 | 3 | 3 |
|  | Antioxidant | 2 | 2 | 2 | 2 | 2 | 2 |
|  | Wax | 1.5 | 1.5 | 1.5 | 1.5 | 1.5 | 1.5 |
| Step 2 | Sulfur | 1.8 | 1.8 | 1.8 | 1.8 | 1.8 | 1.8 |
|  | Vulcanization accelerator | 1 | 1 | 1 | 1 | 1 | 1 |
| Evaluation result | Degree of carbon black dispersion (%) | 98 | 98 | 99 | 97 | 97 | 98 |
|  | Volume resistivity | 5.4 | 5.6 | 5.4 | 5.5 | 5.6 | 5.5 |
|  | Abrasion resistance | 109 | 112 | 119 | 105 | 111 | 100 |
|  | Rolling resistance properties | 97 | 117 | 107 | 101 | 104 | 100 |
|  | Tire electrical resistance (initial) | 6.2 | 6.4 | 6.2 | 6.4 | 6.5 | 6.4 |
|  | Tire electrical resistance (after running 20,000 km) | 6.3 | 6.4 | 6.2 | 6.9 | 6.6 | 11.0 |
|  | Increase in electrical resistance caused by running (20,000 km) | 0.1 | 0.0 | 0.0 | 0.5 | 0.1 | 4.6 |
|  | Level differences of the tread surface observed after running (20,000 km) | Good | Good | Good | Good | Good | Poor |

TABLE 15

Covering rubber (Undertread)

|  |  | Formulation |
|---|---|---|
| Amount (parts by mass) | NR | 75 |
|  | SBR 2 | 25 |
|  | Carbon black 1 | 20 |
|  | Carbon black 2 | 25 |
|  | Antioxidant | 2 |
|  | Stearic acid | 1 |
|  | Zinc oxide | 3 |
|  | Sulfur | 3 |
|  | Vulcanization accelerator | 1 |
| Volume resistivity |  | 5.2 |

TABLE 16

Tread rubber

|  |  | Formulation |
|---|---|---|
| Amount (parts by mass) | SBR 2 | 100 |
|  | Silica | 50 |
|  | Silane coupling agent | 5 |
|  | Wax | 1 |
|  | Antioxidant | 2 |
|  | Stearic acid | 1 |
|  | Zinc oxide | 3 |
|  | Sulfur | 1.5 |
|  | Vulcanization accelerator | 1 |
| Volume resistivity |  | 13.5 |

TABLE 17

Sidewall rubber

|  |  | Formulation |
|---|---|---|
| Amount (parts by mass) | NR | 60 |
|  | BR | 40 |
|  | Silica | 45 |
|  | Silane coupling agent | 4.5 |
|  | Wax | 1 |
|  | Antioxidant | 3 |
|  | Stearic acid | 1 |
|  | Zinc oxide | 3 |
|  | Sulfur | 2 |
|  | Vulcanization accelerator | 1 |
| Volume resistivity |  | 13.8 |

TABLE 18

Breaker rubber

|  |  | Formulation |
|---|---|---|
| Amount (parts by mass) | NR | 100 |
|  | Silica | 55 |
|  | Silane coupling agent | 5.5 |
|  | Antioxidant | 2 |
|  | Cobalt stearate | 2 |
|  | Stearic acid | 1 |
|  | Zinc oxide | 10 |
|  | Insoluble sulfur | 5.5 |
|  | Vulcanization accelerator | 0.9 |
| Volume resistivity |  | 14.0 |

TABLE 19

Inner sidewall layer rubber, Cushion rubber

|  |  |  | Formulation |
|---|---|---|---|
| Amount (parts by mass) | Step 1 | NR | 60 |
|  |  | Silica | 25 |
|  |  | Silane coupling agent | 2.0 |
|  |  | Carbon black 3 | 12.5 |
|  |  | Aromatic oil | 5 |
|  |  | Petroleum-based resin | 3 |
|  | Step 2 | BR | 40 |
|  |  | Stearic acid | 2.5 |
|  |  | Zinc oxide | 3 |
|  |  | Antioxidant | 2 |
|  |  | Wax | 1.2 |
|  | Step 3 | Rekneading | performed |
|  | Step 4 | Sulfur | 1.5 |
|  |  | Vulcanization accelerator | 0.7 |
| Degree of carbon black dispersion (%) |  |  | 99 |
| Volume resistivity |  |  | 5.2 |

TABLE 20

Clinch rubber, Chafer rubber

|  |  |  | Formulation |
| --- | --- | --- | --- |
| Amount (parts by mass) | Step 1 | NR | 60 |
|  |  | Silica | 50 |
|  |  | Silane coupling agent | 4.8 |
|  |  | Carbon black 3 | 15 |
|  |  | Aromatic oil | 5 |
|  |  | Petroleum-based resin | 3 |
|  | Step 2 | BR | 40 |
|  |  | Silica | 10 |
|  |  | Stearic acid | 2.5 |
|  |  | Zinc oxide | 3 |
|  |  | Antioxidant | 3 |
|  |  | Wax | 1.2 |
|  | Step 3 | Rekneading | performed |
|  | Step 4 | Sulfur | 1.5 |
|  |  | Vulcanization accelerator | 0.7 |
| Degree of carbon black dispersion (%) |  |  | 99 |
| Volume resistivity |  |  | 5.5 |

Tables 13 and 14 demonstrate that, in each of the examples using a rubber composition containing a carbon black specified in the aspect 3-1 or 3-2 of the invention, improved abrasion resistance and good conductive properties could be exhibited while maintaining or improving good low heat build-up properties, and also the deterioration in conductive properties during service could be reduced. In particular, it is demonstrated that pneumatic tires including a tread in which a conductive rubber formed from the rubber composition was embedded to be partially exposed, could exhibit ground contact properties and antistatic properties for a long time.

In contrast, in each of the comparative examples using a rubber composition containing carbon black other than the carbon black specified in the aspect 3-1 or 3-2 of the invention, the abrasion resistance and the effect of reducing deterioration in conductive properties were lower than the examples. As a result, particularly when such a rubber composition was used as the conductive rubber, unfortunately the tire showed poor ground contact properties and poor antistatic properties after long-term service.

Examples and Comparative Examples in the Aspect 4-1 or 4-2 of the Invention

The chemicals used in examples and comparative examples are listed below.
BR: Ubepol BR150B (cis content: 97% by mass) available from Ube Industries, Ltd.
SBR: NS116R (S-SBR, vinyl content: 60% by mass, styrene content: 20% by mass) available from Zeon Corporation
Carbon black: carbon black prepared in any of Production Examples 1 to 11
Silica: Ultrasil VN3 ($N_2SA$: 175 m$^2$/g) available from Degussa
Silane coupling agent: Si69 (bis(3-triethoxysilylpropyl)tetrasulfide) available from Degussa
Oil: Diana Process AH-24 (aromatic process oil) available from Idemitsu Kosan Co., Ltd.
Zinc oxide: zinc oxide available from Mitsui Mining & Smelting Co., Ltd.
Stearic acid: stearic acid "TSUBAKI" available from NOF Corporation
Antioxidant: OZONONE 6C (N-(1,3-dimethylbutyl)-N'-phenyl-p-phenylenediamine) available from Seiko Chemical Co., Ltd.
Sulfur: powder sulfur available from Tsurumi Chemical industry Co., Ltd.
Vulcanization accelerator 1: NOCCELER NS (N-tert-butyl-2-benzothiazolylsulfenamide) available from Ouchi Shinko Chemical Industrial Co., Ltd.
Vulcanization accelerator 2: Soxinol D (1,3-diphenylguanidine) available from Sumitomo Chemical Co., Ltd.

Examples and Comparative Examples

According to the formulations shown in Tables 21 and 22, 20 parts by mass of BR, 80 parts by mass of SBR, carbon black (carbon black listed in Table 21 or 22), silica, the silane coupling agent, 25 parts by mass of oil, 2 parts by mass of zinc oxide, 2 parts by mass of stearic acid, and 2 parts by mass of the antioxidant were kneaded at 150° C. for three minutes using a BP-type Banbury mixer to give a kneadate. Then, 1.5 parts by mass of sulfur, 2.0 parts by mass of the vulcanization accelerator 1, and 2.0 parts by mass of the vulcanization accelerator 2 were added to the kneadate, followed by kneading at 50° C. for five minutes using an open roll mill to obtain an unvulcanized rubber composition.

The unvulcanized rubber composition was press-vulcanized for 12 minutes at 170° C. to obtain a vulcanized rubber composition.

The thus prepared vulcanized rubber compositions were subjected to the following evaluations. The results are shown in Tables 21 and 22. The reference comparative example in Table 21 is Comparative Example 4-1, and the reference comparative example in Table 22 is Comparative Example 4-2.

(Abrasion Resistance)

The volume loss of each vulcanized rubber composition was determined at a load of 50 N, a speed of 20 km/h, and a slip angle of 5° using a laboratory abrasion and skid tester (LAT tester). The volume loss of each formulation example is expressed as an index (abrasion resistance index), with the reference comparative example set equal to 100. A higher index indicates better abrasion resistance.

(Tan δ Peak Temperature, Low Heat Build-Up Properties)

Test pieces of a predetermined size were prepared from the vulcanized rubber compositions. A temperature dependence curve of tan δ of each test piece over the temperature range of −100° C. to 100° C. was obtained using a viscoelastic spectrometer VES (available from Iwamoto Seisakusho Co., Ltd.) at an initial strain of 10%, a dynamic strain of 0.5%, a frequency of 10 Hz, an amplitude of ±0.25%, and a rate of temperature increase of 2° C./min. The temperature corresponding to the maximum tan δ in the temperature dependence curve is taken as the tan δ peak temperature.

The loss tangent (tan δ) of each formulation example was determined at a temperature of 50° C., an initial strain of 10%, and a dynamic strain of 2%. The tan δ of the reference comparative example is taken as 100, while the tan δ of the other formulation examples are expressed as an index (low heat build-up property index) using the equation below. A higher index indicates better low heat build-up properties (rolling resistance properties). An index of 95 or higher is considered good.

(Low heat build-up property index)=(tan δ of reference comparative example)/(tan δ of each formulation example)×100

TABLE 21

|  | Comparative Example 4-1 | Example 4-1 | Example 4-2 | Example 4-3 | Example 4-4 |
|---|---|---|---|---|---|
| Carbon black used | Production Example 1 | Production Example 2 | Production Example 3 | Production Example 4 | Production Example 5 |
| Amount (parts by mass) | 25 | 25 | 25 | 25 | 25 |
| Amount of silica (parts by mass) | 50 | 50 | 50 | 50 | 50 |
| Amount of silane coupling agent (parts by mass) | 4 | 4 | 4 | 4 | 4 |
| Evaluation tan δ peak temperature (° C.) | −15 | −15 | −15 | −15 | −15 |
| Abrasion resistance index | 100 | 106 | 105 | 102 | 102 |
| Low heat build-up property index | 100 | 98 | 99 | 107 | 105 |

TABLE 22

|  | Comparative Example 4-2 | Comparative Example 4-3 | Comparative Example 4-4 | Example 4-5 | Example 4-6 | Example 4-7 | Example 4-8 | Example 4-9 |
|---|---|---|---|---|---|---|---|---|
| Carbon black used | Production Example 6 | Production Example 6 | Production Example 9 | Production Example 7 | Production Example 8 | Production Example 9 | Production Example 10 | Production Example 11 |
| Amount (parts by mass) | 25 | 75 | 75 | 25 | 25 | 25 | 25 | 25 |
| Amount of silica (parts by mass) | 50 | — | — | 50 | 50 | 50 | 50 | 50 |
| Amount of silane coupling agent (parts by mass) | 4 | — | — | 4 | 4 | 4 | 4 | 4 |
| Evaluation tan δ peak temperature (° C.) | −15 | −15 | −15 | −15 | −15 | −15 | −15 | −15 |
| Abrasion resistance index | 100 | 100 | 105 | 106 | 109 | 115 | 101 | 108 |
| Low heat build-up propery index | 100 | 95 | 100 | 99 | 115 | 105 | 101 | 102 |

Tables 21 and 22 show that, in the examples in which carbon black (1) was incorporated with a specific amount of a specific silica, abrasion resistance could be improved while maintaining or improving good low heat build-up properties, and thus abrasion resistance and low heat build-up properties could be simultaneously achieved to a high extent.

Comparison of Comparative Examples 4-3, 4-2, and 4-4 with Example 4-7 reveals that the combined use of carbon black (1) and a specific amount of a specific silica produced higher effects (synergistic effects) in improving abrasion resistance or the balance of abrasion resistance and low heat build-up properties than the sum of the effects obtained when carbon black (1) was used alone as filler and when carbon black other than carbon black (1) and a specific amount of a specific silica were used in combination.

Examples and Comparative Examples in the Aspect 5-1 or 5-2 of the Invention

The chemicals used in examples and comparative examples are listed below.
Natural rubber (NR): TSR20
Polyisoprene rubber (IR): Nipol IR2200 available from Zeon Corporation
Halogenated butyl rubber 1: chlorobutyl rubber HT1066 (chlorinated butyl rubber) available from Exxon Chemical
Halogenated butyl rubber 2: bromobutyl rubber 2255 (brominated butyl rubber) available from Exxon Chemical
Reclaimed butyl-based rubber: reclaimed butyl-based rubber (butyl rubber: 50% by mass) available from Car Quest
Butyl rubber: regular butyl rubber 268 available from Exxon Chemical
Carbon black (1): carbon black prepared in any of Production Examples 1 to 11
Carbon black (2): N660 ($N_2SA$: 35 $m^2/g$) available from Jiangxi Black Cat
Resin mixture: STRUKTOL 40MS (mixture of high molecular weight aromatic hydrocarbon resin and aliphatic hydrocarbon resin) available from Struktol
C5 resin: Marukarez T-100AS (C5 aliphatic hydrocarbon resin, softening point: 97° C. to 103° C.) available from Maruzen Petrochemical Co., Ltd.
Alkylphenolic resin: SP1068 (aromatic hydrocarbon resin) available from Schenectady Chemicals
Oil: Diana Process PA32 (paraffinic component: 67% by mass, naphthenic component: 28% by mass, aromatic component: 5% by mass) available from Idemitsu Kosan Co., Ltd.
Zinc oxide: zinc oxide available from Mitsui Mining & Smelting Co., Ltd.
Stearic acid: stearic acid "TSUBAKI" available from NOF Corporation
Antioxidant RD: NOCRAC 224 (2,2,4-trimethyl-1,2-dihydroquinoline polymer) available from Ouchi Shinko Chemical Industrial Co., Ltd.
5% oil-containing powder sulfur: HK-200-5 available from Hosoi Chemical Industry Co., Ltd
Vulcanization accelerator DM: NOCCELER DM (di-2-benzothiazolyl disulfide) available from Ouchi Shinko Chemical Industrial Co., Ltd.

Examples and Comparative Examples

According to the formulations shown in Table 23, the chemicals other than the zinc oxide, sulfur, and vulcanization accelerator were kneaded using a 1.7 L Banbury mixer for five minutes until the discharge temperature reached 160° C. to give a kneadate. Then, the zinc oxide, sulfur, and vulcanization accelerator were added to the kneadate, followed by kneading for four minutes using an open two roll mill until the temperature reached 105° C. to obtain an unvulcanized rubber composition.

The unvulcanized rubber composition was extruded into a predetermined shape and press-vulcanized for 12 minutes at 170° C. to obtain a vulcanized rubber composition.

The thus prepared vulcanized rubber compositions were subjected to the following evaluations. The results are shown in Table 23. The reference comparative example for Examples 5-1 to 5-4 is Comparative Example 5-1, and the reference comparative example for Comparative Examples 5-3 to 5-5 and Examples 5-5 to 5-13 is Comparative Example 5-2.

<Air Permeation Resistance>

Rubber test pieces having a diameter of 90 mm and a thickness of 1 mm were prepared from the vulcanized rubber compositions. The air permeability coefficient (cc·cm/cm$^2$·sec/cm Hg) of each test piece was determined in accordance with ASTM D-1434-75M and expressed as an index (air permeation resistance index) using the equation below, with the reference comparative example set equal to 100. A higher index indicates lower air permeation and better air permeation resistance.

(Air permeation resistance index)=(Air permeability coefficient of reference comparative example)/(Air permeability coefficient of each formulation example)×100

(Low Heat Build-Up Properties)

The loss tangent (tan δ) of each vulcanized rubber composition was determined using a viscoelastic spectrometer VES (available from Iwamoto Seisakusho Co., Ltd.) at a temperature of 70° C., a frequency of 10 Hz, an initial strain of 10%, and a dynamic strain of 2%. The tan δ of each formulation example is expressed as an index (low heat build-up property index) using the equation below, with the reference comparative example set equal to 100. A higher index indicates better low heat build-up properties. An index of 95 or higher is considered good.

(Low heat build-up property index)=(tan δ of reference comparative example)/(tan δ of each formulation example)×100

TABLE 23

|  |  | Com. Ex. | Ex. | | | | Com. Ex. | | | |
| --- | --- | --- | --- | --- | --- | --- | --- | --- | --- | --- |
|  |  | 5-1 | 5-1 | 5-2 | 5-3 | 5-4 | 5-2 | 5-3 | 5-4 | 5-5 |
| Amount (parts by mass) | NR | 20 | 20 | 20 | 20 | 20 | 20 | 20 | 100 | 100 |
|  | IR | — | — | — | — | — | — | — | — | — |
|  | Halogenated butyl rubber 1 | 70 | 70 | 70 | 70 | 70 | 70 | 70 | — | — |
|  | Halogenated butyl rubber 2 | — | — | — | — | — | — | — | — | — |
|  | Reclaimed butyl-based rubber (butyl rubber content) | 20 (10) | 20 (10) | 20 (10) | 20 (10) | 20 (10) | 20 (10) | 20 (10) | — | — |
|  | Butyl rubber | — | — | — | — | — | — | — | — | — |
|  | Carbon black (1) | 20 Production Example 1 | 20 Production Example 2 | 20 Production Example 3 | 20 Production Example 4 | 20 Production Example 5 | 20 Production Example 6 | — | 20 Production Example 9 | — |
|  | Carbon black (2) | — | — | — | — | — | — | 20 | — | 20 |
|  | Resin mixture | 8 | 8 | 8 | 8 | 8 | 8 | 8 | 8 | 8 |
|  | C5 resin | 5 | 5 | 5 | 5 | 5 | 5 | 5 | 5 | 5 |
|  | Alkylphenolic resin | 3 | 3 | 3 | 3 | 3 | 3 | 3 | 3 | 3 |
|  | Oil | 2 | 2 | 2 | 2 | 2 | 2 | 2 | 2 | 2 |
|  | Zinc oxide | 1.5 | 1.5 | 1.5 | 1.5 | 1.5 | 1.5 | 1.5 | 1.5 | 1.5 |
|  | Stearic acid | 1.5 | 1.5 | 1.5 | 1.5 | 1.5 | 1.5 | 1.5 | 1.5 | 1.5 |
|  | Antioxidant RD | 1 | 1 | 1 | 1 | 1 | 1 | 1 | 1 | 1 |
|  | 5% oil-containing powder sulfur | 0.5 | 0.5 | 0.5 | 0.5 | 0.5 | 0.5 | 0.5 | 0.5 | 0.5 |
|  | Vulcanization accelerator DM | 1.2 | 1.2 | 1.2 | 1.2 | 1.2 | 1.2 | 1.2 | 1.2 | 1.2 |
| Evaluation | Air permeation resistance index | 100 | 106 | 106 | 103 | 103 | 100 | 100 | 20 | 10 |
|  | Fuel economy index | 100 | 96 | 98 | 109 | 106 | 100 | 105 | 115 | 110 |

|  |  | Ex. | | | | | | | | |
| --- | --- | --- | --- | --- | --- | --- | --- | --- | --- | --- |
|  |  | 5-5 | 5-6 | 5-7 | 5-8 | 5-9 | 5-10 | 5-11 | 5-12 | 5-13 |
| Amount (parts by mass) | NR | 20 | 20 | 20 | 20 | 20 | 10 | 20 | 10 | 10 |
|  | IR | — | — | — | — | — | 10 | — | — | — |
|  | Halogenated butyl rubber 1 | 70 | 70 | 70 | 70 | 70 | 70 | — | 70 | 70 |
|  | Halogenated butyl rubber 2 | — | — | — | — | — | — | 70 | — | — |

TABLE 23-continued

|  | | | | | | | | | |
|---|---|---|---|---|---|---|---|---|---|
| Reclaimed butyl-based rubber (butyl rubber content) | 20 (10) | 20 (10) | 20 (10) | 20 (10) | 20 (10) | 20 (10) | 20 (10) | 20 (10) | 20 (10) |
| Butyl rubber | — | — | — | — | — | — | — | 10 | 10 |
| Carbon black (1) | 20 Production Example 7 | 20 Production Example 8 | 20 Production Example 9 | 20 Production Example 10 | 20 Production Example 11 | 20 Production Example 8 | 20 Production Example 8 | 20 Production Example 8 | 20 Production Example 8 |
| Carbon black (2) | — | — | — | — | — | — | — | — | 20 |
| Resin mixture | 8 | 8 | 8 | 8 | 8 | 8 | 8 | 8 | 8 |
| C5 resin | 5 | 5 | 5 | 5 | 5 | 5 | 5 | 5 | 5 |
| Alkylphenolic resin | 3 | 3 | 3 | 3 | 3 | 3 | 3 | 3 | 3 |
| Oil | 2 | 2 | 2 | 2 | 2 | 2 | 2 | 2 | 2 |
| Zinc oxide | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Antioxidant RD | 1 | 1 | 1 | 1 | 1 | 1 | 1 | 1 | 1 |
| 5% oil-containing powder sulfur | 0.5 | 0.5 | 0.5 | 0.5 | 0.5 | 0.5 | 0.5 | 0.5 | 0.5 |
| Vulcanization accelerator DM | 1.2 | 1.2 | 1.2 | 1.2 | 1.2 | 1.2 | 1.2 | 1.2 | 1.2 |
| Evaluation — Air permeation resistance index | 107 | 108 | 113 | 103 | 106 | 100 | 110 | 102 | 105 |
| Fuel economy index | 97 | 117 | 107 | 102 | 104 | 106 | 97 | 103 | 106 |

Table 23 shows that, in the examples in which carbon black (1) was incorporated with a specific amount of a halogenated butyl rubber, good air permeation resistance and good low heat build-up properties could be maintained or improved, and thus air permeation resistance and low heat build-up properties could be simultaneously achieved to a high extent.

Comparison of Comparative Examples 5-5, 5-3, and 5-4 with Example 5-7 reveals that the combined use of carbon black (1) and a specific amount of a halogenated butyl rubber produced a higher effect (synergistic effect) in improving air permeation resistance than the sum of the effects obtained when carbon black other than carbon black (1) and a specific amount of a halogenated butyl rubber were used in combination and when carbon black (1) was incorporated into a rubber formulation not including a specific amount of a halogenated butyl rubber.

Examples and Comparative Examples in the Aspect 6-1 or 6-2 of the Invention

The chemicals used in examples and comparative examples are listed below.
SBR: NS116R (vinyl content: 60% by mass, styrene content: 20% by mass) available from Zeon Corporation
BR: Ubepol BR150B (cis content: 97% by mass) available from Ube Industries, Ltd.
Silica: Ultrasil VN3 ($N_2SA$: 175 $m^2/g$) available from Evonik-Degussa
Silane coupling agent: Si69 (bis(3-triethoxysilylpropyl)tetrasulfide) available from Evonik-Degussa
Carbon black: carbon black prepared in any of Production Examples 1 to 11
Oil: Diana Process AH-24 (aromatic process oil) available from Idemitsu Kosan Co., Ltd.
Resin 1: NOVARES C10 (coumarone-indene resin, softening point: 5° C. to 15° C.) available from Rutgers Chemicals
Resin 2: NOVARES C30 (coumarone-indene resin, softening point: 20° C. to 30° C.) available from Rutgers Chemicals
Resin 3: NOVARES C90 (coumarone-indene resin, softening point: 85° C. to 95° C.) available from Rutgers Chemicals
Zinc oxide: zinc oxide available from Mitsui Mining & Smelting Co., Ltd.
Stearic acid: stearic acid "TSUBAKI" available from NOF Corporation
Antioxidant: OZONONE 6C (N-(1,3-dimethylbutyl)-N'-phenyl-p-phenylenediamine) available from Seiko Chemical Co., Ltd.
Wax: SUNNOC wax available from Ouchi Shinko Chemical Industrial Co., Ltd.
Sulfur: powder sulfur available from Tsurumi Chemical industry Co., Ltd.
Vulcanization accelerator 1: NOCCELER NS (N-tert-butyl-2-benzothiazolylsulfenamide) available from Ouchi Shinko Chemical Industrial Co., Ltd.
Vulcanization accelerator 2: Soxinol D (1,3-diphenylguanidine) available from Sumitomo Chemical Co., Ltd.

Examples and Comparative Examples

According to the formulations shown in Tables 24 and 25, the materials other than the sulfur and vulcanization accelerators were kneaded for three minutes at 150° C. using a BP-type Banbury mixer to give a kneadate. Then, the sulfur and vulcanization accelerators were added to the kneadate, followed by kneading for five minutes at 50° C. using an open roll mill to obtain an unvulcanized rubber composition.

The unvulcanized rubber composition was press-vulcanized for 12 minutes at 170° C. to obtain a vulcanized rubber composition.

The thus prepared vulcanized rubber compositions were subjected to the following evaluations. The results are shown in Tables 24 and 25. The reference comparative example in Table 24 is Comparative Example 6-1, and the reference comparative example in Table 25 is Comparative Example 6-6.

(Abrasion Resistance)

The volume loss of each vulcanized rubber composition was determined at a load of 50 N, a speed of 20 km/h, and a slip angle of 5° using a laboratory abrasion and skid tester (LAT tester). The volume loss of each formulation example is expressed as an abrasion index, with the reference comparative example set equal to 100. A higher abrasion index indicates better abrasion resistance.

(Low Heat Build-Up Properties)

The loss tangent (tan δ) of each formulation example was determined using a viscoelastic spectrometer VES (available from Iwamoto Seisakusho Co., Ltd.) at a temperature of 50° C., an initial strain of 10%, and a dynamic strain of 2%. The tan δ of the reference comparative example is taken as 100, while the tan δ of the other formulation examples are expressed as an index (rolling resistance index) using the equation below. A higher index indicates better rolling resistance properties (low heat build-up properties).

(Rolling resistance index)=(tan δ of reference comparative example)/(tan δ of each formulation example)×100

TABLE 24

| | | Comparative Example 6-1 | Comparative Example 6-2 | Comparative Example 6-3 | Comparative Example 6-4 | Comparative Example 6-5 | Example 6-1 | Example 6-2 | Example 6-3 | Example 6-4 | Example 6-5 |
|---|---|---|---|---|---|---|---|---|---|---|---|
| | Carbon black used | Production Example 1 | Production Example 1 | Production Example 1 | Production Example 1 | Production Example 2 | Production Example 2 | Production Example 3 | Production Example 3 | Production Example 4 | Production Example 5 |
| Amount (parts by mass) | SBR | 80 | 80 | 80 | 80 | 80 | 80 | 80 | 80 | 80 | 80 |
| | BR | 20 | 20 | 20 | 20 | 20 | 20 | 20 | 20 | 20 | 20 |
| | Carbon black | 25 | 25 | 25 | 25 | 25 | 25 | 25 | 25 | 25 | 25 |
| | Silica | 50 | 50 | 50 | 50 | 50 | 50 | 50 | 50 | 50 | 50 |
| | Oil | 25 | 15 | — | 15 | 25 | 15 | 15 | 15 | — | — |
| | Resin 1 | — | 10 | 45 | — | — | 10 | 10 | — | 10 | 10 |
| | Resin 2 | — | — | — | — | — | — | — | 10 | — | — |
| | Resin 3 | — | — | — | 10 | — | — | — | — | — | — |
| | Silane coupling agent | 4 | 4 | 4 | 4 | 4 | 4 | 4 | 4 | 4 | 4 |
| | Stearic acid | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 |
| | Wax | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 |
| | Vulcanization accelerator 1 | 2 | 2 | 2 | 2 | 2 | 2 | 2 | 2 | 2 | 2 |
| | Vulcanization accelerator 2 | 2 | 2 | 2 | 2 | 2 | 2 | 2 | 2 | 2 | 2 |
| Evaluation result | Abrasion resistance | 100 | 103 | 90 | 95 | 106 | 112 | 112 | 115 | 108 | 108 |
| | Low heat build-up properties | 100 | 102 | 95 | 90 | 98 | 104 | 105 | 103 | 113 | 111 |

TABLE 25

| | | Comparative Example 6-6 | Comparative Example 6-7 | Comparative Example 6-8 | Comparative Example 6-9 | Comparative Example 6-10 | Example 6-6 | Example 6-7 | Example 6-8 | Example 6-9 | Example 6-10 | Example 6-11 |
|---|---|---|---|---|---|---|---|---|---|---|---|---|
| | Carbon black used | Production Example 6 | Production Example 6 | Production Example 6 | Production Example 6 | Production Example 7 | Production Example 7 | Production Example 8 | Production Example 8 | Production Example 9 | Production Example 10 | Production Example 11 |
| Amount (parts by mass) | SBR | 80 | 80 | 80 | 80 | 80 | 80 | 80 | 80 | 80 | 80 | 80 |
| | BR | 20 | 20 | 20 | 20 | 20 | 20 | 20 | 20 | 20 | 20 | 20 |
| | Carbon black | 25 | 25 | 25 | 25 | 25 | 25 | 25 | 25 | 25 | 25 | 25 |
| | Silica | 50 | 50 | 50 | 50 | 50 | 50 | 50 | 50 | 50 | 50 | 50 |
| | Oil | 25 | 15 | — | 15 | 25 | 15 | 15 | 15 | — | — | — |
| | Resin 1 | — | 10 | 45 | — | — | 10 | 10 | — | 10 | 10 | 10 |
| | Resin 2 | — | — | — | — | — | — | — | 10 | — | — | — |
| | Resin 3 | — | — | — | 10 | — | — | — | — | — | — | — |
| | Silane coupling agent | 4 | 4 | 4 | 4 | 4 | 4 | 4 | 4 | 4 | 4 | 4 |
| | Stearic acid | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 | 2 |
| | Wax | 2 | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 |
| | Vulcanization accelerator 1 | 2 | 2 | 2 | 2 | 2 | 2 | 2 | 2 | 2 | 2 | 2 |
| | Vulcanization accelerator 2 | 2 | 2 | 2 | 2 | 2 | 2 | 2 | 2 | 2 | 2 | 2 |
| Evaluation result | Abrasion resistance | 100 | 103 | 90 | 95 | 106 | 112 | 115 | 117 | 121 | 107 | 114 |
| | Low heat build-up properties | 100 | 102 | 95 | 90 | 99 | 105 | 121 | 119 | 111 | 107 | 108 |

Tables 24 and 25 show that, in the examples in which a resin (resin 1 or 2) having a softening point of −20° C. to 45° C. and carbon black (1) were incorporated, abrasion resistance and low heat build-up properties were synergistically improved, and thus abrasion resistance and low heat build-up properties could be significantly improved. Specifically, comparison of Comparative Examples 6-1, 6-2, and 6-5 with Example 6-1 and comparison of Comparative Examples 6-6, 6-7, and 6-10 with Example 6-6 reveal that the combined use of a resin (resin 1 or 2) having a softening point of −20° C. to 45° C. and carbon black (1) synergistically improved abrasion resistance and low heat build-up properties.

Examples and Comparative Examples in the Aspect 7-1 or 7-2 of the Invention

The chemicals used for preparing modified natural rubbers are listed below.
Field latex: field latex available from Muhibbah Lateks
EMAL E-27C (surfactant): EMAL E-27C (sodium polyoxyethylene lauryl ether sulfate, active ingredient: 27% by mass) available from Kao Corporation
NaOH: NaOH available from Wako Pure Chemical Industries, Ltd.
Wingstay L (antioxidant): Wingstay L (compound produced by butylating a condensate of p-cresol and dicyclopentadiene) available from ELIOKEM
Emulvin W (surfactant): Emulvin W (aromatic polyglycol ether) available from LANXESS
Tamol NN 9104 (surfactant): Tamol NN9104 (sodium salt of naphthalenesulfonic acid/formaldehyde) available from BASF
Van gel B (surfactant): Van gel B (hydrated magnesium aluminum silicate) available from Vanderbilt
(Preparation of Antioxidant Dispersion)

An amount of 462.5 g of water was mixed with 12.5 g of Emulvin W, 12.5 g of Tamol NN9104, 12.5 g of Van gel B, and 500 g of Wingstay L (total amount of mixture: 1,000 g) for 16 hours using a ball mill to prepare an antioxidant dispersion.

Production Example 7A

The solids concentration (DRC) of the field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at a room temperature to prepare a saponified natural rubber latex. Next, 6 g of the antioxidant dispersion was added and the mixture was stirred for two hours, and then water was further added to dilute the mixture until the rubber concentration reached 15% (w/v). Thereafter, formic acid was added with slow stirring to adjust the pH to 4.0. Subsequently, a cationic polymer flocculant was added and the mixture was stirred for two minutes, so that coagulation occurred. The thus obtained coagulum (coagulated rubber) had a diameter of approximately 0.5 to 5 mm. The coagulum was taken out and immersed in 1,000 mL of a 2% by mass aqueous solution of sodium carbonate for four hours at a room temperature, and then the rubber was taken out. The rubber was combined with 2,000 mL of water and the mixture was stirred for two minutes and then dehydrated as much as possible. This operation was repeated seven times. Thereafter, 500 mL of water was added, and 2% by mass formic acid was added until the pH reached 4, followed by leaving the mixture for 15 minutes. Then, the mixture was dehydrated as much as possible and combined with water again, followed by stirring for two minutes. This operation was repeated three times. Thereafter, water was squeezed off from the resultant rubber with a water squeezing roll to form the rubber into a sheet, followed by drying for four hours at 90° C. In this manner, a solid rubber (highly purified natural rubber A) was prepared.

Production Example 7B

A solid rubber (highly purified natural rubber B) was prepared as in Production Example 7A, except that 2% by mass formic acid was added until the pH reached 1.

Comparative Production Example 7C

The solids concentration (DRC) of the field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at a room temperature to prepare a saponified natural rubber latex. Next, 6 g of the antioxidant dispersion was added and the mixture was stirred for two hours, and then water was further added to dilute the mixture until the rubber concentration reached 15% (w/v). Thereafter, formic acid was added with slow stirring to adjust the pH to 4.0. Subsequently, a cationic polymer flocculant was added and the mixture was stirred for two minutes, so that coagulation occurred. The thus obtained coagulum (coagulated rubber) had a diameter of approximately 3 to 15 mm. The coagulum was taken out and immersed in 1,000 mL of a 2% by mass aqueous solution of sodium carbonate for four hours at a room temperature, and then the rubber was taken out. The rubber was combined with 1,000 mL of water and the mixture was stirred for two minutes and then dehydrated as much as possible. This operation was carried out once. Thereafter, 500 mL of water was added, and 2% by mass formic acid was added until the pH reached 4, followed by stirring for 15 minutes. Then, the mixture was dehydrated as much as possible and combined with water again, and the mixture was stirred for two minutes. This operation was repeated three times, followed by drying for four hours at 90° C. In this manner, a solid rubber (highly purified natural rubber C) was prepared.

Comparative Production Example 7D

A solid rubber (highly purified natural rubber D) was prepared as in Production Example 7A, except that, after the treatment with the aqueous solution of sodium carbonate was performed and water washing was repeated seven times, the resultant rubber was not subjected to the acidic treatment with 2% by mass formic acid before water was squeezed off from the rubber with a water squeezing roll to form it into a sheet.

Production Example 7E

A commercially available high-ammonia latex having a rubber solids content of 62.0% (available from Muhibbah Lateks in Malaysia) was diluted with a 0.12% aqueous solution of sodium naphthenate to a rubber solids content of 10%. Further, sodium dihydrogen phosphate was added to adjust the pH to 9.2. To the mixture was added a proteolytic enzyme (2.0 M alcalase) in an amount of 0.87 g per 10 g of the rubber component. Then, the pH was again adjusted to 9.2, and the resultant mixture was maintained at 37° C. for 24 hours.

Next, the latex obtained after completion of the enzymatic treatment was combined with a 1% aqueous solution of a nonionic surfactant (available from Kao Corporation under the trade name EMULGEN 810) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This operation was repeated twice. The resulting cream fraction was dispersed in distilled water to prepare a deproteinized rubber latex having a rubber solids content of 60%.

To the latex was added 2% by mass formic acid until the pH reached 4. Then, a cationic polymer flocculant was added, so that 0.5-5 mm rubber particles were formed. They were dehydrated as much as possible, and water was added in an amount of 50 g per 10 g of the rubber component, and then 2% by mass formic acid was added until the pH reached 3. Thirty minutes later, the rubber was taken out and formed into a sheet using a creper, followed by drying for four hours at 90° C. In this manner, a solid rubber (highly purified natural rubber E) was prepared.

Production Example 7F

A solid rubber (highly purified natural rubber F) was prepared as in Production Example 7E, except that 2% by mass formic acid was added until the pH reached 1.

Comparative Production Example 7G

A commercially available high-ammonia latex having a rubber solids content of 62.0% (available from Muhibbah Lateks in Malaysia) was diluted with a 0.12% aqueous solution of sodium naphthenate to a rubber solids content of 10%. Further, sodium dihydrogen phosphate was added to adjust the pH to 9.2. To the mixture was added a proteolytic enzyme (2.0 M alcalase) in an amount of 0.87 g per 10 g of the rubber component. Then, the pH was again adjusted to 9.2, and the resultant mixture was maintained at 37° C. for 24 hours.

Next, the latex obtained after completion of the enzymatic treatment was combined with a 1% aqueous solution of a nonionic surfactant (available from Kao Corporation under the trade name EMULGEN 810) to adjust the rubber concentration to 8%. The mixture was centrifuged at a rotational speed of 11,000 rpm for 30 minutes. Then, a cream fraction obtained by the centrifugation was dispersed in the 1% aqueous solution of EMULGEN 810 to adjust the rubber concentration to 8%, followed by centrifugation again at a rotational speed of 11,000 rpm for 30 minutes. This operation was repeated again. The resulting cream fraction was dispersed in distilled water to prepare a deproteinized rubber latex having a rubber solids content of 60%.

To the latex was added 50% by mass formic acid until the rubber was coagulated. The coagulated rubber was taken out and formed into a sheet using a creper while being washed with water, followed by drying for four hours at 90° C. In this manner, a solid rubber (highly purified natural rubber G) was prepared.

Comparative Production Example 7H

A solid rubber (highly purified natural rubber H) was prepared as in Comparative Production Example 7G, except that, after the coagulated rubber was taken out, it was immersed in a 0.5% by mass aqueous solution of sodium carbonate for one hour, and then the resulting rubber was formed into a sheet using a creper while being washed with water, followed by drying for four hours at 90° C.

The solid rubbers obtained as above were evaluated as described below. Table 26 shows the results.

[Measurement of pH of Rubber]

The obtained rubber in an amount of 5 g was cut into pieces each with a total length of the three sides of 5 mm or smaller (about 1 to 2× about 1 to 2× about 1 to 2 (mm)) and placed in a 100 mL beaker. After 50 mL of distilled water at a room temperature was added to the beaker, the mixture was heated to 90° C. over two minutes, and then irradiated with microwave (300 W) for 13 minutes (total 15 minutes) while controlling the temperature at constant 90° C. Then, after the immersion water was cooled to 25° C. in an ice bath, the pH of the immersion water was measured with a pH meter.

[Measurement of Nitrogen Content]

(Acetone Extraction (Preparation of Test Piece))

Each solid rubber was finely cut into 1 mm cubes and about 0.5 g of the cubes were weighed out. The sample thus prepared was immersed in 50 g of acetone for 48 hours at a room temperature (25° C.). Then, the rubber was taken out and dried to prepare a test piece (from which antioxidants had been extracted and removed).

(Measurement)

The nitrogen content of each test piece was measured by the following method.

The acetone-extracted test piece obtained above was decomposed and gasified using a trace nitrogen/carbon analyzer "SUMIGRAPH NC 95A" (Sumika Chemical Analysis Service, Ltd.), and the gas was analyzed using a gas chromatograph "GC-8A" (Shimadzu Corporation) to determine the nitrogen content.

[Measurement of Phosphorus Content]

The phosphorus content was determined using an ICP emission spectrometer (P-4010, Hitachi, Ltd.).

[Measurement of Gel Content]

The raw rubber sample was cut into 1 mm×1 mm pieces, and about 70 mg of the pieces were accurately weighed out. The sample was combined with 35 mL of toluene and the mixture was allowed to stand still in a cool, dark place for one week. Then, the mixture was centrifuged so that a toluene-insoluble gel fraction was sedimented, and a toluene-soluble supernatant was removed. Only the gel fraction was solidified with methanol and then dried. The mass of the dried gel fraction was measured. The gel content (%) was determined using the following equation.

$$\text{Gel content (\% by mass)} = [\text{mass after drying (mg)}]/[\text{initial mass of sample (mg)}] \times 100$$

[Heat Aging Resistance]

The Mooney viscosity ML (1+4) at 130° C. of the solid rubber was measured before and after treatment at 80° C. for 18 hours in accordance with JIS K 6300:2001-1. A heat aging resistance index was calculated using the formula described earlier.

TABLE 26

| | Saponified natural rubber | | | | Deproteinized natural rubber | | | | |
|---|---|---|---|---|---|---|---|---|---|
| | Highly purified natural rubber A Production Example 7A | Highly purified natural rubber B Production Example 7B | Highly purified natural rubber C Comparative Production Example 7C | Highly purified natural rubber D Comparative Production Example 7D | Highly purified natural rubber E Production Example 7E | Highly purified natural rubber F Production Example 7F | Highly purified natural rubber G Comparative Production Example 7G | Highly purified natural rubber H Comparative Production Example 7H | Natural rubber TSR20 |
| pH | 5 | 3.8 | 8 | 8.5 | 4.9 | 3.6 | 8.1 | 9.5 | — |
| Nitrogen content (% by mass) | 0.07 | 0.07 | 0.08 | 0.07 | 0.02 | 0.02 | 0.02 | 0.02 | 0.36 |
| Phosphorus content (ppm) | 92 | 88 | 89 | 93 | 108 | 99 | 93 | 95 | 590 |
| Gel content (% by mass) | 6 | 7 | 8 | 6 | 9 | 10 | 8 | 7 | 29.8 |
| Mooney viscosity | 58 | 56 | 59 | 60 | 58 | 57 | 60 | 60 | 88 |
| Heat aging resistance (%) | 95 | 99 | 60 | 41 | 85 | 88 | 58 | 28 | 103 |

The results in Table 26 show that the modified natural rubbers having a pH within a range of 2 to 7 had better heat aging resistance than the rubbers having a pH outside the range.

The chemicals used in examples and comparative examples are listed below.
NR: TSR20 (natural rubber)
Highly purified natural rubber: highly purified natural rubber A to H prepared in Production Example 7A to Comparative Production Example 7H
Carbon black: carbon black prepared in any of Production Examples 1 to 11
Oil: Diana Process AH-24 (aromatic process oil) available from Idemitsu Kosan Co., Ltd.
Zinc oxide: zinc oxide available from Mitsui Mining & Smelting Co., Ltd.
Stearic acid: stearic acid "TSUBAKI" available from NOF Corporation
Antioxidant: OZONONE 6C (N-(1,3-dimethylbutyl)-N'-phenyl-p-phenylenediamine) available from Seiko Chemical Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

An amount of 100 parts by mass of the rubber component (shown in Table 27, 28, 29, or 30), 45 parts by mass of the carbon black (shown in Table 27, 28, 29, or 30), 5 parts by mass of oil, 5 parts by mass of zinc oxide, 3 parts by mass of stearic acid, and 2 parts by mass of the antioxidant were kneaded using a BP-type Banbury mixer at 150° C. for three minutes to give a kneadate. To the kneadate were added 2 parts by mass of sulfur and 1 part by mass of the vulcanization accelerator, and the mixture was kneaded with an open roll mill at 50° C. for five minutes to obtain an unvulcanized rubber composition.

The unvulcanized rubber composition was press-vulcanized at 170° C. for 12 minutes to obtain a vulcanized rubber composition.

The vulcanized rubber compositions prepared as above were subjected to the following evaluations. The results are shown in Tables 27 to 30. The reference comparative example in Tables 27 and 30 is Comparative Example 7-6, the reference comparative example in Table 28 is Comparative Example 7-13, and the reference comparative example in Table 29 is Comparative Example 7-14.

(Abrasion Resistance)

Lambourn abrasion loss was determined using a Lambourn abrasion tester at a temperature of 20° C., a slip ratio of 20%, and a test time of 2 minutes. Then, a volume loss was calculated from the Lambourn abrasion loss. The volume loss of each formulation example is expressed as an index (Lambourn abrasion index), with the reference comparative example set equal to 100. A higher Lambourn abrasion index indicates better abrasion resistance.

(Low Heat Build-Up Properties)

The loss tangent (tan δ) of each formulation example was determined using a viscoelastic spectrometer VES (available from Iwamoto Seisakusho Co., Ltd.) at a temperature of 50° C., an initial strain of 10%, and a dynamic strain of 2%. The tan δ of the reference comparative example is taken as 100, while the tan δ of the other formulation examples are expressed as an index (rolling resistance index) using the equation below. A higher index indicates better rolling resistance properties (low heat build-up properties). An index of 95 or higher is considered good.

(Rolling resistance index)=(tan δ of reference comparative example)/(tan δ of each formulation example)×100

TABLE 27

| | Comparative Example 7-1 | Comparative Example 7-2 | Comparative Example 7-3 | Comparative Example 7-4 | Comparative Example 7-5 | Comparative Example 7-6 | Example 7-1 | Example 7-2 | Example 7-3 | Example 7-4 |
|---|---|---|---|---|---|---|---|---|---|---|
| Carbon black used | Production Example 1 | Production Example 2 | Production Example 3 | Production Example 4 | Production Example 5 | Production Example 1 | Production Example 2 | Production Example 3 | Production Example 4 | Production Example 5 |
| Rubber | TSR20 | TSR20 | TSR20 | TSR20 | TSR20 | Highly | Highly | Highly | Highly | Highly |

TABLE 27-continued

|  |  | Comparative Example 7-1 | Comparative Example 7-2 | Comparative Example 7-3 | Comparative Example 7-4 | Comparative Example 7-5 | Comparative Example 7-6 | Example 7-1 | Example 7-2 | Example 7-3 | Example 7-4 |
|---|---|---|---|---|---|---|---|---|---|---|---|
|  | component used |  |  |  |  |  |  | purified natural rubber A | purified natural rubber A | purified natural rubber A | purified natural rubber A | purified natural rubber A |
| Rubber physical properties | Abrasion resistance | 95 | 103 | 102 | 99 | 99 | 100 | 110 | 113 | 107 | 106 |
| Rubber physical properties | Low heat build-up properties | 90 | 86 | 88 | 99 | 96 | 100 | 99 | 101 | 110 | 109 |

TABLE 28

|  |  | Comparative Example 7-7 | Comparative Example 7-8 | Comparative Example 7-9 | Comparative Example 7-10 | Comparative Example 7-11 | Comparative Example 7-12 | Comparative Example 7-13 | Example 7-6 | Example 7-7 | Example 7-8 | Example 7-9 | Example 7-10 |
|---|---|---|---|---|---|---|---|---|---|---|---|---|---|
| Carbon black used |  | Production Example 6 | Production Example 7 | Production Example 8 | Production Example 9 | Production Example 10 | Production Example 11 | Production Example 6 | Production Example 7 | Production Example 8 | Production Example 9 | Production Example 10 | Production Example 11 |
| Rubber component used |  | TSR20 | TSR20 | TSR20 | TSR20 | TSR20 | TSR20 | Highly purified natural rubber A | Highly purified natural rubber A | Highly purified natural rubber A | Highly purified natural rubber A | Highly purified natural rubber A | Highly purified natural rubber A |
| Rubber physical properties | Abrasion resistance | 93 | 101 | 104 | 111 | 95 | 103 | 100 | 111 | 114 | 124 | 104 | 115 |
| Rubber physical properties | Low heat build-up properties | 92 | 89 | 109 | 99 | 93 | 96 | 100 | 100 | 121 | 113 | 106 | 109 |

TABLE 29

|  |  | Comparative Example 7-14 | Example 7-11 | Example 7-12 | Example 7-13 | Example 7-14 | Example 7-15 |
|---|---|---|---|---|---|---|---|
| Carbon black used |  | Production Example 6 | Production Example 7 | Production Example 8 | Production Example 9 | Production Example 10 | Production Example 11 |
| Rubber component used |  | Highly purified natural rubber B | Highly purified natural rubber B | Highly purified natural rubber B | Highly purified natural rubber B | Highly purified natural rubber B | Highly purified natural rubber B |
| Rubber physical properties | Abrasion resistance | 100 | 108 | 115 | 120 | 103 | 109 |
| Rubber physical properties | Low heat build-up properties | 100 | 102 | 114 | 114 | 104 | 103 |

TABLE 30

|  | Comparative Example 7-2 | Comparative Example 7-6 | Example 7-1 | Example 7-16 | Comparative Example 7-15 | Comparative Example 7-16 | Example 7-17 | Example 7-18 | Comparative Example 7-17 | Comparative Example 7-18 |
|---|---|---|---|---|---|---|---|---|---|---|
| Carbon black used | Production Example 1 | Production Example 2 | Production Example 2 | Production Example 2 | Production Example 2 | Production Example 2 | Production Example 2 | Production Example 2 | Production Example 2 | Production Example 2 |
| Rubber component used | TSR20 | Highly purified natural rubber A | Highly purified natural rubber A | Highly purified natural rubber B | Highly purified natural rubber G | Highly purified natural rubber D | Highly purified natural rubber E | Highly purified natural rubber F | Highly purified natural rubber G | Highly purified natural rubber H |

TABLE 30-continued

| | | Comparative Example 7-2 | Comparative Example 7-6 | Example 7-1 | Example 7-16 | Comparative Example 7-15 | Comparative Example 7-16 | Example 7-17 | Example 7-18 | Comparative Example 7-17 | Comparative Example 7-18 |
|---|---|---|---|---|---|---|---|---|---|---|---|
| Rubber physical properties | Abrasion resistance | 103 | 100 | 110 | 109 | 105 | 103 | 107 | 107 | 106 | 106 |
| | Low heat build-up properties | 86 | 100 | 99 | 101 | 88 | 90 | 100 | 101 | 86 | 84 |

Tables 27 to 30 show that, in the examples in which a highly purified natural rubber with a pH of 2 to 7 and carbon black (1) were incorporated, abrasion resistance and low heat build-up properties were synergistically improved, and thus abrasion resistance and low heat build-up properties could be significantly improved.

Examples and Comparative Examples in the Aspect 8-1 or 8-2 of the Invention

The chemicals used in examples and comparative examples are listed below.
NR: RSS#3
BR 1: BR1250H (tin-modified BR produced by polymerization using lithium initiator, cis content: 45% by mass, vinyl content: 10% to 13% by mass, Mw/Mn: 1.5, tin atom content: 250 ppm) available from Zeon Corporation
BR 2: Nipol BR1220 (vinyl content: 1% by mass, cis content: 97% by mass) available from Zeon Corporation
Carbon black: carbon black prepared in any of Production Examples 1 to 11
Oil: Diana Process AH-24 (aromatic process oil) available from Idemitsu Kosan Co., Ltd.
Zinc oxide: zinc oxide available from Mitsui Mining & Smelting Co., Ltd.
Stearic acid: stearic acid "TSUBAKI" available from NOF Corporation
Antioxidant: OZONONE 6C (N-(1,3-dimethylbutyl)-N'-phenyl-p-phenylenediamine) available from Seiko Chemical Co., Ltd.
Wax: SUNNOC wax available from Ouchi Shinko Chemical Industrial Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

According to the formulations shown in Tables 31 and 32, the materials other than the sulfur and vulcanization accelerator were kneaded for three minutes at 150° C. using a BP-type Banbury mixer to give a kneadate. Then, the sulfur and vulcanization accelerator were added to the kneadate, followed by kneading for five minutes at 50° C. using an open roll mill to obtain an unvulcanized rubber composition.

The unvulcanized rubber composition was press-vulcanized for 12 minutes at 170° C. to obtain a vulcanized rubber composition.

The vulcanized rubber compositions prepared as above were subjected to the following evaluations. The results are shown in Tables 31 and 32. The reference comparative example in Table 31 is Comparative Example 8-1, and the reference comparative example in Table 32 is Comparative Example 8-4.

(Rubber Strength)

Each vulcanized rubber composition was subjected to a tensile test in accordance with JIS K 6251 to measure the elongation at break. The results are expressed as an index, with the reference comparative example set equal to 100. A higher index indicates better rubber strength.

(Rubber strength index)=(Elongation at break of each formulation example)/(Elongation at break of reference comparative example)×100

(Low Heat Build-Up Properties)

The loss tangent (tan δ) of each formulation example was determined using a viscoelastic spectrometer VES (available from Iwamoto Seisakusho Co., Ltd.) at a temperature of 50° C., an initial strain of 10%, and a dynamic strain of 2%. The tan δ of the reference comparative example is taken as 100, while the tan δ of the other formulation examples are expressed as an index (rolling resistance index) using the equation below. A higher index indicates better rolling resistance properties (low heat build-up properties).

(Rolling resistance index)=(tan δ of reference comparative example)/(tan δ of each formulation example)×100

TABLE 31

| | | | Comparative Example 8-1 | Comparative Example 8-2 | Comparative Example 8-3 | Example 8-1 | Example 8-2 | Example 8-3 | Example 8-4 | Example 8-5 |
|---|---|---|---|---|---|---|---|---|---|---|
| | | Carbon black used | Production Example 1 | Production Example 1 | Production Example 2 | Production Example 2 | Production Example 3 | Production Example 4 | Production Example 5 | Production Example 2 |
| Amount (parts by mass) | NR | | 80 | 80 | 80 | 80 | 80 | 80 | 80 | 80 |
| | BR 1 | | — | 20 | — | 20 | 20 | 20 | 20 | 20 |
| | BR 2 | | 20 | — | 20 | — | — | — | — | — |

TABLE 31-continued

|  |  | Comparative Example 8-1 | Comparative Example 8-2 | Comparative Example 8-3 | Example 8-1 | Example 8-2 | Example 8-3 | Example 8-4 | Example 8-5 |
|---|---|---|---|---|---|---|---|---|---|
|  | Carbon black | 45 | 45 | 45 | 45 | 45 | 45 | 45 | 45 |
|  | Oil | 5 | 5 | 5 | 15 | 15 | — | — | 5 |
|  | Stearic acid | 2 | 2 | 2 | 2 | 2 | 2 | 2 | 2 |
|  | Zinc oxide | 2 | 2 | 2 | 2 | 2 | 2 | 2 | 2 |
|  | Antioxidant | 2 | 2 | 2 | 2 | 2 | 2 | 2 | 2 |
|  | Wax | 2 | 2 | 2 | 2 | 2 | 2 | 2 | 2 |
|  | Sulfur | 2 | 2 | 2 | 2 | 2 | 2 | 2 | 2 |
|  | Vulcanization accelerator | 1.5 | 1.5 | 1.5 | 1.5 | 1.5 | 1.5 | 1.5 | 1.5 |
| Evaluation result | Rubber strength index | 100 | 100 | 106 | 106 | 105 | 102 | 102 | 107 |
|  | Low heat build-up property index | 100 | 120 | 98 | 118 | 119 | 127 | 125 | 120 |

TABLE 32

|  |  | Comparative Example 8-4 | Comparative Example 8-5 | Comparative Example 8-6 | Example 8-6 | Example 8-7 | Example 8-8 | Example 8-9 | Example 8-10 | Example 8-11 |
|---|---|---|---|---|---|---|---|---|---|---|
|  | Carbon black used | Production Example 6 | Production Example 6 | Production Example 7 | Production Example 7 | Production Example 8 | Production Example 9 | Production Example 10 | Production Example 11 | Production Example 7 |
| Amount (parts by mass) | NR | 80 | 80 | 80 | 80 | 80 | 80 | 80 | 80 | 80 |
|  | BR 1 | — | 20 | — | 20 | 20 | 20 | 20 | 20 | 20 |
|  | BR 2 | 20 | — | 20 | — | — | — | — | — | — |
|  | Carbon black | 45 | 45 | 45 | 45 | 45 | 45 | 45 | 45 | 45 |
|  | Oil | 5 | 5 | 5 | 15 | 15 | — | — | — | 5 |
|  | Stearic acid | 2 | 2 | 2 | 2 | 2 | 2 | 2 | 2 | 2 |
|  | Zinc oxide | 2 | 2 | 2 | 2 | 2 | 2 | 2 | 2 | 2 |
|  | Antioxident | 2 | 2 | 2 | 2 | 2 | 2 | 2 | 2 | 2 |
|  | Wax | 2 | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 | 1.5 |
|  | Vulcanization accelerator | 2 | 2 | 2 | 2 | 2 | 2 | 2 | 2 | 2 |
| Evaluation result | Rubber strength index | 100 | 100 | 106 | 106 | 109 | 115 | 101 | 108 | 108 |
|  | Low heat build-up property index | 100 | 115 | 99 | 114 | 130 | 120 | 114 | 117 | 116 |

Tables 31 and 32 show that, in the examples in which tin-modified BR (BR 1) and carbon black (1) were incorporated, rubber strength and low heat build-up properties were synergistically improved, and thus rubber strength and low heat build-up properties could be significantly improved.

Examples and Comparative Examples in the Aspect 9-1 or 9-2 of the Invention

The chemicals used in examples and comparative examples are listed below.
Natural rubber (NR): RSS#3
Styrenebutadiene rubber (SBR): SBR1502 (styrene content: 23.5% by mass) available from JSR Corporation
Carbon black (1): carbon black prepared in any of Production Examples 1 to 11
Carbon black (2): DIABLACK N220 ($N_2SA$: 114 $m^2/g$, average particle size: 20 nm, DBP oil absorption: 114 ml/100 g) available from Mitsubishi Chemical Corporation
Oil: VIVATEC400 (TDAE oil) available from H&R
Zinc oxide: Ginrei R available from Toho Zinc Co., Ltd.
Stearic acid: stearic acid "Kiri" available from NOF Corporation
Antioxidant: NOCRAC 3C available from Ouchi Shinko Chemical Industrial Co., Ltd.
Sulfur: sulfur available from Tsurumi Chemical Industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

According to the formulations shown in Tables 33 and 34, the chemicals other than the zinc oxide, sulfur, and vulcanization accelerator were kneaded using a 1.7 L Banbury mixer for five minutes until the discharge temperature reached 160° C. to give a kneadate. Then, the zinc oxide, sulfur, and vulcanization accelerator were added to the kneadate, followed by kneading for four minutes using an open two roll mill until the temperature reached 105° C. to obtain an unvulcanized rubber composition.

The unvulcanized rubber composition was extruded into a predetermined shape and press-vulcanized for 12 minutes at 170° C. to obtain a vulcanized rubber composition.

The thus prepared unvulcanized rubber compositions and vulcanized rubber compositions were subjected to the following evaluations. The results are shown in Tables 33 and 34. The reference comparative example in Table 33 is Comparative Example 9-1, and the reference comparative example in Table 34 is Comparative Example 9-2.

(Viscoelasticity Test)

A piece having a width of 4 mm, a length of 40 mm, and a thickness of 2 mm was cut out of each vulcanized rubber composition prepared as above. The storage modulus E' (MPa) and loss tangent (tan δ) of the vulcanized rubber composition piece were measured using a viscoelastic spectrometer VES (available from Iwamoto Seisakusho Co., Ltd.) at a temperature of 70° C., a frequency of 10 Hz, an initial strain of 10%, and a dynamic strain of 2%. The E' and tan δ values of each formulation example are each expressed as an index (storage modulus index or rolling resistance index), with the reference comparative example set equal to 100. A vulcanized rubber composition with a higher storage modulus index, when used in an insulation component, shows a higher rigidity and allows the tire to have better handling stability. A vulcanized rubber composition with a higher rolling resistance index, when used in an insulation component, allows the tire to have better low heat build-up properties. A rolling resistance index of 90 or higher is considered good.

(Tensile Test)

A tensile test was performed using a No. 3 dumbbell test piece prepared from each vulcanized rubber composition in accordance with JIS K 6251 "Rubber, vulcanized or thermoplastic—Determination of tensile stress-strain properties" to measure the elongation at break EB (%). The EB values are expressed as an index (elongation at break index) using the equation below, with the reference comparative example set equal to 100. A higher elongation at break index indicates better rubber strength, leading to better tire durability in the use as an insulation component.

(Elongation at break index)=(EB of each formulation example)/(EB of reference comparative example)

(Viscosity and Processability)

The Mooney viscosity ($ML_{1+4}$/130° C.) of each unvulcanized rubber composition was determined in accordance with JIS K 6300-1 "Rubber, unvulcanized—Physical property—Part 1: Determination of Mooney viscosity and pre-vulcanization characteristics with Mooney viscometer" using a Mooney viscosity tester as follows. After preheating for one minute to 130° C., a small rotor was rotated, and after a lapse of four minutes the Mooney viscosity ($ML_{1+4}$/130° C.) of the unvulcanized rubber composition was measured. Processability was rated based on the Mooney viscosity. A value of at least 30 but less than 50 is rated as "Good", and a value of less than 30 or not less than 50 is rated as "Poor". A rating of "Good" indicates that processability is excellent and tires can be produced with high productivity.

TABLE 33

|  |  | Comparative Example | Example | | | |
|---|---|---|---|---|---|---|
|  |  | 9-1 | 9-1 | 9-2 | 9-3 | 9-4 |
| Formulation (parts by mass) | NR | 70 | 70 | 70 | 70 | 70 |
|  | SBR | 30 | 30 | 30 | 30 | 30 |
|  | Carbon black (1) | 20 | 20 | 20 | 20 | 20 |
|  |  | Production Example 1 | Production Example 2 | Production Example 3 | Production Example 4 | Production Example 5 |
|  | Carbon black (2) | — | — | — | — | — |
|  | Oil | 2 | 2 | 2 | 2 | 2 |
|  | Zinc oxide | 2 | 2 | 2 | 2 | 2 |
|  | Stearic acid | 2 | 2 | 2 | 2 | 2 |
|  | Antioxidant | 1 | 1 | 1 | 1 | 1 |
|  | Sulfur | 0.5 | 0.5 | 0.5 | 0.5 | 0.5 |
|  | Vulcanization accelerator | 1.2 | 1.2 | 1.2 | 1.2 | 1.2 |
| Evaluation | Rolling resistance index | 100 | 96 | 98 | 109 | 106 |
|  | Storage modulus index | 100 | 106 | 104 | 103 | 102 |
|  | Elongation at break index | 100 | 106 | 104 | 102 | 102 |
|  | Processability | Good | Good | Good | Good | Good |

TABLE 34

|  |  | Comparative Example | Example | | | | | | | | Comparative Example | | | |
|---|---|---|---|---|---|---|---|---|---|---|---|---|---|---|
|  |  | 9-2 | 9-5 | 9-6 | 9-7 | 9-8 | 9-9 | 9-10 | 9-11 | 9-12 | 9-3 | 9-4 | 9-5 | 9-6 |
| Formulation (parts by mass) | NR | 70 | 70 | 70 | 70 | 70 | 70 | 70 | 70 | 40 | 70 | 70 | 100 | 100 |
|  | SBR | 30 | 30 | 30 | 30 | 30 | 30 | 30 | 30 | 60 | 30 | 30 | — | — |
|  | Carbon black (1) | 20 | 20 | 20 | 20 | 20 | 20 | 20 | 60 | 20 | 120 | 10 | 20 | 20 |
|  |  | Production Example 6 | Production Example 7 | Production Example 8 | Production Example 9 | Production Example 10 | Production Example 11 | Production Example 8 | Production Example 8 | Production Example 8 | Production Example 8 | Production Example 8 | Production Example 8 | Production Example 6 |
|  | Carbon black (2) | — | — | — | — | — | 20 | — | 20 | — | — | — | — | — |
|  | Oil | 2 | 2 | 2 | 2 | 2 | 2 | 2 | 2 | 2 | 2 | 2 | 2 | 2 |

TABLE 34-continued

|  |  | Comparative Example | Example | | | | | | | | Comparative Example | | | |
|---|---|---|---|---|---|---|---|---|---|---|---|---|---|---|
|  |  | 9-2 | 9-5 | 9-6 | 9-7 | 9-8 | 9-9 | 9-10 | 9-11 | 9-12 | 9-3 | 9-4 | 9-5 | 9-6 |
|  | Zinc oxide | 2 | 2 | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 | 2 | 2 |
|  | Antioxidant | 1 | 1 | 1 | 1 | 1 | 1 | 1 | 1 | 1 | 1 | 1 | 1 | 1 |
|  | Sulfur | 0.5 | 0.5 | 0.5 | 0.5 | 0.5 | 0.5 | 0.5 | 0.5 | 0.5 | 0.5 | 0.5 | 0.5 | 0.5 |
|  | Vulcanization accelerator | 1.2 | 1.2 | 1.2 | 1.2 | 1.2 | 1.2 | 1.2 | 1.2 | 1.2 | 1.2 | 1.2 | 1.2 | 1.2 |
| Evaluation | Rolling resistance index | 100 | 97 | 117 | 107 | 102 | 104 | 112 | 90 | 115 | 70 | 110 | 98 | 94 |
|  | Storage modulus index | 100 | 105 | 106 | 105 | 101 | 102 | 106 | 120 | 105 | 140 | 70 | 104 | 102 |
|  | Elongation at break index | 100 | 106 | 109 | 112 | 102 | 106 | 106 | 105 | 104 | 80 | 110 | 104 | 103 |
|  | Processability | Good | Good | Good | Good | Good | Good | Good | Good | Good | Poor | Poor | Good | Good |

Tables 33 and 34 show that, in the examples in which an isoprene-based rubber and SBR were incorporated with carbon black (1), good processability was obtained, and also storage modulus and rubber strength could be improved while maintaining or improving good low heat build-up properties, and thus the balance of low heat build-up properties, storage modulus, rubber strength, and processability could be significantly improved.

Comparison of Comparative Examples 9-2, 9-5, and 9-6 with Example 9-6 reveals that the incorporation of carbon black (1) into a rubber formulation including an isoprene-based rubber and SBR produced higher effects (synergistic effects) in improving low heat build-up properties, storage modulus, rubber strength, or the balance of these properties than the sum of the effects obtained when carbon black (1) was incorporated into a rubber formulation including an isoprene-based rubber alone and when carbon black other than carbon black (1) was incorporated into a rubber formulation including an isoprene-based rubber and SBR.

Examples and Comparative Examples in the Aspect 10-1 or 10-2 of the Invention

The chemicals used in examples and comparative examples are listed below.
Natural rubber (NR): RSS#3
Polybutadiene rubber (BR): Ubepol BR150B (cis content: 97% by mass) available from Ube Industries, Ltd.
Carbon black (1): carbon black prepared in any of Production Examples 1 to 11
Carbon black (2): DIABLACK N550 ($N_2SA$: 40 $m^2/g$, DBP oil absorption: 115 ml/100 g) available from Mitsubishi Chemical Corporation
Oil: process oil NC300S (aromatic hydrocarbon (CA) content: 29% by mass) available from Japan Energy Corporation
Zinc oxide: zinc oxide #1 available from Mitsui Mining & Smelting Co., Ltd.
Stearic acid: stearic acid beads "Tsubaki" available from NOF Corporation
Antioxidant: NOCRAC 3C available from Ouchi Shinko Chemical Industrial Co., Ltd.
Sulfur: powder sulfur available from Tsurumi Chemical industry Co., Ltd.
Vulcanization accelerator 1: Soxinol CZ (N-cyclohexyl-2-benzothiazolylsulfenamide) available from Sumitomo Chemical Co., Ltd.
Vulcanization accelerator 2: Soxinol D (1,3-diphenylguanidine) available from Sumitomo Chemical Co., Ltd.

Examples and Comparative Examples

According to the formulations shown in Tables 35 and 36, the chemicals other than the zinc oxide, sulfur, and vulcanization accelerators were kneaded using a 1.7 L Banbury mixer for five minutes until the discharge temperature reached 160° C. to give a kneadate. Then, the zinc oxide, sulfur, and vulcanization accelerators were added to the kneadate, followed by kneading for four minutes using an open two roll mill until the temperature reached 105° C. to obtain an unvulcanized rubber composition.

The unvulcanized rubber composition was extruded into a predetermined shape and press-vulcanized for 12 minutes at 170° C. to obtain a vulcanized rubber composition.

The thus prepared unvulcanized rubber compositions and vulcanized rubber compositions were subjected to the following evaluations. The results are shown in Tables 35 and 36. The reference comparative example in Table 35 is Comparative Example 10-1, and the reference comparative example in Table 36 is Comparative Example 10-2.
(Viscoelasticity Test)

A piece having a width of 4 mm, a length of 40 mm, and a thickness of 2 mm was cut out of each vulcanized rubber composition prepared as above. The storage modulus E' (MPa) and loss tangent (tan δ) of the vulcanized rubber composition piece were measured using a viscoelastic spectrometer VES (available from Iwamoto Seisakusho Co., Ltd.) at a temperature of 70° C., a frequency of 10 Hz, an initial strain of 10%, and a dynamic strain of 2%. The E' and tan δ values of each formulation example are each expressed as an index (storage modulus index or rolling resistance index), with the reference comparative example set equal to 100. A vulcanized rubber composition with a higher storage modulus index, when used in a sidewall component, shows a higher rigidity and allows the tire to have higher resistance to external damage (cur resistance). A vulcanized rubber composition with a higher rolling resistance index, when used in a sidewall component, allows the tire to have better low heat build-up properties. A rolling resistance index of 90 or higher is considered good.

(Viscosity and Processability)

The Mooney viscosity ($ML_{1+4}$/130° C.) of each unvulcanized rubber composition was determined in accordance with JIS K 6300-1 "Rubber, unvulcanized—Physical property—Part 1: Determination of Mooney viscosity and pre-vulcanization characteristics with Mooney viscometer" using a Mooney viscosity tester as follows. After preheating for one minute to 130° C., a small rotor was rotated, and after a lapse of four minutes the Mooney viscosity ($ML_{1+4}$/130° C.) of the unvulcanized rubber composition was measured. Processability was rated based on the Mooney viscosity. A value of at least 30 but less than 50 is rated as "Good", and a value of less than 30 or not less than 50 is rated as "Poor". A rating of "Good" indicates that processability is excellent and tires can be produced with high productivity.

TABLE 35

|  |  | Comparative Example | Example | | | |
|---|---|---|---|---|---|---|
|  |  | 10-1 | 10-1 | 10-2 | 10-3 | 10-4 |
| Formulation | NR | 70 | 70 | 70 | 70 | 70 |
| | BR | 30 | 30 | 30 | 30 | 30 |

TABLE 35-continued

|  |  | Comparative Example | Example | | | |
|---|---|---|---|---|---|---|
|  |  | 10-1 | 10-1 | 10-2 | 10-3 | 10-4 |
| (parts by mass) | Carbon black (1) | 20 Production Example 1 | 20 Production Example 2 | 20 Production Example 3 | 20 Production Example 4 | 20 Production Example 5 |
| | Carbon black (2) | — | — | — | — | — |
| | Oil | 5 | 5 | 5 | 5 | 5 |
| | Zinc oxide | 2 | 2 | 2 | 2 | 2 |
| | Stearic acid | 2 | 2 | 2 | 2 | 2 |
| | Antioxidant | 2 | 2 | 2 | 2 | 2 |
| | Sulfur | 1.5 | 1.5 | 1.5 | 1.5 | 1.5 |
| | Vulcanization accelerator 1 | 2 | 2 | 2 | 2 | 2 |
| | Vulcanization accelerator 2 | 1 | 1 | 1 | 1 | 1 |
| Evaluation | Rolling resistance index | 100 | 98 | 98 | 109 | 106 |
| | Storage modulus index | 100 | 106 | 105 | 103 | 102 |
| | Processability | Good | Good | Good | Good | Good |

TABLE 36

|  |  | Comparative Example | Example | | | | | | | | Comparative Example | | | |
|---|---|---|---|---|---|---|---|---|---|---|---|---|---|---|
|  |  | 10-2 | 10-5 | 10-6 | 10-7 | 10-8 | 10-9 | 10-10 | 10-11 | 10-12 | 10-3 | 10-4 | 10-5 | 10-6 |
| Formulation (parts by mass) | NR | 70 | 70 | 70 | 70 | 70 | 70 | 70 | 70 | 50 | 70 | 70 | 100 | 100 |
| | BR | 30 | 30 | 30 | 30 | 30 | 30 | 30 | 30 | 50 | 30 | 30 | — | — |
| | Carbon black (1) | 20 Production Example 6 | 20 Production Example 7 | 20 Production Example 8 | 20 Production Example 9 | 20 Production Example 10 | 20 Production Example 11 | 20 Production Example 8 | 20 Production Example 8 | 60 Production Example 8 | 120 Production Example 8 | 10 Production Example 8 | 20 Production Example 8 | 20 Production Example 6 |
| | Carbon black (2) | — | — | — | — | — | — | 20 | — | — | — | — | — | — |
| | Oil | 5 | 5 | 5 | 5 | 5 | 5 | 5 | 5 | 5 | 5 | 5 | 5 | 5 |
| | Zinc oxide | 2 | 2 | 2 | 2 | 2 | 2 | 2 | 2 | 2 | 2 | 2 | 2 | 2 |
| | Stearic acid | 2 | 2 | 2 | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 | 1.5 | 1.5 |
| | Vulcanization accelerator 1 | 2 | 2 | 2 | 2 | 2 | 2 | 2 | 2 | 2 | 2 | 2 | 2 | 2 |
| | Vulcanization accelerator 2 | 1 | 1 | 1 | 1 | 1 | 1 | 1 | 1 | 1 | 1 | 1 | 1 | 1 |
| Evaluation | Rolling resistance index | 100 | 97 | 117 | 107 | 102 | 104 | 112 | 90 | 112 | 70 | 110 | 98 | 90 |
| | Storage modulus index | 100 | 105 | 106 | 105 | 101 | 102 | 106 | 120 | 109 | 120 | 70 | 105 | 106 |
| | Processability | Good | Good | Good | Good | Good | Good | Good | Good | Good | Poor | Poor | Good | Good |

Tables 35 and 36 show that, in the examples in which an isoprene-based rubber and BR were incorporated with carbon black (1), good processability was obtained, and also storage modulus could be improved while maintaining or improving good low heat build-up properties, and thus the balance of low heat build-up properties, storage modulus, and processability could be significantly improved.

Comparison of Comparative Examples 10-2, 10-5, and 10-6 with Example 10-6 reveals that the incorporation of carbon black (1) into a rubber formulation including an isoprene-based rubber and BR produced a higher effect (synergistic effect) in improving the balance of low heat build-up properties and storage modulus than the sum of the effects obtained when carbon black (1) was incorporated into a rubber formulation including an isoprene-based rubber alone and when carbon black other than carbon black (1) was incorporated into a rubber formulation including an isoprene-based rubber and BR.

Examples and Comparative Examples in the Aspect 11-1 or 11-2 of the Invention

The chemicals used for preparing carbon black dispersions and wet masterbatchs are listed below.
SBR latex: LX110 (E-SBR, vinyl content: 18% by mass, styrene content: 37.5% by mass, concentration of the rubber component in the rubber latex: 40.5% by mass) available from Zeon Corporation
Carbon black: carbon black prepared in any of Production Examples 1 to 11
DEMOL N: surfactant DEMOL N (sodium salt of β-naphthalenesulfonic acid formalin condensate, anionic surfactant) available from Kao Corporation
Oil: Diana Process AH-24 (aromatic process oil) available from Idemitsu Kosan Co., Ltd.
(Preparation of Carbon Black Dispersion)

An amount of 1,900 g of deionized water and 100 g of the carbon black shown in Table 37 or 38 were introduced into a colloid mill having a rotor diameter of 30 mm, and they were stirred at a rotor-stator gap of 1 mm and a rotational speed of 2,000 rpm for 10 minutes. Subsequently, DEMOL N was added to a concentration of 0.05% by mass. The mixture was circulated three times using a pressure homogenizer to prepare a carbon black dispersion.
(Preparation of Wet Masterbatch)

The SBR latex, the carbon black dispersion, and oil were mixed so that the ratio by dry mass of the rubber component (solids):the carbon black component (solids) shown in Table 37 or 38:oil was 100:50:20. After the solution became homogeneous, sulfuric acid was added while stirring was continued to adjust the pH to 5, so that coagulation occurred. The thus obtained coagulum was filtered off to recover the rubber component. The rubber component was washed with pure water until the pH of the liquid obtained after washing (washing water) reached 7, followed by drying to obtain a wet masterbatch.

The chemicals used in examples and comparative examples are listed below.
SBR: Nipol 1502 (E-SBR, vinyl content: 18% by mass, styrene content: 23.5%) available from Zeon Corporation
BR: Ubepol BR150B (cis content: 97% by mass) available from Ube Industries, Ltd.
Carbon black: carbon black prepared in any of Production Examples 1 to 11
WMB: wet masterbatch obtained in the Preparation of wet masterbatch
Oil: Diana Process AH-24 (aromatic process oil) available from Idemitsu Kosan Co., Ltd.
Zinc oxide: zinc oxide available from Mitsui Mining & Smelting Co., Ltd.
Stearic acid: stearic acid "TSUBAKI" available from NOF Corporation
Antioxidant: OZONONE 6C (N-(1,3-dimethylbutyl)-N'-phenyl-p-phenylenediamine) available from Seiko Chemical Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

According to the formulations shown in Tables 37 and 38, the rubber component (shown in Table 37 or 38), WMB (wet masterbatch shown in Table 37 or 38), carbon black (shown in Table 37 or 38), oil, 5 parts by mass of zinc oxide, 3 parts by mass of stearic acid, and 2 parts by mass of the antioxidant were kneaded at 150° C. for three minutes using a BP-type Banbury mixer to give a kneadate. Then, 2 parts by mass of sulfur and 1 part by mass of the vulcanization accelerator were added to the kneadate, followed by kneading at 50° C. for five minutes using an open roll mill to obtain an unvulcanized rubber composition.

The unvulcanized rubber composition was press-vulcanized for 12 minutes at 170° C. to obtain a vulcanized rubber composition.

An amount of 119 parts by mass of WMB consists of 70 parts by mass of SBR, 35 parts by mass of carbon black, and 14 parts by mass of oil.

In the tables, the terms "later introduced carbon black" and "later introduced oil" mean that another carbon black and another oil, respectively, were incorporated separately from the wet masterbatch. In each example, the carbon black indicated in the "Carbon black used" column in Table 37 or 38 was used as both the carbon black used for preparing a wet masterbatch and the later introduced carbon black.

Specifically, in Example 11-1, the carbon black prepared in Production Example 2 was used as both the carbon black used for preparing a wet masterbatch and the later introduced carbon black.

The vulcanized rubber compositions prepared as above were subjected to the following evaluations. The results are shown in Tables 37 and 38. The reference comparative example in Table 37 is Comparative Example 11-6, and the reference comparative example in Table 38 is Comparative Example 11-13.
(Abrasion Resistance)

Lambourn abrasion loss was determined using a Lambourn abrasion tester at a temperature of 20° C., a slip ratio of 20%, and a test time of 2 minutes. Then, a volume loss was calculated from the Lambourn abrasion loss. The volume loss of each formulation example is expressed as an index (Lambourn abrasion index), with the reference comparative example set equal to 100. A higher Lambourn abrasion index indicates better abrasion resistance.
(Low Heat Build-Up Properties)

The loss tangent (tan δ) of each formulation example was determined using a viscoelastic spectrometer VES (available from Iwamoto Seisakusho Co., Ltd.) at a temperature of 50° C., an initial strain of 10%, and a dynamic strain of 2%. The tan δ of the reference comparative example is taken as 100, while the tan δ of the other formulation examples are expressed as an index (rolling resistance index) using the equation below. A higher index indicates better rolling resistance properties (low heat build-up properties).

(Rolling resistance index)=(tan δ of reference comparative example)/(tan δ of each formulation example)×100

TABLE 37

| | | Comparative Example 11-1 | Comparative Example 11-2 | Comparative Example 11-3 | Comparative Example 11-4 | Comparative Example 11-5 | Comparative Example 11-6 | Example 11-1 | Example 11-2 | Example 11-3 | Example 11-4 |
|---|---|---|---|---|---|---|---|---|---|---|---|
| Carbon black used | | Production Example 1 | Production Example 2 | Production Example 3 | Production Example 4 | Production Example 5 | Production Example 1 | Production Example 2 | Production Example 3 | Production Example 4 | Production Example 5 |
| Amount (parts by mass) | SBR | 70 | 70 | 70 | 70 | 70 | | | | | |
| | WMB | | | | | | 119 | 119 | 119 | 119 | 119 |
| | BR | 30 | 30 | 30 | 30 | 30 | 30 | 30 | 30 | 30 | 30 |
| | Later introduced carbon black | 50 | 50 | 50 | 50 | 50 | 15 | 15 | 15 | 15 | 15 |
| | Later introduced oil | 20 | 20 | 20 | 20 | 20 | 6 | 6 | 6 | 6 | 6 |
| Rubber physical properties | Abrasion resistance | 90 | 98 | 97 | 94 | 94 | 100 | 112 | 110 | 108 | 107 |
| | Low heat build-up properties | 91 | 87 | 89 | 100 | 97 | 100 | 101 | 105 | 113 | 111 |

TABLE 38

| | | Comparative Example 11-7 | Comparative Example 11-8 | Comparative Example 11-9 | Comparative Example 11-10 | Comparative Example 11-11 | Comparative Example 11-12 |
|---|---|---|---|---|---|---|---|
| Carbon black used | | Production Example 6 | Prduction Example 7 | Production Example 8 | Production Example 9 | Production Example 10 | Production Example 11 |
| Amount (parts by mass) | SBR | 70 | 70 | 70 | 70 | 70 | 70 |
| | WMB | | | | | | |
| | BR | 30 | 30 | 30 | 30 | 30 | 30 |
| | Later introduced carbon black | 50 | 50 | 50 | 50 | 50 | 50 |
| | Later introduced oil | 20 | 20 | 20 | 20 | 20 | 20 |
| Rubber physical properties | Abrasion resistance | 85 | 93 | 96 | 99 | 89 | 94 |
| | Low heat build-up properties | 90 | 87 | 103 | 105 | 93 | 96 |

| | | Comparative Example 11-13 | Example 11-6 | Example 11-7 | Example 11-8 | Example 11-9 | Example 11-10 |
|---|---|---|---|---|---|---|---|
| Carbon black used | | Production Example 6 | Production Example 7 | Production Example 8 | Production Example 9 | Production Example 10 | Production Example 11 |
| Amount (parts by mass) | SBR | | | | | | |
| | WMB | 119 | 119 | 119 | 119 | 119 | 119 |
| | BR | 30 | 30 | 30 | 30 | 30 | 30 |
| | Later introduced carbon black | 15 | 15 | 15 | 15 | 15 | 15 |

TABLE 38-continued

|  |  |  |  |  |  |  |  |
|---|---|---|---|---|---|---|---|
|  | Later introduced oil | 6 | 6 | 6 | 6 | 6 | 6 |
| Rubber physical properties | Abrasion resistance | 100 | 115 | 121 | 122 | 106 | 111 |
|  | Low heat build-up properties | 100 | 101 | 119 | 120 | 108 | 109 |

Tables 37 and 38 show that, in each of the examples using a rubber composition that contained a wet masterbatch obtained by mixing a rubber latex and a dispersion of one or more types of carbon black at least one of which was a specific carbon black, abrasion resistance and low heat build-up properties were synergistically improved, and thus abrasion resistance and low heat build-up properties could be significantly improved. Specifically, comparison of Comparative Examples 11-1 to 11-6 with Examples 11-1 to 11-4 and comparison of Comparative Examples 11-7 to 11-13 with Examples 11-6 to 11-10 reveal that the incorporation of the specific carbon black in the form of a wet masterbatch synergistically improved abrasion resistance and low heat build-up properties.

Examples and Comparative Examples in the Aspect 12-1 or 12-2 of the Invention

The chemicals used for preparing carbon black dispersions and wet masterbatchs are listed below.
SBR latex: LX110 (E-SBR, vinyl content: 18% by mass, styrene content: 37.5% by mass, concentration of the rubber component in the rubber latex: 40.5% by mass) available from Zeon Corporation
Carbon black (A): carbon black prepared in any of Production Examples 1 to 11
Carbon black (B): DIABLACKH (N330, N$_2$SA: 79 m$^2$/g, DBP: 105 ml/100 g) available from Mitsubishi Chemical Corporation
DEMOL N: surfactant DEMOL N (sodium salt of β-naphthalenesulfonic acid formalin condensate, anionic surfactant) available from Kao Corporation
Oil: Diana Process AH-24 (aromatic process oil) available from Idemitsu Kosan Co., Ltd.
(Preparation of Carbon Black (A) Dispersion)
An amount of 1,900 g of deionized water and 100 g of the carbon black shown in Table 39 or 40 were introduced into a colloid mill having a rotor diameter of 30 mm, and they were stirred at a rotor-stator gap of 1 mm and a rotational speed of 2,000 rpm for 10 minutes. Subsequently, DEMOL N was added to a concentration of 0.05% by mass. The mixture was circulated three times using a pressure homogenizer to prepare a carbon black (A) dispersion.
(Preparation of Carbon Black (B) Dispersion)
An amount of 1,900 g of deionized water and 100 g of carbon black (B) were introduced into a colloid mill having a rotor diameter of 30 mm, and they were stirred at a rotor-stator gap of 1 mm and a rotational speed of 2,000 rpm for 10 minutes. Subsequently, DEMOL N was added to a concentration of 0.05% by mass. The mixture was circulated three times using a pressure homogenizer to prepare a carbon black (B) dispersion.
(Preparation of Wet Masterbatch)
The SBRlatex, the carbon black (A) dispersion, the carbon black (B) dispersion, and oil were mixed so that the ratio by dry mass of the rubber component (solids):the carbon black (A) component (solids) shown in Table 39 or 40:the carbon black (B) component (solids):oil was 100:40:20:20. After the solution became homogeneous, sulfuric acid was added while stirring was continued to adjust the pH to 5, so that coagulation occurred. The thus obtained coagulum was filtered off to recover the rubber component. The rubber component was washed with pure water until the pH of the liquid obtained after washing (washing water) reached 7, followed by drying to obtain a wet masterbatch.

The chemicals used in examples and comparative examples are listed below.
NR: TSR20
SBR: Nipol 1502 (E-SBR, vinyl content: 18% by mass, styrene content: 23.5%) available from Zeon Corporation
Carbon black (A): carbon black prepared in any of Production Examples 1 to 11
Carbon black (B): DIABLACKH (N330, N$_2$SA: 79 m$^2$/g, DBP: 105 ml/100 g, Dmod: 112 nm, ΔD50/Dmod: 0.71, feedstock oil: 100% by mass of creosote oil (BMCI: 160, aliphatic hydrocarbon content: 0% by mass, aromatic hydrocarbon content: 100% by mass)) available from Mitsubishi Chemical Corporation.
WMB: wet masterbatch obtained in the Preparation of wet masterbatch
Oil: Diana Process AH-24 (aromatic process oil) available from Idemitsu Kosan Co., Ltd.
Zinc oxide: zinc oxide available from Mitsui Mining & Smelting Co., Ltd.
Stearic acid: stearic acid "TSUBAKI" available from NOF Corporation
Antioxidant: OZONONE 6C (N-(1,3-dimethylbutyl)-N'-phenyl-p-phenylenediamine) available from Seiko Chemical Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

According to the formulations shown in Tables 39 and 40, the materials other than the sulfur and vulcanization accelerator were kneaded at 150° C. for three minutes using a BP-type Banbury mixer to give a kneadate. Then, the sulfur and vulcanization accelerator were added to the kneadate, followed by kneading at 50° C. for five minutes using an open roll mill to obtain an unvulcanized rubber composition.

The unvulcanized rubber composition was press-vulcanized for 12 minutes at 170° C. to obtain a vulcanized rubber composition.

An amount of 54 parts by mass of WMB consists of 30 parts by mass of SBR, 12 parts by mass of the carbon black prepared in each of the production examples, 6 parts by mass of carbon black (B), and 6 parts by mass of oil.

In each example, the carbon black indicated in the "Carbon black used" column in Table 3 or 4 was used as the carbon black used for preparing a wet masterbatch. Specifically, in Example 12-1, the carbon black prepared in Production Example 2 was used to prepare a wet masterbatch, i.e. a carbon black (A) dispersion.

The vulcanized rubber compositions prepared as above were subjected to the following evaluations. The results are shown in Tables 39 and 40. The reference comparative example in Table 39 is Comparative Example 12-2, and the reference comparative example in Table 40 is Comparative Example 12-6.

(Conductivity)

Test pieces (2 mm in thickness×15 cm×15 cm) were prepared from the vulcanized rubber compositions, and the volume resistivity of the rubber composition test pieces was measured using R8340A for measuring electrical resistance (available from Advantest) at an applied voltage of 100 V under constant temperature and humidity conditions (temperature: 25° C., relative humidity: 50%), and the other measurement conditions were as specified in JIS K 6217: 2008. A smaller value indicates that the rubber composition has a lower volume resistivity and, when used in a rubberized tire cord components, it allows the tire to show good conductivity.

(Breaking Properties)

The tensile strength and elongation at break of each vulcanized rubber composition (vulcanized rubber sheet) were measured in accordance with JIS K 6251. A breaking energy was calculated from: (tensile strength)×(elongation at break)/2 and expressed as an index (breaking energy index) using the equation below, with the reference comparative example set equal to 100. A vulcanized rubber composition with a higher index, when used in a rubberized tire cord component, allows the tire to have better breaking properties.

(Breaking energy index)=(Breaking energy of each formulation example)/(Breaking energy of reference comparative example)×100

(Low Heat Build-Up Properties)

The loss tangent (tan δ) of each vulcanized rubber composition was determined using a viscoelastic spectrometer VES (available from Iwamoto Seisakusho Co., Ltd.) at a temperature of 50° C., an initial strain of 10%, and a dynamic strain of 2%, and expressed as an index using the equation below, with the reference comparative example set equal to 100. A vulcanized rubber composition with a higher index, when used in a rubberized tire cord component, allows the tire to have better rolling resistance properties (low heat build-up properties).

(Low heat build-up property index)=(tan δ of reference comparative example)/(tan δ of each formulation example)×100

TABLE 39

| | | Comparative Example 12-1 | Comparative Example 12-2 | Example 12-1 | Example 12-2 | Example 12-3 | Example 12-4 | Comparative Example 12-3 | Comparative Example 12-4 |
|---|---|---|---|---|---|---|---|---|---|
| Carbon black used | | | | Production Example 1 | Production Example 2 | Production Example 3 | Production Example 4 | Production Example 5 | Production Example 2 | Production Example 1 |
| Amount (parts by mass) | NR | 70 | 70 | 70 | 70 | 70 | 70 | 70 | 70 |
| | SBR | 30 | | | | | | 30 | 30 |
| | Carbon black (B) | 48 | 30 | 30 | 30 | 30 | 30 | 36 | 36 |
| | Carbon black (Production Example 1) | | | | | | | | 12 |
| | Carbon black (Production Example 2) | | | | | | | 12 | |
| | WMB | | 54 | 54 | 54 | 54 | 54 | | |
| | Oil | 10 | 4 | 4 | 4 | 4 | 4 | 10 | 10 |
| | Antioxidant | 2 | 2 | 2 | 2 | 2 | 2 | 2 | 2 |
| | Stearic acid | 2 | 2 | 2 | 2 | 2 | 2 | 2 | 2 |
| | Zinc oxide | 5 | 5 | 5 | 5 | 5 | 5 | 5 | 5 |
| | Sulfur | 3 | 3 | 3 | 3 | 3 | 3 | 3 | 3 |
| | Vulcanization accelerator | 1 | 1 | 1 | 1 | 1 | 1 | 1 | 1 |
| Evaluation result | Conductivity (×10^7Ω · cm) | 1.3 | 0.8 | 0.4 | 0.1 | 0.08 | 0.07 | 0.98 | 1 |
| | Breaking properties | 99 | 100 | 100 | 100 | 100 | 100 | 100 | 100 |
| | Low heat build-up properties | 96 | 100 | 104 | 102 | 103 | 101 | 93 | 90 |

TABLE 40

| | | Comparative Example 12-5 | Comparative Example 12-6 | Example 12-5 | Example 12-6 | Example 12-7 | Example 12-8 | Example 12-9 |
|---|---|---|---|---|---|---|---|---|
| Carbon black used | | | Production Example 6 | Production Example 7 | Production Example 8 | Production Example 9 | Production Example 10 | Production Example 11 |
| Amount (parts by mass) | NR | 70 | 70 | 70 | 70 | 70 | 70 | 70 |
| | SBR | 30 | | | | | | |
| | Carbon black (B) | 48 | 30 | 30 | 30 | 30 | 30 | 30 |
| | WMB | | 54 | 54 | 54 | 54 | 54 | 54 |
| | Oil | 10 | 4 | 4 | 4 | 4 | 4 | 4 |
| | Antioxidant | 2 | 2 | 2 | 2 | 2 | 2 | 2 |
| | Stearic acid | 2 | 2 | 2 | 2 | 2 | 2 | 2 |
| | Zinc oxide | 5 | 5 | 5 | 5 | 5 | 5 | 5 |
| | Sulfur | 3 | 3 | 3 | 3 | 3 | 3 | 3 |
| | Vulcanization accelerator | 1 | 1 | 1 | 1 | 1 | 1 | 1 |
| Evaluation result | Conductivity ($\times 10^7 \Omega \cdot cm$) | 1.3 | 0.2 | 0.01 | 0.09 | 0.03 | 0.06 | 0.07 |
| | Breaking properties | 94 | 100 | 100 | 103 | 101 | 101 | 102 |
| | Low heat build-up properties | 97 | 100 | 103 | 101 | 102 | 102 | 101 |

Tables 39 and 40 show that, in each of the examples using a rubber composition that contained a wet masterbatch obtained by mixing a rubber latex and a dispersion of one or more types of carbon black at least one of which was a specific carbon black, a balanced improvement in breaking properties and low heat build-up properties could be achieved while having excellent conductivity. Specifically, comparison of Comparative Examples 12-2 to 12-4 with Example 12-1 reveals that the incorporation of the specific carbon black in the form of a wet masterbatch synergistically improved conductivity and low heat build-up properties.

It is also demonstrated that, when a test tire was prepared using a rubber composition for carcasses having the formulation of any of Examples 12-1 to 12-9 and a rubber composition for sidewalls having a volume resistivity measured at 100 V of $1 \times 10^9$ Ω·cm or more, the evaluation of conductivity, breaking properties (durability), and low heat build-up properties revealed that the tire was similarly excellent in these properties.

Likewise, it is demonstrated that, when a test tire was prepared using a rubber composition for bands having the formulation of any of Examples 12-1 to 12-9 and a rubber composition for sidewalls having a volume resistivity measured at 100 V of $1 \times 10^9$ Ω·cm or more, the evaluation of conductivity, breaking properties (durability), and low heat build-up properties revealed that the tire was similarly excellent in these properties.

Examples and Comparative Examples in the Aspect 13-1 or 13-2 of the Invention

Production Example 13A,
S-(3-aminopropyl)thiosulfuric acid (Amphoteric Compound A)

To a reaction vessel purged with nitrogen gas were introduced 75 g of 3-bromopropylamine hydrobromide, 85.26 g of sodium thiosulfate pentahydrate, 375 ml of methanol, and 375 ml of water. The mixture was refluxed at 70° C. for five hours and then allowed to cool. Then, methanol was removed under reduced pressure. To the residue was added 13.68 g of sodium hydroxide, and the mixture was stirred at a room temperature for one hour, followed by removing the solvent under reduced pressure. To the residue was added 600 ml of ethanol, and the mixture was refluxed for 1.5 hours. Hot filtration was performed, and the filtrate was condensed under reduced pressure to give a crystal. The crystal was collected by filtration, and washed with ethanol and then hexane. The resulting crystal was dried in vacuum to give a sodium salt of S-(3-aminopropyl)thiosulfuric acid. To a reaction vessel purged with nitrogen gas were introduced 52 g of the sodium salt of S-(3-aminopropyl)thiosulfuric acid, 90 ml of water, and 5 mol/l hydrochloric acid. The solution was condensed under reduced pressure, followed by filtration to collect a crystal. The crystal was dried in vacuum to give S-(3-aminopropyl)thiosulfuric acid represented by the formula (A) below.

(A)

Production Example 13B,
S-(6-aminohexyl)thiosulfuric acid (Amphoteric Compound B)

To a reaction vessel were introduced 99.2 g of potassium phthalimide and 480 ml of dimethylformamide. To the mixture was dropwise added a mixture of 200 g of 1,6-dibromohexane and 200 ml of dimethylformamide at a room temperature. After completion of the dropwise addition, the resulting mixture was heated to 120° C. and then refluxed for five hours. After the reaction mixture was allowed to cool, the solvent was evaporated off from the reaction mixture. Thereto were added ethyl acetate and water for separation, and then the organic phase was condensed. To the residue were added hexane and ethyl acetate to precipitate a crystal. The crystal was taken out and dried in vacuum to give N-(6-bromohexyl)phthalimide. To a reaction vessel were introduced 40 g of the N-(6-bromohexyl) phthalimide, 32.0 g of sodium thiosulfate pentahydrate, 200 ml of methanol, and 200 ml of water, and the mixture was refluxed for five hours. After the reaction mixture was allowed to cool, the solvent was evaporated off from the reaction mixture. To the residue was added 200 ml of ethanol, and the mixture was refluxed for 1.5 hours. Hot filtration was performed, and the filtrate was condensed under reduced pressure to give a crystal, and the crystal was allowed to stand still. Then, the crystal was collected by filtration, and washed with ethanol and then hexane. The resulting crystal was dried in vacuum to give sodium 6-phthalimidohexylthiosulfate. A reaction vessel purged with nitrogen gas was charged with 20.0 g (54.7 mmol) of the sodium 6-phthalimidohexylthiosulfate and 200 ml of ethanol. To the mixture was dropwise added 4.25 g (84.8 mmol) of hydrazine monohydrate. After completion of the dropwise addition, the resulting mixture was stirred at 70° C. for five hours, followed by removing ethanol under reduced pressure. To the residue was added 100 ml of methanol, and the mixture was refluxed for one hour. Hot filtration was performed to give a crystal. The crystal was washed with methanol and dried in vacuum to give a sodium salt of S-(6-aminohexyl)thiosulfuric acid. To a reaction vessel purged with nitrogen gas were introduced 26 g of the sodium salt of S-(6-aminohexyl)thiosulfuric acid, 45 ml of water, and 5 mol/l hydrochloric acid. The solution was condensed under reduced pressure and filtered to give a crystal. The crystal was dried in vacuum to give S-(6-aminohexyl) thiosulfuric acid represented by the formula (B) below.

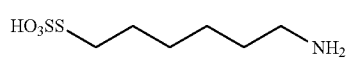

(B)

The median diameter (50% D) of the amphoteric compounds A and B obtained in Production Examples 13A and 13B, respectively, was measured by laser diffraction (by the procedure as described below) using SALD-2000J (available from Shimadzu Corporation) to find that both the amphoteric compounds had a median diameter (50% D) of 66.7 μm. The amphoteric compounds A and B were each ground and adjusted to have a median diameter (50% D) of 14.6 μm before use in the examples described later.
[Measurement Procedure]
The amphoteric compounds A and B obtained in Production Examples 13A and 13B, respectively, were each dispersed in a mixed solution of a dispersing solvent (toluene) and a dispersant (10% by mass solution of sodium di-2-ethylhexylsulfosuccinate in toluene) at a room temperature. The dispersion was stirred for five minutes while being irradiated with ultrasonic waves to prepare a test liquid. The test liquid was transferred to a batch cell and, one minute later, it was subjected to the measurement (refractive index: 1.70-0.20 i)

Production Example 13C, Sodium (2Z)-4-[(4-aminophenyl)amino]-4-oxo-2-butenoate methanol solvate (Amphoteric Compound C)

To a reaction vessel in a nitrogen atmosphere were charged 195.5 g (1.81 mol) of 1,4-phenylenediamine and 3,000 ml of tetrahydrofuran. To the mixture while being cooled with ice was dropwise added a solution of 118.1 g (1.20 mol) of maleic anhydride in 1,200 ml of tetrahydrofuran over about three hours, followed by stirring at a room temperature overnight. After completion of the reaction, the crystal thus precipitated was collected by filtration, washed twice with 250 ml of tetrahydrofuran, and dried at 40° C. to give 241.8 g of crude (2Z)-4-[(4-aminophenyl)amino]-4-oxo-2-butenoic acid as a yellowish orange powder. To 241.8 g of crude (2Z)-4-[(4-aminophenyl)amino]-4-oxo-2-butenoic acid was added 484 ml of water and the mixture was cooled to 0° C. to 10° C., followed by dropwise addition of 216 ml of a 5N sodium hydroxide aqueous solution and then 21 ml of a 1N sodium hydroxide aqueous solution. Thereafter, the solvent was evaporated off under reduced pressure. To the residue was added 200 ml of 2-propanol, and the solvent was again evaporated off under reduced pressure to give a yellowish brown solid. Thereto was added 800 ml of tetrahydrofuran and the mixture was stirred overnight at a room temperature. The solid was collected by filtration, washed with 100 ml of tetrahydrofuran three times, and dried to give 279 g of crude sodium (2Z)-4-[(4-aminophenyl)amino]-4-oxo-2-butenoic acid. The crude sodium (2Z)-4-[(4-aminophenyl)amino]-4-oxo-2-butenoic acid (279 g) was divided into two portions, to each of which was then added 2,800 ml of methanol and refluxed with heating for one hour, followed by hot filtration to remove insolubles. The solids obtained by condensation of each filtrate under reduced pressure were combined, and 750 ml of tetrahydrofuran was added and stirred overnight at a room temperature. After the mixture was kept at 50° C. for 30 minutes, it was subjected to hot filtration. The resulting solid was washed with 150 ml of tetrahydrofuran three times and dried at 45° C. under reduced pressure for five hours to give 264.6 g of sodium (2Z)-4-[(4-aminophenyl)amino]-4-oxo-2-butenoate methanol solvate represented by the formula (C) below as a pale brownish white powder (yield: 84.5%).

H$^1$-NMR (300 MHz, DMSO-d6) δ$_{ppm}$: 14.6 (1H, s), 7.3 (2H, d, J=8.9 Hz), 6.5 (2H, d, J=8.9 Hz), 6.1 (1H, d, J=13.5 Hz), 5.6 (1H, d, J=13.5 Hz), 4.1 (1H, q, J=5.4, 10.5 Hz), 4.8 (2H, s), 3.2 (3H, s).

(C)

The chemicals used in examples and comparative examples are listed below.
NR: TSR20
BR: Ubepol BR150B (cis content: 97% by mass) available from Ube Industries, Ltd.
Carbon black: carbon black prepared in any of Production Examples 1 to 11
Amphoteric compound A: S-(3-aminopropyl)thiosulfuric acid (prepared in Production Example 13A)
Amphoteric compound B: S-(6-aminohexyl)thiosulfuric acid (prepared in Production Example 13B)
Amphoteric compound C: sodium (2Z)-4-[(4-aminophenyl) amino]-4-oxo-2-butenoate methanol solvate (prepared in Production Example 13C)
Oil: Process X-140 (aromatic process oil) available from Japan Energy Corporation
Zinc oxide: zinc oxide #1 available from Mitsui Mining & Smelting Co., Ltd.

Stearic acid: stearic acid "TSUBAKI" available from NOF Corporation
Antioxidant: NOCRAC 6C (N-(1,3-dimethylbutyl)-N'-phenyl-p-phenylenediamine) available from Ouchi Shinko Chemical Industrial Co., Ltd.
Sulfur: powder sulfur available from Tsurumi Chemical industry Co., Ltd.
Vulcanization accelerator: NOCCELER NS (N-tert-butyl-2-benzothiazolylsulfenamide) available from Ouchi Shinko Chemical Industrial Co., Ltd.

Examples and Comparative Examples

According to the formulations shown in Tables 41 to 44, the materials other than the sulfur and vulcanization accelerator were kneaded for three minutes at 160° C. using a 1.7 L Banbury mixer to give a kneadate. Then, the sulfur and vulcanization accelerator were added to the kneadate, followed by kneading for five minutes at 80° C. using an open two roll mill to obtain an unvulcanized rubber composition.

The unvulcanized rubber composition was press-vulcanized for 15 minutes at 170° C. to obtain a vulcanized rubber composition.

The unvulcanized rubber compositions and vulcanized rubber compositions prepared as above were subjected to the following evaluations. The results are shown in Tables 41 to 44. The reference comparative example in Table 41 is Comparative Example 13-3, the reference comparative example in Table 42 is Comparative Example 13-10, the reference comparative example in Table 43 is Comparative Example 13-17, and the reference comparative example in Table 44 is Comparative Example 13-23.

(Processability)

The Mooney viscosity of each unvulcanized rubber composition was measured at 130° C. in accordance with JIS K 6300. The Mooney viscosity ($ML_1+4$) of the reference comparative example is taken as 100, while the $ML_1+_4$ of the other formulation examples is expressed as an index (Mooney viscosity index) using the equation below. A higher index indicates a lower Mooney viscosity and better processability. A Mooney viscosity index of approximately 100 is considered to have sufficiently good processability.

(Mooney viscosity index)=($ML_1+_4$ of reference comparative example)/($ML_1+_4$ of each formulation example)×100

(Low Heat Build-Up Properties)

The loss tangent (tan δ) of each formulation example was determined using a viscoelastic spectrometer VES (available from Iwamoto Seisakusho Co., Ltd.) at a temperature of 50° C., an initial strain of 10%, and a dynamic strain of 2%. The tan δ of the reference comparative example is taken as 100, while the tan δ of the other formulation examples is expressed as an index (rolling resistance index) using the equation below. A higher index indicates better rolling resistance properties (low heat build-up properties).

(Rolling resistance index)=(tan δ of reference comparative example)/(tan δ of each formulation example)×100

(Abrasion Resistance)

Lambourn abrasion loss was determined using a Lambourn abrasion tester at a temperature of 20° C., a slip ratio of 20%, and a test time of 2 minutes. Then, a volume loss was calculated from the Lambourn abrasion loss. The volume loss of each formulation example is expressed as an index (Lambourn abrasion index) using the equation below, with the reference comparative example set equal to 100. A higher index indicates better abrasion resistance.

(Lambourn abrasion index)=(Volume loss of reference comparative example)/(Volume loss of each formulation example)×100

TABLE 41

|  | Comparative Example 13-1 | Comparative Example 13-2 | Comparative Example 13-3 | Example 13-1 | Example 13-2 | Comparative Example 13-4 | Example 13-3 | Example 13-4 |
|---|---|---|---|---|---|---|---|---|
| NR | 50 | 50 | 50 | 50 | 50 | 50 | 50 | 50 |
| BR | 50 | 50 | 50 | 50 | 50 | 50 | 50 | 50 |
| Carbon black (Production Example 1) | 50 | 50 | 50 | — | — | — | — | — |
| Carbon black (Production Example 2) | — | — | — | 50 | 50 | 50 | — | — |
| Carbon black (Production Example 3) | — | — | — | — | — | — | 50 | 50 |
| Carbon black (Production Example 4) | — | — | — | — | — | — | — | — |
| Carbon black (Production Example 5) | — | — | — | — | — | — | — | — |
| Amphoteric compound A | 1 | — | — | 1 | — | — | 1 | — |
| Amphoteric compound B | — | 1 | — | — | 1 | — | — | 1 |
| Oil | 3 | 3 | 3 | 3 | 3 | 3 | 3 | 3 |
| Zinc oxide | 3 | 3 | 3 | 3 | 3 | 3 | 3 | 3 |
| Stearic acid | 3 | 3 | 3 | 3 | 3 | 3 | 3 | 3 |
| Antioxidant | 2 | 2 | 2 | 2 | 2 | 2 | 2 | 2 |
| Sulfur | 2 | 2 | 2 | 2 | 2 | 2 | 2 | 2 |
| Vulcanization accelerator | 1 | 1 | 1 | 1 | 1 | 1 | 1 | 1 |
| Processability | 100 | 100 | 100 | 100 | 100 | 100 | 100 | 100 |

TABLE 41-continued

|  | | | | | | | | |
|---|---|---|---|---|---|---|---|---|
| Low heat build-up properties | 110 | 112 | 100 | 128 | 133 | 107 | 128 | 133 |
| Abrasion resistance | 100 | 100 | 100 | 124 | 129 | 113 | 118 | 122 |

|  | Comparative Example 13-5 | Example 13-5 | Example 13-6 | Comparative Example 13-6 | Example 13-7 | Example 13-8 | Comparative Example 13-7 |
|---|---|---|---|---|---|---|---|
| NR | 50 | 50 | 50 | 50 | 50 | 50 | 50 |
| BR | 50 | 50 | 50 | 50 | 50 | 50 | 50 |
| Carbon black (Production Example 1) | — | — | — | — | — | — | — |
| Carbon black (Production Example 2) | — | — | — | — | — | — | — |
| Carbon black (Production Example 3) | 50 | — | — | — | — | — | — |
| Carbon black (Production Example 4) | — | 50 | 50 | 50 | — | — | — |
| Carbon black (Production Example 5) | — | — | — | — | 50 | 50 | 50 |
| Amphoteric compound A | — | 1 | — | — | 1 | — | — |
| Amphoteric compound B | — | — | 1 | — | — | 1 | — |
| Oil | 3 | 3 | 3 | 3 | 3 | 3 | 3 |
| Zinc oxide | 3 | 3 | 3 | 3 | 3 | 3 | 3 |
| Stearic acid | 3 | 3 | 3 | 3 | 3 | 3 | 3 |
| Antioxidant | 2 | 2 | 2 | 2 | 2 | 2 | 2 |
| Sulfur | 2 | 2 | 2 | 2 | 2 | 2 | 2 |
| Vulcanization accelerator | 1 | 1 | 1 | 1 | 1 | 1 | 1 |
| Processability | 100 | 100 | 100 | 100 | 100 | 100 | 100 |
| Low heat build-up properties | 107 | 133 | 138 | 111 | 122 | 126 | 102 |
| Abrasion resistance | 107 | 107 | 111 | 97 | 112 | 116 | 102 |

TABLE 42

|  | Comparative Example 13-8 | Comparative Example 13-9 | Comparative Example 13-10 | Example 13-9 | Example 13-10 | Comparative Example 13-11 | Example 13-11 | Example 13-12 | Comparative Example 13-12 | Example 13-13 |
|---|---|---|---|---|---|---|---|---|---|---|
| NR | 50 | 50 | 50 | 50 | 50 | 50 | 50 | 50 | 50 | 50 |
| BR | 50 | 50 | 50 | 50 | 50 | 50 | 50 | 50 | 50 | 50 |
| Carbon black (Production Example 6) | 50 | 50 | 50 | — | — | — | — | — | — | — |
| Carbon black (Production Example 7) | — | — | — | 50 | 50 | 50 | — | — | — | — |
| Carbon black (Production Example 8) | — | — | — | — | — | — | 50 | 50 | 50 | — |
| Carbon black (Production Example 9) | — | — | — | — | — | — | — | — | — | 50 |
| Carbon black (Production Example 10) | — | — | — | — | — | — | — | — | — | — |
| Carbon black (Production Example 11) | — | — | — | — | — | — | — | — | — | — |
| Amphoteric compound A | 1 | — | — | 1 | — | — | 1 | — | — | 1 |

TABLE 42-continued

|  | | | | | | | | | | |
|---|---|---|---|---|---|---|---|---|---|---|
| Amphoteric compound B | — | 1 | — | — | 1 | — | — | 1 | — | — |
| Oil | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 |
| Stearic acid | 3 | 3 | 3 | 3 | 3 | 3 | 3 | 3 | 3 | 3 |
| Antioxidant | 2 | 2 | 2 | 2 | 2 | 2 | 2 | 2 | 2 | 2 |
| Sulfur | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 |
| Processability | 100 | 100 | 100 | 100 | 100 | 100 | 100 | 100 | 100 | 100 |
| Low heat build-up properties | 107 | 110 | 100 | 116 | 120 | 97 | 116 | 120 | 97 | 116 |
| Abrasion resistance | 101 | 105 | 100 | 121 | 125 | 110 | 127 | 131 | 115 | 129 |

|  | Example 13-14 | Comparative Example 13-13 | Example 13-15 | Example 13-16 | Comparative Example 13-14 | Example 13-17 | Example 13-18 | Comparative Example 13-15 |
|---|---|---|---|---|---|---|---|---|
| NR | 50 | 50 | 50 | 50 | 50 | 50 | 50 | 50 |
| BR | 50 | 50 | 50 | 50 | 50 | 50 | 50 | 50 |
| Carbon black (Production Example 6) | — | — | — | — | — | — | — | — |
| Carbon black (Production Example 7) | — | — | — | — | — | — | — | — |
| Carbon black (Production Example 8) | — | — | — | — | — | — | — | — |
| Carbon black (Production Example 9) | 50 | 50 | — | — | — | — | — | — |
| Carbon black (Production Example 10) | — | — | 50 | 50 | 50 | — | — | — |
| Carbon black (Production Example 11) | — | — | — | — | — | 50 | 50 | 50 |
| Amphoteric compound A | — | — | 1 | — | — | 1 | — | — |
| Amphoteric compound B | 1 | — | — | 1 | — | — | 1 | — |
| Oil | 3 | 3 | 3 | 3 | 3 | 3 | 3 | 3 |
| Zinc oxide | 3 | 3 | 3 | 3 | 3 | 3 | 3 | 3 |
| Stearic acid | 3 | 3 | 3 | 3 | 3 | 3 | 3 | 3 |
| Antioxidant | 2 | 2 | 2 | 2 | 2 | 2 | 2 | 2 |
| Sulfur | 2 | 2 | 2 | 2 | 2 | 2 | 2 | 2 |
| Vulcanization accelerator | 1 | 1 | 1 | 1 | 1 | 1 | 1 | 1 |
| Processability | 100 | 100 | 100 | 100 | 100 | 100 | 100 | 100 |
| Low heat build-up properties | 120 | 97 | 114 | 118 | 95 | 114 | 118 | 95 |
| Abrasion resistance | 133 | 117 | 121 | 125 | 110 | 121 | 125 | 110 |

TABLE 43

|  | Comparative Example 13-16 | Comparative Example 13-17 | Example 13-19 | Comparative Example 13-18 | Example 13-20 | Comparative Example 13-19 | Example 13-21 | Comparative Example 13-20 | Example 13-22 | Comparative Example 13-21 |
|---|---|---|---|---|---|---|---|---|---|---|
| NR | 50 | 50 | 50 | 50 | 50 | 50 | 50 | 50 | 50 | 50 |
| BR | 50 | 50 | 50 | 50 | 50 | 50 | 50 | 50 | 50 | 50 |
| Carbon black (Production Example 1) | 50 | 50 | — | — | — | — | — | — | — | — |
| Carbon black (Production Example 2) | — | — | 50 | 50 | — | — | — | — | — | — |

TABLE 43-continued

| | Comparative Example 13-16 | Comparative Example 13-17 | Example 13-19 | Comparative Example 13-18 | Example 13-20 | Comparative Example 13-19 | Example 13-21 | Comparative Example 13-20 | Example 13-22 | Comparative Example 13-21 |
|---|---|---|---|---|---|---|---|---|---|---|
| Carbon black (Production Example 3) | — | — | — | — | 50 | 50 | — | — | — | — |
| Carbon black (Production Example 4) | — | — | — | — | — | — | 50 | 50 | — | — |
| Carbon black (Production Example 5) | — | — | — | — | — | — | — | — | 50 | 50 |
| Amphoteric compound C | 1 | — | 1 | — | 1 | — | 1 | — | 1 | — |
| Oil | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 |
| Stearic acid | 3 | 3 | 3 | 3 | 3 | 3 | 3 | 3 | 3 | 3 |
| Antioxidant | 2 | 2 | 2 | 2 | 2 | 2 | 2 | 2 | 2 | 2 |
| Sulfur | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 |
| Processability | 100 | 100 | 100 | 100 | 100 | 100 | 100 | 100 | 100 | 100 |
| Low heat build-up properties | 107 | 100 | 129 | 104 | 130 | 106 | 133 | 111 | 138 | 112 |
| Abrasion resistance | 100 | 100 | 124 | 113 | 118 | 107 | 107 | 97 | 116 | 108 |

TABLE 44

| | Comparative Example 13-22 | Comparative Example 13-23 | Example 13-23 | Comparative Example 13-24 | Example 13-24 | Comparative Example 13-25 | Example 13-25 | Comparative Example 13-26 | Example 13-26 | Comparative Example 13-27 | Example 13-27 | Comparative Example 13-28 |
|---|---|---|---|---|---|---|---|---|---|---|---|---|
| NR | 50 | 50 | 50 | 50 | 50 | 50 | 50 | 50 | 50 | 50 | 50 | 50 |
| BR | 50 | 50 | 50 | 50 | 50 | 50 | 50 | 50 | 50 | 50 | 50 | 50 |
| Carbon black (Production Example 6) | 50 | 50 | — | — | — | — | — | — | — | — | — | — |
| Carbon black (Production Example 7) | — | — | 50 | 50 | — | — | — | — | — | — | — | — |
| Carbon black (Production Example 8) | — | — | — | — | 50 | 50 | — | — | — | — | — | — |
| Carbon black (Production Example 9) | — | — | — | — | — | — | 50 | 50 | — | — | — | — |
| Carbon black (Production Example 10) | — | — | — | — | — | — | — | — | 50 | 50 | — | — |
| Carbon black (Production Example 11) | — | — | — | — | — | — | — | — | — | — | 50 | 50 |
| Amphoteric compound C | 1 | — | 1 | — | 1 | — | 1 | — | 1 | — | 1 | — |
| Oil | 3 | 3 | 3 | 3 | 3 | 3 | 3 | 3 | 3 | 3 | 3 | 3 |
| Zinc oxide | 3 | 3 | 3 | 3 | 3 | 3 | 3 | 3 | 3 | 3 | 3 | 3 |
| Stearic acid | 3 | 3 | 3 | 3 | 3 | 3 | 3 | 3 | 3 | 3 | 3 | 3 |
| Antioxidant | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 | 1 | 1 |
| Processability | 100 | 100 | 100 | 100 | 100 | 100 | 100 | 100 | 100 | 100 | 132 | 100 |
| Low heat build-up properties | 109 | 100 | 131 | 102 | 131 | 106 | 133 | 109 | 125 | 110 | 122 | 105 |
| Abrasion resistance | 100 | 100 | 124 | 113 | 118 | 107 | 107 | 97 | 112 | 116 | 112 | 108 |

Tables 41 to 44 show that, in the examples in which an amphoteric compound containing a specific acidic functional group and a specific basic functional group and carbon black (1) were incorporated, abrasion resistance and low heat build-up properties were synergistically improved while maintaining good processability, and abrasion resistance and low heat build-up properties could be significantly improved.

Specifically, for example, comparison of Comparative Examples 13-1, 13-3, and 13-4 with Example 13-1, comparison of Comparative Examples 13-2, 13-3, and 13-4 with Example 13-2, comparison of Comparative Examples 13-8, 13-10, and 13-11 with Example 13-9, comparison of Comparative Examples 13-9, 13-10, and 13-11 with Example 13-10, comparison of Comparative Examples 13-16, 13-17, and 13-18 with Example 13-19, and comparison of Comparative Examples 13-22, 13-23, and 13-24 with Example 13-23 reveal that the combined use of the amphoteric compound containing a specific acidic functional group and a specific basic functional group (amphoteric compound A, B, or C) and carbon black (1) synergistically improved abrasion resistance and low heat build-up properties.

REFERENCE SIGNS LIST

1: tire
2: chafer rubber
3: clinch rubber
4: cushion rubber
5: covering rubber
6: conductive rubber
7: tread rubber
8: sidewall rubber
9: breaker rubber
10: carcass
11: bead apex
12: band
13: bead core
14: inner sidewall layer rubber
51: insulating plate
52: metal plate
53: tire mounting shaft
54: electrical resistance meter
R: rim

The invention claimed is:

1. A rubber composition, comprising:
a rubber component;
one or more carbon blacks; and
silica, having a nitrogen adsorption specific surface area of 40 to 400 m²/g, in an amount of 1 to 120 parts by mass relative to 100 parts by mass of the rubber component,
wherein at least one of the one or more carbon blacks is produced from a feedstock oil that has a BMCI value of 150 or less and an aliphatic hydrocarbon content of 30% by mass or more, the BMCI value being calculated from an average boiling point T (° C.) and a specific gravity D (60/60° F.) relative to water at 60° F. according to the equation below, $$BMCI=48,640/(T+273)+473.7D-456.8.$$

2. The rubber composition according to claim 1, wherein the at least one carbon black is produced from a feedstock oil that has a BMCI value of 95 or more and an aliphatic hydrocarbon content of 60% by mass or less.

3. The rubber composition according to claim 1, wherein the feedstock oil comprises aliphatic hydrocarbons derived from animal or vegetable oils or modified products thereof in an amount of 10% by mass or more based on 100% by mass of aliphatic hydrocarbons in the feedstock oil.

4. The rubber composition according to claim 1, wherein the feedstock oil comprises tall oil.

5. The rubber composition according to claim 1, wherein the at least one carbon black is produced by a furnace process.

6. A rubber composition, comprising:
a rubber component;
one or more of carbon black, carbon blacks; and
silica, having a nitrogen adsorption specific surface area of 40 to 400 m²/g, in an amount of 1 to 120 parts by mass relative to 100 parts by mass of the rubber component,
wherein at least one of the one or more carbon blacks has, as aggregate properties, a mode diameter (Dmod) of a Stokes' diameter distribution curve of 79 nm or less and a ratio (ΔD50/Dmod) of a half width (ΔD50) of the distribution curve to the Dmod of 0.78 or more.

7. The rubber composition according to claim 1, wherein the rubber composition is used as a rubber composition for tires.

8. A pneumatic tire, formed from the rubber composition according to claim 7.

* * * * *